United States Patent
Rosenberg et al.

(10) Patent No.: US 9,459,746 B2
(45) Date of Patent: *Oct. 4, 2016

(54) CAPACITIVE TOUCH SENSOR SYSTEM AND METHOD

(71) Applicant: Sensel, Inc., Mountain View, CA (US)

(72) Inventors: Ilya Daniel Rosenberg, Mountain View, CA (US); John Aaron Zarraga, San Francisco, CA (US)

(73) Assignee: Sensel, Inc., Mountain View, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/499,090

(22) Filed: Sep. 27, 2014

(65) Prior Publication Data

US 2015/0091859 A1    Apr. 2, 2015

Related U.S. Application Data

(63) Continuation-in-part of application No. 14/314,662, filed on Jun. 25, 2014, now Pat. No. 9,001,082.

(60) Provisional application No. 61/883,597, filed on Sep. 27, 2013, provisional application No. 61/928,269, filed on Jan. 16, 2014, provisional application No. 62/025,589, filed on Jul. 17, 2014.

(51) Int. Cl.
*G06F 3/044* (2006.01)
*G06F 3/047* (2006.01)
(Continued)

(52) U.S. Cl.
CPC .......... *G06F 3/044* (2013.01); *G06F 3/03545* (2013.01); *G06F 3/045* (2013.01);
(Continued)

(58) Field of Classification Search
CPC ........ G06F 3/045; G06F 3/047; G06F 3/044; G06F 3/0414; G06F 3/0416; G06F 3/0418; G06F 3/046; G06F 3/03545; G06F 2203/04104

USPC ................ 345/156–184; 178/18.01–20.04
See application file for complete search history.

(56) References Cited

U.S. PATENT DOCUMENTS 4,374,384 A    2/1983  Moates
4,555,693 A *  11/1985 Danish ................. H03M 11/24
                                                                      178/17 C
(Continued)

OTHER PUBLICATIONS

International Search Report and Written Opinion of the International Searching Authority for International Application No. PCT/US2014/057912 dated Jan. 2, 2015 (9 pages).
(Continued)

*Primary Examiner* — Dmitriy Bolotin
(74) *Attorney, Agent, or Firm* — James R. Gourley; Kevin M. Klughart; Carstens & Cahoon, LLP

(57) ABSTRACT

A capacitive touch sensor system and method incorporating an interpolated sensor array is disclosed. The system and method utilize a touch sensor array (TSA) configured to detect proximity/contact/pressure (PCP) via a variable impedance array (VIA) electrically coupling interlinked impedance columns (IIC) coupled to an array column driver (ACD), and interlinked impedance rows (IIR) coupled to an array row sensor (ARS). The ACD is configured to select the IIC based on a column switching register (CSR) and electrically drive the IIC using a column driving source (CDS). The VIA conveys current from the driven IIC to the IIC sensed by the ARS. The ARS selects the IIR within the TSA and electrically senses the IIR state based on a row switching register (RSR). Interpolation of ARS sensed current/voltage allows accurate detection of TSA PCP and/or spatial location.

132 Claims, 125 Drawing Sheets

(51) Int. Cl.
  *G06F 3/045* (2006.01)
  *G06F 3/041* (2006.01)
  *G06F 3/046* (2006.01)
  *G06F 3/0354* (2013.01)

(52) U.S. Cl.
  CPC .............. *G06F 3/046* (2013.01); *G06F 3/047* (2013.01); *G06F 3/0414* (2013.01); *G06F 3/0416* (2013.01); *G06F 3/0418* (2013.01); *G06F 2203/04104* (2013.01)

(56) References Cited

U.S. PATENT DOCUMENTS

| | | |
|---|---|---|
| 4,856,993 A | 8/1989 | Maness |
| 5,505,072 A | 4/1996 | Oreper |
| 5,719,597 A | 2/1998 | Fong |
| 5,756,904 A | 5/1998 | Oreper |
| 5,844,506 A | 12/1998 | Binstead |
| 5,905,209 A | 5/1999 | Oreper |
| 6,694,826 B2 | 2/2004 | Kiribayashi |
| 7,499,036 B2 | 3/2009 | Flowers |
| 7,926,365 B2 | 4/2011 | Yeh |
| 8,036,846 B1 | 10/2011 | Vullaganti |
| 8,416,213 B2 | 4/2013 | Shen |
| 8,766,925 B2 | 7/2014 | Perlin |
| 9,001,082 B1* | 4/2015 | Rosenberg ............ G06F 3/0414 178/18.05 |
| 2006/0238518 A1 | 10/2006 | Westerman |
| 2007/0234825 A1 | 10/2007 | Loomis |
| 2007/0235231 A1 | 10/2007 | Loomis |
| 2007/0257890 A1 | 11/2007 | Hotelling |
| 2008/0158172 A1 | 7/2008 | Hotelling |
| 2008/0162996 A1 | 7/2008 | Krah |
| 2009/0256817 A1 | 10/2009 | Perlin |
| 2009/0284398 A1 | 11/2009 | Shen |
| 2010/0037709 A1 | 2/2010 | Yeh |
| 2010/0300773 A1 | 12/2010 | Cordeiro |
| 2011/0141026 A1 | 6/2011 | Joquet |
| 2012/0062497 A1 | 3/2012 | Rebeschi |
| 2012/0105361 A1 | 5/2012 | Kremin |
| 2013/0082936 A1 | 4/2013 | Islamkulov |
| 2015/0091858 A1* | 4/2015 | Rosenberg ............ G06F 3/0414 345/174 |

OTHER PUBLICATIONS

International Search Report and Written Opinion of the International Searching Authority for International Application No. PCT/US2014/057911 dated Jan. 2, 2015 (9 pages).

International Search Report and Written Opinion of the International Searching Authority for International Application No. PCT/US2014/057913 dated Jan. 2, 2015 (9 pages).

* cited by examiner

|    | -3 | -2  | -1  | 0    | 1   | 2   | 3  |
|----|----|-----|-----|------|-----|-----|----|
| -3 | 0% | 0%  | 0%  | 0%   | 0%  | 0%  | 0% |
| -2 | 0% | 11% | 22% | 33%  | 22% | 11% | 0% |
| -1 | 0% | 22% | 44% | 67%  | 44% | 22% | 0% |
| 0  | 0% | 33% | 67% | 100% | 67% | 33% | 0% |
| 1  | 0% | 22% | 44% | 67%  | 44% | 22% | 0% |
| 2  | 0% | 11% | 22% | 33%  | 22% | 11% | 0% |
| 3  | 0% | 0%  | 0%  | 0%   | 0%  | 0%  | 0% |

*FIG. 36*
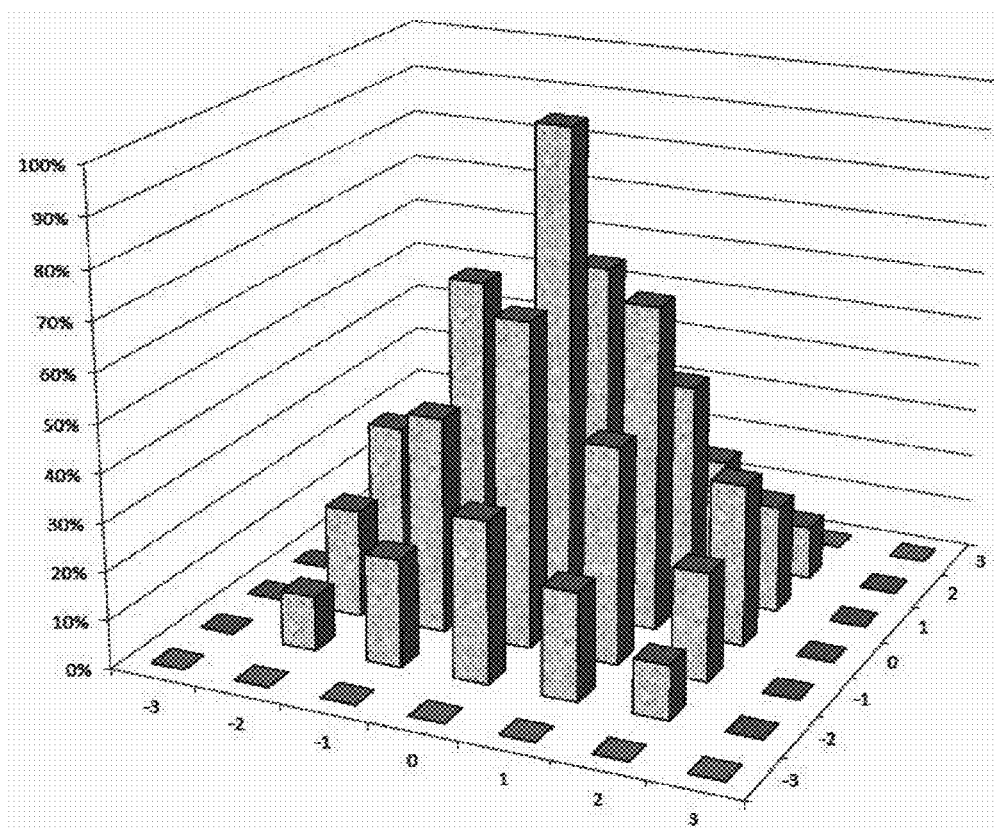

FIG. 62
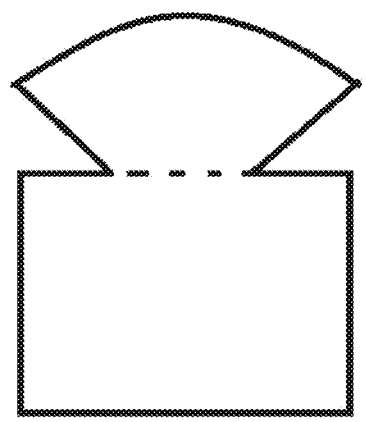 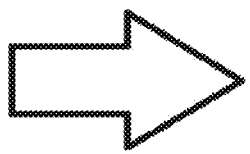 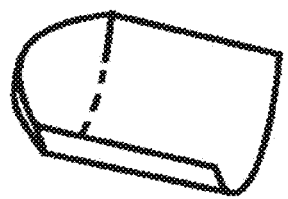

FIG. 63
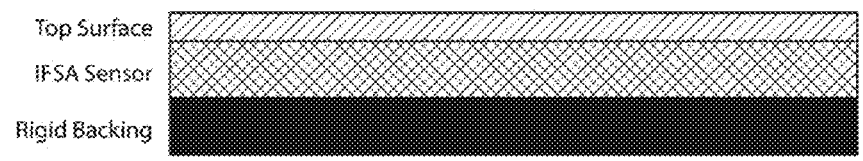
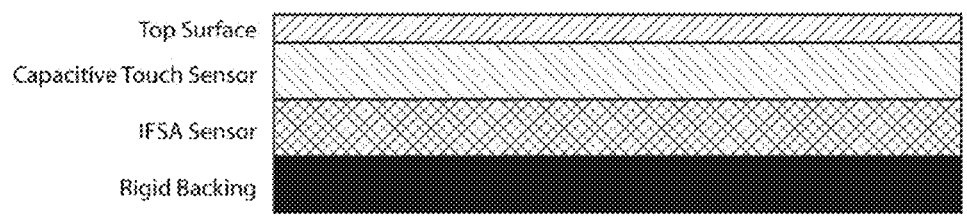
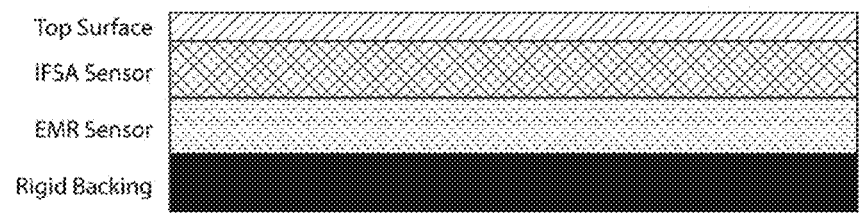
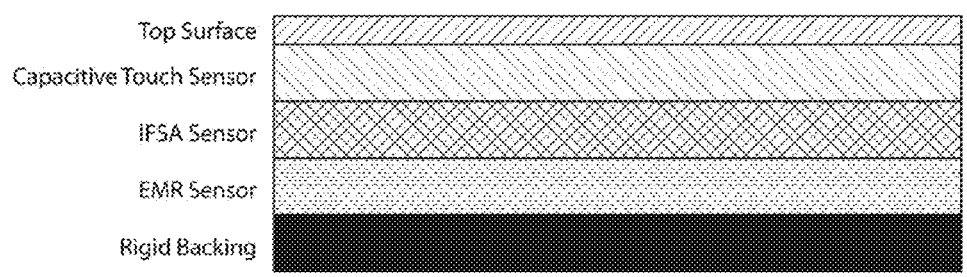

*FIG. 64*
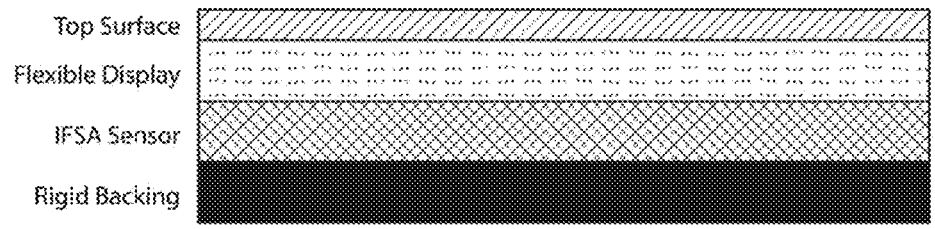
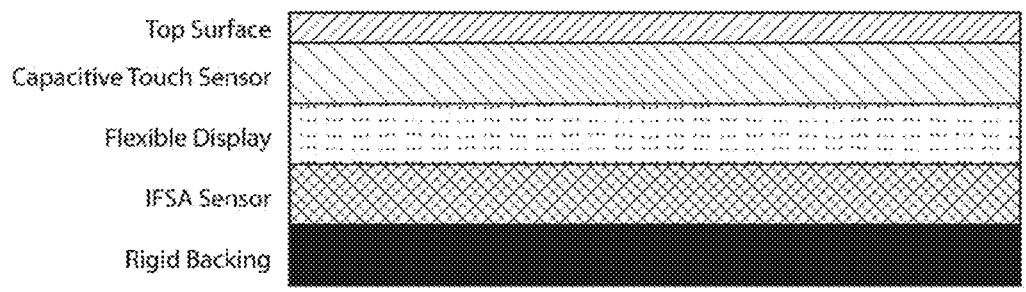
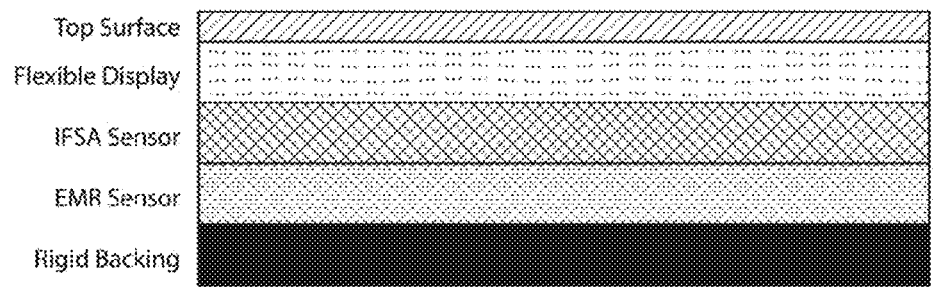
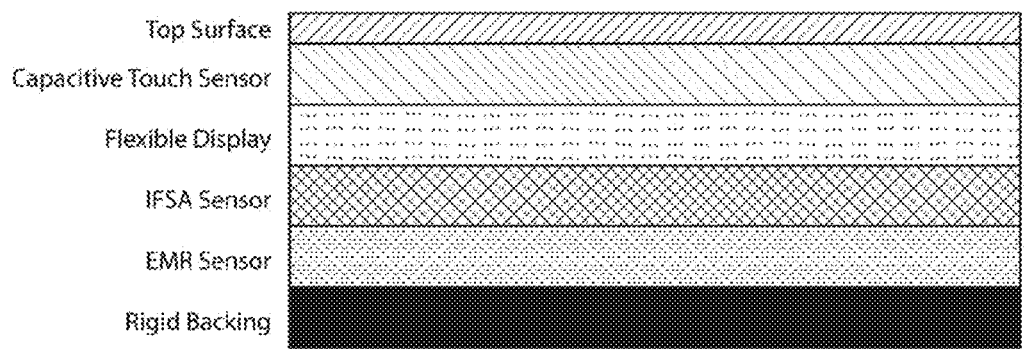

*FIG. 101*
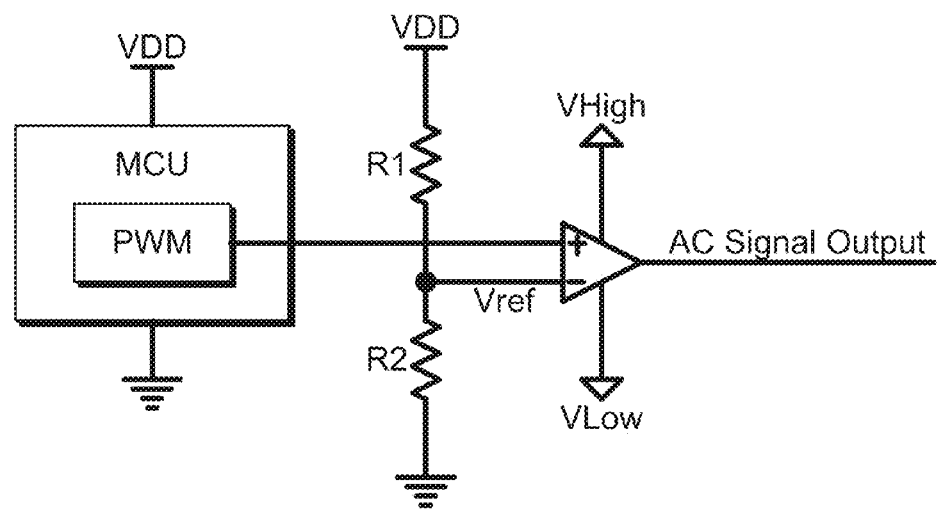
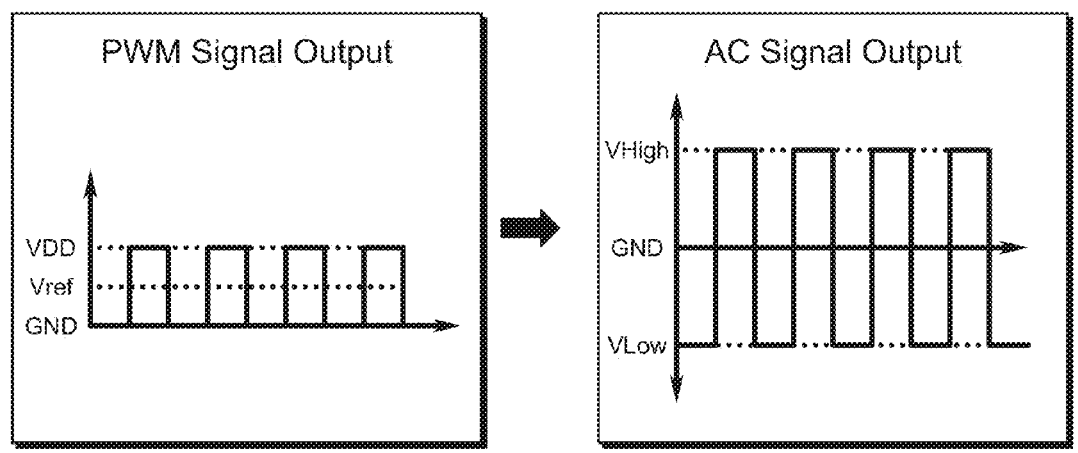

*FIG. 103*
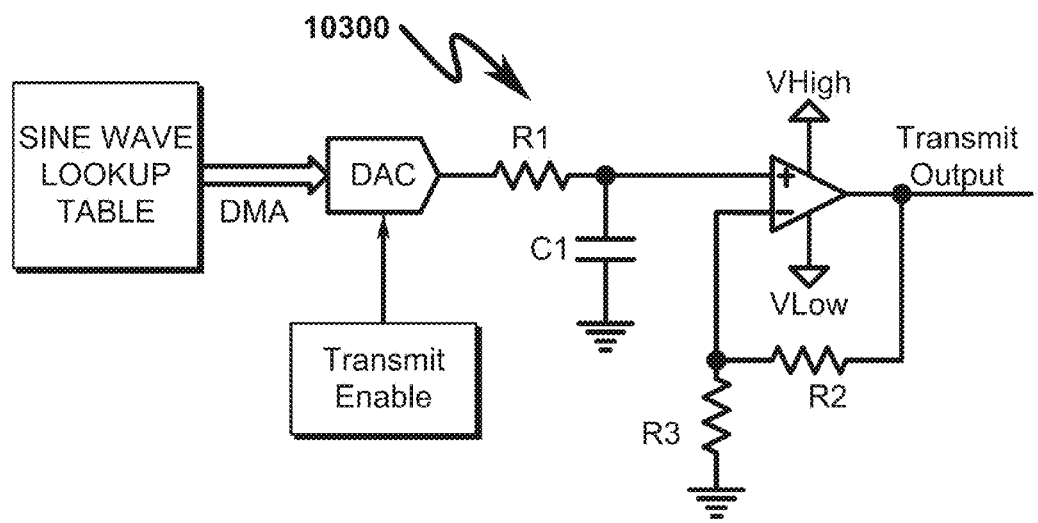
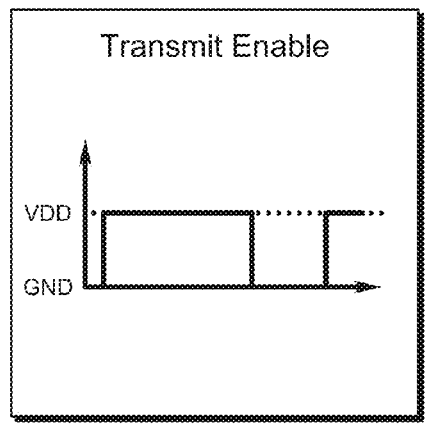
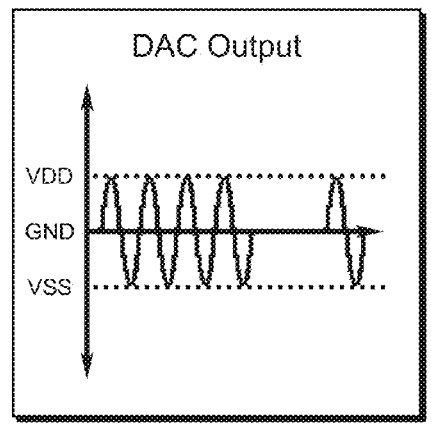
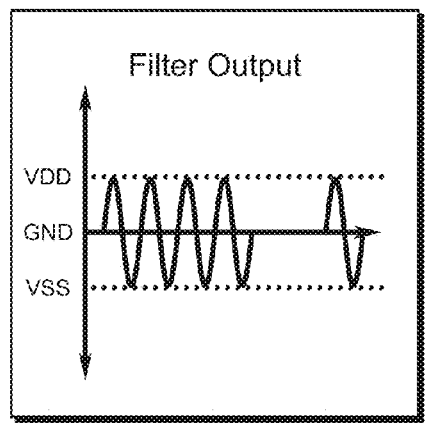
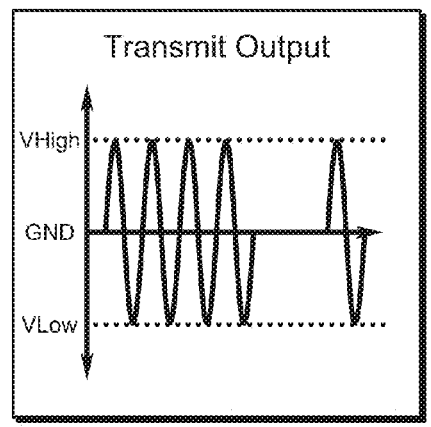

*FIG. 105*
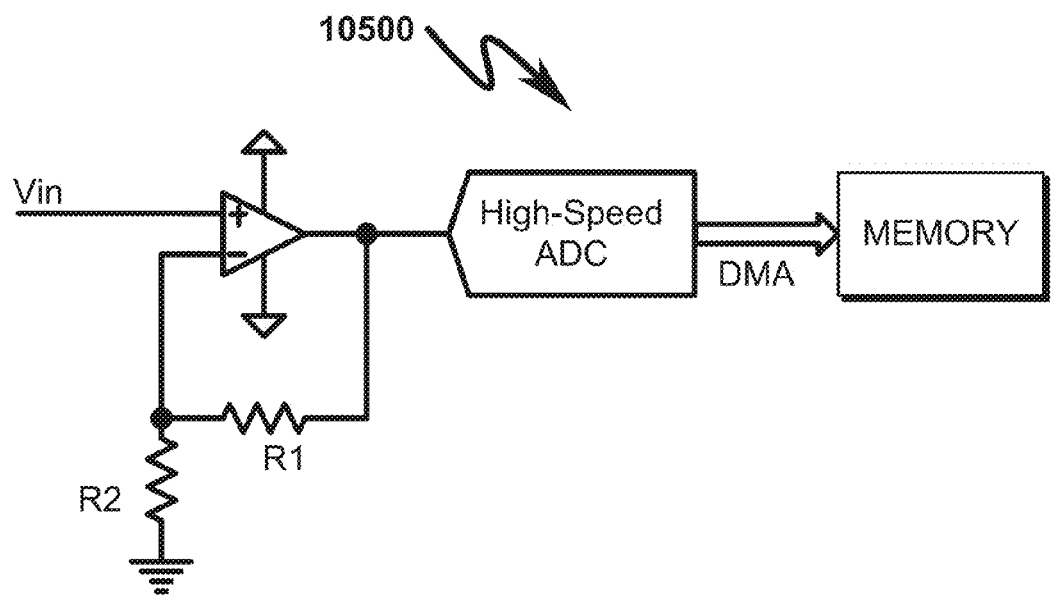
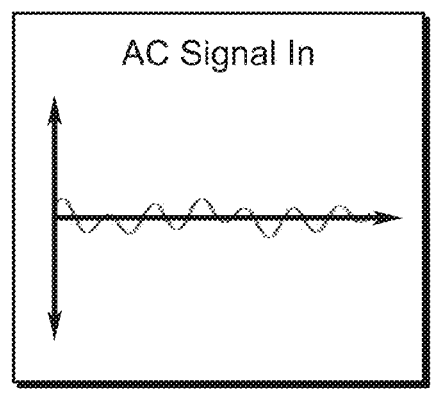
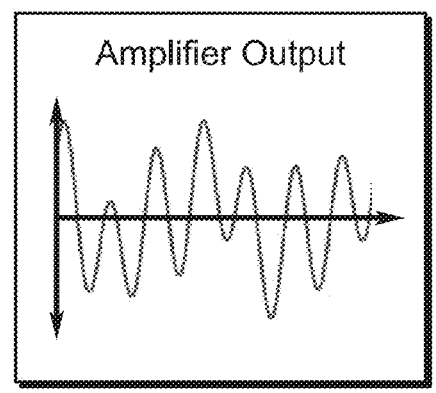
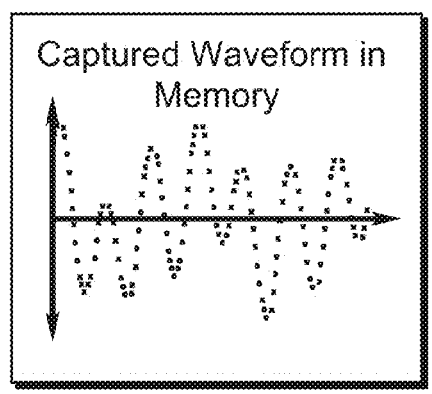

*FIG. 107*
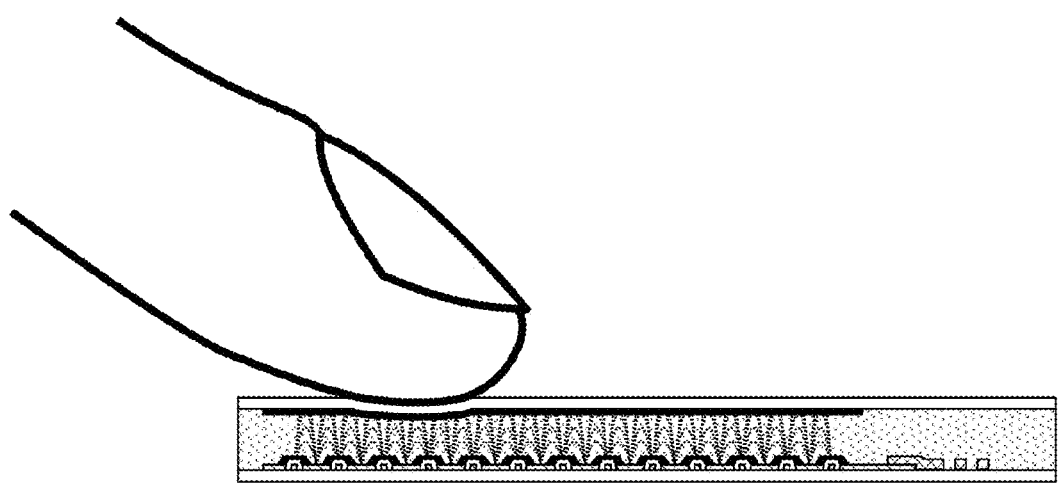

FIG. 108
10800
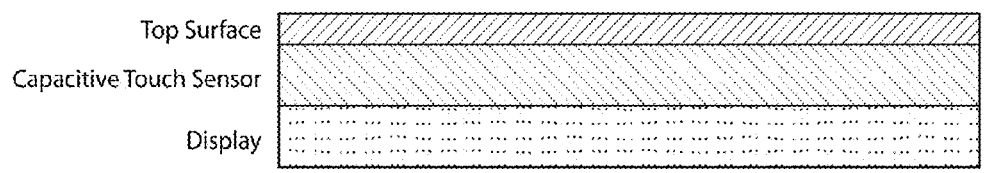
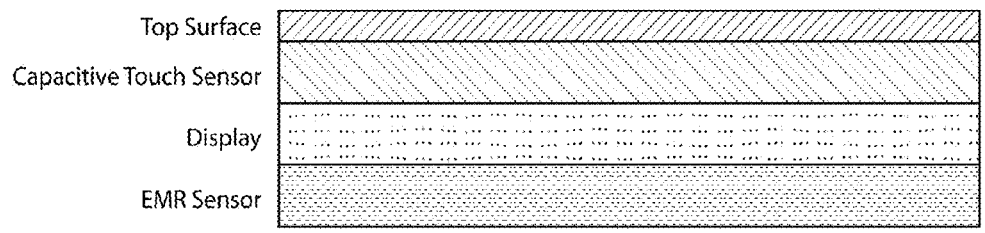

*Prior Art*

Prior Art

FIG. 112
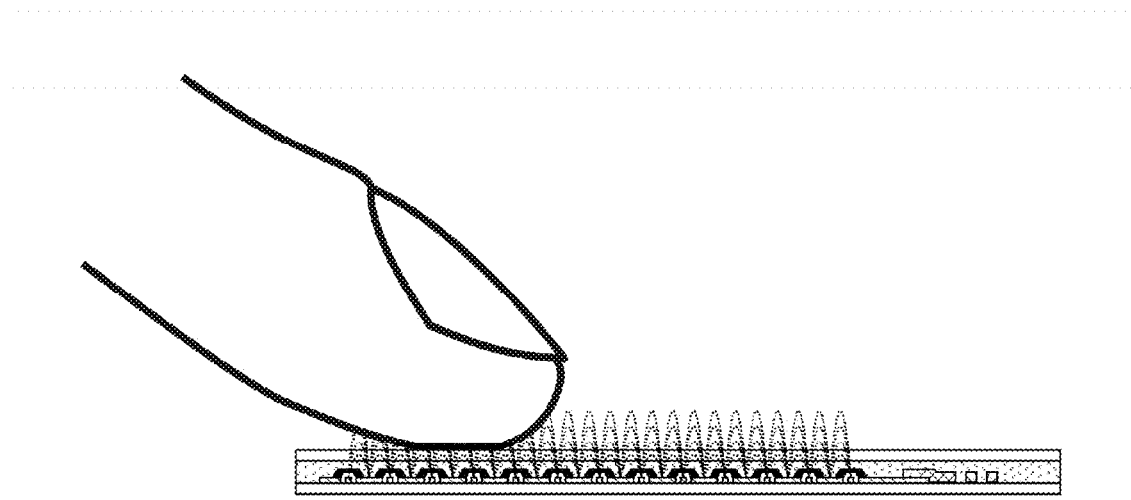

FIG. 113
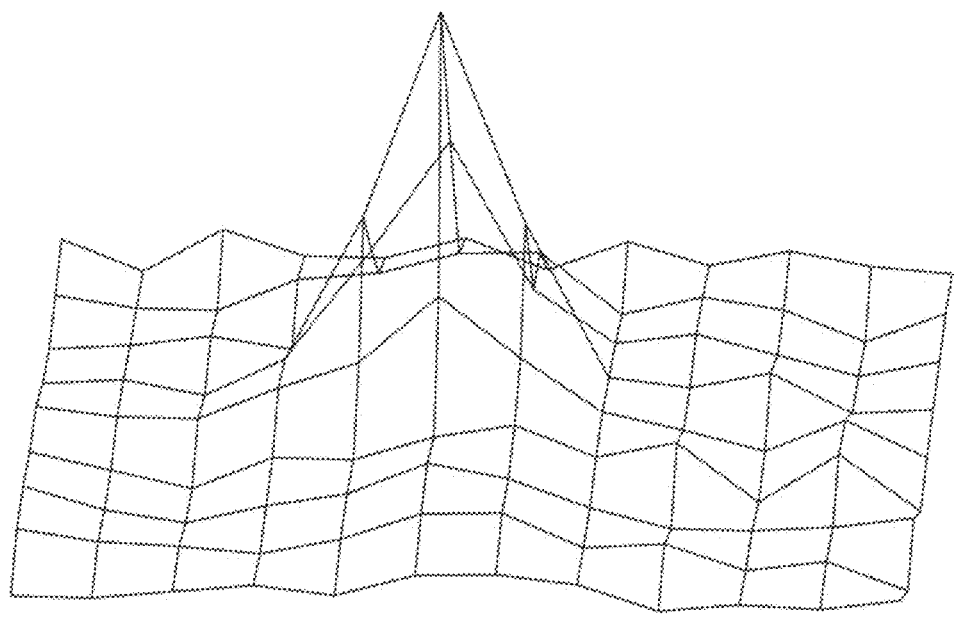
Prior Art

FIG. 114
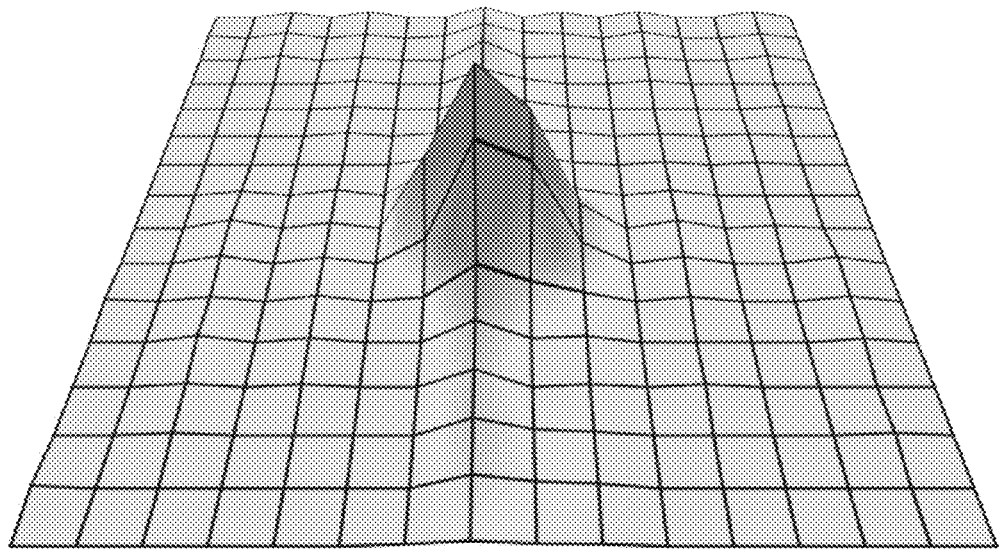

*FIG. 125*

|  | Resistive Force Sensor ||
|---|---|---|
|  | Object NOT Detected | Object Detected |
| Capacitive Sensor — Object NOT Detected | State 1<br>Path C ⟷<br>No objects interacting with sensor or,<br>Non-conductive object hovering<br>Path B · Path A | State 4<br>Object is made of non-conductive material<br>Contact is exerting force on the sensor (not hovering) |
| Capacitive Sensor — Object Detected | State 2<br>Object is made of a conductive material<br>Object is hovering or contacting the sensor with a very light force | State 3<br>Object is made of a conductive material<br>Object is exerting force on the sensor (not hovering) |

CAPACITIVE TOUCH SENSOR SYSTEM AND METHOD

CROSS REFERENCE TO RELATED APPLICATIONS

Continuation Patent Application (CPA)

This is a continuation patent application (CPA) of and incorporates by reference United States Utility Patent Application for TOUCH SENSOR DETECTOR SYSTEM AND METHOD by inventors Ilya Daniel Rosenberg and John Aaron Zarraga, filed electronically with the USPTO on Jun. 25, 2014, with Ser. No. 14/314,662, EFSID 19410170, confirmation number 8306.

Utility Patent Applications

This application claims benefit under 35 U.S.C. §120 and incorporates by reference United States Utility Patent Application for TOUCH SENSOR DETECTOR SYSTEM AND METHOD by inventors Ilya Daniel Rosenberg and John Aaron Zarraga, filed electronically with the USPTO on Jun. 25, 2014, with Ser. No. 14/314,662, EFSID 19410170, confirmation number 8306.

Provisional Patent Applications

This application claims benefit under 35 U.S.C. §119 and incorporates by reference United States Provisional Patent Application for INTERPOLATING FORCE SENSING ARRAY by inventor Ilya Daniel Rosenberg, filed electronically with the USPTO on Sep. 27, 2013, with Ser. No. 61/883,597.

This application claims benefit under 35 U.S.C. §119 and incorporates by reference United States Provisional Patent Application for INTERPOLATING FORCE SENSING ARRAY by inventor Ilya Daniel Rosenberg, filed electronically with the USPTO on Jan. 16, 2014, with Ser. No. 61/928,269.

This application claims benefit under 35 U.S.C. §119 and incorporates by reference United States Provisional Patent Application for TACTILE TOUCH SENSOR SYSTEM AND METHOD by inventors Ilya Daniel Rosenberg and John Aaron Zarraga, filed electronically with the USPTO on Jul. 17, 2014, with Ser. No. 62/025,589, EFS ID 19606351, confirmation number 5185.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods in the field of touch sensor devices. Specific invention embodiments may have particular applicability to touch-based force-sensing devices and methods for determining the location and amount of force exerted on a pressure-sensitive surface.

PRIOR ART AND BACKGROUND OF THE INVENTION

In the field of touch-based force-sensing apparatus, multi-touch sensors have been developed and are commonly used to add touch-based user input to a variety of communications and computing appliances including computers, tablets, and similar electronics devices.

Multiple touch pressure or force-sensing relative to a force-sensing apparatus refers to the ability of a computing system using touch-based sensors to distinguish and independently track multiple touches exerted in real-time against the sensing apparatus. Such technology enables computing appliance operators to use multiple hands and fingers and other objects such as a styli to provide input and enables multiple users to simultaneously interact with the sensor apparatus.

One problem with existing touch sensing systems is a requirement for accuracy in determining the precise location and nature of the force exerted against the sensing surface. Moreover, there is a market demand for larger devices having larger touch-screen areas for entering touch-based instruction to operate computing programs and applications. There is also a need for small sensors (such as touch sensors for mobile devices) with improved tracking resolution. Therefore, there is motivation in the art to seek touch-sensing technologies that remain accurate and may still be economically feasible for manufacture and operation.

Therefore, what is clearly needed is a force-sensing apparatus that can be provided in a larger footprint with less electronics and that may sense the presence and location of, as well as the amount of force exerted with every touch in a multi-touch sequence of input operation.

BACKGROUND INFORMATION

One of the greatest challenges in creating a multi-touch sensor for user interface applications is that most people are capable of extremely precise movements, and expect the touch sensor to faithfully capture their input. For a good user experience, a touch panel for finger interaction usually requires accuracy on the order of 0.5 mm, while interaction with a stylus requires even higher accuracy on the order of 0.1 mm. Furthermore, most users want larger device surfaces to interact with. This is evidenced by the increasing sizes of smart-phones, and the growing popularity of devices with larger touch surfaces such as tablet computers and touch displays.

Furthermore, the complexity of consumer electronic devices tends to increase over time while prices tend to decrease, which suggests that any touch sensor device used for consumer electronics applications must be inexpensive to manufacture and must have a high performance to price ratio. Thus, a sensor that can track touches very precisely over a large area, and can be manufactured at a reasonable price point is needed. Finally, users want extra dimensions of interactivity. This technology provides not only precise touch tracking over large surfaces at a reasonable price point, but also measures the extra dimension of force for every touch, which can increase the level of interactivity and control in many user interface applications.

DEFICIENCIES IN THE PRIOR ART

The prior art as detailed above suffers from the following deficiencies:
- Prior art sensor systems require individual column drive and row sense circuitry for each row/column in the sensing array.
- Prior art sensor systems consume significant dynamic power in scanning the sense array because each column must be driven and each row sensed to detect pressure/presence at a given column/row intersection in the sensing array.
- Prior art sensor systems require significant electronics integration to support large area sensing surfaces.
- Prior art sensor systems are not capable of sensing contact and pressure with the same device.
- Prior art sensor systems require relatively complex manufacturing processes to achieve high spatial sensing resolutions.
- Prior art sensor systems are generally not compatible with standard PCB manufacturing processes and methods.
- Prior art sensor systems are not amenable to construction in non-planar formats.
- Prior art sensor systems require relatively complex calibration procedures to achieve accurate sensor positioning data.
- Prior art sensor systems do not produce a linear relationship between sensor data and detected spatial positioning within the array.
- Prior art sensor systems are not conducive to the design of non-rectangular sensor shapes due to non-linearity which results when creating a non-rectangular sensor.
- Prior art sensor systems do not allow scanning the sensor at various resolutions while maintaining linearity.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
(1) Provide for a touch sensor detector system and method that does not require individual column drive and row sense circuitry for each row/column in the sensing array.
(2) Provide for a touch sensor detector system and method that reduces dynamic power consumption when scanning the sense array by reducing the number of columns that must be driven and the number of rows sensed to detect pressure/presence at a given column/row intersection in the sensing array.
(3) Provide for a touch sensor detector system and method that does not require significant electronics integration to support large area sensing surfaces.
(4) Provide for a touch sensor detector system and method that is capable of sensing contact and pressure with the same device.
(5) Provide for a touch sensor detector system and method that does not require complex manufacturing processes to achieve high spatial sensing resolutions.
(6) Provide for a touch sensor detector system and method that is compatible with standard PCB manufacturing processes and methods.
(7) Provide for a touch sensor detector system and method that is amenable to construction in non-planar formats.
(8) Provide for a touch sensor detector system and method that does not require complex calibration procedures to achieve accurate sensor positioning data.
(9) Provide for a touch sensor detector system and method that produces a linear relationship between sensor data and detected spatial positioning within the array.
(10) Provide for a touch sensor detector system and method that allows creation of non-rectangular sensors that maintain accuracy and linearity across the entire sensor.
(11) Provide for a touch sensor detector system and method that allows scanning at varying resolutions while maintaining full accuracy and linearity.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addresses several of the deficiencies in the prior art in the following manner. Rather than utilizing individual column drivers within a touch sensor array (TSA) to individually drive the TSA columns to convey current for individual row sensors to detect, the present invention interconnects groups of TSA columns into interlinked impedance columns (IICs). These IICs are driven using one of a number of electrical column driving sources (CDS) under control of a column switching register (CSR). When the TSA internal variable impedance array (VIA) detects a sensor event, individual columns and rows of the VIA are electrically coupled. This event enables current conduction from the IICs to interlinked impedance rows (IIR) within the VIA. The IIRs are then selected by a row switching register (RSR) and sensed by an analog-to-digital converter (ADC).

A computer control device (CCD) permits the TSA to be continuously scanned using different configurations of CSR/RSR state as well as CDS driving parameters. These scans permit the CCD to gather differential sensor data within the VIA internal to the TSA and interpolate this information to gather a more accurate indication of the sensor profile associated with the current TSA state. For example, the TSA may be configured for scanning at one resolution and then rescanned using a different resolution to determine both the focal point of contact with the TSA but also movement of this focal point over time and across each TSA scan. Within this context, a focal point of one scanning pass may also be used to determine a vector of travel when compared to the focal point of subsequent scanning passes. This sensor profile may include information on the exact location of the focal point of sensor activity on the TSA surface as well as other information regarding a more accurate indication of sensor detection present at or near the TSA surface.

In some preferred invention embodiments, the present invention may be applied to the creation of a low-cost, multi-touch, high resolution, force sensing touch sensor that can be manufactured using traditional PCB manufacturing methods as well as additive printing techniques. The present invention utilizes the concept of an interpolating array which allows a high tracking resolution without requiring a large number of drive and sense lines to be connected to the sensor scan electronics (active lines). By increasing the tracking resolution relative to the number of active drive and sense lines, the present invention allows for increased sensor performance with reduced electronics complexity and cost as compared to other sensor technologies. Herein are described several possible embodiments for the sensor and how it can be adapted to different use cases such as stylus interaction and embedding below or over a display.

In one preferred interpolating force sensing array (IFSA) embodiment, the present invention addresses deficiencies in the prior art by adding a network of resistors to the inputs and outputs of a force sensing array which decouples the resolution of the force sensing array from the resolution of the drive and sense circuitry. This preferred embodiment electrically drives and senses the sensor in a fashion that creates a bilinear interpolation kernel around each row/column intersection. This allows reconstruction of the position of the touch at the resolution of the force sensing array, even though the present invention drive and sense circuitry has a much lower resolution. Interestingly, the resolution of the drive and sense circuitry only has an effect on the distance at which two distinct touches start to look like one to the processing algorithms, and does not have an effect on the accuracy with which a single touch can be tracked. In addition to the interpolating resistor network, the present invention teaches several methods of construction for the present invention sensors using known manufacturing techniques, and it shows the implementation of the driving circuitry, the algorithms for scanning the sensor, and the algorithms for interpreting the output. It also suggests how the present invention sensor technology can be integrated with other sensing and display technologies.

BRIEF DESCRIPTION OF THE DRAWINGS

For a fuller understanding of the advantages provided by the invention, reference should be made to the following detailed description together with the accompanying drawings wherein:

FIG. 36 illustrates a 3D representation of the sensitivity distribution of the 7×7 array of sensors shown in FIG. 34 as it is being scanned using the present invention drive scheme and depicts linear sensitivity falloff for sensor elements as they get farther away from the intersection at location (0,0) along both the X and Y axes;

FIG. 62 illustrates how an IFSA sensor designed with cuts and bend lines can be bent into complex shapes. In this example, the pattern on the left can be bent to form a sensor for a robot fingertip as shown on the right;

FIG. 63 illustrates four cross-sections of possible IFSA Sensor stackups;

FIG. 64 illustrates four cross-sections of possible IFSA Sensor stackups which include a display;

FIG. 101 illustrates circuitry that generates a square wave transmission signal using a PWM module and a comparator;

FIG. 103 illustrates circuitry that generates a sine wave transmission signal using a sine wave lookup table, a DAC, a filter, and an amplifier;

FIG. 105 illustrates circuitry that captures an AC waveform comprising of multiple frequencies;

FIG. 107 illustrates a stackup that adds force sensitivity to an interpolating capacitive touch sensor through the use of a conductive film adhered to the underside of a flexible top layer and a deformable middle layer;

FIG. 108 illustrates a stackup that adds an interpolating capacitive touch sensor on top of a display, with an optional EMR sensor underneath;

FIG. 112 illustrates a cross section (with visible electric-field lines) of an interpolating capacitive touch sensor configuration 4 millimeter active electrode pitch and a 1 millimeter pattern pitch;

FIG. 113 illustrates the response of a standard existing capacitive touch sensor solution;

FIG. 114 illustrates the response of an interpolating capacitive touch sensor solution;

FIG. 119 illustrates a flowchart depicting the scanning method for an interpolating capacitive touch sensor with an active stylus;

FIG. 120 illustrates a flowchart depicting the scanning method subroutines for an interpolating capacitive touch sensor with an active stylus that embodies the structure of FIG. 96;

FIG. 121 illustrates a flowchart depicting the scanning method subroutines for an interpolating capacitive touch sensor with an active stylus that embodies the structure of FIG. 97;

FIG. 122 illustrates a flowchart depicting the scanning method for a sensor that embodies the structure of FIG. 99;

FIG. 123 illustrates a flowchart depicting an alternate method for scanning a sensor that embodies the structure of FIG. 99;

FIG. 124 illustrates the measured signal of an active capacitive stylus interacting with an interpolating capacitive sensor at each active row and column electrode; and FIG. 125 illustrates a matrix of possible detection states for a given contact when using a sensor capable of both capacitive and force-sensitive touch sensing.

DESCRIPTION OF THE PRESENTLY PREFERRED EXEMPLARY EMBODIMENTS

Figure 1:
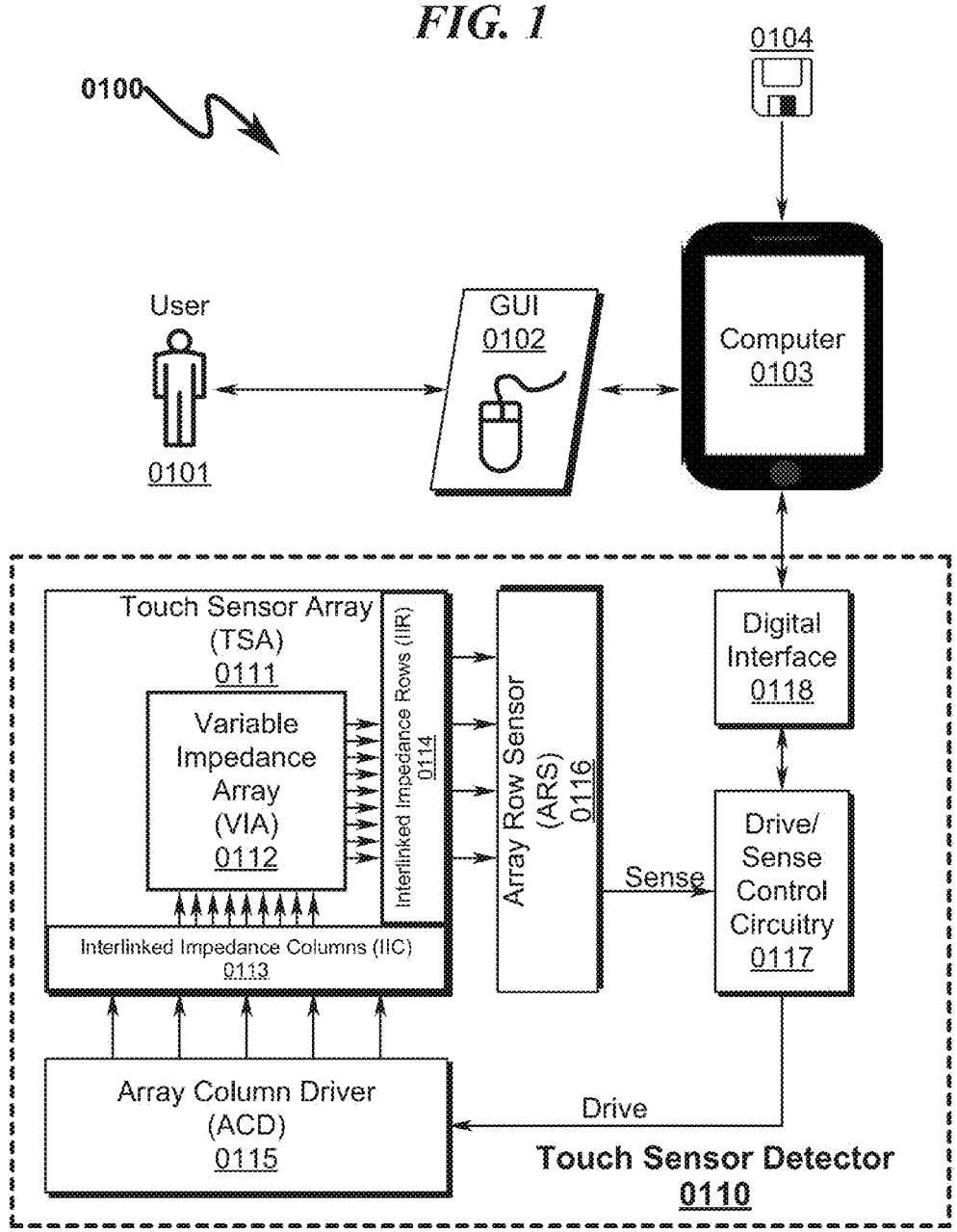
FIG. 1 illustrates a system block diagram of a preferred exemplary system embodiment.

While the present invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a TOUCH SENSOR DETECTOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

IIC/IIR Order Not Limitive

The present invention may utilize a variety of different configurations of interlinked impedance columns (IIC) and interlinked impedance rows (IIR). In many preferred embodiments there will be two or more IICs and two or more IIRs, thus permitting a reduction of both the number of VIA externally accessible columns and rows by a factor of two or more in the column and row orientations. However, some preferred invention embodiments may utilize a singular inter-column impedance element or a singular inter-row impedance element in one or more columns/rows. Thus, the terms IIC and IIR encompass the condition in which only one dimension of the VIA incorporates an interlinked impedance element.

Column Driving Source (CDS) Not Limitive

The present invention may utilize a wide variety of sources to drive the VIA sensor columns, including but not limited to: DC voltage source; AC voltage source; arbitrary waveform generator (AWG) voltage source; DC current source; AC current source; and arbitrary waveform generator (AWG) current source. Note that the use of AWG sources in this context may include a wide variety of signaling waveforms that may be dynamically defined/generated using conventional waveform generation techniques well known in the electrical arts.

CSR/RSR Sources/Sinks Not Limitive

The present invention may utilize a wide variety of electrical sources and electrical sinks within the column switching register (CSR) and row switching register (RSR) to configure stimulation and/or sensing of the VIA. Within this context, the present invention anticipates the use of CSR sources selected from a group consisting of: open circuit; zero potential voltage source; voltage source defined by the CSR; current source defined by the CSR; voltage derived from the CDS; and current derived from the CDS. Within this context the present invention anticipates the use of RSR sinks selected from a group consisting of: open circuit; zero potential voltage source; voltage source defined by the RSR; current sink defined by the RSR; and the input to an ADC.

IIC/IIR Resistors Not Limitive

The resistors depicted in the exemplary IIC and IIR functionality described herein may be fixed resistors (possibly of varying values) and/or may include variable resistors that in some circumstances may be configured based on the CSR and/or RSR. Within this context, the resistors depicted are to be considered as one potential example of a general impedance, which may include any combination of resistance, capacitance, and/or inductance. Other types of impedance elements such as capacitive or inductive elements, active elements (or active circuitry) as well as combinations of these may be substituted for the depicted resistors with no loss of generality in the scope of the claimed invention. Thus, in the context of the IIC and IIR circuitry, any form of impedance may be substituted for the illustrated resistor elements, and may include variable impedance elements including active components such as MOSFETs and other semiconductor devices.

Inter-Column/Inter-Row Impedance Count Not Limitive

The present invention uses inter-column impedances and inter-row impedances in conjunction with inter-column and inter-row interpolation within the VIA to implement the touch sensor detector system and method. The number of impedances between each column and each row is typically configured as two or more, but in some circumstances the VIA may be directly mapped to achieve conventional scanning of all VIA columns/rows via access to internal nodes within the series IIC and IIR impedance strings.

Row/Column Not Limitive

The present invention will be discussed in terms of rows/columns when addressing a typical configuration in which the touch sensor array (TSA) is configured as a conventional array of variable impedance sensors (VIA). However, the terms "row" and "column" may be interchanged in many invention embodiments without departing from the overall spirit and scope of the claimed invention.

Sensor Array Geometry Not Limitive

The present invention anticipates a wide variety of sensor array geometries that may be used depending on the application context. While rectangular construction arrays of variable impedance elements may be advantageous in some preferred invention embodiments, the use of other geometries including polygons, circles, ellipses, and other planar and non-planar shapes are also anticipated. The application of the disclosed technology to both two-dimensional and three-dimensional shapes is anticipated within this broad scope of sensor geometry.

Sensor VIA Population Not Limitive

The present invention anticipates that in some applications the VIA sensor array may be partially populated such that a sensor element may only be present in a subset of the overall VIA structure. For example, a sensor configuration in which the VIA further comprises physical columns electrically coupled to physical rows via a pressure-sensitive sensor element located at the intersections of the physical columns and the physical rows is anticipates wherein the pressure-sensitive sensor element is present in only a subset of the intersections to form a shaped sensor array. This permits a reduction in overall VIA sensor manufacture and creates the possibility of custom sensor applications and shapes/physical configurations which in some circumstances may have varying degrees of sensor density across the VIA array.

ADC Not Limitive

The present invention illustrates in many preferred embodiments the use of an analog-to-digital converter (ADC). This ADC may be implemented in some embodiments as a voltage mode converter and in other embodiments as a current mode converter. Furthermore, some preferred ADC embodiments may incorporate frequency detection/filtering so as to enable frequency discrimination within the analog-to-digital conversion process.

Sensor Element Not Limitive

The present invention may be applied to a wide variety of variable impedance array (VIA) touch sensor technologies such as pressure sensors, capacitance sensors, optical sensors, photo-sensitive sensors, and RF-based sensor technologies. These technologies may in some circumstances be combined to form hybrid sensor systems. In some circumstances, the sensor array may detect near-field events that do not necessarily touch the sensing surface of the VIA sensors. Within this context, the individual sensing elements may also be referred to as "sensor elements" within this document.

Post-Processing Not Limitive

The present invention in many preferred embodiments generates a Touch Sensor Matrix (TSM) representing information collected from the VIA. This TSM data structure may be transmitted by the computing control device (CCD) to a digital data processor (DDP), or locally processed by the CCD to perform a variety of application-specific functions.

TSM Collection/Processing Not Limitive

The Touch Sensor Matrix (TSM) representing information collected from the VIA may be collected and/or processed as an entire entity or may in some circumstances be collected and/or processed in a piece-meal fashion. This may occur (for example) in situations where an area of the touch sensor detector is scanned and VIA information collected and processed from this partial region of interest. Similarly, this partial information may be transmitted by the computing control device (CCD) to a digital data processor (DDP), or locally processed by the CCD to perform a variety of application-specific functions associated with the partially scanned area of the detector. Thus, any transfer or processing of the TSM assumes that a partial transfer or processing of the matrix is also anticipated.

Conceptual Overview

The present invention relates to the field of multi-touch touch sensors, which are commonly used to add touch input to computers, tablets, and other electronic devices. Multi-touch sensing refers to the ability of a touch sensor to distinguish and independently track multiple touches, which allows users to interact with the sensor using multiple hands, fingers, or other objects (such as styli) simultaneously, and also allows for multiple users to interact with the sensor simultaneously. While many touch sensing technologies only allow for the determination of the presence/absence of a touch and its position, the present invention technologies also have the ability to determine the amount of force that is being exerted at each touch point.

The present invention also relates to the field of pressure-sensitive arrays which are often used in industrial and medical applications to measure pressure distributions over an area and to detect variations in pressure, including contact areas, peaks, and minima in a pressure distribution.

Operational Goals

Within the context of a conventional touch sensor array, a variable impedance array (VIA) senses touches at a particular resolution (at the resolution of the sensor elements). This is the highest resolution of data possible if every row and column of the VIA were to be individually connected to driving/sensing electronics. Within the context of the present invention, interpolation blocks (interlinked impedance columns (IIC) and interlinked impedance rows (IIR)) allow the VIA sensors to be scanned at a lower resolution. Because of the configuration of the IIC and IIR, the sensor hardware can properly downsample the signal in the VIA (in a linear fashion). As a result, the scanned values in the lower-resolution array (touch sensor matrix (TSM) data structure) extracted from this VIA sensor data resemble that of a linearly downsampled sensor response. This downsampling allows reconstruction of the positions, force, shape, and other characteristics of touches at the resolution of the VIA (and even possibly at a higher resolution than the VIA) in software.

As an example, on a VIA sensor array constructed with 177 column electrodes and 97 row electrodes having a 1.25 mm pitch, it could be possible in theory to build electronics with 177 column drive lines and 97 row sense lines to support sensing of this entire VIA. However, this would be prohibitive in terms of cost and it would be very difficult to route that many row and sense lines on a conventional printed circuit board (PCB) in a space efficient manner. Additionally, this 177×97 VIA sensor configuration would require scanning 177×97=17169 intersections, which with a low power microcontroller (such as an ARM M3) would result in a maximum scan rate of approximately 10 hz (which is unacceptably slow for typical user interaction with a touch screen). Finally, assuming 16-bit ADC values, storage for these touch screen values would require 17169× 2=34 KB of memory for a single frame, an excessive memory requirement for small microcontrollers that may only be configured with 32 KB of RAM. Thus, the use of conventional row/column touch sensor technology in this context requires a much more powerful processor and much more RAM, which would make this solution too expensive and complex to be practical for a consumer electronics application.

The gist of the invention is that rather than scanning the exemplary sensor array described above at the full 177×97 resolution, the system is configured to scan at a lower resolution, but retain the accuracy and quality of the signal as if it had been scanned at 177×97. To continue discussion of the example sensor array above, the drive electronics on a typical present invention embodiment for this sensor array would require only 45 column drivers and 25 row drivers. The interpolation circuit allows the system to scan the 177×97 array using only a complement of 45×25 electronics. This cuts the number of intersections that must be scanned down by a factor of 16 to 45×25=1125. This configuration allows scanning the sensor at 150 Hz and reduces memory consumption in a RAM-constrained microcontroller application context. Although the ability to resolve two touches that are 1.25 mm together (or to see exactly what is happening at each individual sensor element) is lost, it is still possible to track a touch at the full resolution of the VIA sensors because of the linearity of the row/column interpolation performed by using the IIC and IIR.

System Overview (0100)

A general view of a preferred exemplary system embodiment in a typical application context is depicted in FIG. 1 (0100), wherein a user (0101) interacts with a graphical user interface (GUI) (0102) that incorporates a computer (typically consisting of a mobile or non-mobile computing device and herein collectively described as a digital data processor (DDP)) (0103) executing machine instructions read from a computer useable medium (0104). In this application context, the preferred exemplary touch sensor detector (0110) system embodiment incorporates a touch sensor array (0111) that comprises a variable impedance array (VIA) (0112).

Figure 7:
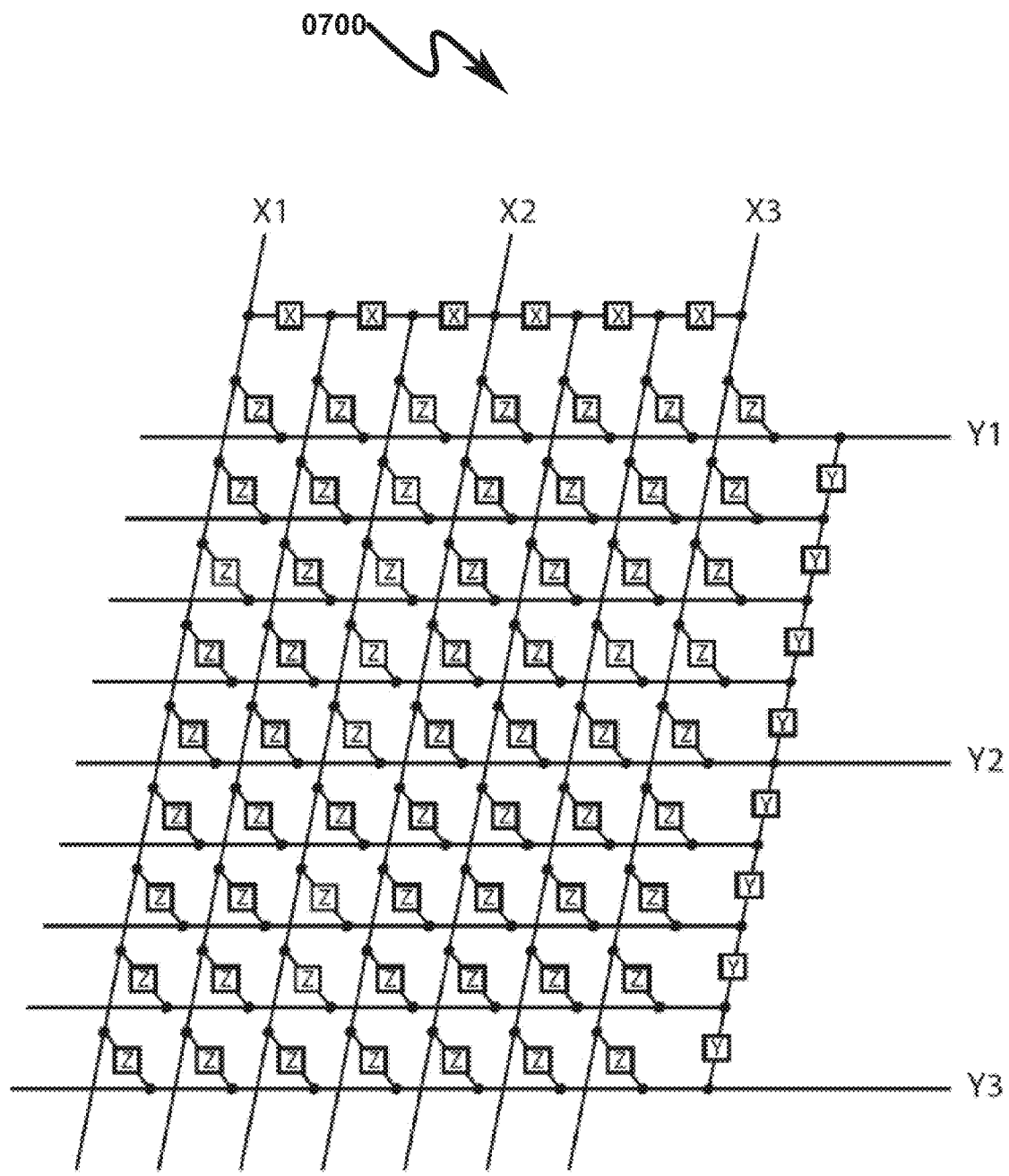
FIG. 7 illustrates an exemplary non-orthogonal VIA configuration.

The VIA (0112) may utilize a resistive or capacitive array consisting of rows and columns of sensor elements that may be arranged in a conventional orthogonal orientation, or in some circumstances, the VIA (0112) may be configured wherein the row/columns are not orthogonal to each other (as depicted in the example illustrated in FIG. 7 (0700)). The VIA (0112) has interlinked impedance columns (IIC) (0113) and interlinked impedance rows (IIR) (0114) at its edges that may be configured to electrically connect, stimulate, or sense two or more columns/rows (via internal electrical column/row nodes within the (IIC) (0113) and (IIR) (0114)) in various configurations of connectivity.

The IIC (0113) and IIR (0114) are controlled by an array column driver (ACD) (0115) and array row sensor (ARS) (0116). The ACD (0115) is responsible for selecting the configuration of the IIC (0113), the electrical sources that are used to drive the IIC (0113), and the selection of columns that are electrically driven within the IIC (0113). The ARS (0116) is responsible for selecting the configuration of the IIR (0114), the electrical sinks that are connected to the IIR (0114), and the selection of rows that are electrically sensed within the IIR (0114). The ACD (0115) and ARS (0116) are controlled with drive/sense control circuitry (0117) that may include individual column switching registers (CSR) and row switching registers (RSR), as well as digital-to-analog converters (DAC) used to drive the IIC (0113) via the ACD (0115) and/or analog-to-digital (ADC) converters used to sense the configured IIR (0114) status through the ARS (0116).

The sensed results of reading analog signals from the ARS (0116) may be converted to digital by the drive/sense control circuitry (0117) and presented to a digital interface (0118) for transmission to the computing system (0103) and interpretation by operating system software in the context of application software running on the computer (0103). A wide variety of computer systems (0103) and associated applications are anticipated in this system context.

The system as depicted differs from the prior art in that configuration of the IIC (0113) and IIR (0114) as determined by the ACD (0115) and ARS (0116), permits the VIA (0112) sensing elements to be interfaced with less complex electronics (fewer column drivers and fewer row sensors) while still providing spatial granularity that is comparable to the physical row/column spacing present in the VIA (0112). By manipulation of the IIC (0113) and IIR (0114) configuration and the use of appropriate software in the drive/sense control circuitry (0117), VIA (0112) sensing elements may be interpolated through a coarser hardware interface that does not require active circuitry to support each individual row and column within the VIA (0112). This interpolation capability is a combination of various hardware configurations of the IIC (0113) and IIR (0114) in combination with a variety of software techniques within the drive/sense control circuitry (0117) that may be used to refine the raw data collected by the ARS (0116).

Within this context, a variety of methods of electrically driving the VIA (0112) columns and sensing the VIA (0112) rows is anticipated including both DC and AC signaling as well as the use of both voltage mode and current mode drive/sensing methodologies.

Method Overview (0200)

Figure 2:
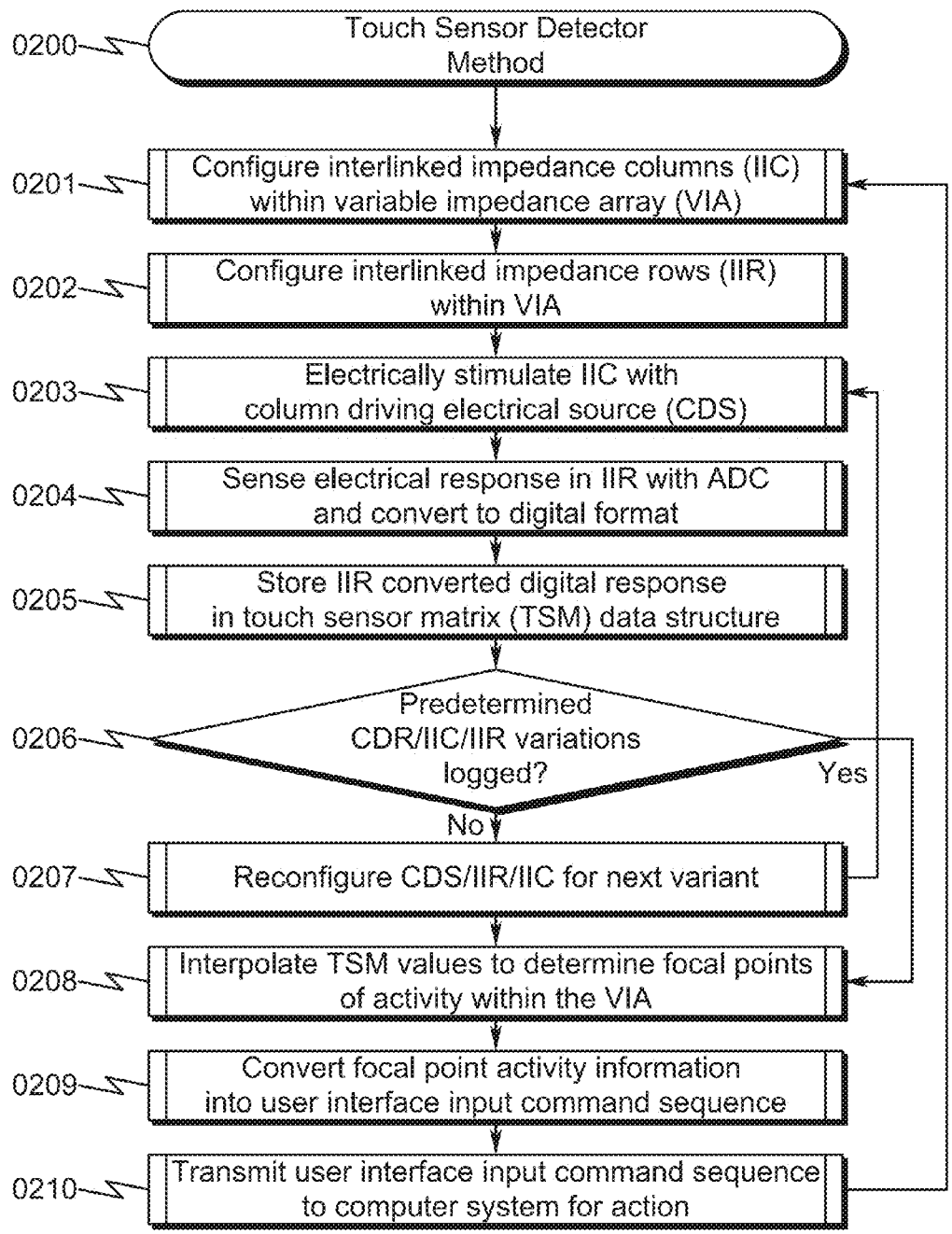
FIG. 2 illustrates a flowchart depicting a preferred exemplary method embodiment.

An exemplary present invention method can be generally described in the flowchart of FIG. 2 (0200) as incorporating the following steps:
(1) Configure interlinked impedance columns (IIC) within variable impedance array (VIA) (0201);
(2) Configure interlinked impedance rows (IIR) within VIA (0202);
(3) Electrically stimulate IIC with column driving electrical source (CDS) (0203);
(4) Sense electrical response in IIR with ADC and convert to digital format (0204);
(5) Store IIR converted digital format response in a touch sensor matrix (TSM) data structure (0205);
(6) Determine if predetermined CDR/IIC/IIR variations have been logged to the TSM, and if so, proceed to step (8) (0206);
(7) Reconfigure CDS/IIC/IIR for the next VIA sensing variant and proceed to step (3) (0207);
(8) Interpolate TSM values to determine focal points of activity within the VIA (0208);
(9) Convert focal point activity information into user interface input command sequence (0209); and
(10) Transmit user interface input command sequence to a computer system for action and proceed to step (1) (0210).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

VIA/IIC/IIR Detail (0300)

Figure 3:
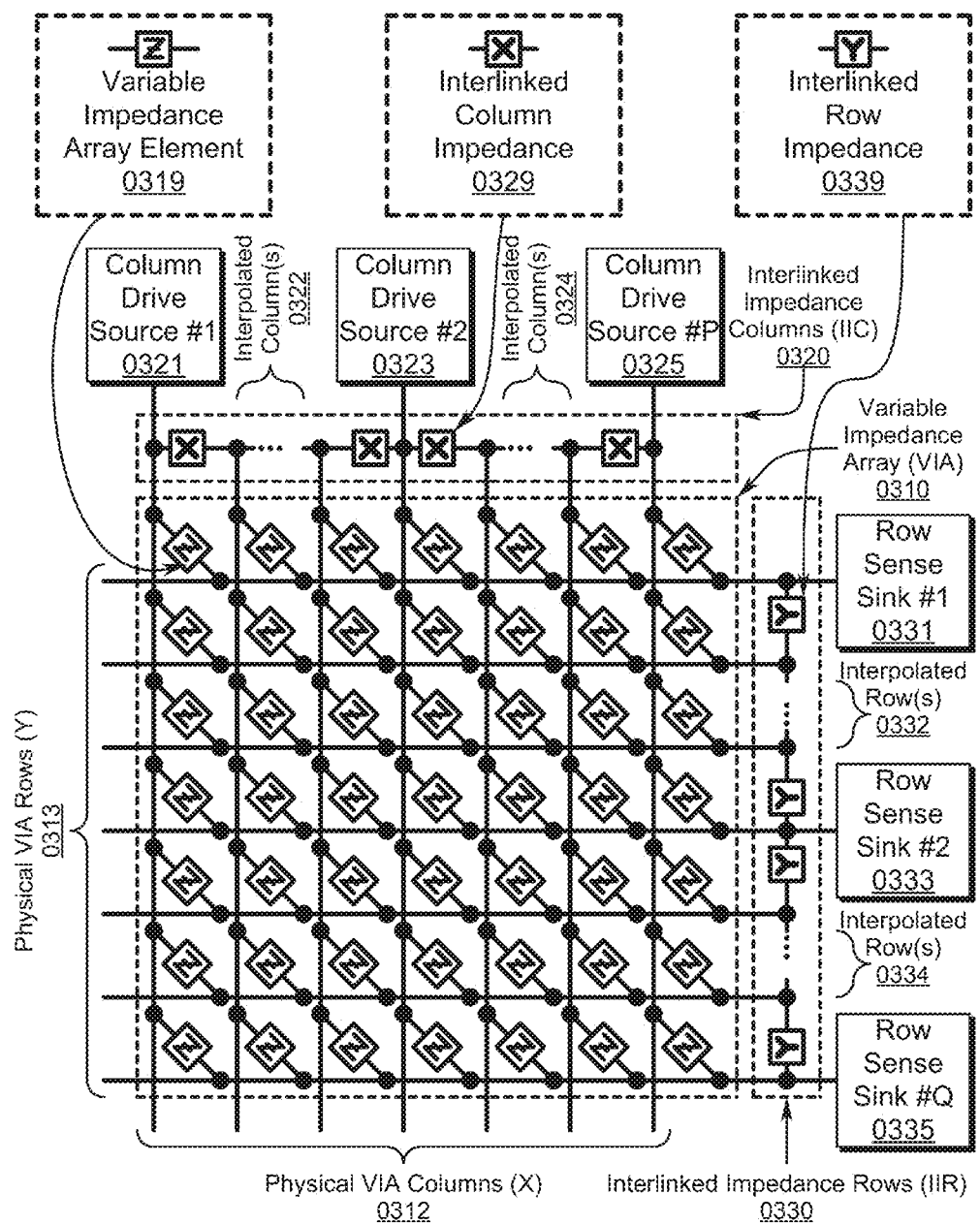
FIG. 3 illustrates a system block diagram depicting detail of the variable impedance array (VIA), interlinked impedance column (IIC), and interlinked impedance row (IIR)

Additional detail of the variable impedance array (VIA) (0310), interlinked impedance columns (IIC) (0320), and interlinked impedance rows (IIR) (0330) is generally depicted in FIG. 3 (0300). Here the VIA (0310) includes columns (0312) and rows (0313) of an array in which individual variable impedance array elements (0319) may interconnect within the row/column crosspoints of the array. These individual variable impedance array elements (0319) may comprise active and/or passive components based on the application context, and include any combination of resistive, capacitive, and inductive components. Thus the VIA (0310) array impedance elements (0319) are depicted generically in this diagram as generalized impedance values Z.

It should be noted that the physical VIA columns (0312) and VIA rows (0313) are connected together via interlinked impedance columns (IIC) (0320) and interlinked impedance rows (IIR) (0330), respectively. The IIC (0320) and IIR (0330) are configured to reduce the number of columns and rows that are connected to the column drive sources (0321, 0323, 0325) and the row sense sinks (0331, 0333, 0335). As such, the combination of the IIC (0320) and IIR (0330) will reduce the external components necessary to interface to the VIA columns (0312) and VIA rows (0313). Within the context of the present invention, the number of IIC (0320) interconnects will be configured to allow the reduction of the number of column drive sources (0321, 0323, 0325) to less than the number of physical VIA columns (0312) (thus the number of external IIC columns is typically less than the number of internal IIC columns), and the IIR (0330) interconnects will be configured to allow the reduction of the number of row sense sinks (0331, 0333, 0335) to less than the number of physical VIA rows (0313) (thus the number of external IIR rows is typically less than the number of IIR rows). This reduction is achieved by having one or more IIC (0320) elements (0329) in series between each VIA physical column (0312) and one or more IIR (0330) elements (0339) between each VIA physical row (0313). Thus, the X×Y VIA sensor (0310) is translated to an electrical interface only requiring P column drivers and Q row sensors. The present invention constrains $$P \leq X \quad (1)$$

and $$Q \leq Y \quad (2)$$

with many preferred embodiments satisfying the relations $$\frac{X}{P} \geq 2 \quad (3)$$

or $$\frac{Y}{Q} \geq 2 \quad (4)$$

Note that within the context of these preferred embodiments, there may be circumstances where the IIC may incorporate a plurality of interlinked impedances with the IIR incorporating a singular interlinked impedance element, and circumstances where the IIC may incorporate a singular interlinked impedance element with the IIR incorporating a plurality of interlinked impedance elements.

The IIC (0320) impedance elements (0329) are configured to connect individual VIA columns (0312). These IIC (0320) impedance elements (0329) may comprise active and/or passive components based on the application context and include any combination of resistive, capacitive, and inductive components. Thus the IIC (0320) impedance elements (0329) are depicted generically in this diagram as generalized impedance values X. As depicted in the diagram, the individual VIA columns may either be directly driven using individual column drive sources (0321, 0323, 0325) or interpolated (0322, 0324) between these directly driven columns.

The IIR (0330) impedance elements (0339) are configured to connect individual VIA rows (0313). These IIR (0330) impedance elements (0339) may comprise active and/or passive components based on the application context and include any combination of resistive, capacitive, and inductive components. Thus the IIR (0330) impedance elements (0339) are depicted generically in this diagram as generalized impedance values Y. As depicted in the diagram, the individual VIA rows may either be directly sensed using individual row sense sinks (0331, 0333, 0335) or interpolated (0332, 0334) between these directly sensed rows.

The column drive sources (0321, 0323, 0325) are generically illustrated as being independent in this diagram, but may be combined in some configurations utilizing a series of switches controlled by a column switching register (CSR) that defines the type of column drive source to be electrically coupled to each column that is externally accessible to the VIA sensors (0310). Variations of AC/DC excitation, voltage sources, open circuits, current sources, and other electrical source driver combinations may be utilized as switched configurations for the column drive sources (0321, 0323, 0325). The CSR may be configured to both select the type of electrical source to be applied to the VIA sensors (0310) but also its relative amplitude/magnitude.

The row sense sinks (0331, 0333, 0335) are generically illustrated as being independent in this diagram but may be combined in some configurations utilizing a series of switches controlled by a row switching register (RSR) that defines the type of row sense sinks to be electrically coupled to each row that is externally accessible to the VIA sensors (0310). Variations of AC/DC excitation, voltage sources, open circuits, current sources, and other electrical sense sink combinations may be utilized as switched configurations for the row sense sinks (0331, 0333, 0335). The RSR may be configured to both select the type of electrical sink to be applied to the VIA sensors (0310), but also its relative amplitude/magnitude.

Column/Row Switching Logic (0400)

Figure 4:
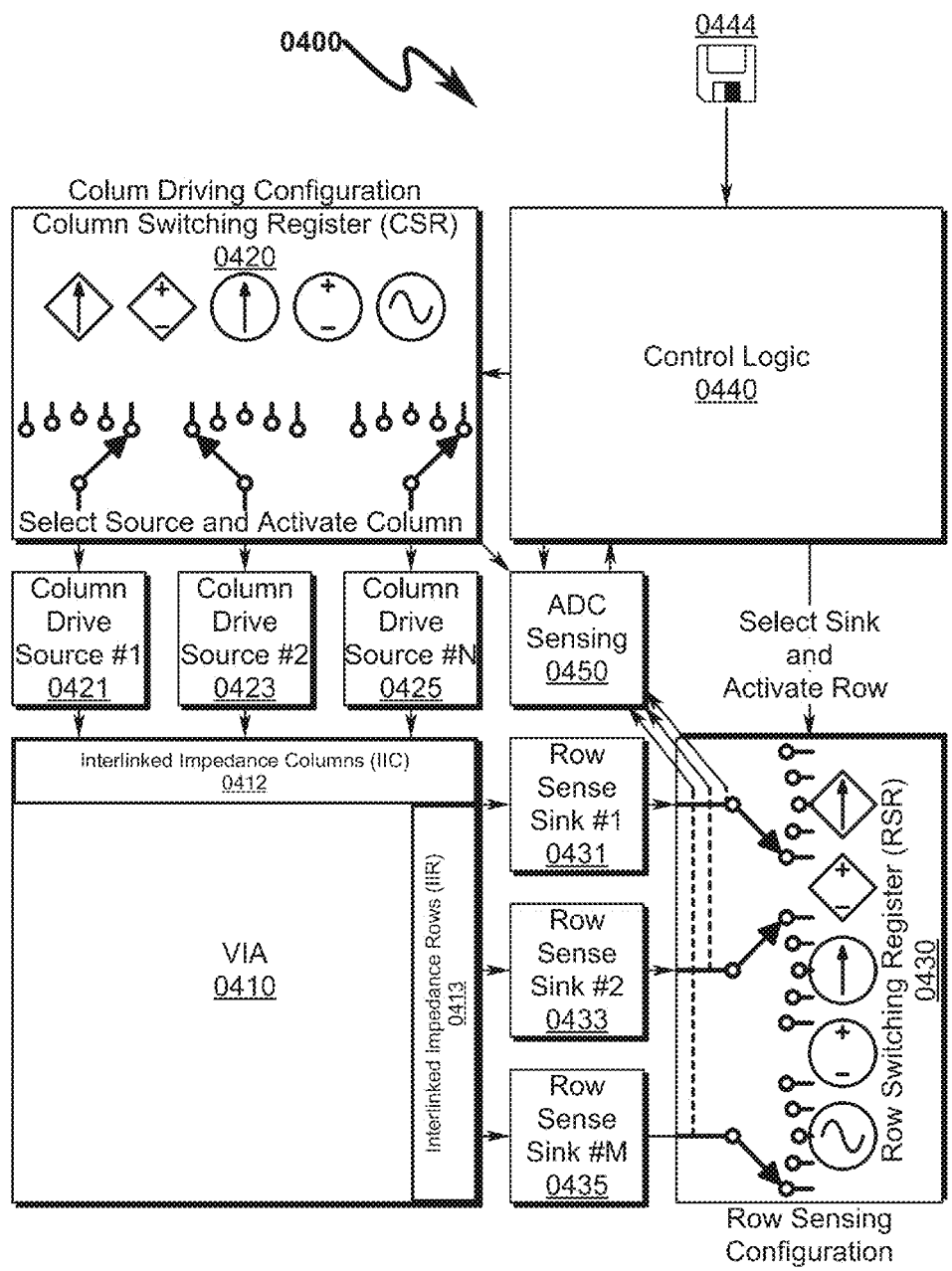
FIG. 4 illustrates a system block diagram depicting detail of the CSR, RSR, interlinked impedance column (IIC), and interlinked impedance row (IIR)

Further detail of the CSR and RSR column/row source/sink operation is depicted in FIG. 4 (0400) wherein the VIA (0410) is interfaced via the use of the IIC (0412) and IIR (0413) impedance networks to column drive sources (0421, 0423, 0425) and row sense sinks (0431, 0433, 0435), respectively. The column switching registers (CSR) (0420) may comprise a set of latches or other memory elements to configure switches controlling the type of source drive associated with each column drive source (0421, 0423, 0425), the amplitude/magnitude of the drive source, and whether the drive source is activated. Similarly, the row switching registers (RSR) (0430) may comprise a set of latches or other memory elements to configure switches controlling the type of sense sink associated with each row sense sink (0431, 0433, 0435), the amplitude/magnitude of the sink, and whether the sink is activated.

As mentioned previously, the IIC (0412) and IIR (0413) impedance networks may comprise a wide variety of impedances that may be static or actively engaged by virtue of the configuration of the CSR (0420) and RSR (0430), respectively. Thus, the CSR (0420) and RSR (0430) may be configured in some preferred embodiments to not only stimulate/sense the VIA (0410) behavior, but also internally configure the interlinked nature of the VIA (0410) by reconfiguring the internal column cross-links and the internal row cross-links. All of this behavior can be determined dynamically by virtue of control logic (0440) that may include a microcontroller or other computing device executing machine instructions read from a computer-readable medium (0444). Within this context, the behavior of the analog-to-digital (ADC) converter (0450) may be controlled in part by the configuration of the CSR (0420) and/or RSR (0430), as well as the control logic (0440). For example, based on the configuration of the CSR (0420) and RSR (0430), the ADC (0450) may be configured for specific modes of operation that are compatible with the type of sensing associated with the CSR (0420)/RSR (0430) setup.

Simplified System Embodiment (0500)

Figure 5:
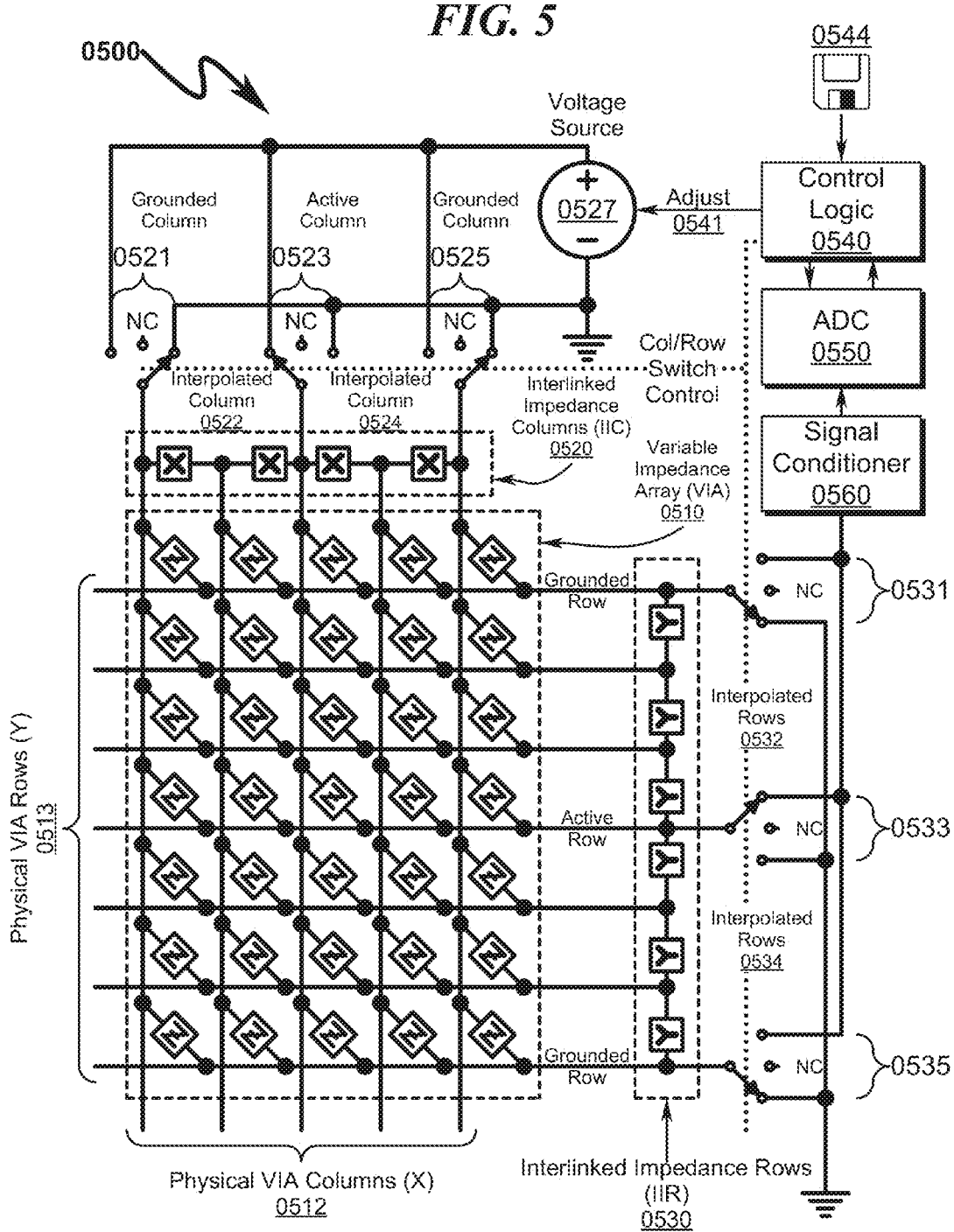
FIG. 5 illustrates a simplified system block diagram of a preferred exemplary system embodiment.

The generalized concepts depicted in FIG. 1 (0100)-FIG. 4 (0400) may be simplified in some system designs as depicted in FIG. 5 (0500). Here a VIA sensor (0510) is depicted in which the interlinked impedance columns (0520) form a reduced electrical interface to the physical VIA sensor columns (0512) that comprise the VIA sensor array (0510). Similarly, the interlinked impedance rows (0530) form a reduced electrical interface to the physical VIA sensor rows (0513) that comprise the VIA sensor array (0510). Note in this example that the number of physical VIA columns (0512) need not be the same as the number of physical VIA rows (0513). Furthermore, the number of column interpolation impedance components (X) serially connecting each column of the VIA (0510) need not be equal to the number of row interpolation impedance components (Y) serially connecting each row of the VIA (0510). In other words, the number of interpolated columns (0522, 0524) need not be equal to the number of interpolated rows (0532, 0534).

The control logic (0540) provides information to control the state of the column switches (0521, 0523, 0525) and row switches (0531, 0533, 0535). The column switches (0521, 0523, 0525) define whether the individual VIA columns are grounded or driven to a voltage potential from a voltage source (0527) that may in some embodiments be adjustable by the control logic (0540) to allow on-the-fly adjustment (0541) which can be used to compensate for potential nonlinearities in the driving electronics. Similarly, the row switches (0531, 0533, 0535) define whether an individual VIA row is grounded or electrically coupled to the signal conditioner (0560) and associated ADC (0550).

In the configuration depicted in FIG. 5 (0500), the VIA sensors (0510) comprise uniformly two interpolating impedances between each column (X) and three interpolating impedances between each row (Y). This illustrates the fact that the number of interpolating columns need not equal the number of interpolating rows in a given VIA. Furthermore, it should be noted that the number of interpolating columns need not be uniform across the VIA, nor does the number of interpolating rows need be uniform across the VIA. Each of these parameters may vary in number across the VIA.

Note also that the VIA sensors (0510) need not have uniformity within the row or column interpolating impedances and that these impedances in some circumstances may be defined dynamically in number and/or value using MOSFETs or other transconductors. In this exemplary VIA sensor segment it can be seen that one column (0523) of the array is actively driven while the remaining two columns (0521, 0525) are held at ground potential. The rows are configured such that one row (0533) is being sensed by the signal conditioner (0560)/ADC combination (0550) while the remaining rows (0531, 0535) are held at ground potential.

Simplified Method (0600)

Figure 6:
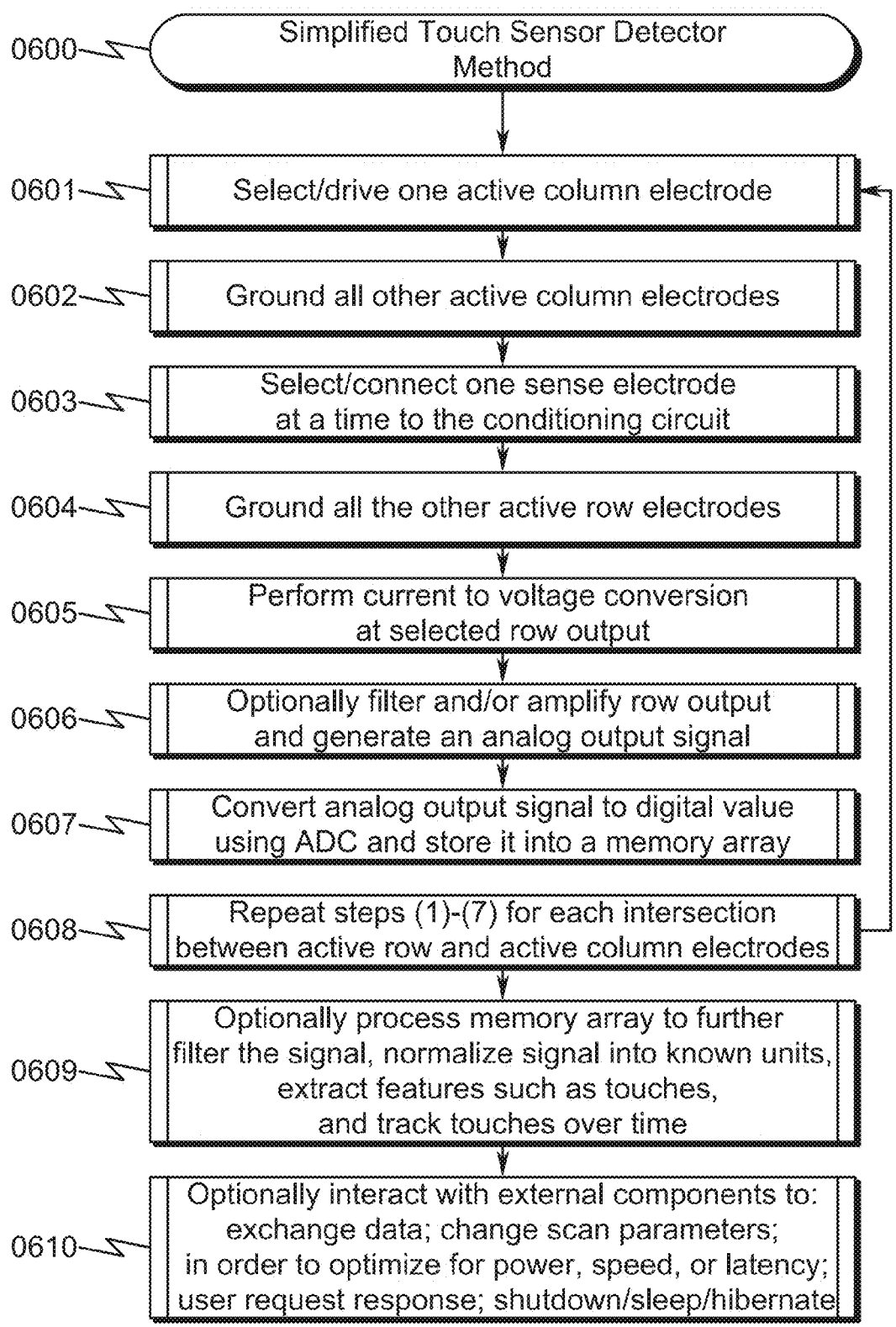
FIG. 6 illustrates a simplified flowchart depicting a preferred exemplary method embodiment.

A method associated with the simplified schematic of FIG. 5 (0500) is depicted in FIG. 6 (0600). Here the column driver, column sources, and row sinks are simplified as depicted in FIG. 5 (0500) with a corresponding reduction in overall method complexity. This simplified exemplary present invention method can be generally described in the flowchart of FIG. 6 (0600) as incorporating the following steps:

(1) The control logic drives one active column electrode at a time (0601), while grounding all the other active column electrodes (0602).

(2) For each powered drive electrode, the control logic connects one sense electrode at a time to the conditioning circuit (0603), while grounding all the other active row electrodes (0604). This creates multiple possible current paths through the force sensing elements near the intersection of the powered drive electrode and the sense electrode, which is connected to the conditioning circuit. Force applied to the sensor creates a signal that is proportional to the force and the distance of the force to the intersection.

(3) The signal passes through the conditioning circuit which may perform current to voltage conversion (0605), optional filtering, and/or amplification and generates an analog output signal (0606).

(4) The ADC converts the signal output from the signal conditioning circuitry into a digital value and stores it into an array in memory (0607). This is repeated for each intersection (steps (0601)-(0607)) between the active row and active column electrodes (0608).

(5) After the full sensor is scanned, the control circuit may optionally process the array in memory to further filter the signal, normalize the signal into known units, extract features such as touches, and track touches over time (0609).

(6) The control circuitry may interact with external components to exchange data. It may also choose to change scan parameters in order to optimize for power, speed, or latency for subsequent scans. It may also respond to a user request or decide to shut down or sleep between scans (0610).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary Non-Orthogonal VIA (0700)

As depicted in FIG. 7 (0700), the VIA may be configured in a non-orthogonal configuration in some preferred embodiments with no loss of generality in the invention teachings. This drawing depicts the general concept that a wide variety of VIA sensor element layouts are possible using the present invention teachings and as such, the interpolation techniques taught herein are not limited to a particular VIA layout or coordinate system.

Exemplary Radial/Elliptical VIA (0800)

Figure 8:
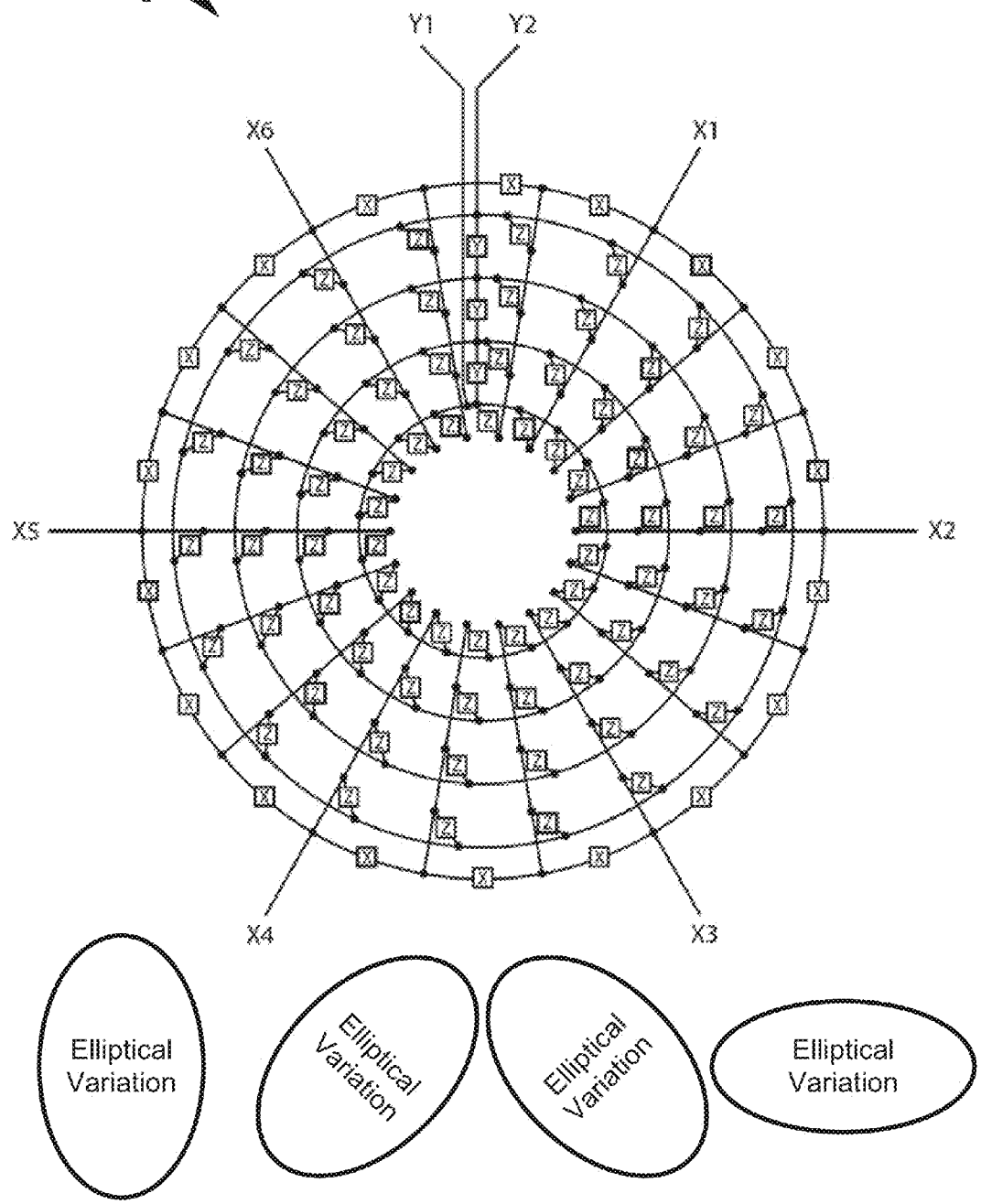
FIG. 8 illustrates exemplary radial and elliptical VIA configurations.

As depicted in FIG. 8 (0800), the VIA may be configured in a radial configuration in some preferred embodiments with no loss of generality in the invention teachings. While the radial configuration depicted is circularly symmetric with respect to the origin of the VIA, some preferred invention embodiments as depicted may configure this as an elliptical array by stretching/contracting/rotating one or more axes of the VIA array.

Exemplar Voltage-Mode Column Drive Circuitry (0900)-(1100)

Figure 9:
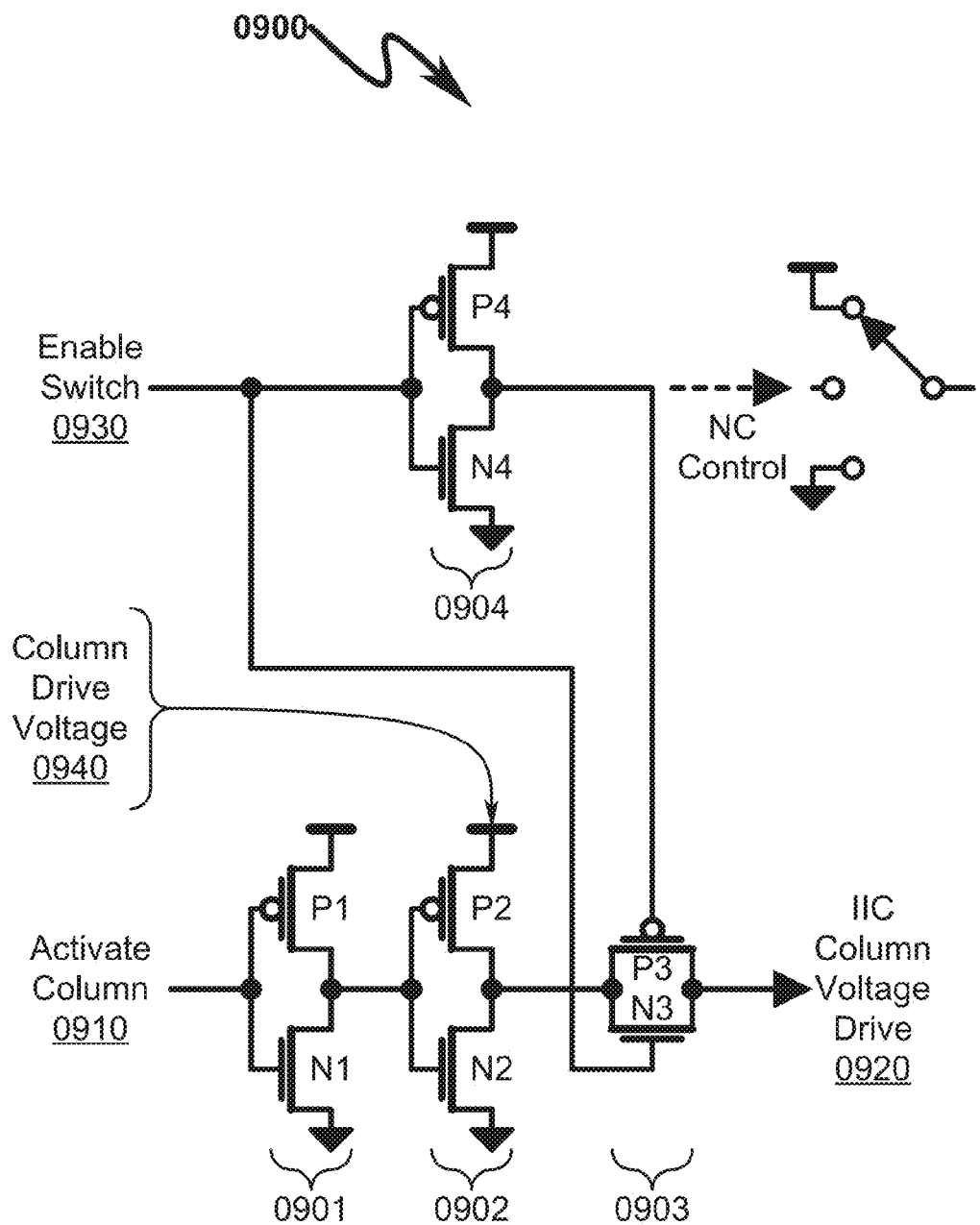
FIG. 9 illustrates an exemplary voltage-mode column drive circuitry schematic.

While the column drive circuitry may take a wide variety of forms consistent with the present invention teachings, one exemplary form is generally illustrated in FIG. 9 (0900). Here the ACTIVATE COLUMN signal (0910) is presented to an inverter chain (0901, 0902) and then provided with tri-state connectivity via the transmission gate (0903) to the IIC column drive signal (0920) that is connected to the IIC interpolation structure within the VIA. The transmission gate (0903) is designed to actively couple the output of the inverter chain (0902) to the IIC column drive (0920) when the ENABLE SWITCH signal (0930) is active. The tri-state inverter (0904) provides the necessary signal inversion to ensure that the transmission gate (0903) is capable of bidirectional current flow. Note that the column drive voltage (0940) may be different than other voltages supplied to the inverters shown, as the P2 MOSFET may be configured as a power driver, depending on the column application specific configuration of the inverter chain (0901, 0902).

Figure 10:
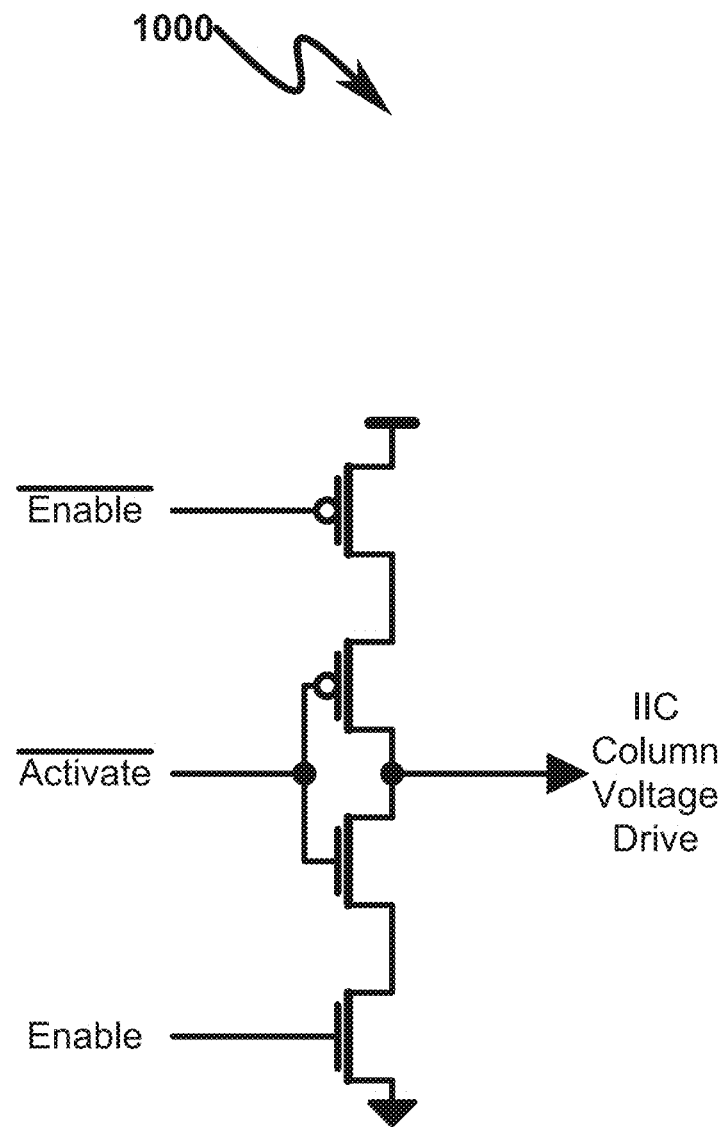
FIG. 10 illustrates an exemplary voltage-mode column drive circuitry schematic employing a stacked switching design.

It should be noted as depicted in FIG. 10 (1000) that other embodiments of this tri-state switch configuration are possible wherein stacked MOSFET switches may be used in combination to provide for both the activation and tri-state drive control functions shown in FIG. 9 (0900). In this example, inversion circuitry for the ACTIVATE and ENABLE signals has been omitted for clarity. The major difference in the embodiment of FIG. 10 (1000) exists in the requirement for additional headroom voltage requirements (the supply voltage must be higher) and the use of a unified supply voltage for all switching operations. The configuration of FIG. 9 (0900) is preferable in many applications because dynamic power consumption associated with switching the VIA will be on the order of $$P = \tfrac{1}{2} C V^2 f \quad (5)$$

with P representing the dynamic power consumption, C representing the reactive VIA load capacitance, V representing the switched voltage differential, and f representing the switching (scanning) frequency. Thus, a reduction in switched voltage across the VIA sensors can drastically reduce the amount of power consumed by the touch sensor scanning operation. By using different driving voltages within the embodiment of FIG. 9 (0900) (i.e., reducing the column drive voltage (0940)), a considerable reduction in overall power consumption can be realized.

Figure 11:
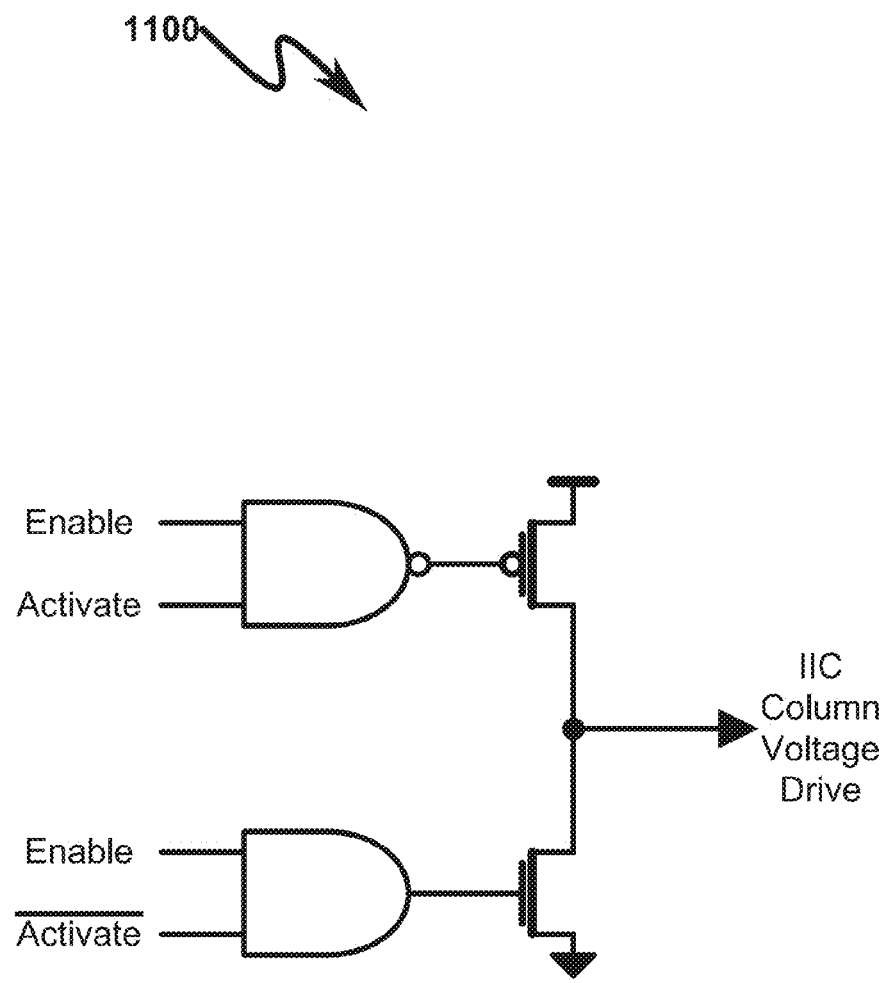
FIG. 11 illustrates an exemplary voltage-mode column drive circuitry schematic employing a non-stacked switching design.

The stacked driving approach depicted in FIG. 10 (1000) may be modified to form a non-stacked IIC column driver as generally depicted in FIG. 11 (1100). Here the addition of logic driving the output CMOS inverter permits lower overall voltage operation for the system. This logic configuration is often incorporated in microcontroller tri-state GPIO circuitry.

Exemplary Voltage-Mode Row Sense Circuitry (1200)-(1300)

Figure 12:
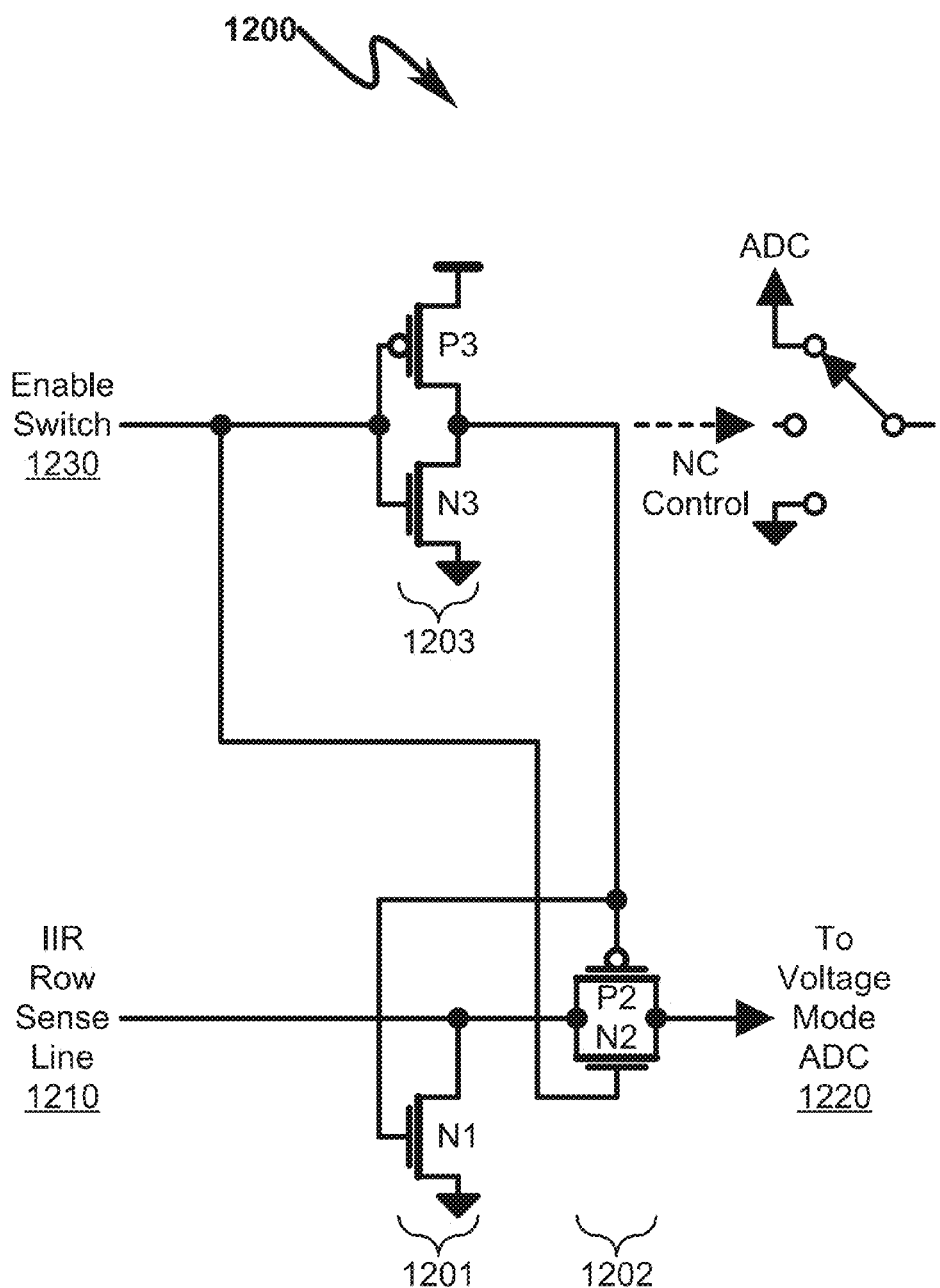
FIG. 12 illustrates an exemplary voltage-mode row switching circuitry schematic.

While the row sense circuitry may take a wide variety of forms consistent with the present invention teachings, one exemplary form is generally illustrated in FIG. 12 (1200). Here the IIR row sense signal line (1210) is electrically coupled to the ADC input (1220) via a MOSFET switched ground shunt (1201) coupled to a transmission gate (1202). When the ENABLE SWITCH signal (1230) is active, the MOSFET shunt (1201) is disabled and the transmission gate (1202) is activated via inverter (1203), which couples the selected IIR row sense signal line (1210) to the ADC (1220). When the ENABLE SWITCH signal (1230) is inactive, the MOSFET shunt (1201) is enabled, which grounds the IIR row sense signal line (1210) and disables the transmission gate (1202) which decouples the selected IIR row sense signal line (1210) from the ADC (1220).

It should be noted that in some circumstances this switching circuitry may involve more than simple passive signal switching and may incorporate active amplification/filtering devices to condition the IIR row sense signal line (1210) before presentation to the ADC (1220). Implementation of this type of switched active buffering is well within the skill of one of ordinary skill in the electrical arts.

Figure 13:
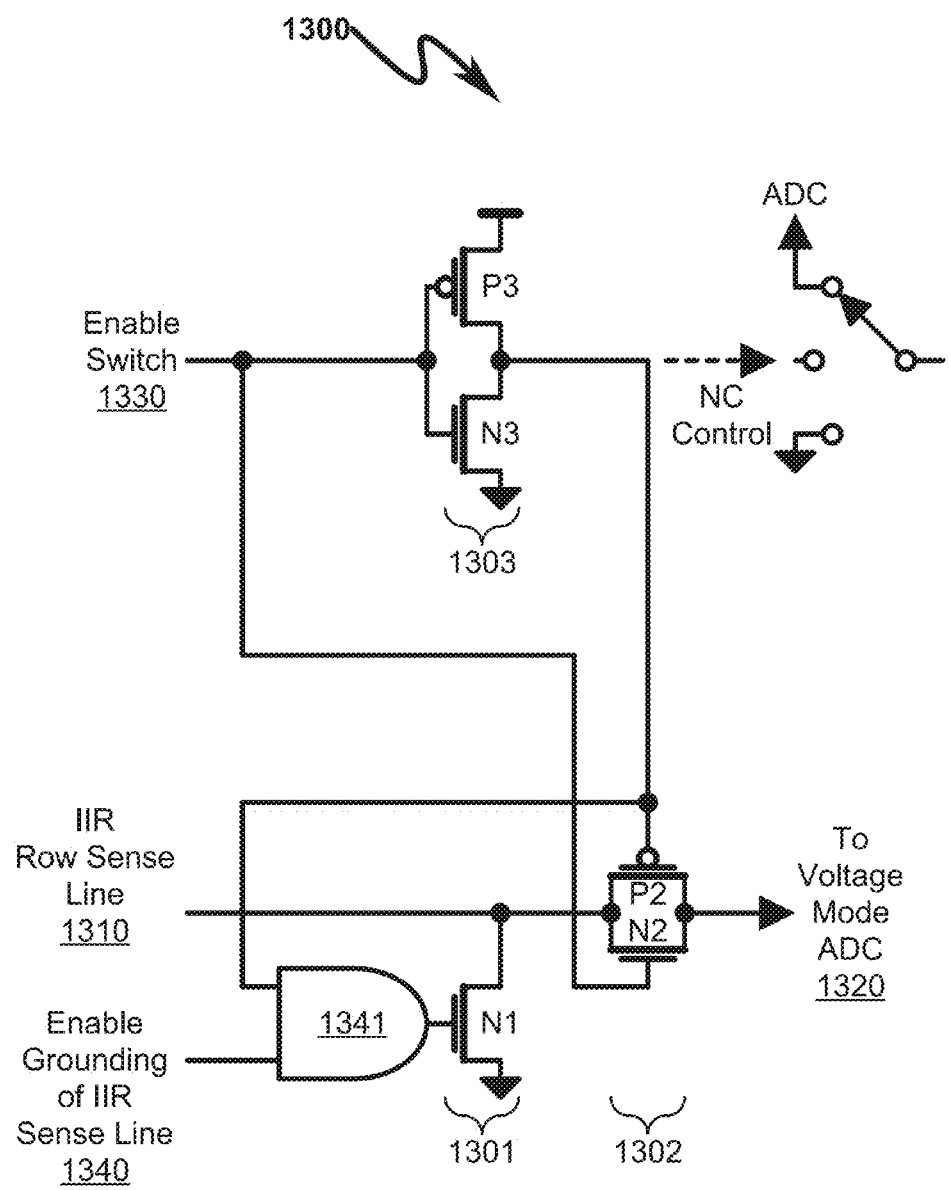
FIG. 13 illustrates an exemplary voltage-mode row switching circuitry schematic incorporating sense line grounding enable logic.

The circuitry depicted in FIG. 12 (1200) may be augmented and modified as depicted in FIG. 13 (1300) to incorporate a GROUND ENABLE signal (1340) and associated logic gate (1341) to permit optional disablement of IIR row sense line grounding in situations where the row sense line is not being sensed or grounded such as in multi-resolution scanning operations. Circuit components (1301, 1302, 1303, 1310, 1320, 1330) in this embodiment generally correspond to elements (1201, 1202, 1203, 1210, 1220, 1230) in FIG. 12 (1200).

Exemplary Current-Mode Column Drive Circuitry (1400)-(1500)

Figure 14:
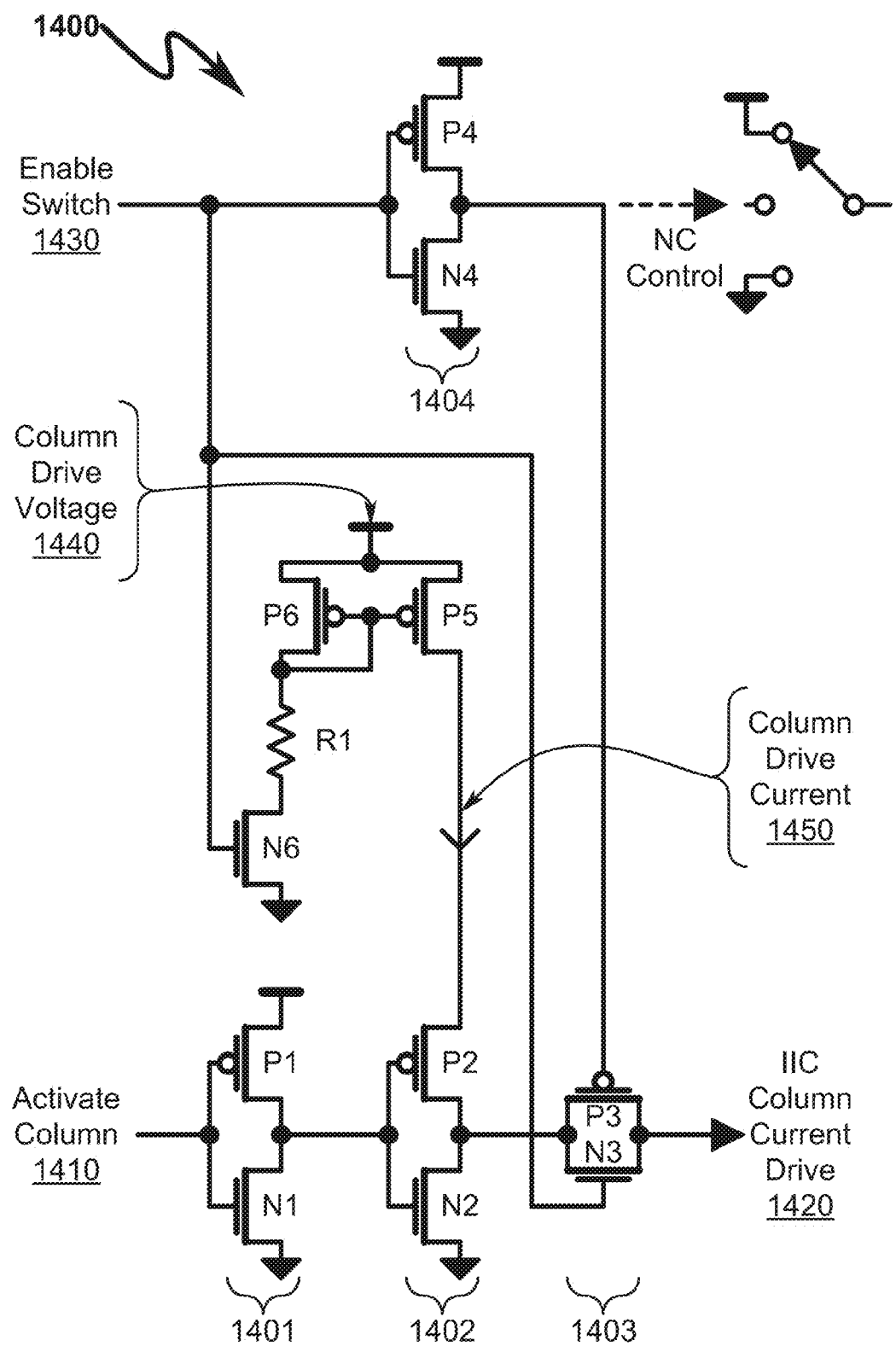
FIG. 14 illustrates an exemplary current-mode column drive circuitry schematic.
Figure 15:
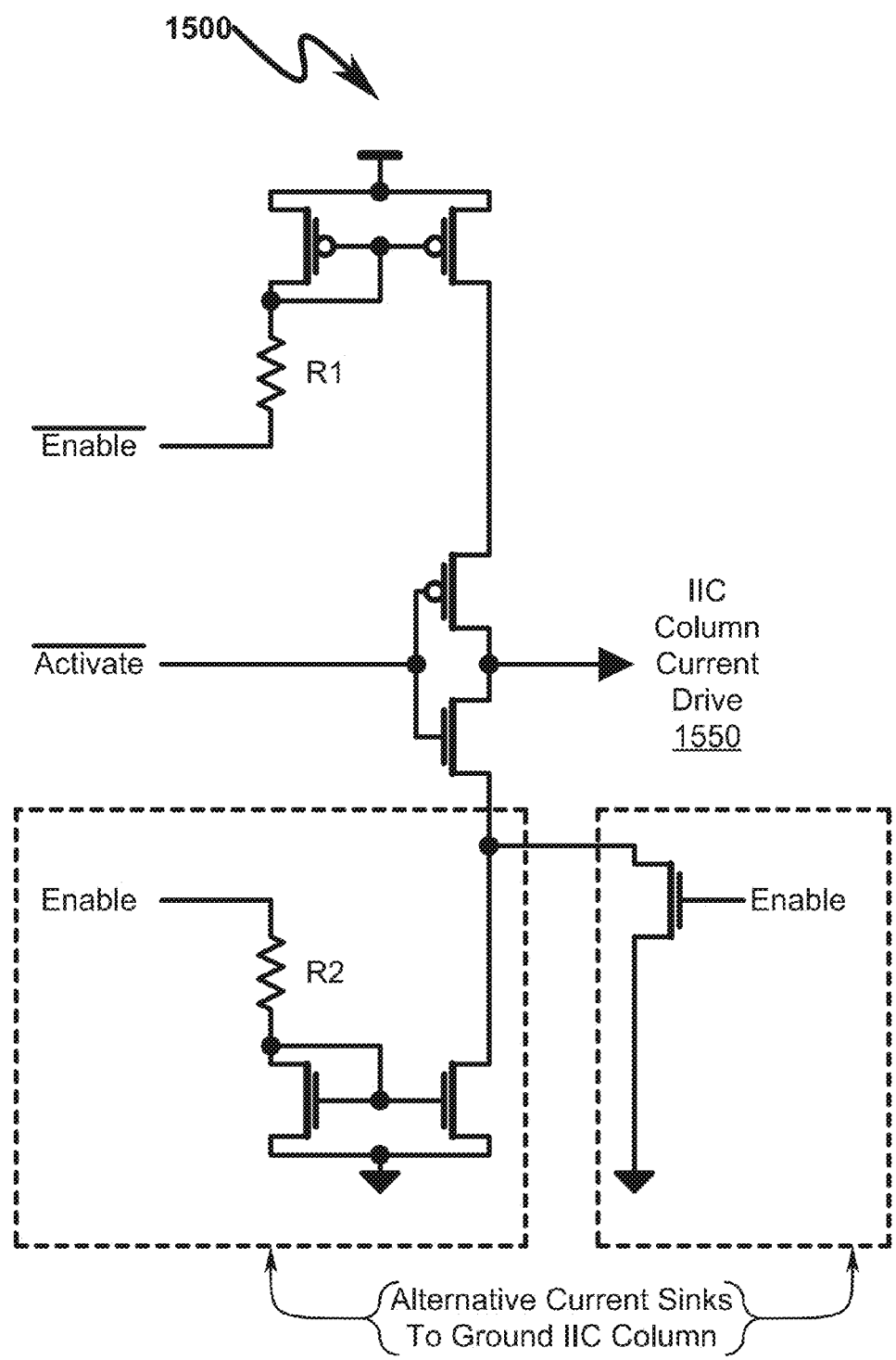
FIG. 15 illustrates an exemplary current-mode column drive circuitry schematic employing a stacked switching design.

The exemplary voltage-mode column drive circuitry generally depicted in FIG. 9 (0900)-FIG. 12 (1200) may also in some invention embodiments be implemented using a current-mode approach as generally depicted in FIG. 14 (1400) and FIG. 15 (1500). These schematics generally depict a structure and function similar to that of FIG. 9 (0900)-FIG. 12 (1200), but incorporating a current-mode driving approach wherein the P5/P6 devices form a current mirror that mirrors current drawn by R1 when N6 is activated by the ENABLE signal (1430).

Figure 17:
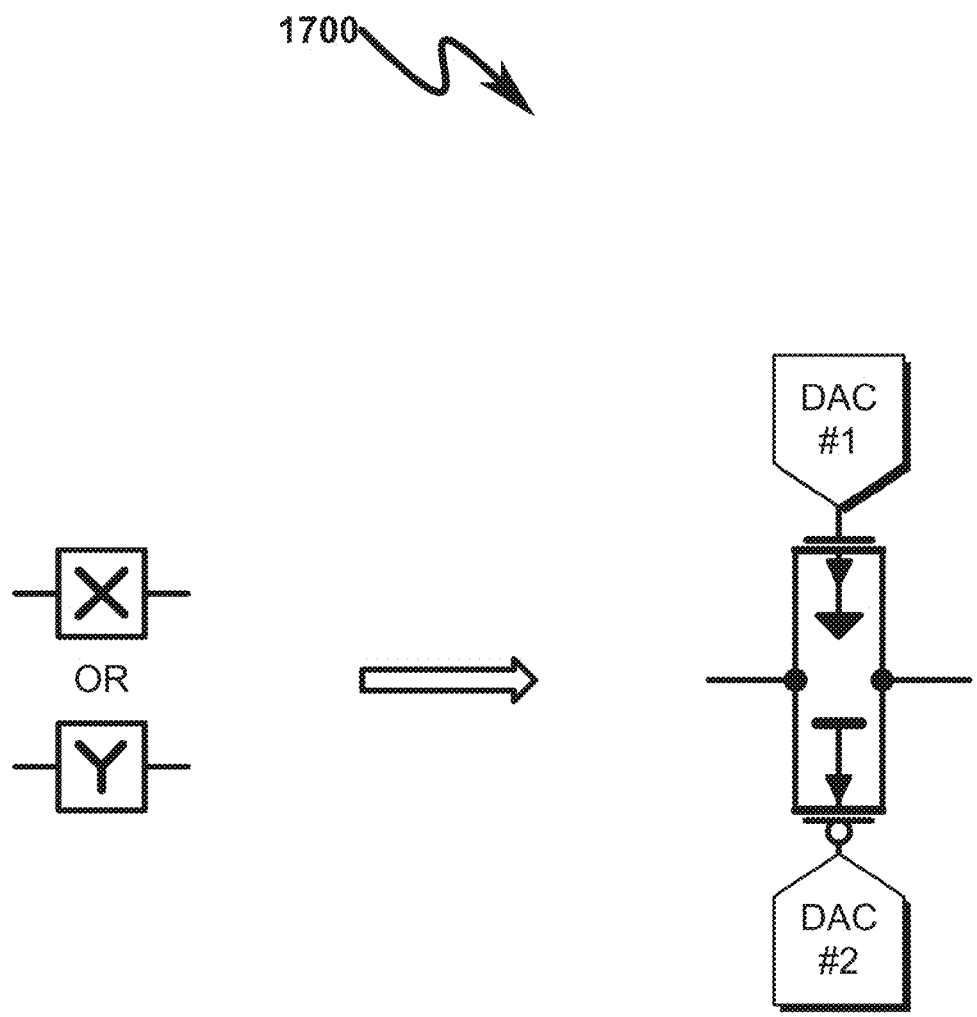
FIG. 17 illustrates an exemplary variable impedance device that may be used for IIC and/or IIR impedance elements.

As generally depicted in FIG. 15 (1500), a variety of methods may be used to ground the IIC column lines, either by using a single MOSFET (as a non-ideal current sink), or by using a more conventional current mirror based current sink. Note that since the current forced in these configurations (1450, 1550) may be "dialed in" using a computer controlled device (R1) (as generally depicted in FIG. 17 (1700)), this embodiment may be useful in situations where power consumption must be minimized.

Exemplary Current-Mode Row Sense Circuitry (1600)

Figure 16:
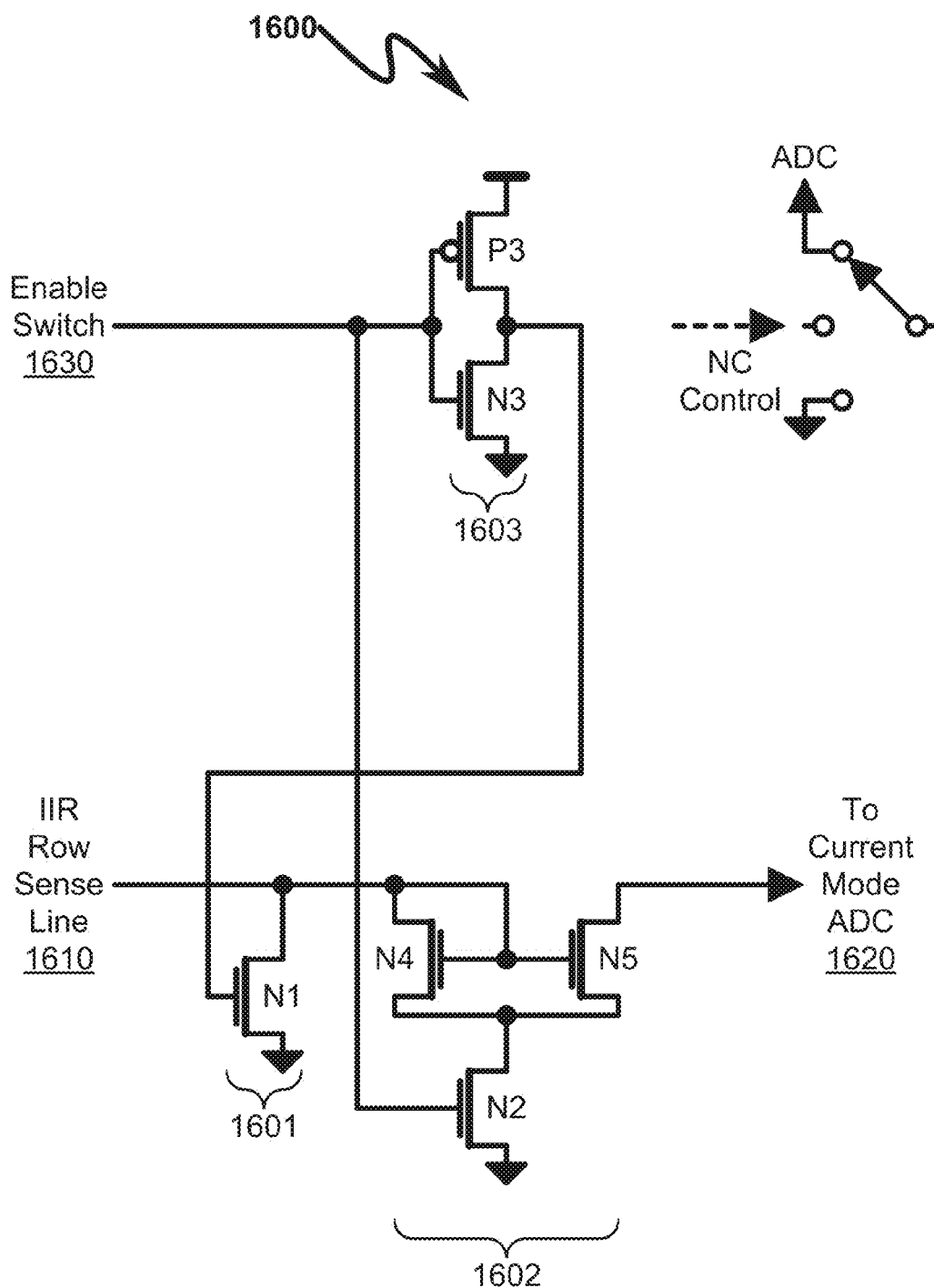
FIG. 16 illustrates an exemplary current-mode row switching circuitry schematic.

The exemplary voltage-mode row sense circuitry generally depicted in FIG. 12 (1200)-FIG. 13 (1300) may also in some invention embodiments be implemented using a current-mode approach as generally depicted in FIG. 16 (1600). This schematic generally depicts a structure similar to that of FIG. 12 (1200)-FIG. 13 (1300) but incorporating a current-mode sensing approach. Here the IIR row sense signal (1610) supplies a current that is either shunted by switch N1 (1601) or mirrored (1602) by the combination of N2, N4, and N5 to supply a sink current that is converted by the current mode ADC (1620). The ENABLE signal (1630) is used to gate the shunt switch (1601) via inverter (1603) and provide an enable for the current mirror (1602) via N2.

Exemplary Variable Interpolation Resistors (1700)

The impedances interconnecting the individual columns (IIC) and the individual rows (IIR) may be configured as fixed resistors (possibly of different values within each column and/or row), but may also be configured as variable resistances as by using MOSFETs as linear conductors configured as voltage modulated transmission gates as depicted in FIG. 17 (1700). Here the DACs may be used to modulate the effective resistance of the X and/or Y impedance elements under control of a microcontroller or other computing device. One skilled in the art will be familiar with a wide variety of DAC hardware implementations that are compatible with this design approach.

Active Circuitry Variable Impedance Array Elements (1800)

Figure 18:
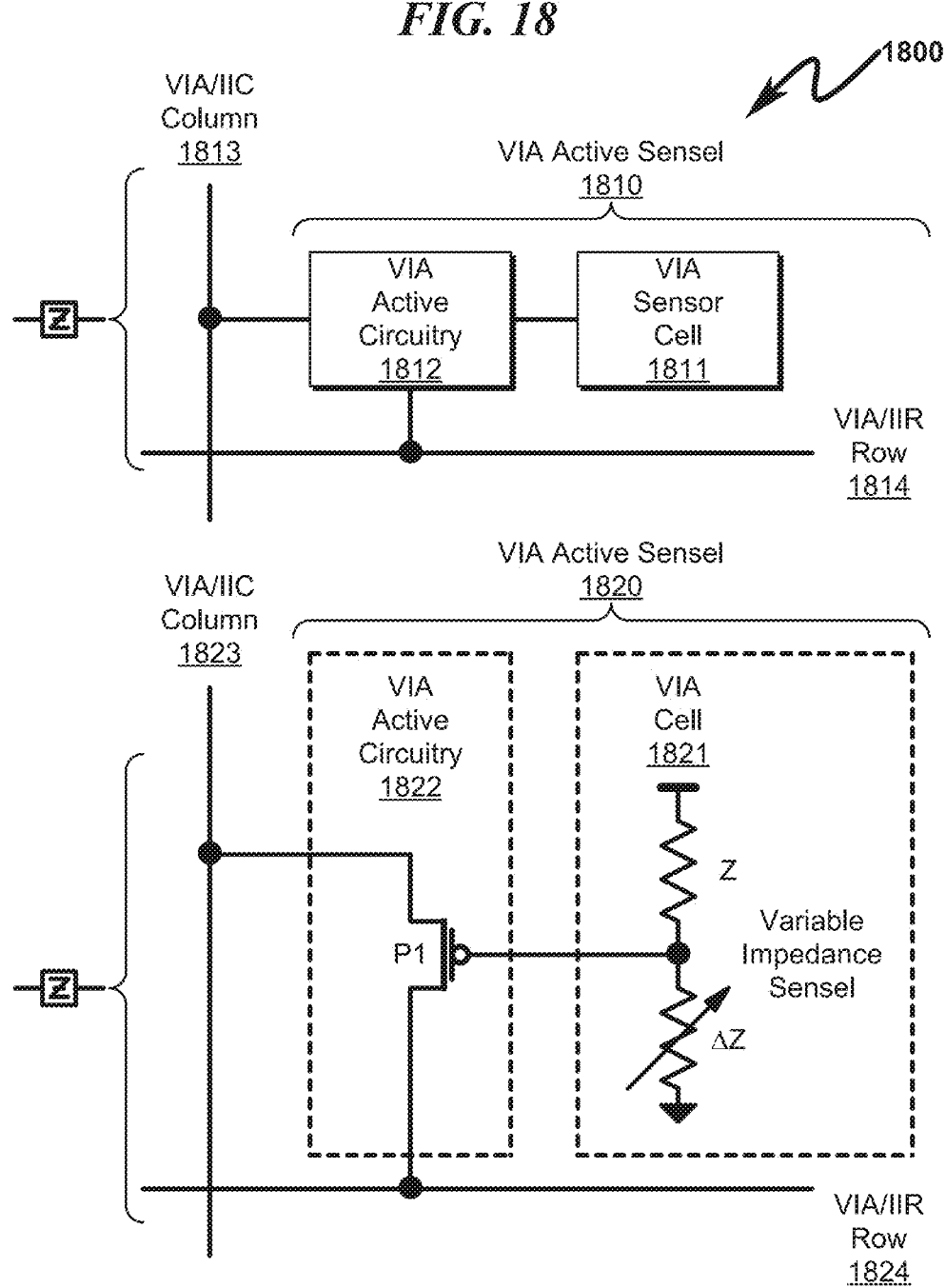
FIG. 18 illustrates an exemplary active variable impedance array (VIA) element structure.

The variable impedance array (VIA) typically incorporates an impedance element that is passively structured, such as a resistor, capacitor, inductor, or other passive device combination involving these primitive elements. However, some preferred invention embodiments may utilize active circuitry associated with the passive VIA component. An example of this active circuitry construction is depicted in FIG. 18 (1800) wherein a VIA active sensor element (1810) includes a passive VIA sensor element (1811) that is augmented with an active circuitry (1812) which interlinks a VIA/IIC column (1813) and VIA/IIR row (1814).

One possible exemplary embodiment of this concept is depicted with the VIA active sensor element (1820) comprising a passive VIA sensor element (1821) that is augmented with a MOSFET (1822) that interlinks a VIA column (1823) and row (1824). One skilled in the art will recognize that the VIA cell (1811, 1821) may comprise a wide variety of variable impedance elements, and that the active circuitry (1812, 1822) may comprise a wide variety of active circuitry consistent with coupling an individual VIA column (1813, 1823) and VIA row (1814, 1824).

Exemplary Variable Frequency Excitation/Detection (1900)-(2000)

Figure 19:
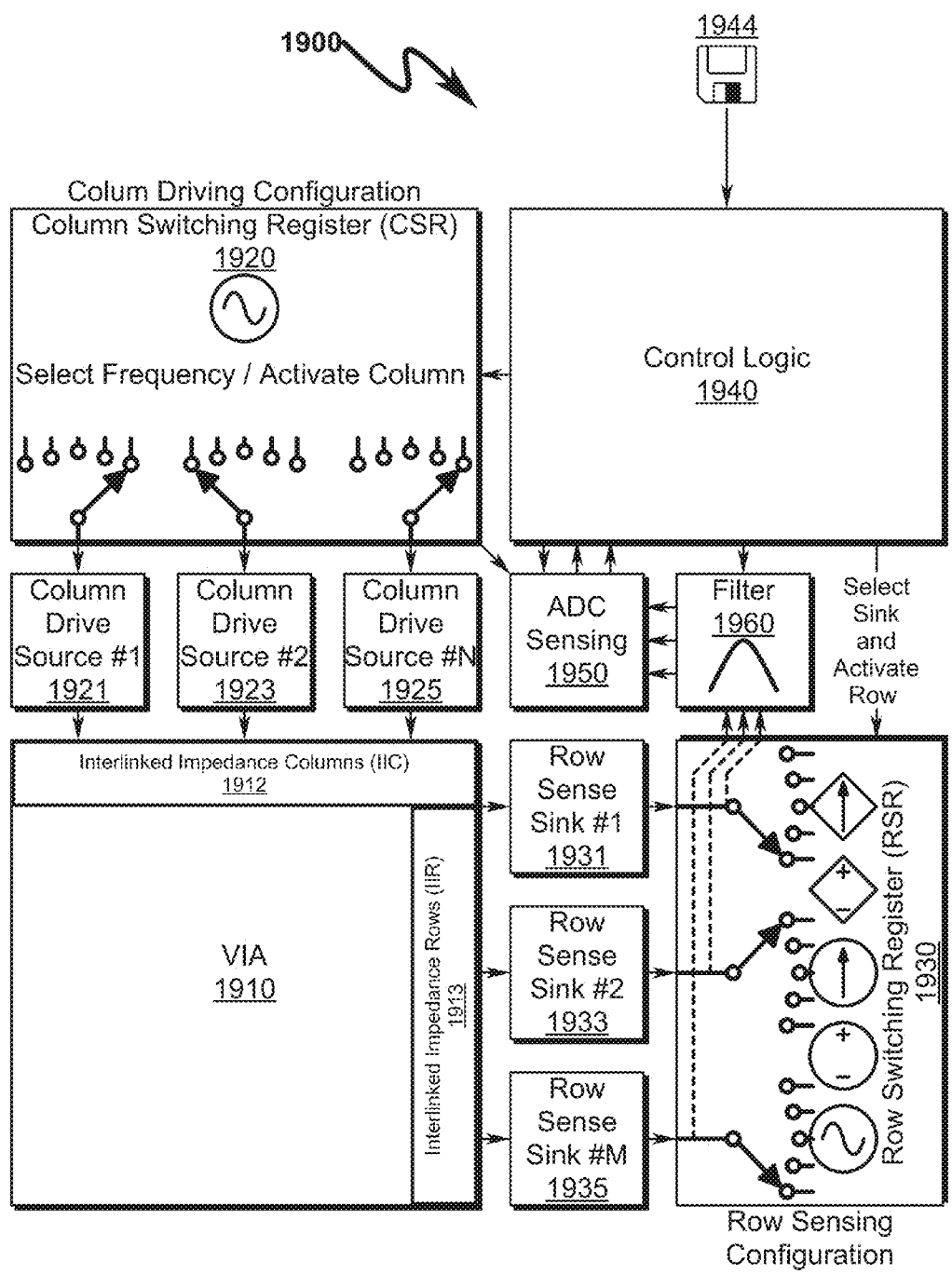
FIG. 19 illustrates a system block diagram depicting detail of the CSR, RSR, interlinked impedance column (IIC), and interlinked impedance row (IIR) in an embodiment utilizing variable frequency excitation for the VIA and switched filtering detection in the row sense elements.

As generally depicted in FIG. 19 (1900), the present invention may utilize selectable frequency generation within the CSR (1920) to excite the VIA (1910). While this architecture generally mimics that depicted in FIG. 4 (0400), the addition of a selectable filtering element (1960) permits individual excitation frequencies to be filtered from the VIA (1910) and then detected by the ADC (1950) before being processed by the control logic (1940). In some circumstances, the selectable filtering element (1960) may be incorporated within the ADC (1950). In this example, the CSR (1920) AC excitation may take the form of one or more singular frequencies or a plurality of frequencies. The use of an arbitrary waveform generator (AWG) in this configuration for the generation of the CSR (1920) frequencies is anticipated in some embodiments.

Note that the use of multiple excitation frequencies within the CSR (1920) along with parallel multiple frequency detection by the programmable filter (1960) may permit multiple areas of the VIA (1910) to be detected simultaneously. This in conjunction with appropriate control logic (1940) software/firmware can allow multiple touch areas to be properly detected and also permit the use of varying frequencies to detect finer registration within the VIA (1910). This multi-frequency approach may also be used in some circumstances to reduce the power required to operate the touch sensor detector system.

Figure 20:
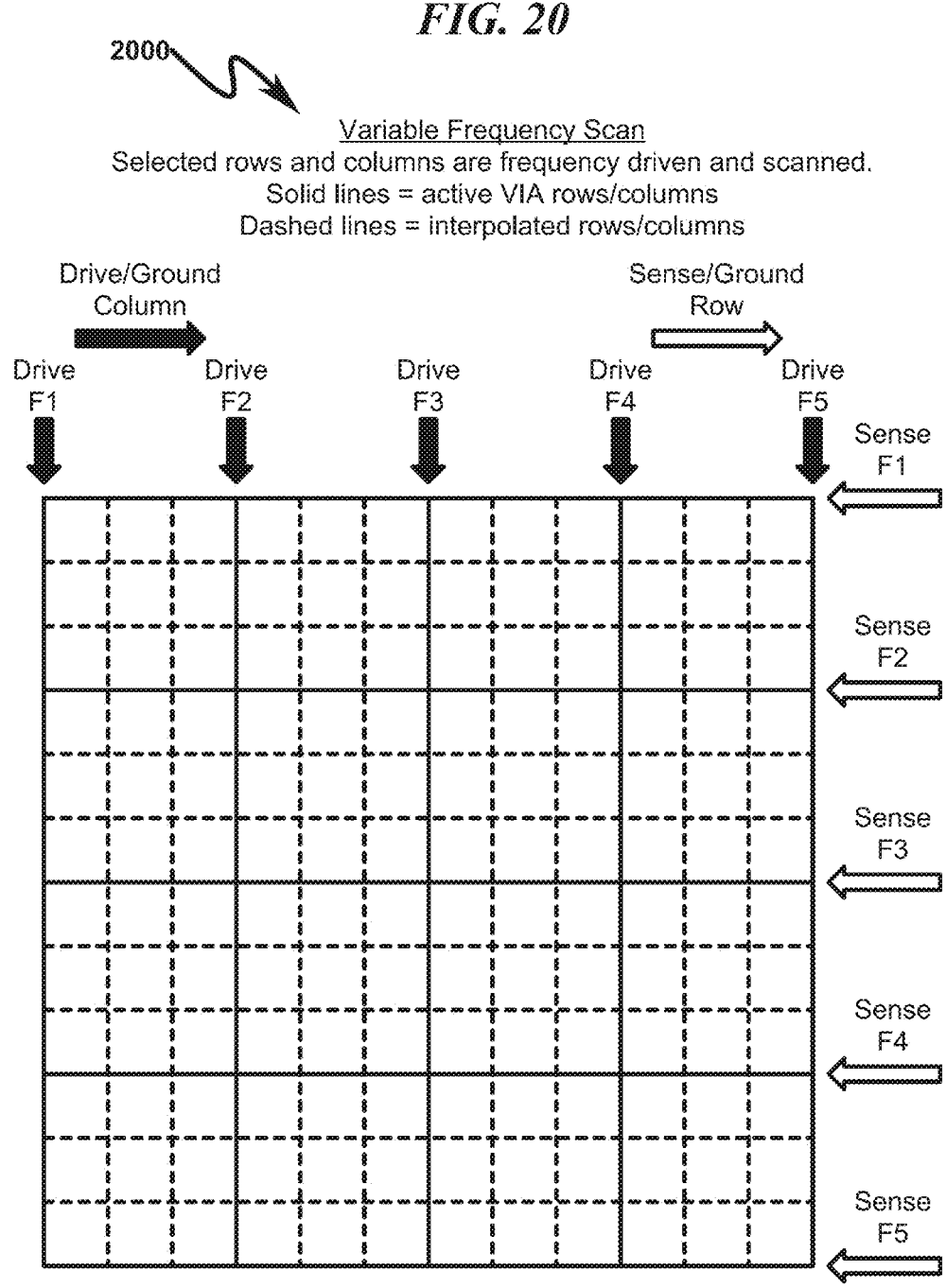
FIG. 20 illustrates an exemplary VIA depicting a variable frequency scan configuration.

An example of this multi-area frequency-based scanning approach is depicted in FIG. 20 (2000) wherein the VIA is excited with various frequencies along the columns, and by selective filtering of frequency information on the row sensors, the VIA can be sensed based on frequency in addition to variations in individual VIA sensor element impedance. Note that this may in some circumstances permit multiple areas of the VIA surface to be associated with different sensing mechanisms, such as pressure, proximity, interaction with a capacitively coupled stylus, etc.

Variable Scan Resolutions (2100)-(2400)

Figure 21:
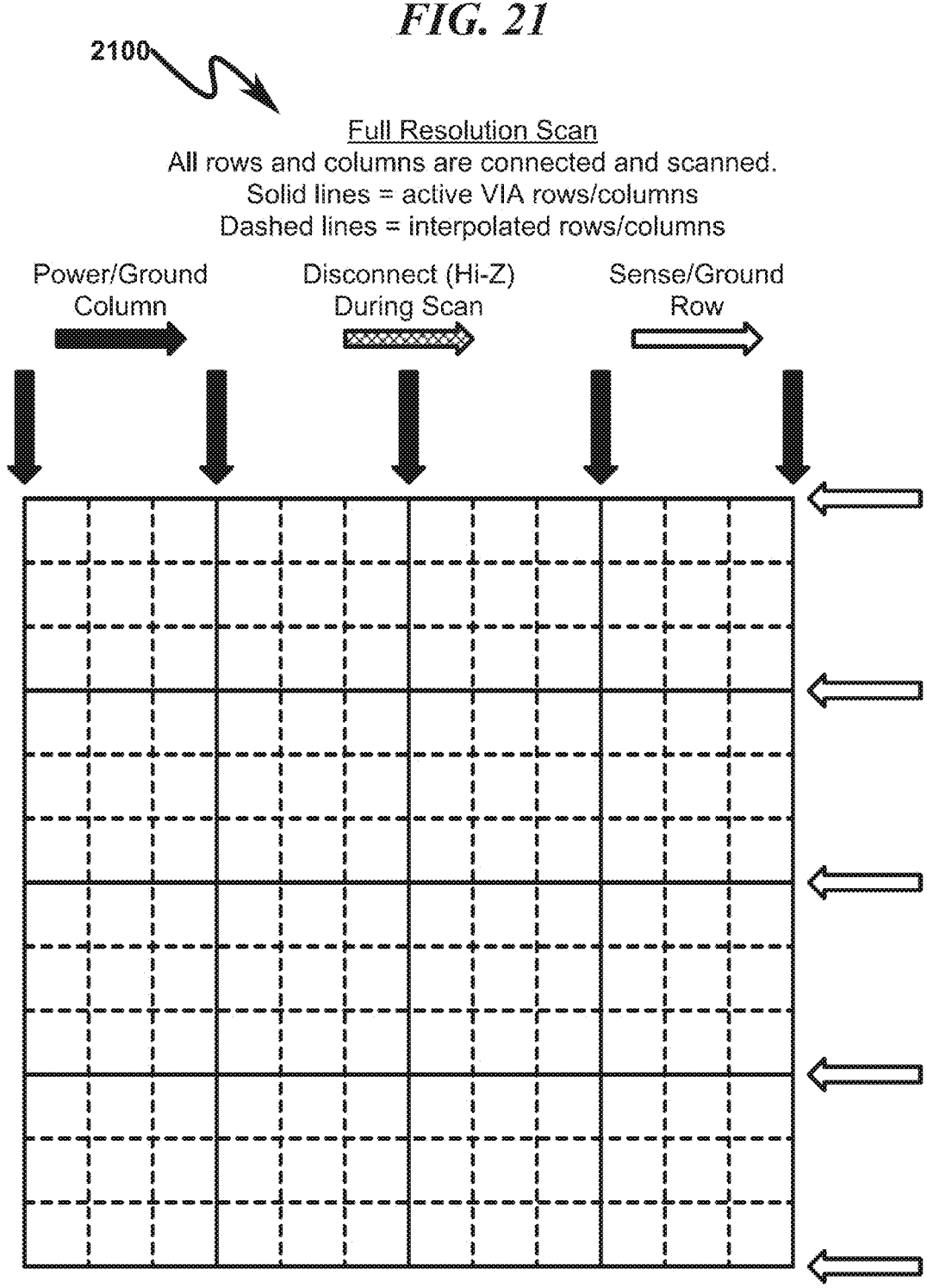
FIG. 21 illustrates an exemplary VIA full resolution scan configuration.
Figure 24:
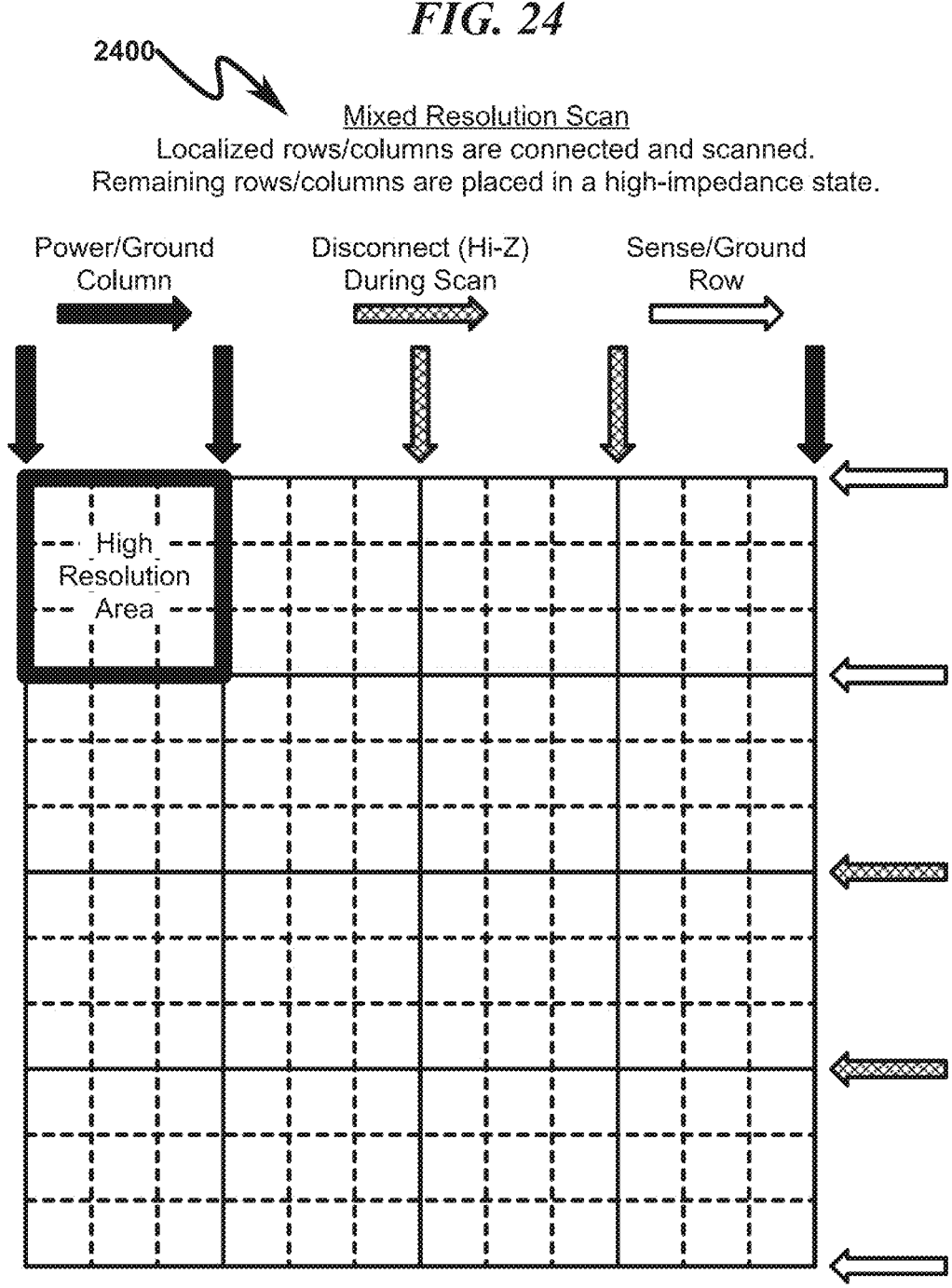
FIG. 24 illustrates an exemplary VIA mixed resolution scan configuration.

The present invention anticipates that by varying the IIC column excitation and IIR row sensing IIR configurations, that a variety of scanning resolutions may be obtained from a given invention embodiment. Several examples of this variable scan resolution capability are illustrated in FIG. 21 (2100)-FIG. 24 (2400). In these examples, the solid horizontal/vertical lines represent active rows/columns in the VIA, and the dashed lines represent interpolated rows/columns within the VIA. Each row/column may be considered in either an active state (columns are driven/grounded and rows are sensed/grounded) or in a disconnected state (high impedance state).

Figure 22:
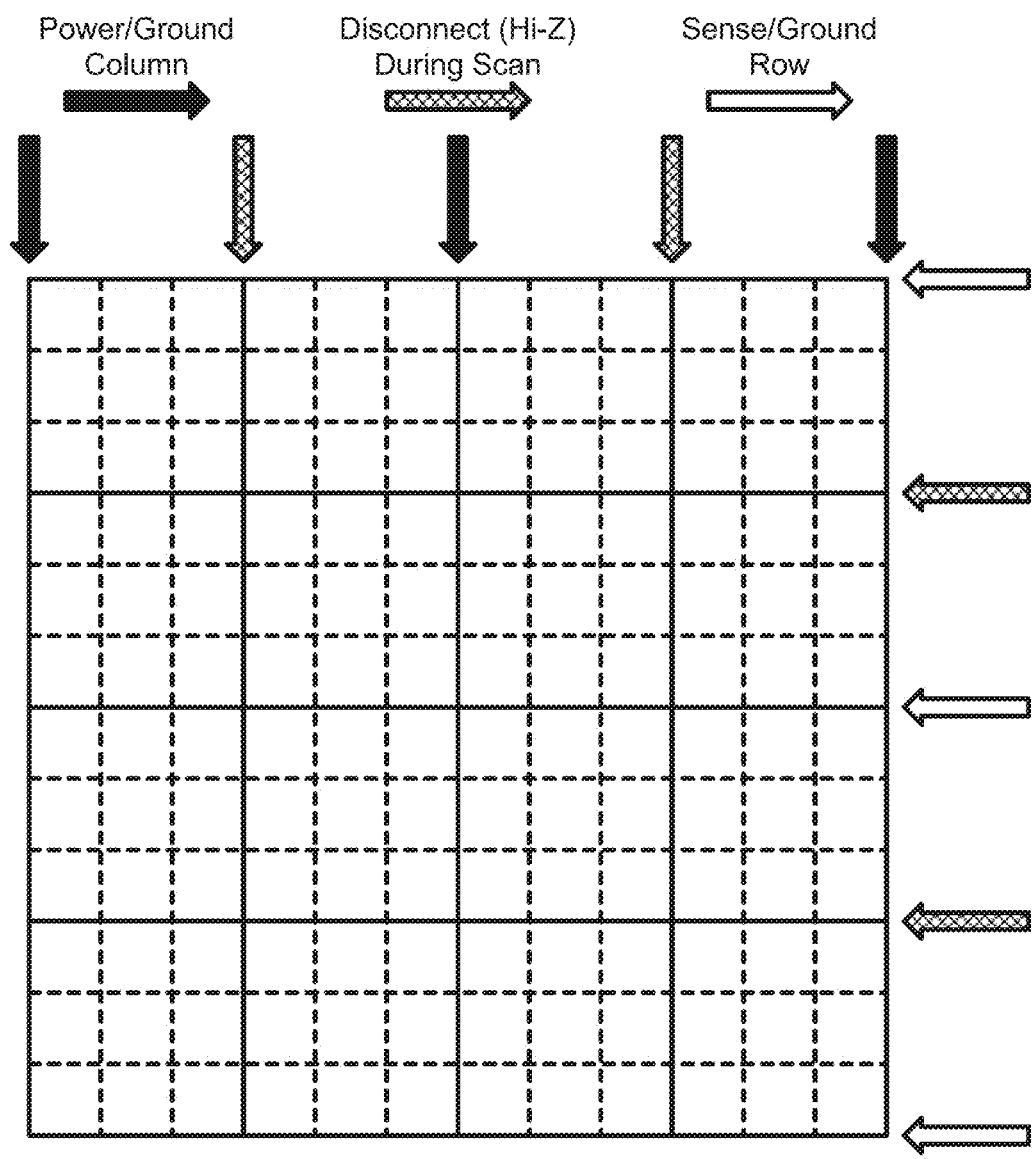
FIG. 22 illustrates an exemplary VIA half resolution scan configuration.
Figure 23:
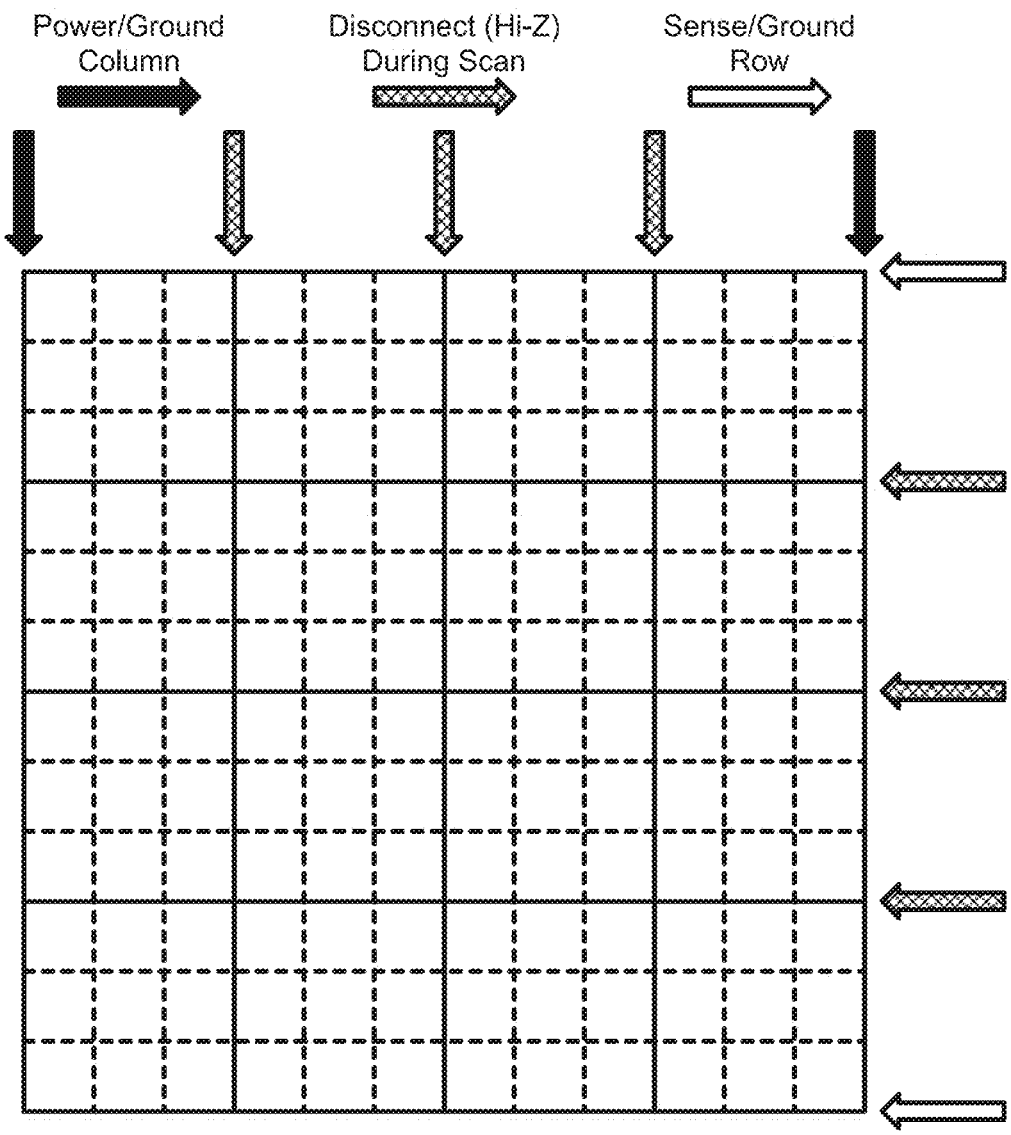
FIG. 23 illustrates an exemplary VIA quarter resolution scan configuration.

FIG. 21 (2100) illustrates a scenario in which a full resolution scan is configured and all columns are driven and all rows are sensed during a scan. A half resolution scan is depicted in FIG. 22 (2200) wherein every other row/column is connected and driven/sensed during a scan. A quarter-resolution scan is depicted in FIG. 23 (2300) wherein every fourth row/column is connected and driven/sensed during a scan. Finally, FIG. 24 (2400) illustrates the concept of a mixed-mode scan in which a portion of the VIA is scanned at full resolution and the remaining portion of the VIA is scanned at a lower resolution. The ability to vary scan resolutions greatly aids in power conservation for the overall touch sensor system by reducing the dynamic power loss associated with scanning each column/row of the VIA. One skilled in the art will recognize that the example of FIG. 24 (2400) may be configured to perform a full resolution scan at a number of discrete areas within the overall VIA structure.

Pen/Stylus Embodiment (2500)-(3200)

Overview (2500)

Figure 25:
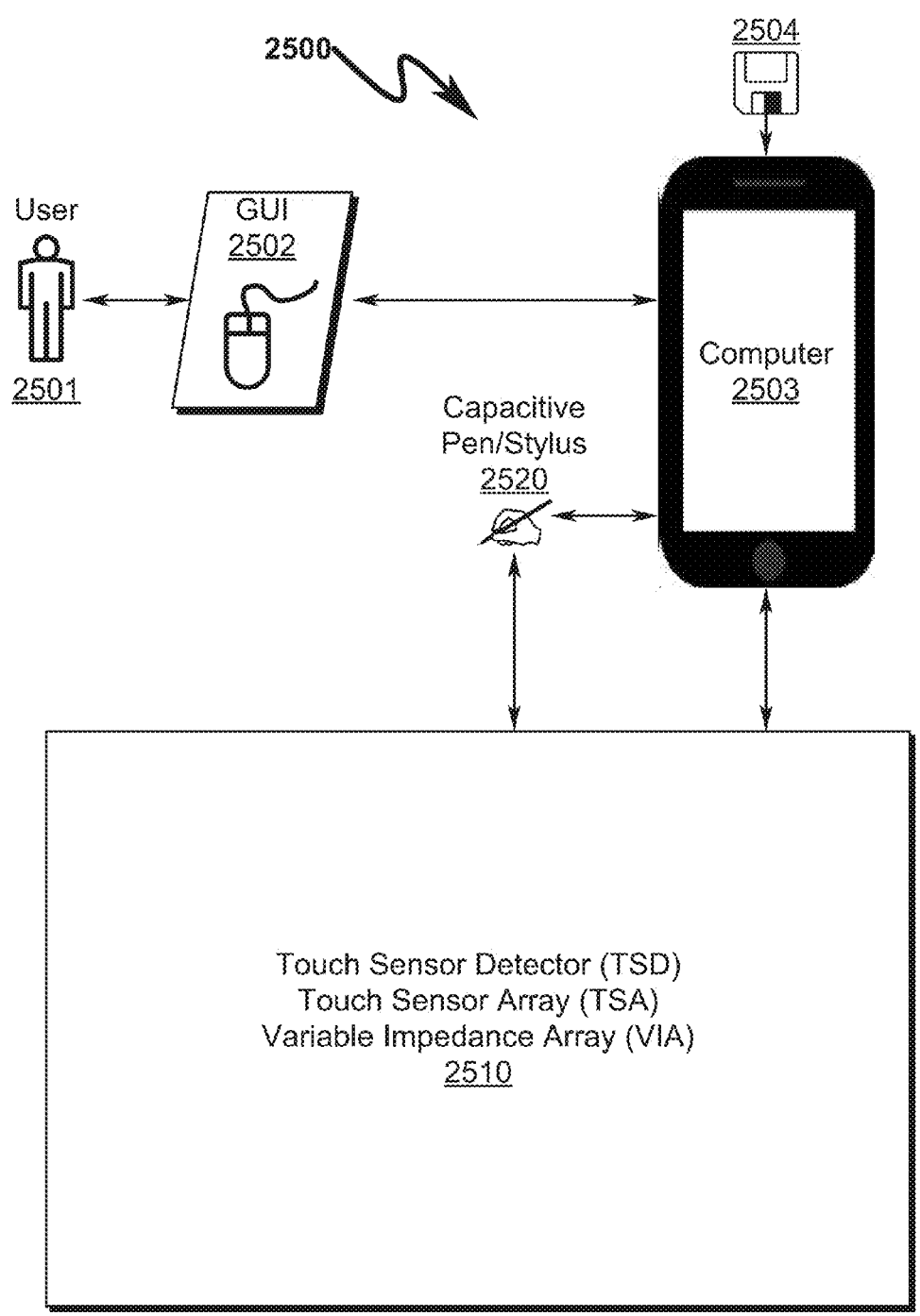
FIG. 25 illustrates a system block diagram depicting a preferred exemplary invention embodiment employing a pen/stylus input.
Figure 32:
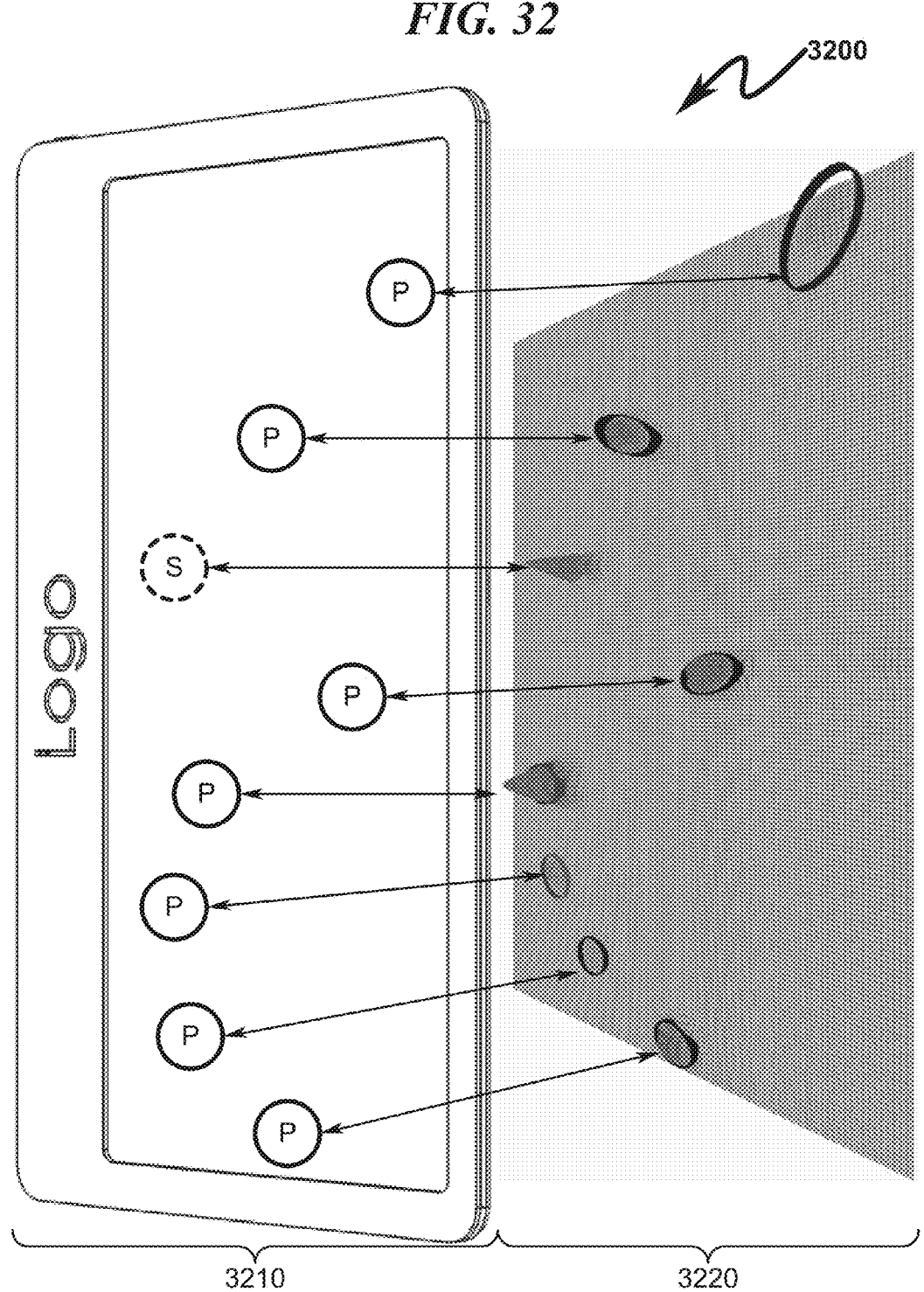
FIG. 32 illustrates sensed areas of sensed input associated with FIG. 30 categorized as pressure (P) inputs and stylus (S) inputs.

As generally depicted in FIG. 25 (2500)-FIG. 32 (3200), the present invention may incorporate the use of a user (2501) pen/stylus (2520) as a GUI (2502) input in addition to the touch sensor detector. As depicted in the block diagram of FIG. 25 (2500), this alternate embodiment provides for similar functionality as depicted in FIG. 1 (0100), but with the addition of a pen/stylus (2520) that may communicate with the touch sensor detector (TSD)/touch sensor array (TSA) (2510) and/or the computer system (2503) under control of machine instructions read from a computer readable medium (2504).

Active Capacitive Stylus (2600)

Figure 26:
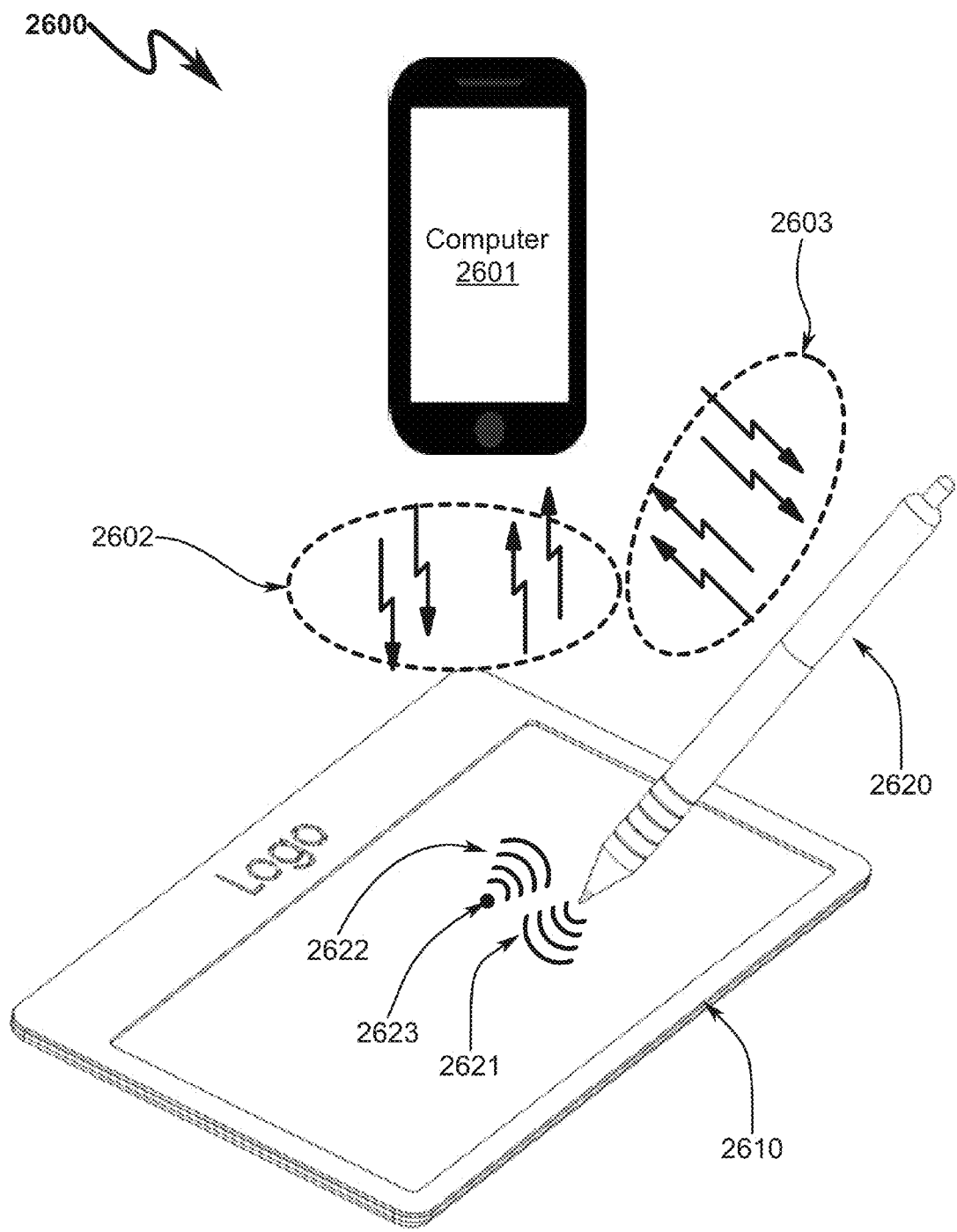
FIG. 26 illustrates a perspective diagram depicting a preferred exemplary invention embodiment employing a pen/stylus input.

As generally depicted in FIG. 26 (2600), the use of an active capacitive stylus (2620) in this configuration permits the stylus (2620) to emit a signal (such as a selected AC frequency) (2621) that is then detected by the TSA (2610) and used in a one-dimensional scanning approach to determine the X and Y positions of the stylus separately. As depicted in this diagram, the computer system (2601) may be configured to wirelessly communicate (2602) with the TSA (2610) as well as wirelessly communicate (2603) with the stylus (2620) in this configuration.

As depicted in the diagram, in some circumstances the active capacitive stylus (2620) may be configured to receive wireless transmissions (2622) from an individual VIA sensor element (2623) and communicate this information to the computer system (2601) wirelessly. In this fashion the VIA may be used to communicate information (location, pressure, detected capacitance, proximity, etc.) to the stylus (2620) which is then relayed to the computer system (2601).

Exemplary Stylus Schematic (2700)

Figure 27:
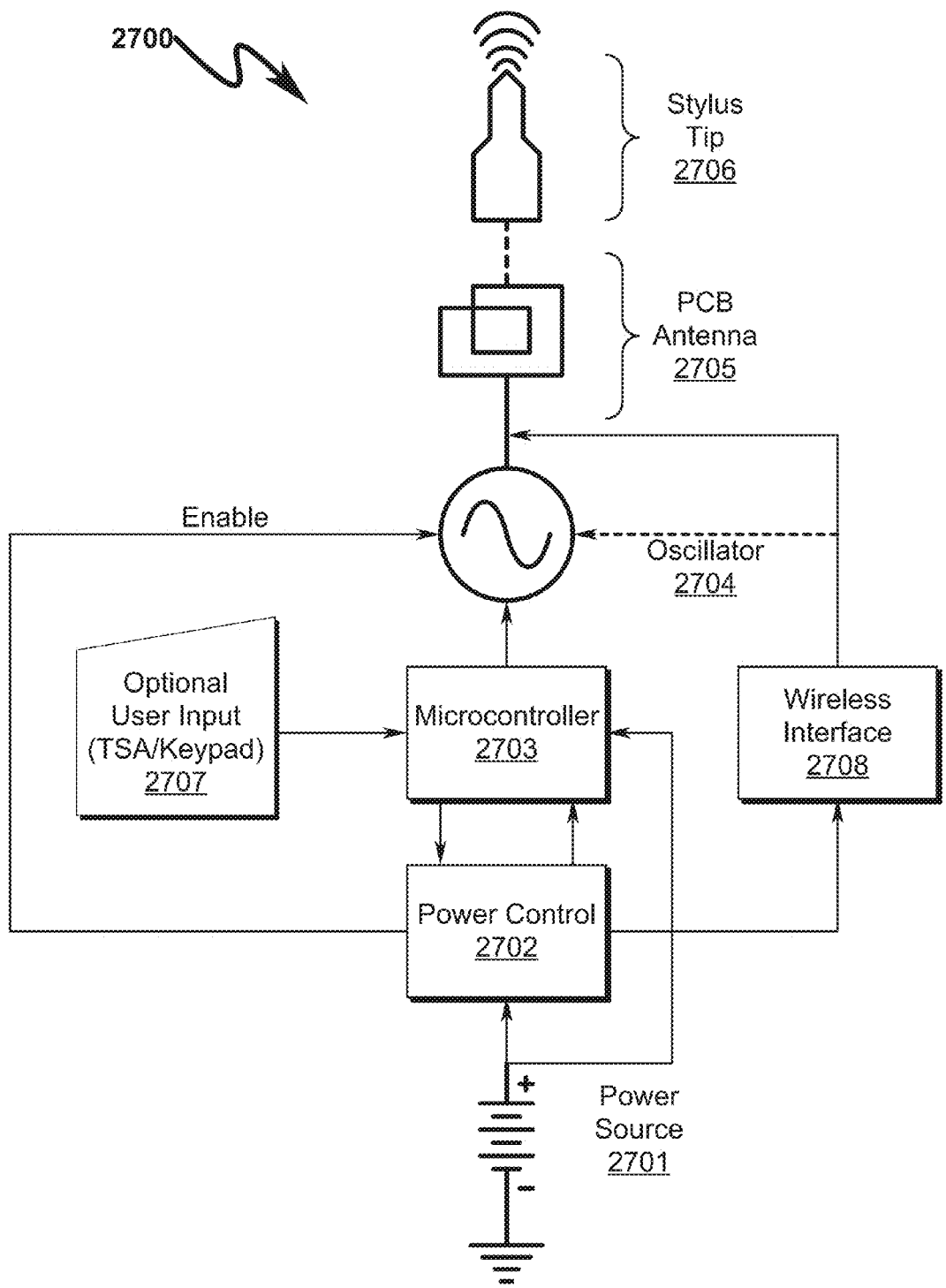
FIG. 27 illustrates a schematic diagram depicting a preferred exemplary pen/stylus circuit useful in many preferred invention embodiments.

A block diagram schematic of an exemplary active capacitive stylus is depicted in FIG. 27 (2700), wherein a power source (typically a 1.5V battery) (2701) is boost converted by a power control module (2702) under control of a low power microcontroller (2703) to supply power to the system. The microcontroller operates to control an oscillator (2704) that drives a PCB antenna (2705) with signals designed for reception by the TSA after transmission by the stylus tip (2706). Radiation coupling between the oscillator (2704) and stylus tip (2706) is typically capacitive but may be aided by the on-board PCB antenna (2705). The type of signal emitted by the oscillator (2704) may be controlled by the microcontroller (2703) in some circumstances by optional user input (2707) that may take the form of a TSA within the stylus body, or optional keyboard switches or capacitive sensors contained within the stylus body. This user input (2707) may put the stylus into different modes of operation that convey distinct information to the TSA through the stylus tip (2706). Thus, the stylus tip (2706) may convey information such as pressure/location to the TSA, but also provide mode indicators based on the state of the oscillator (2704) output.

In conjunction with the stylus (2706) communication modes to the TSA, the stylus may also be configured with a wireless interface (WiFi, BLUETOOTH®, etc.) that may make use of the oscillator (2704) and/or PCB antenna (2705) to communicate with the TSA electronics and/or the computing device to which the TSA electronics communicates as depicted in FIG. 26 (2600).

Exemplary Stylus Construction (2800)-(2900)

Figure 28:
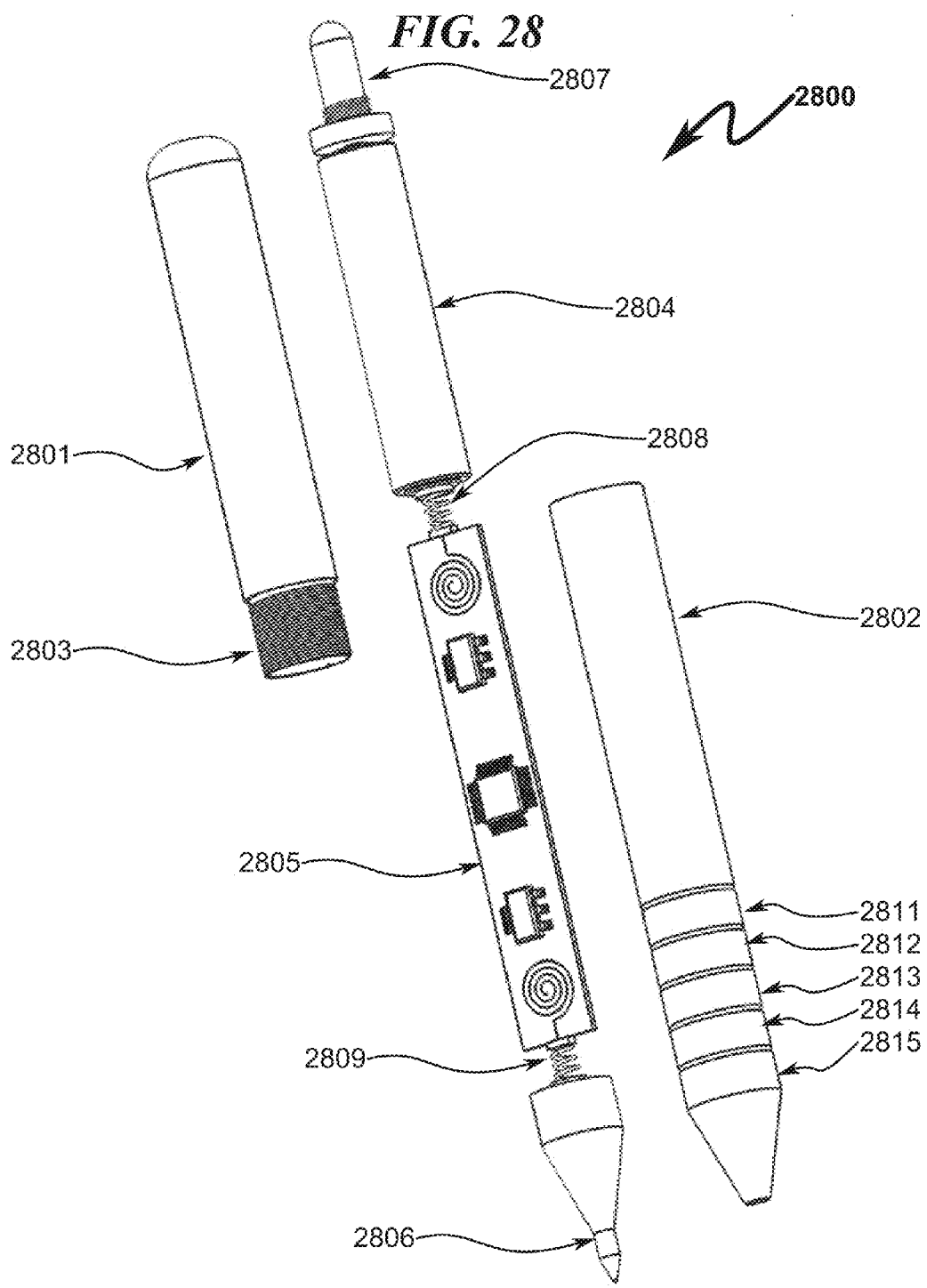
FIG. 28 illustrates a perspective assembly view of a preferred exemplary pen/stylus circuit useful in many preferred invention embodiments.
Figure 29:
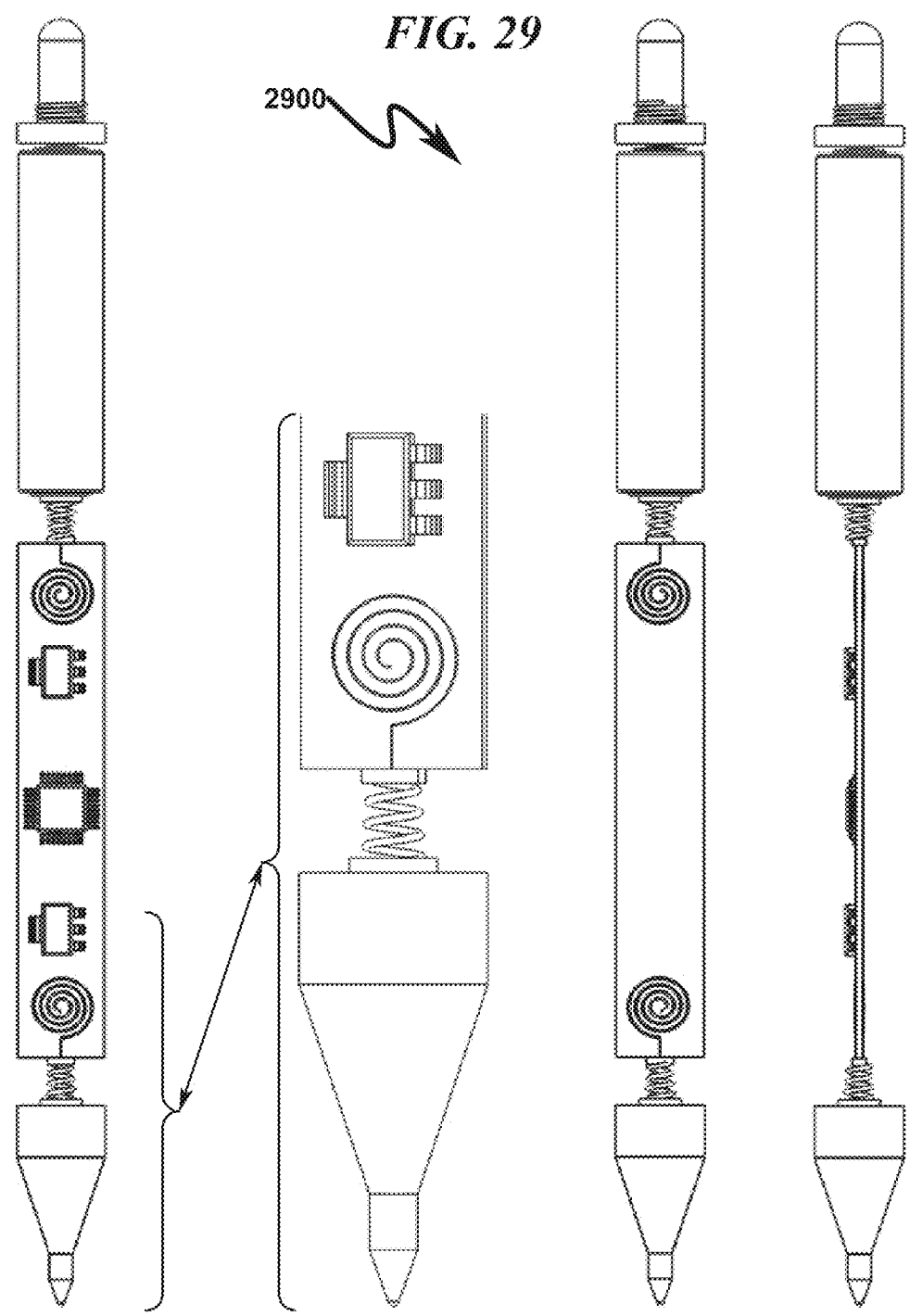
FIG. 29 illustrates top, bottom, and side views of a preferred exemplary pen/stylus circuit useful in many preferred invention embodiments.

Exemplary stylus construction details are provided in FIG. 28 (2800)-FIG. 29 (2900) wherein the stylus comprises top (2801) and bottom (2802) enclosure shells that are configured with mating threads (2803) for assembly. Within this two-piece shell structure, a battery (2804) supplying power and PCB (2805) containing the active electronics are contained along with a stylus tip (2806) that is designed to make contact with the protective cover overlaying the TSA. An optional mechanical switch (2807) may be included to support power control to the stylus or as a means of changing operating modes of the stylus. Springs (2808, 2809) may be included to affect battery (2804) contact as well as permit the stylus tip (2806) to freely move when placed in contact with a flat surface such as that of the TSA protective cover.

Associated with the microcontroller (2703) in the stylus there may also be a variety of user input mechanisms (such as switches or other inputs) (2807) that may allow modification of the operating modes of the stylus. An example of this is illustrated in FIG. 28 (2800) wherein bands (2811, 2812, 2813, 2814, 2815) on the outer surface of the bottom enclosure shell (2802) are sensed by capacitive coupling to determine user switch inputs to the microcontroller and thus set the operating mode of the stylus. While other mode selection methods are possible, this is just one example of the ability of the stylus to operate in a variety of modes with the TSA.

FIG. 29 (2900) provides additional detail on the internal construction of the stylus, including the PCB, spring loaded contacts to the stylus tip, and provision for PCB trace antennas to aid in both communication with the TSA and/or a computing system using the TSA as an input device.

Exemplary Input Data Profiles (3000)-(3200)

Figure 30:
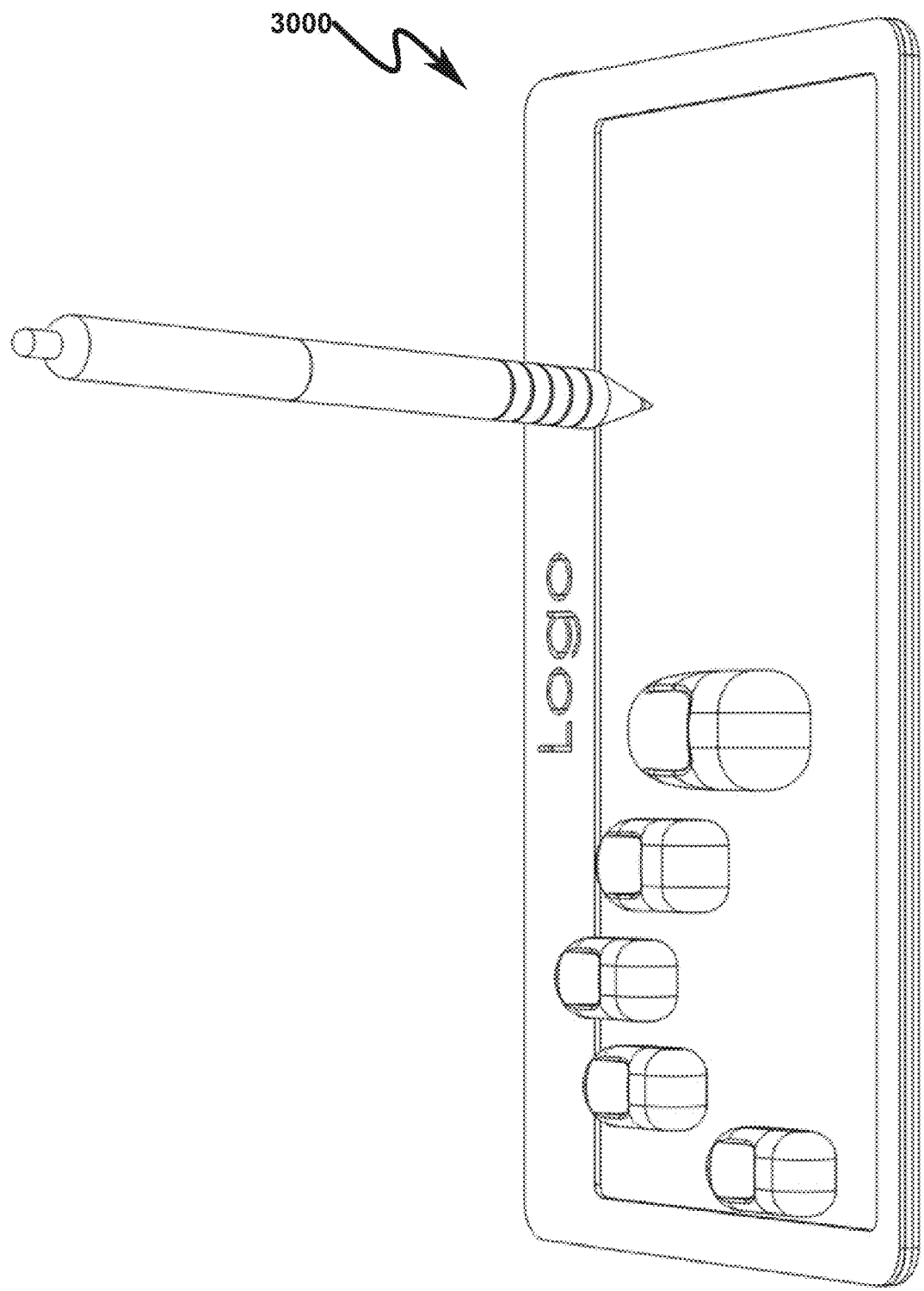
FIG. 30 illustrates a preferred invention embodiment employing a pen/stylus and depicts input from hand/finger and pen/stylus inputs.
Figure 31:
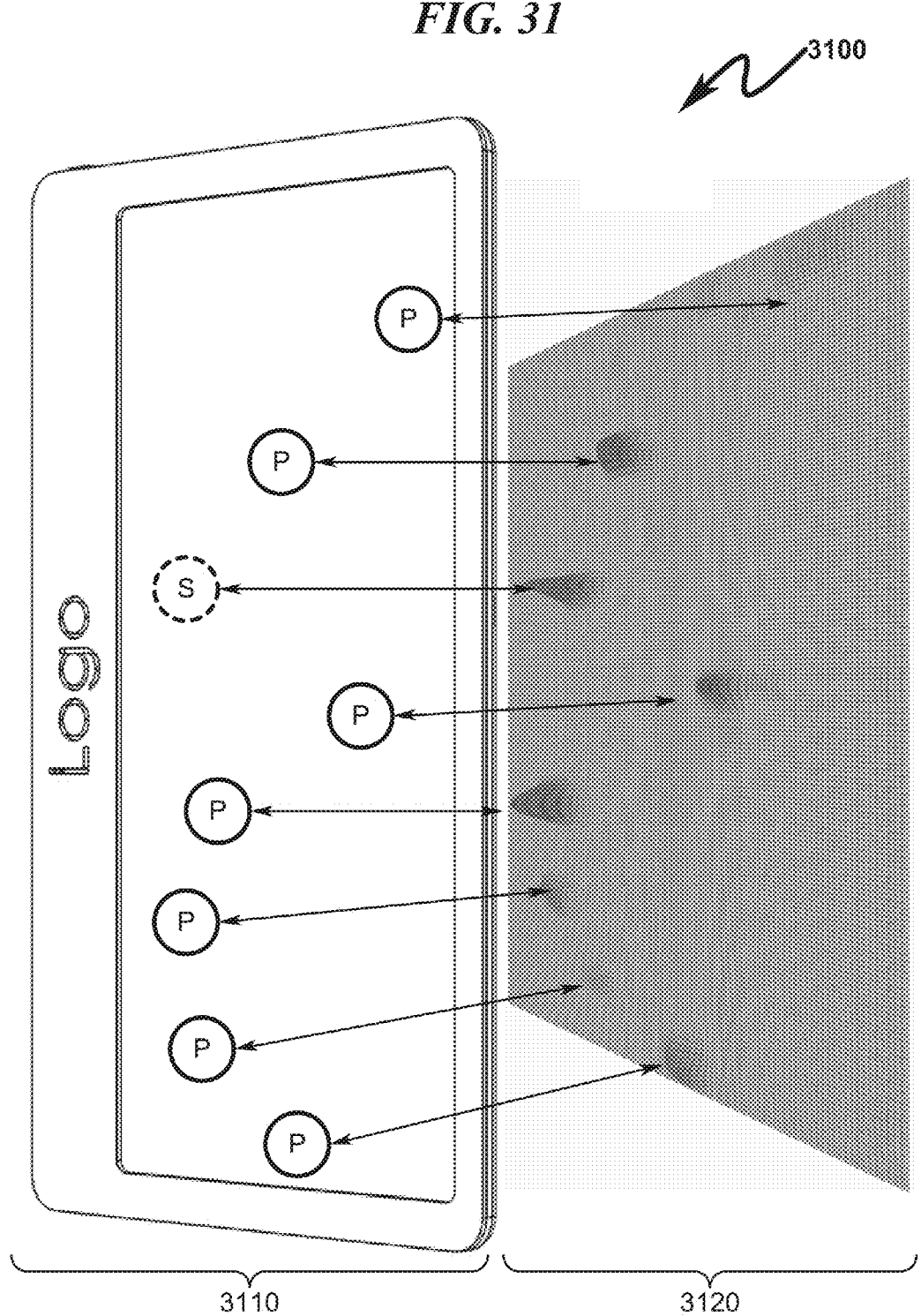
FIG. 31 illustrates sensed areas of sensed input associated with FIG. 30.

As depicted in FIG. 30 (3000)-FIG. 32 (3200), the present invention may integrate the use of hand/finger gestures on a tablet surface (3110, 3210) as well as pen/stylus input to produce pressure/presence profiles (3120, 3220) as depicted in FIG. 31 (3100) and FIG. 32 (3200). As depicted in FIG. 30 (3000), the system may be used to collect pressure information from various user fingers (or other parts of the user hand) as well as the stylus/pen input. As depicted in FIG. 31 (3100), these inputs may form a pressure map in which each hand/finger/stylus input is associated with a pressure profile in the TSA. These pressure profiles can be distinguished as coming from the user hand/fingers (P) or the stylus (S) as depicted in FIG. 32 (3200), because the stylus in this instance is an active capacitance stylus as previously discussed and is emitting wireless information to the TSA during operation. Note that in FIG. 32 (3200) the system may be configured to distinguish between pressure inputs (defined as ellipses in these diagrams) (P) as compared to stylus inputs (S), thus permitting a different dimensional plane of inputs to the same TSA. This additional plane of information may be used by application software running on the remote computer system to affect a variety of operating modes or controls within the application software.

DETAILED DESCRIPTION

IFSA Embodiment (3300)-(6400)

Overview

While the present invention may be implemented using a wide variety of sensor technologies in the VIA, one preferred collection of exemplary embodiments utilize pressure-sensitive sensors to form an interpolating force sensing array (IFSA). The following discussion details this pressure-sensitive class of preferred embodiments and provides detailed exemplary construction contexts. Note that while the IFSA embodiments are detailed below, the techniques used in their construction may be equally applied to other types of sensor technologies such as capacitive, electromagnetic, etc.

In accordance with the above general description, the present invention IFSA embodiment describes systems and methods for constructing a high resolution force sensing array, an interpolating circuit that allows the drive and sense circuitry to have a lower resolution than the force sensing array, a circuit and accompanying algorithms for scanning the sensor and processing the resulting signals, and methods of incorporating this sensor into various devices.

An IFSA sensor typically consists of the following components. Further detail and clarification on each component can be found in the detailed description which follows.

Sensing Area. A sensing area consisting of row and column electrodes and a grid of force sensing elements where each element is connected between one row and one column electrode.

Interpolation Resistors. A series of interpolation resistors connecting to the column and row electrodes and the drive/sense circuit.

Drive Circuit. A drive circuit, which consist of a series of digital and/or analog switches and associated control logic attached to the active columns.

Sense Circuit. A sense circuit, which consist of a series of digital and analog switches and associated control logic attached to the active rows.

Voltage/Current Source. A voltage or current source, which provides drive voltage/current to the drive circuit.

Signal Conditioning. An optional signal conditioning component, which conditions, filters, or transforms the signal coming out of the sense circuit.

Control Circuit. A control circuit, typically a microcontroller or ASIC, which generates the sequence of control signals necessary to scan a sensor. The control circuit may also incorporate an internal or external ADC for conversion of sensor signals from analog to digital format, a processor and memory to process and interpret the signals, and IO logic to communicate with external components, such as a host processor.

Note that the rows and columns in the circuit may be interchanged, but for the purposes of illustration, the present invention connects the drive circuit to the columns and the sense circuit to the rows. Also note that the components are shown separately for the purposes of illustration. The functions of these components may be merged and/or separated in an actual implementation. Some examples of this would include merging the interpolation resistors with the sensing area, incorporating the voltage source into the drive circuitry, placing the ADC external to the control circuit, etc. For clarity, the present invention calls the column and row electrodes that directly connect to the drive and sense circuitry active column and active row electrodes, while those that connect to the drive and sense circuits through the interpolation resistors are called interpolating column and rows electrodes.

During operation, the control circuit repeatedly scans the sensor to retrieve two dimensional "images" of the force distribution on the sensor. Each scan cycle is called a frame. Below is an overview of the steps that happen during each frame. Further detail and clarification on each step can be found in the detailed description.

(1) The control logic drives one active column electrode at a time, while grounding all the other active column electrodes.
(2) For each powered drive electrode, the control logic connects one sense electrode at a time to the conditioning circuit, while grounding all the other active row electrodes. This creates multiple possible current paths through the force sensing elements near the intersection of the powered drive electrode and the sense electrode which is connected to the conditioning circuit. Force applied to the sensor creates a signal that is proportional to the force and the distance of the force to the intersection.
(3) The signal passes through the conditioning circuit which may perform current to voltage conversion, filtering, and/or amplification, and generates an analog output signal.
(4) The ADC converts the signal output from the signal conditioning circuitry into a digital value and stores it into an array in memory. This is repeated for each intersection between the active row and active column electrodes.
(5) After the full sensor is scanned, the control circuit may process the array in memory to further filter the signal, normalize the signal into known units, extract features such as touches, and track touches over time.
(6) The control circuitry may interact with external components to exchange data. It may also choose to change scan parameters in order to optimize for power, speed, or latency for subsequent scans. It may also respond to a user request or decide to shut down or sleep between scans.
(7) The signals sent out to external circuitry are used by hardware and/or software specific to the product in which IFSA is used to perform the desired task.

The components and processes described work in concert to enable the sensor to capture pressure distributions, process the data, and output meaningful information to enable a wide variety of applications. The foregoing purposes, features, and advantages of the invention as well as the detailed design, implementation, and manufacturing of the invention are clarified and discussed in more detail in the detailed description of the invention provided herein.

Theory of Operation (3300)-(3600)

Introduction

The following discussion will describe on a conceptual level how an IFSA sensor is constructed and how that construction enables interpolation. As described earlier, an IFSA sensor has a set of active row and column electrodes, which are connected to the drive and sense circuitry. In between each pair of active row and column electrodes, there are one or more interpolating electrodes. Although the number of interpolating electrodes between each row and column pair can vary, most IFSA sensor designs will keep this number constant and reference it as the number N.

Figure 33:
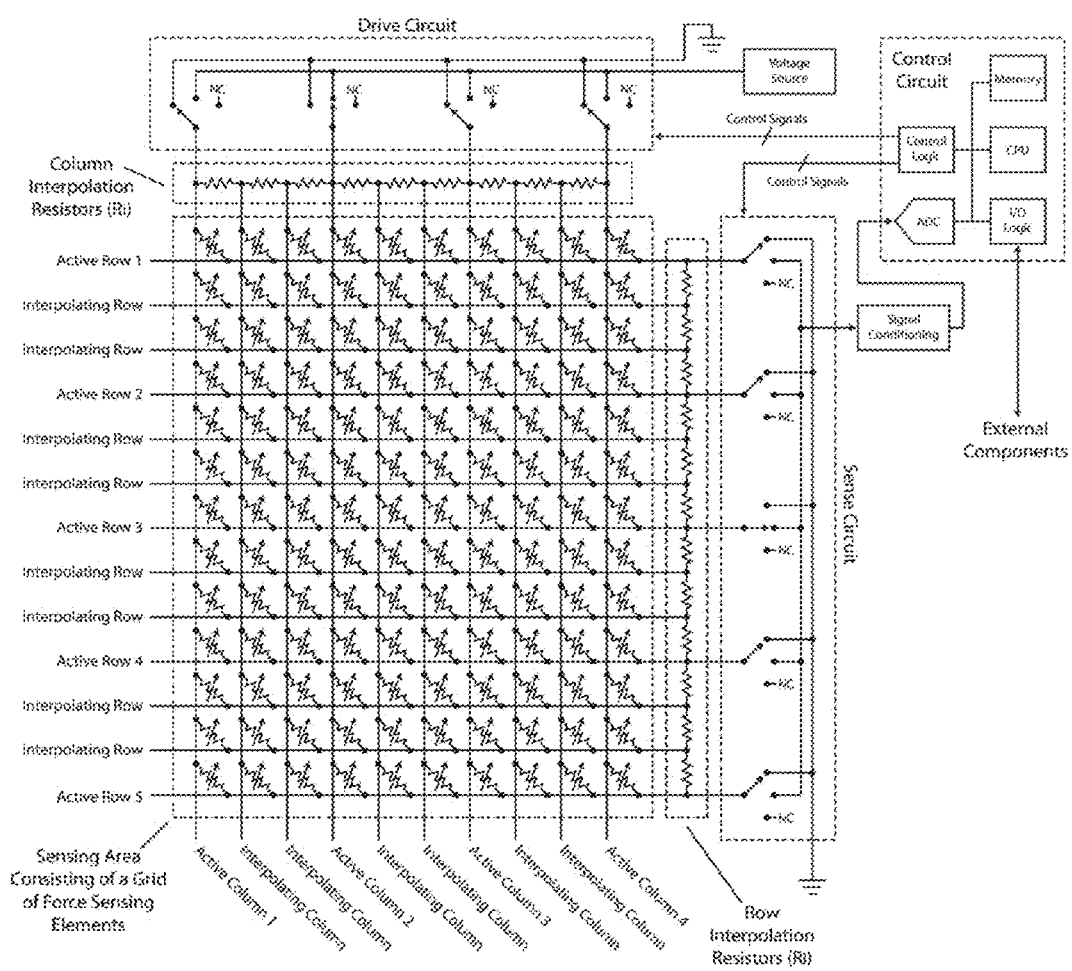
FIG. 33 illustrates a representative IFSA circuit with four active column electrodes and five active row electrodes incorporating two interpolating electrodes between each pair of active electrodes.

FIG. 33 (3300) depicts an example of an IFSA circuit with four active column electrodes, five active row electrodes, and two interpolating electrodes between each pair of column and row electrodes. Thus, with circuitry that would normally only be able to read a 4×5 sensor, the present invention is able to read forces from a 10×13 array of force sensing elements. With this arrangement, the present invention has tripled the effective tracking resolution of the sensor in both X and Y dimensions compared to the number of rows and columns that are hooked up to the readout electronics. Furthermore, by increasing the number N of interpolating row and column electrodes, the present invention can further increase the tracking resolution of the sensor, with the only limit being the capability of the manufacturing process used to create the sensor.

Force Sensing Elements

At the intersection of each pair of row and column electrodes is a force sensing element, represented in the present invention schematic as a variable resistor. A variety of different materials, configurations, and manufacturing methods can be used to create the force sensing elements, which are described in a later section. Most force sensing elements that would be used in IFSA sensors respond in a similar fashion to applied force—as force is applied, the resistance decreases. However, the relationship between resistance and force is typically non-linear. For this reason, rather than measuring resistance, it is preferable to measure the conductance of a sensor, which is the inverse of the resistance. As pressure is applied, the conductance increases in a linear or near-linear fashion. If the constant of proportionality (which corresponds to sensitivity) is assigned the variable k, the amount of force applied at a particular sensor element F, and the conductivity of the sensor element C, then the present invention can model the conductivity C of the sensor with respect to force F with the following equation:

$$C = kF \qquad (6)$$

If a voltage is applied across the force sensing element, Ohm's law states that the amount of current I that will flow through the force sensing element will be proportional to the force times the voltage V:

$$I = kFV \qquad (7)$$

Interpolating Resistors

Connected in between each pair of neighboring electrodes (both active and interpolating) is an interpolation resistor. Although some sensor embodiments may have varying values for the resistance values of the interpolating resistors, for the sake of this example, assume that all the interpolating resistors have the same resistance value Ri. These resistors form a series of resistive divider circuits which, as shall be seen, enable the interpolating property of the sensor.

Interpolation in Action

Activity that occurs when the present invention scans an intersection of the IFSA sensor is detailed as follows. At any point in the scan of a sensor, one active column electrode is driven to a known voltage Vd, while its neighboring column electrodes are connected to ground. Simultaneously, the current Is flowing out of one active row electrode is measured while neighboring row electrodes are connected to ground. As mentioned earlier, the number of interpolating electrodes between a given pair of active column or row electrodes can vary across the sensor, but for the purposes of illustration, assume that the present invention sensor embodiment is constructed with a consistent number of interpolating electrodes between each pair of active column and row electrodes. This number is referenced herein as N.

Figure 34:
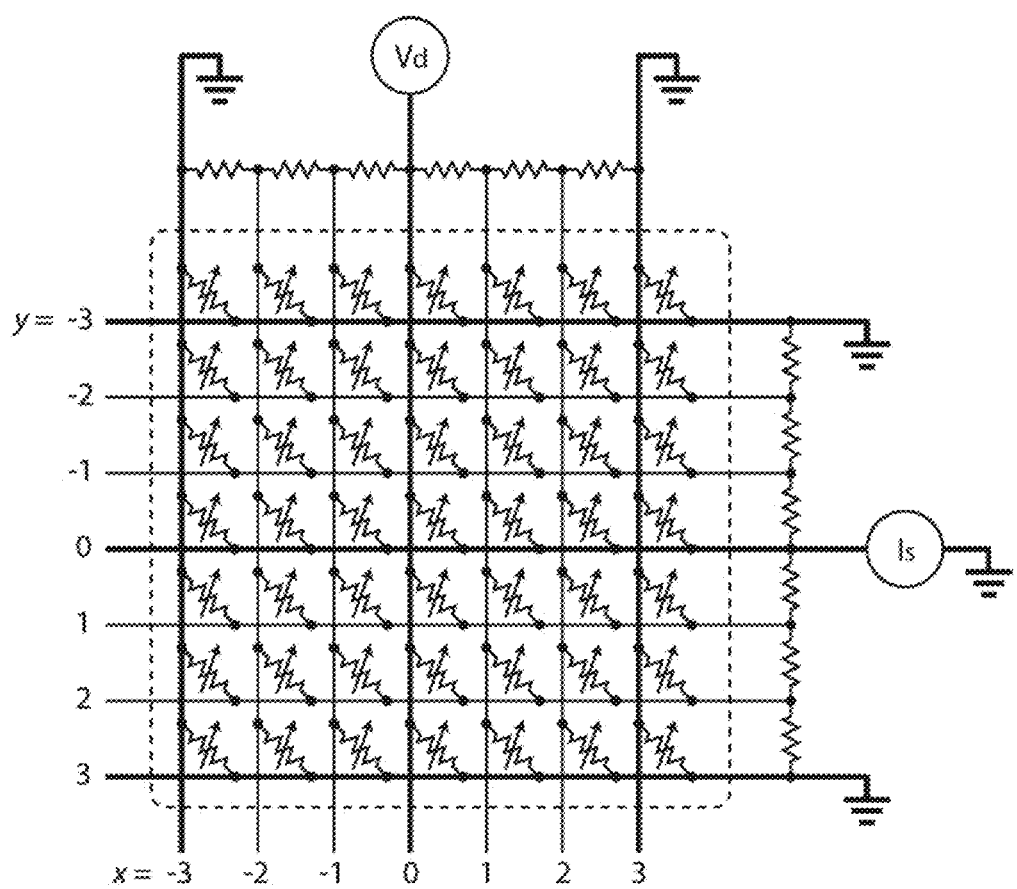
FIG. 34 illustrates interpolation in a 3 active column by 3 active row area of a sensor wherein the sensor has two interpolating electrodes between each pair of active electrodes (thus having an N value of 2) wherein is depicted a moment in time during a sensor scan, columns −3 and +3 are grounded, and column 0 is driven with a voltage (Vd), while rows −3 and +3 are grounded and the current flowing from row 0 (Is) is measured.

When the voltage Vd is applied by the drive electronics, each force sensing element in the area between the two grounded column electrodes and the two grounded row electrodes contributes some current to the total sensed output current Is in a fashion that is linear with respect to the force on the element and the distance from the row-column intersection. To understand how each of these force sensing elements contributes to the final output value, reference FIG. 34 (3400), which depicts a subsection of an IFSA sensor (such as the sensor in FIG. 33 (3300)) during the moment in time of a sensor scan where the row/column intersection at the center of the diagram is being scanned. This sensor has two interpolating electrodes between each pair of active row and column electrodes (N=2). In this figure, the present invention assigns each column electrode (whether it is active or interpolating) an x coordinate based on its distance from the current powered electrode (which is column electrode 0 in this example). In this figure, the leftmost, central, and rightmost electrodes are active electrodes. They are numbered −3, 0, and 3, respectively (for a general sensor with a different N, they would be numbered −(N+1),0 and (N+1)). In between them are two groups of interpolating electrodes. These electrodes are numbered −2 and −1 (−N through −1 generally) and 1 and 2 (1 through N generally). We assign each row electrode a y coordinate based on its distance from the currently sensed electrode (which is row electrode 0 in this example) in a similar fashion. Finally, the present invention assigns a coordinate of (X,Y) to each force sensing element at the intersection of column X and row Y.

Remember that all the neighboring column and row electrodes around the driven and sensed electrode are driven to ground. Thus, column electrodes −3 and 3 are grounded, and so are row electrodes −3 and 3. In the remainder of this section, the present invention shows that this sets up a distribution of sensitivity around the intersection of column 0 and row 0, which falls off in a linear fashion along both X and Y directions.

On the drive side, the set of interpolating resistors which interconnect the interpolating electrodes in between the driven active electrode and the neighboring active electrodes, which are grounded, form a series of voltage dividers. These resistors all have the same resistance value of Ri. Thus, the present invention can express the voltage at each of these column electrodes Vc as a function of x as:

$$V_c(x) = V_d \left[ \frac{(N+1-|x|)}{N+1} \right] \quad (8)$$

Between each row and column electrode is a force sensing element as described earlier. The current flow through the force sensing element varies in proportion to the applied force and the applied voltage. If a given column electrode is at a voltage of Vc(X) as described above, the constant of proportionality of the force sensing element is k, and if the present invention assumes that the sense side of the force sensing element is at a potential of 0 volts (it will be described later why this is a reasonable assumption), the current If(X,Y) that flows through the force sensing element at location (X,Y) is:

$$I_{f(x,y)} = V_c(x) \times k F_{(x,y)} \quad (9)$$

On the readout side, the interpolating resistors in between each pair of active electrodes also act as a series of resistive dividers, except in this case, they split the current flowing into an electrode through the force sensing element between the neighboring active electrodes, which are both at ground potential. In this example, one of these electrodes is being sensed and the neighboring active electrode is being grounded. The contribution to the current at the active sense electrode from force sensing element (X,Y) can be expressed as:

$$I_{C(x,y)} = I_{f(x,y)} \left[ \frac{(N+1-|y|)}{N+1} \right] \quad (10)$$

Now, substituting the equation for If(X,Y) into the equation above, and then substituting the equation for Vc(X) into the resulting equation, the following equation is produced for Ic(X,Y):

$$I_{C(x,y)} = k F_{(x,y)} \times V_d \left[ \frac{(N+1-|x|)}{N+1} \right] \times \left[ \frac{(N+1-|y|)}{N+1} \right] \quad (11)$$

Because k, Vd, and N are all constant, it is seen that the contribution to the output current that is read out from the intersection of an active row and column electrode is proportional to the force F(X,Y) applied to location (X,Y) and the distance in X and Y of the force sensing element from the row-column intersection.

Because the voltage divider circuit between the columns and the current divider between the rows both behave linearly, the current contribution from each sensing element is additive, so the final sensed current Is for a given row-column intersection can be expressed as:

$$I_S = \frac{kV}{(N+1)^2} \sum_{x=-N}^{+N} \sum_{y=-N}^{+N} F_{(x,y)} \times (N+1-|x|) \times (N+1-|y|) \quad (12)$$

Figure 35:
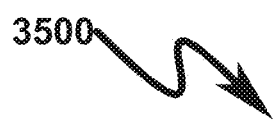
FIG. 35 illustrates a sensitivity distribution for the 7×7 array of sensor elements shown in FIG. 34 as it is being scanned using the present invention drive scheme.

This formula models how each row/column intersection behaves with respect to a distribution of forces applied to the sensing elements around that intersection (note that there is some nonlinearity that is not modeled by this formula, but the effects are typically negligible, as described later). To understand what is happening more clearly, the present invention can compute the percent contribution that each sensing element contributes relative to the element at (0,0) to a reading at the intersection of an active row and column. We calculate this for each of the 49 force sensing elements at each row/column intersection of the sensor in FIG. 34 (3400). FIG. 35 (3500) depicts the results of these calculations, which are the relative contributions of the 7×7 array of force sensing elements depicted in FIG. 34 (3400). This sensitivity distribution is visualized in three dimensions in FIG. 36 (3600).

Because the same distribution happens at every scanned intersection of an active row and column, each sensing element contributes its signal to the active row/column electrode intersections around it in a fashion that is linearly related to its distance from those intersections. Because the falloff of the contributions in X and Y is linear, the present invention can use linear interpolation, applied to the array of force values read out from each intersection of an active row and column to accurately calculate the centroid of a force distribution applied to the sensor.

Furthermore, the resolution with which the present invention can track that centroid is proportional not to the resolution of the active sensing lines, but to the resolution of the interpolating lines. Thus, simply by increasing N, the present invention can increase the tracking resolution of the present invention sensor.

Non-Linearity Due to Current Flow Through Force Sensing Element

In deriving the equations above, the effect of current flow through the force sensing element was not taken into account. This current causes a drop in the voltage Vc at the drive side of the force sensing element and an increase in the voltage at the sense side of the force sensing element above ground potential. Thus, less current than predicted by the equations will flow through the sensor, yielding a slightly reduced sensitivity.

More problematic is that the resulting current flow through the interpolating resistors skews their voltages and affects the response of other nearby force sensing elements. Fortunately, this problem can be mitigated by picking low resistance values for the interpolating resistors and designing the force sensing elements to have significantly higher resistance values in their useful operating range. This ensures that the scale of this effect is relatively small and does not significantly affect the accuracy of the sensor. Beneficially, increasing the resistance of the force sensing elements also reduces overall power consumption.

Force Sensing Calculations

Overview

A variety of preferred invention embodiments utilize a pressure-sensitive array as part of the VIA structure. Within this application context, a variety of force calculations may be incorporated within the control logic in conjunction with the overall interpolation function that is applied across multiple columns and rows of the VIA. The following discusses these calculations in detail and provides a reference point for implementation of a wide range of invention embodiments utilizing this form of VIA structure as the basis of the interpolation process.

The force and position of a touch are computed with arithmetic operations on the two-dimensional array of sensor values read out from a sensor. In a force sensing sensor, the sensor values correspond to force, and in a capacitive sensor, they may correspond to a capacitive signal. These calculations are generally known to those familiar with signal processing for touch sensors.

While the present invention cannot reconstruct the forces on the individual sensor elements after doing a scan at a lower resolution (such as the active electrode resolution), the present invention can reconstruct higher-order information such as the force and position of a touch at the full resolution (such as the VIA resolution) of the sensor. Several reasons that the present invention achieves this result are as follows:

the interpolation network allows the sensor to be down-sampled in a linear fashion; and the computational methods used to compute force and position of a touch are linear in nature.

The THEORY OF OPERATION section above described the first capability by showing mathematically that the present invention approach creates a linear downsampling of the sensor signal. The remainder of this section will explain the second aspect by providing more detail on the methods used to compute the force and position of a touch.

Because the downsampling is happening in hardware and the math used for the calculation are both linear, the accuracy that the present invention gets from scanning the sensor at a lower resolution is the same as if the present invention were to scan it at the full resolution of the sensor elements. Furthermore, this is also true no matter how small or how big a touch is (whether it covers a single sensor element or many sensor elements). The only thing the present invention loses is the ability to distinguish two touches that are closer together than the "Nyquist period" of the present invention scan.

This is important because it means that the present invention can sense at a high resolution, using low resolution scan electronics, without sacrificing accuracy. Or, the present invention can boost the accuracy of a low resolution sensor without introducing extra electronics.

The only calculation that is not mathematically preserved is the area (because after interpolation, there is no way to tell exactly how many sensor elements were activated). However, this generally is not a problem since there are ways to approximate the area calculation.

While it is possible to use a method such as spline interpolation to approximately reconstruct the force values sensed by each of the sensor elements, the present invention may not opt to do this in firmware. The reason is that this would be very computationally expensive and would in many ways defeat the benefits of scanning the sensor at a lower resolution. Instead, the present invention typically performs the math described below on the low resolution scan image and because of the linearity property, the present invention achieves the same result as if it had done the math on the full resolution scan image.

Note that some preferred invention embodiments may up-sample the two-dimensional force array in firmware to better estimate the position of the touch, or to implement multi-resolution scanning. However, on the PC side, the present invention may utilize spline interpolation to up-sample the low-resolution force image back to the resolution of the sensor elements for the purpose of achieving aesthetic visualization of the VIA data. The following is a summary of how the present invention calculates the force and position of a touch.

Calculating Force of a Touch

The force of a touch is the sum of all force values of the touch. Note that in this section, mathematical operations on the TSM data read out from the sensor are being described. N, X and Y refer to the dimensions of the TSM matrix and the (X,Y) coordinates of the data in the matrix, and F(X,Y) refers to data at coordinate (X,Y) in the TSM. They do NOT refer to interpolating electrodes.

$$TotalForce = \sum_{x=0}^{N} \sum_{y=0}^{N} F_{(x,y)} \quad (13)$$

The total force is referred to as $F_{total}$ in this application.

Calculating the Touch Position

The position of a touch in the X dimension is the force-weighted average of the X positions of the touch. Similarly, the position of a touch in the Y dimension is the force-weighted average of the Y positions of the touch.

$$X_{Position} = \frac{1}{F_{total}} \sum_{x=0}^{N} \sum_{y=0}^{N} xF_{(x,y)} \quad (14)$$

$$Y_{Position} = \frac{1}{F_{total}} \sum_{x=0}^{N} \sum_{y=0}^{N} yF_{(x,y)} \quad (15)$$

The X and Y positions are referred to as $\mu_x$ and $\mu_y$ in the remainder of the document.

Calculating the Touch Shape

The shape of a touch is estimated with an ellipse that surrounds the touch. The calculation of the ellipse is similar to the calculation of the standard deviation of a Gaussian distribution of values, except that it is performed in two dimensions. The calculation starts by computing a 2×2 covariance matrix:

$$\begin{bmatrix} XX & XY \\ XY & YY \end{bmatrix} \quad (16)$$

In this matrix, XX, YY, and XY are the variances of the matrix along X, Y, and the XY diagonal. From this matrix, it is possible to compute eigenvectors, which determine the major and minor axes of the matrix, and eigenvalues, which determine the length of the major and minor axes.

$$XX = \frac{1}{F_{total}} \sum_{x=0}^{N} \sum_{y=0}^{N} xF_{(x,y)}(x-\mu_x)^2 \quad (17)$$

$$YY = \frac{1}{F_{total}} \sum_{x=0}^{N} \sum_{y=0}^{N} F_{(x,y)}(y-\mu_y)^2 \quad (18)$$

$$XY = \frac{1}{F_{total}} \sum_{x=0}^{N} \sum_{y=0}^{N} F_{(x,y)}(x-\mu_x)(y-\mu_y) \quad (19)$$

From here, the eigenvectors and eigenvalues of the covariance matrix can be found using simple mathematics which can be found in any linear algebra textbook. What is important to note, is that the length of the major and minor axes can be computed by taking a square root of the first and second eigenvalues and multiplying by a factor. This factor determines what percentage of the touch will be surrounded by the ellipse (a factor between 2 and 3 is typically used to surround 95% to 99% of the ellipse along X and Y dimensions).

The square root in the calculation results in an approximately linear relationship between the input to this algorithm and the output values, preserving the benefit of the linear behavior of the present invention sensor. Finally, the lengths of the major and minor axes can be multiplied together to estimate area.

As illustrated above, the math used to compute the force, position, and shape of a touch is not affected by the level of interpolation applied to the sensor.

Multiple Touches

When there are multiple touches, a watershed algorithm is used to segment the area of the sensor into separate regions, each region containing a single touch. Abstractly, the algorithms described above are performed separately on each region to compute statistics for each touch.

Touch Area Calculation

The area of a touch is just the number of force values greater than a certain threshold, t.

$$\text{Area} = \sum_{x=0}^{N} \sum_{y=0}^{N} \begin{cases} F_{(x,y)} > t \Rightarrow 1 \\ \text{else} \Rightarrow 0 \end{cases} \quad (20)$$

The area of a touch will be affected by the level of interpolation since the number of readings that are greater than a threshold will decrease as the level of interpolation increases. This primarily affects touches with a small area, for which not enough data points are available to reconstruct the touch area accurately. To ameliorate this, a calculation which that is herein termed "soft area" may be used, which uses a soft cutoff instead of a hard threshold for t. This provides a better estimate for area than the calculation above. In general, the area of a touch is not as important to user interface applications as force and position, thus the decrease in the accuracy of area calculations as a result of downsampling is acceptable to users.

Summary of Benefits

To summarize, the benefits of the present invention approach to pressure sensing can be viewed in two different ways:

For a sensor design that is starting out with a high resolution sensor, the present invention approach allows the sensor to be scanned with lower resolution electronics, while preserving the accuracy of the calculations of (X,Y) position, force, and shape. In this case, the cost, complexity, and power consumption of the system is reduced without sacrificing touch-tracking performance.

Another way to view the present invention approach is for a design that is starting with a low resolution sensor. In this case, the present invention approach allows the resolution of the sensor to be increased while keeping the resolution of the sensing electronics the same. Thus, the accuracy of the sensor is improved, without increasing the cost, complexity, and power consumption of the electronics.

Construction Details (3700)-(5800)

Force Sensing Materials

There is a variety of different materials that can be used to create a force sensing material (FSM). These include conductive rubber, conductive foam, conductive plastic (such as KAPTON®), and conductive ink. These materials are usually made by mixing conductive particles such as carbon particles with insulating particles such as a polymer. The conductive particles can include things such as metal particles (which include silver, gold, and nickel), and materials such as graphene, carbon nanotubes, silver nanowires, and organic conductors.

Transparent FSMs can be created as well by mixing a transparent conductive material into a transparent nonconductive carrier. Transparent conductive materials include indium tin oxide (ITO), transparent organic conductive particles, or a material that is too small to see, such as graphene, carbon nanotubes, silver nanowires, or metal nanoparticles (which include silver, gold, and nickel). Transparent non-conductive materials for making transparent FSMs include PET, Polyimide, Polycarbonate, or a transparent rubber such as silicone. Alternately, the transparent conductive materials can be deposited onto the surface of a transparent substrate such as a polymer, glass, or ultra-thin flexible glass.

What these materials have in common is a high bulk resistance (at a level between a conductor and insulator), a rough surface (at a microscopic scale), and some amount of flexibility. As a result, when the material contacts a conductor, the resistance at the interface will decrease as the force pushing the force sensing material against the conductor is increased.

Some of these materials may also experience a change in bulk resistance as force is applied as a result of conductive particles coming closer together. However, this effect is typically small compared to the change in surface resistance. For the purposes of this disclosure, the present invention will call all materials with the properties described above force sensing material (FSM), and the present invention shall call the layer which contains/carries the force sensing material a force sensing layer (FSL).

Force Sensing Element

Figure 37:
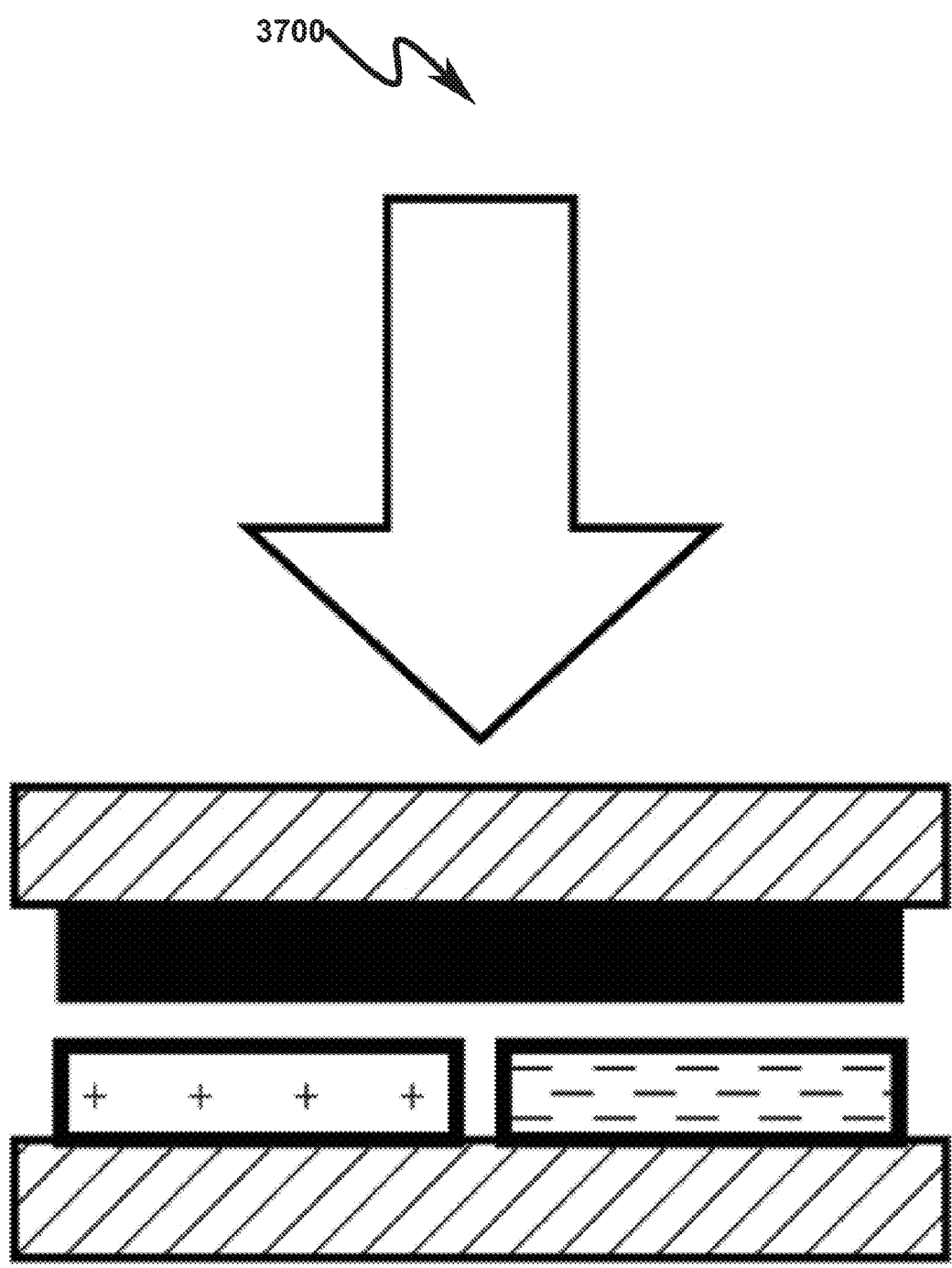
FIG. 37 illustrates an exemplary shunt-mode force sensor with substrate indicated in stripes, drive/sense electrodes indicated with +/−respectively, and FSM indicated in black.

Between each row/column electrode intersection is a force sensing element which creates a variable resistance. There are several different configurations possible for force sensing elements as depicted in FIG. 37 (3700)-FIG. 40 (4000). The two most common configurations are what the present invention call shunt-mode and thru-mode.

In the shunt-mode configuration, there are two substrates. The top substrate is coated with FSM, while the bottom substrate consists of two electrodes (FIG. 37 (3700)). As the two substrates are squeezed together, the FSM allows current to flow between the two electrodes, causing a variable drop in resistance. In essence, the FSM acts as a shunt between two electrodes. To increase sensitivity, the two electrodes can be patterned to form a set of inter-digitated conductive fingers.

Figure 38:
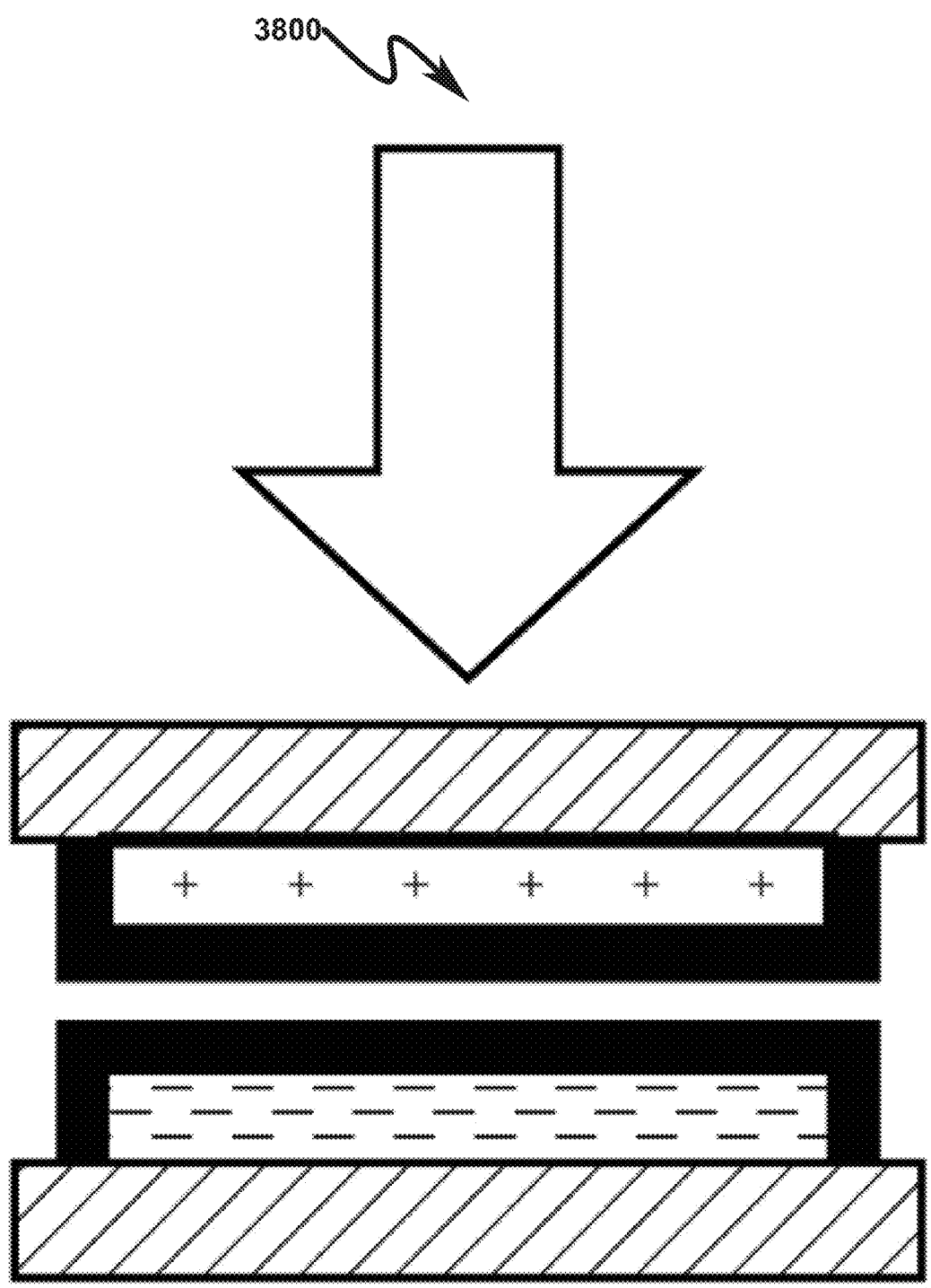
FIG. 38 illustrates an exemplary double-sided thru-mode force sensor with substrate indicated in stripes, drive/sense electrodes indicated with +/−respectively, and FSM indicated in black.

The second common configuration is called thru-mode, where the two electrodes are patterned onto two separate substrates, and the FSM is between them. There are three variants of this configuration. We call the first variant double-sided thru-mode. In this configuration the electrodes on the top and bottom substrate are coated with FSM (FIG. 38 (3800)). A force sensitive interface is formed between the two layers of FSM. Squeezing the two layers together causes a variable drop in resistance.

Figure 39:
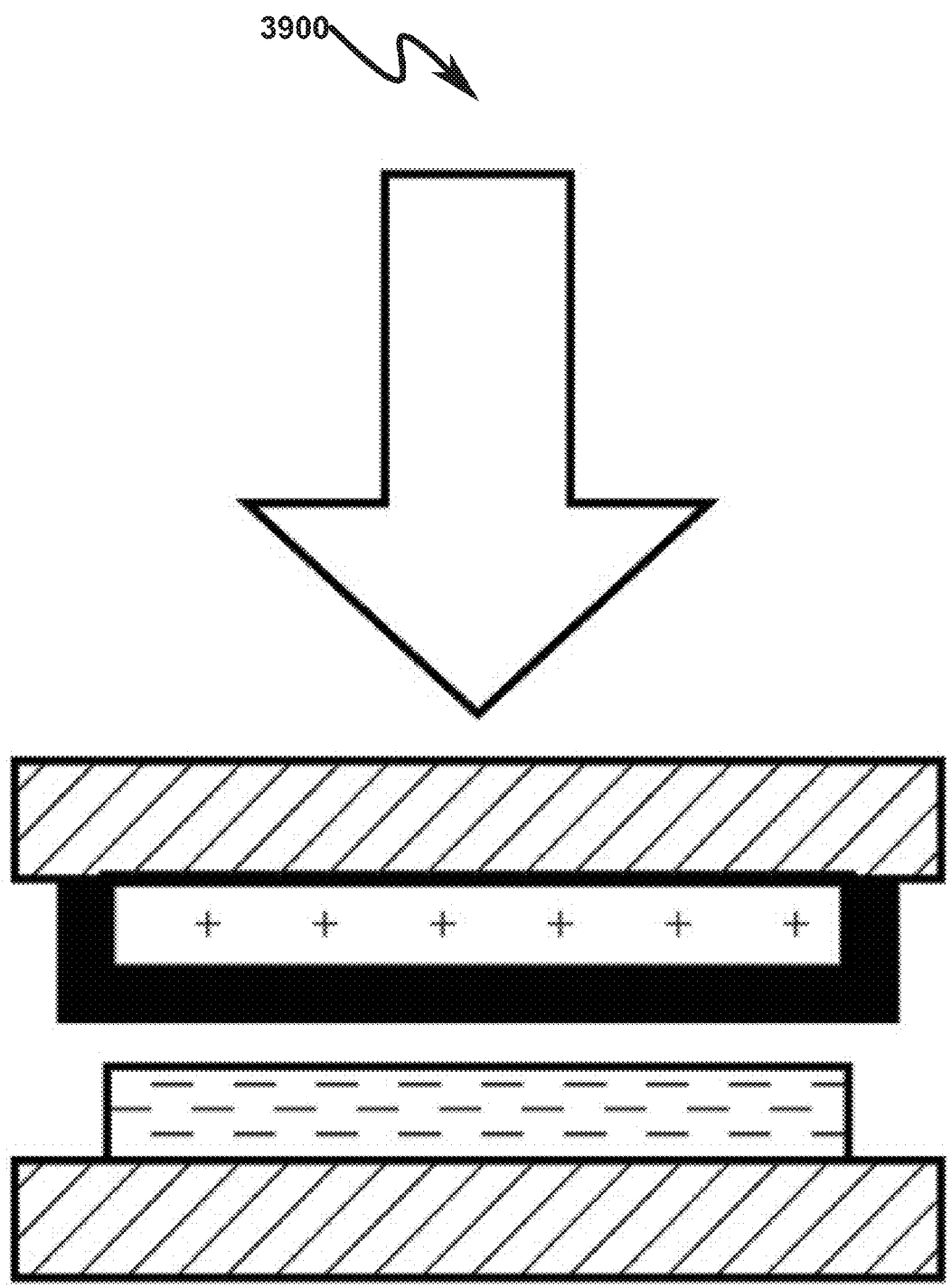
FIG. 39 illustrates an exemplary single-sided thru-mode force sensor with substrate indicated in stripes, drive/sense electrodes indicated with +/−respectively, and FSM indicated in black.

The single-sided thru-mode variant is similar to the double-sided thru-mode, except only one of the two electrodes is coated with FSM (FIG. 39 (3900)). Typically, it does not matter which of the two electrodes, the top or the bottom, is coated with FSM. The final variant is called the sandwich thru-mode. In this variant, the FSM is not deposited onto the electrodes.

Figure 40:
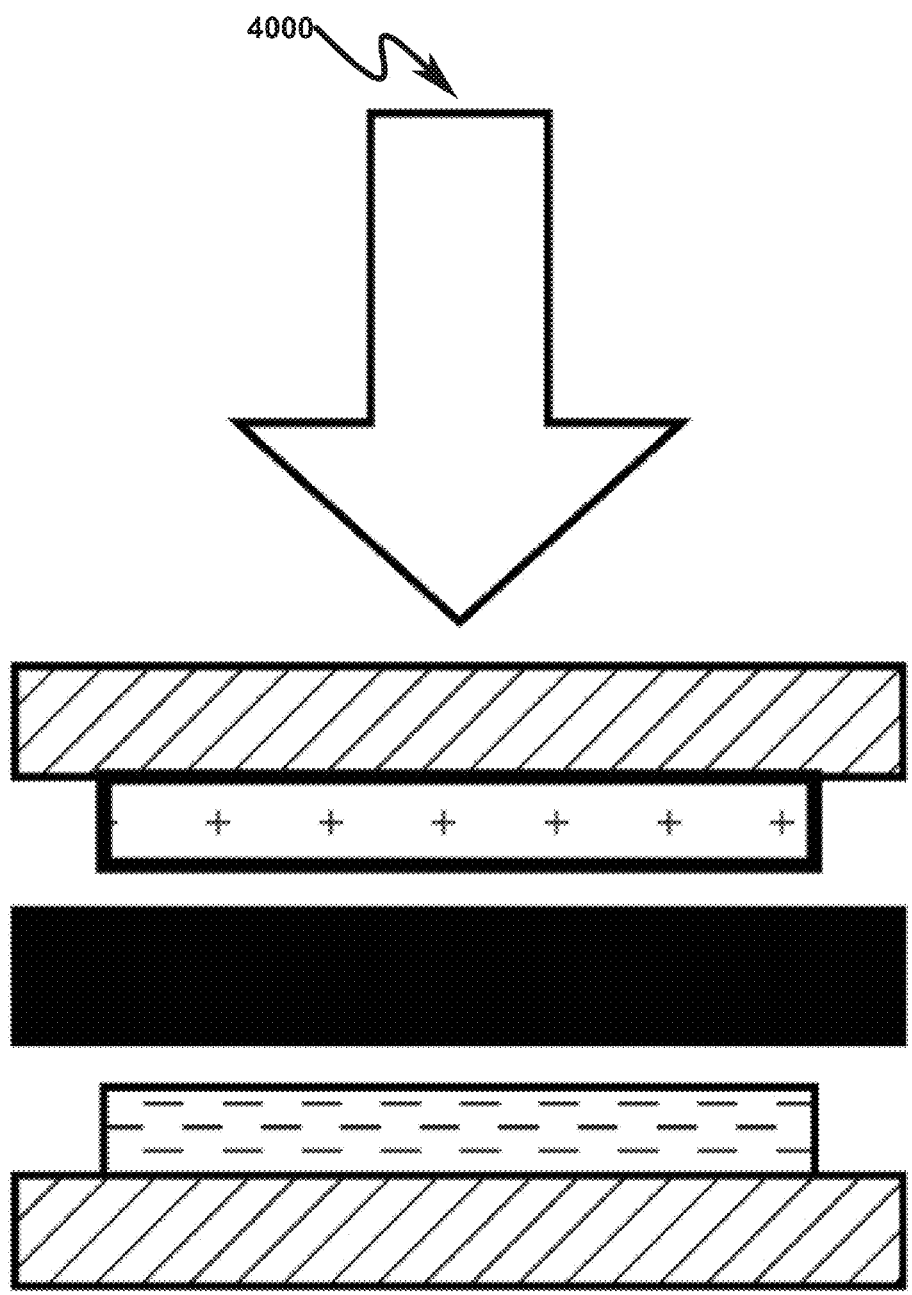
FIG. 40 illustrates an exemplary sandwich thru-mode force sensor with substrate indicated in stripes, drive/sense electrodes indicated with +/−respectively, and FSM indicated in black.

Instead, it forms a layer in between the two electrodes (FIG. 40 (4000)). Thus, there are two force sensing interfaces formed between the top electrode and the FSM, and between the bottom electrode and the FSM. However, from the perspective of the sensor circuitry, these two force sensing elements act the same as a single force sensing element.

Force Sensing Array Construction (3700)-(4000)

IFSA Sensors are generally constructed as a two-dimensional array of force sensing elements at the intersection of a set of column and row electrodes. Interpolating resistors are connected between each pair of adjacent column electrodes and each pair of adjacent row electrodes. The active column and row electrodes are then connected to the drive and sense circuitry (FIG. 33 (3300)).

The sensor elements can be built using a variety of different thru-mode or shunt-mode configurations (FIG. 37 (3700)-FIG. 40 (4000)). Because a sensor array has many sensor elements near to each other, it may be necessary to electrically isolate the sensor elements so that a signal generated at one element has a minimal effect on neighboring elements.

The differences between the possible sensor configurations are primarily in the shape of the electrodes, the way that the force sensing material is applied over or between the electrodes, and the way that the force sensing material is patterned to avoid/reduce interaction between nearby sensor elements. The choice of the sensor element design has an impact on the overall sensor construction and vice versa.

Thru-Mode Configurations (4100)-(4300)

Figure 41:
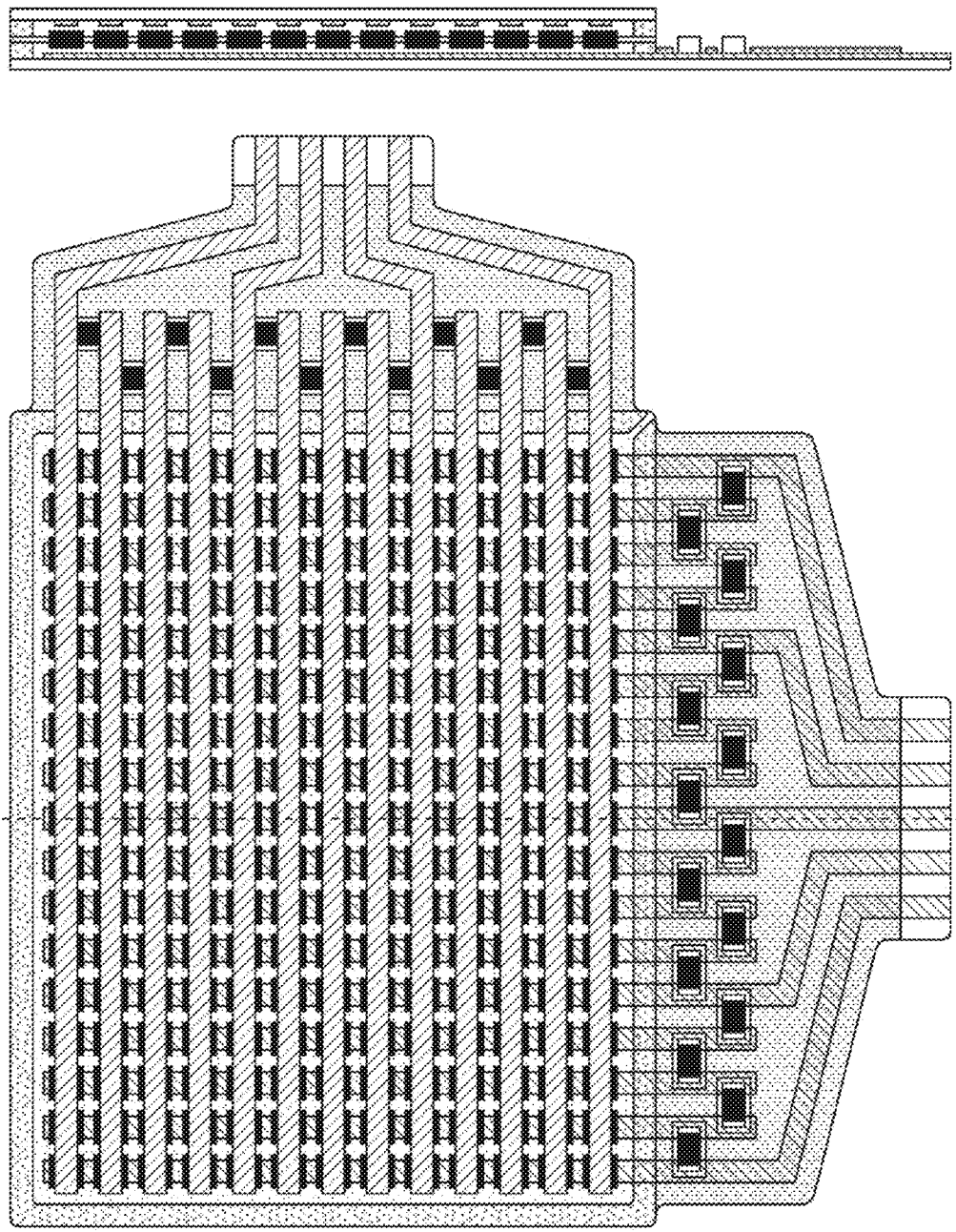
FIG. 41 illustrates cross-section and top-down views of a thru-mode sensor with segmented FSM (sandwich thru-mode configuration) wherein: with the top-down view, the substrate of the top layer and force sensing layer (indicated by a pattern of fine dots) are transparent to allow the viewing of the pattern of column electrodes, FSM, and the row electrodes inside; the dashed line indicates the location of the cross-section relative to the sensor, and the patches of force sensing material align to the intersections of the rows and columns, thus creating a force sensing element at the intersection of each row and column electrode.
Figure 42:
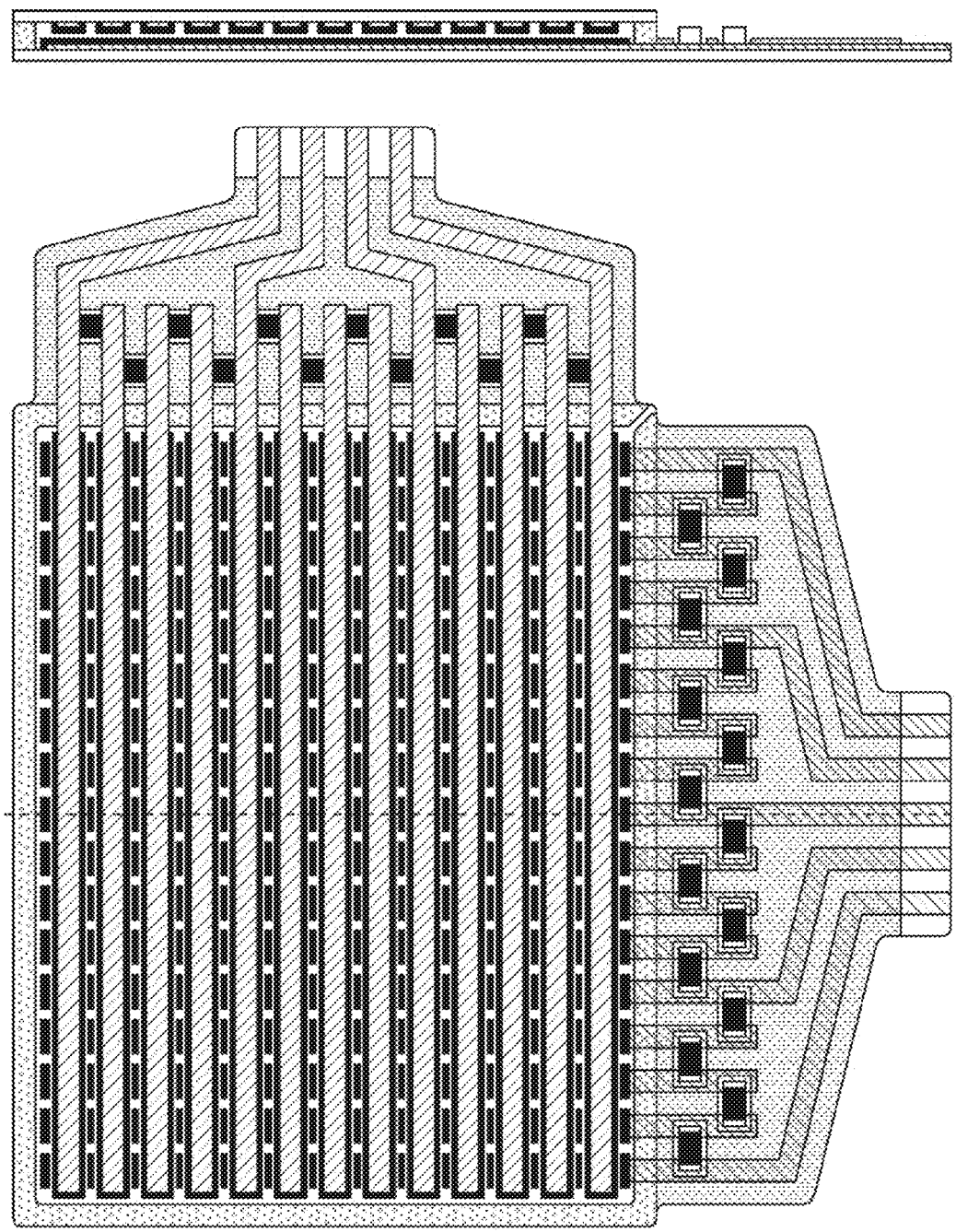
FIG. 42 illustrates cross-section and top-down views of a thru-mode sensor with FSM-coated electrodes wherein: with the top-down view, the substrate of the top layer is transparent to allow the viewing of the pattern of column electrodes, FSM, and the row electrodes inside; the dashed line indicates the location of the cross-section relative to the sensor; and either the rows, the columns, or both can be coated with FSM (creating a sensor with either a single-sided or double-sided thru-mode configuration)
Figure 43:
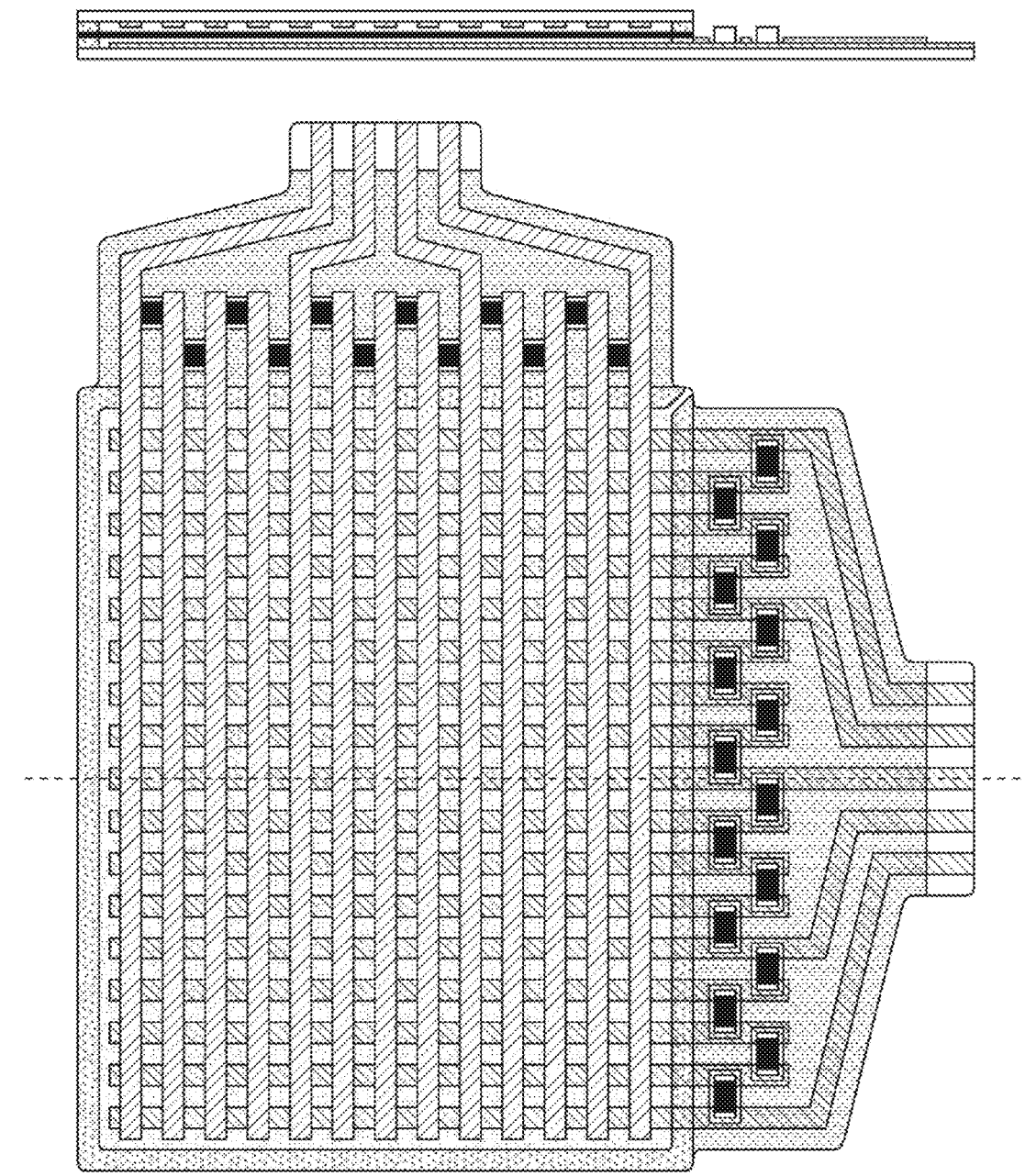
FIG. 43 illustrates cross-section and top-down views of a thru-mode sensor with thin FSM electrodes wherein: with the top-down view, the substrate of the top layer and the force sensing layer (indicated by a pattern of fine dots) are transparent to allow the viewing of the column electrodes and the row electrodes inside; the dashed line indicates the location of the cross-section relative to the sensor, and the thin FSM can also be replaced with a patterned FSM or a pseudo-random patterned FSM wherein all of these configurations are variants of the sandwich thru-mode configuration.
Figure 44:
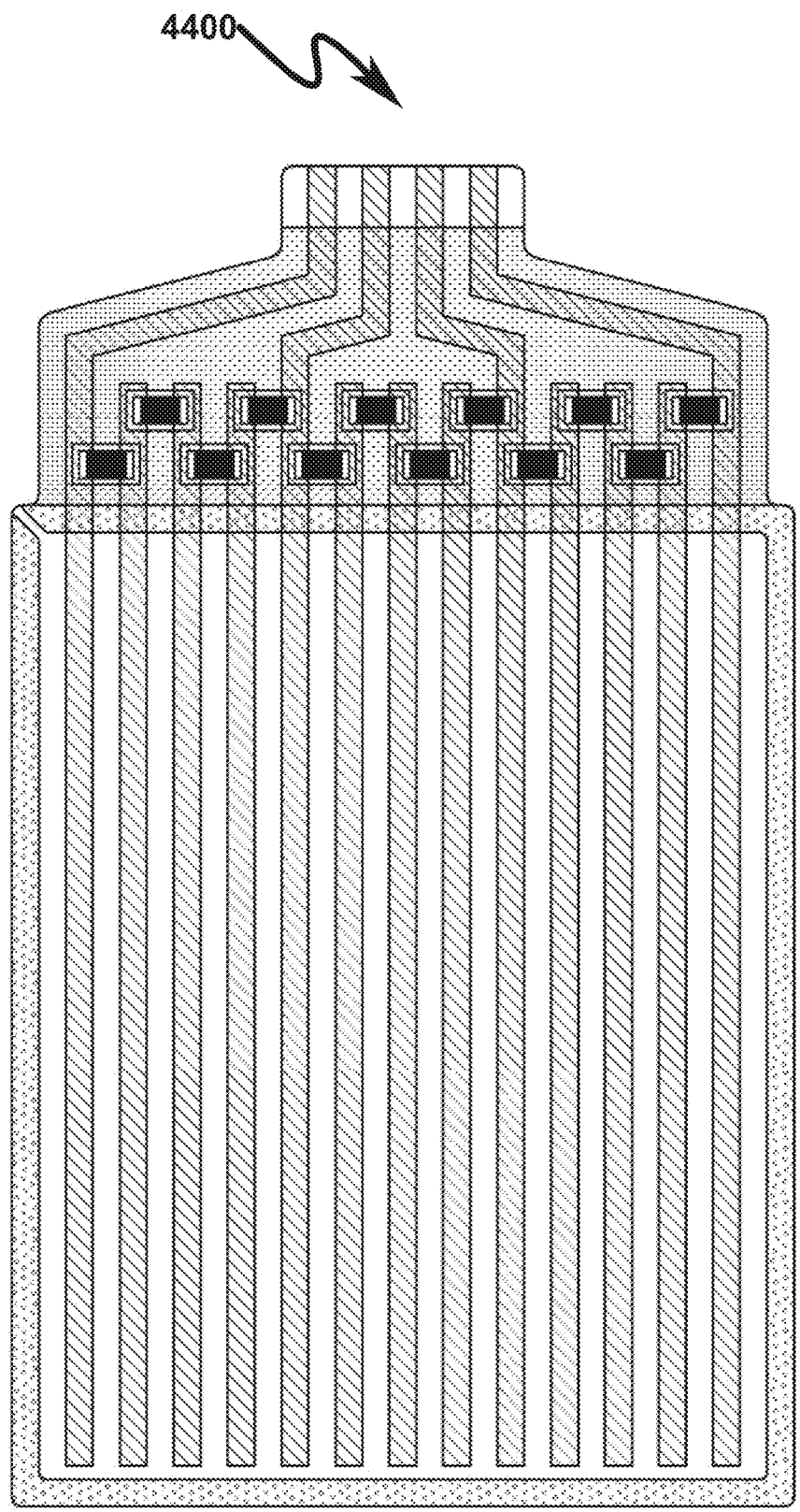
FIG. 44 illustrates detail of a thru-mode sensor top layer wherein the diagram is flipped relative to FIG. 41 (4100)-FIG. 43 (4300) to show the electrode pattern and how the interpolation resistors are mounted.
Figure 45:
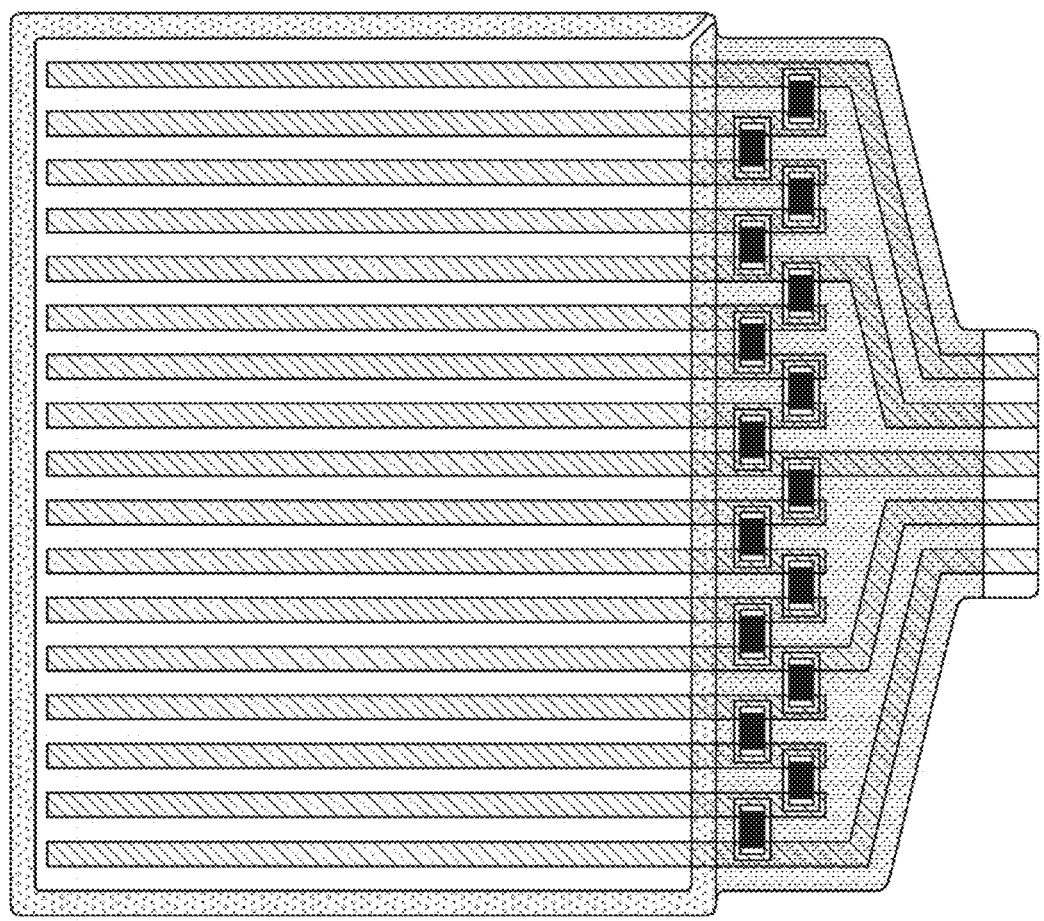
FIG. 45 illustrates detail of a thru-mode sensor bottom layer. The layer in this diagram is in the same orientation as in FIG. 41 (4100)-FIG. 43 (4300)

Some possible thru-mode configurations are depicted in FIG. 41 (4100)-FIG. 43 (4300)). The array in FIG. 41 (4100) is built with the sandwich thru-mode configuration, where the force sensing layer is sandwiched between two substrates which carry the row and column electrodes which face inwards towards the force sensing layer. A force sensing element is formed at each intersection of row and column electrodes. In these figures, the force sensing material is segmented so that each force sensing element has its own electrically isolated patch of force sensing material. FIG. 43 (4300) depicts an alternate arrangement where a very thin layer of contiguous force sensing material is sandwiched between the row and column electrodes. Alternatively, a material with a pattern (FIG. 48 (4800)) or pseudo-random pattern (FIG. 49 (4900)) of force sensing material can be sandwiched between the row and column electrodes depicted in FIG. 43 (4300). The array in FIG. 42 (4200) is built with the doubled-sided thru-mode configuration, where each row and column electrode is coated with force sensing material. One possible variation of this (which is not shown) is to coat only the top electrodes or only the bottom electrodes with force sensing material.

Shunt-Mode Configurations (5000)-(5700)

Figure 50:
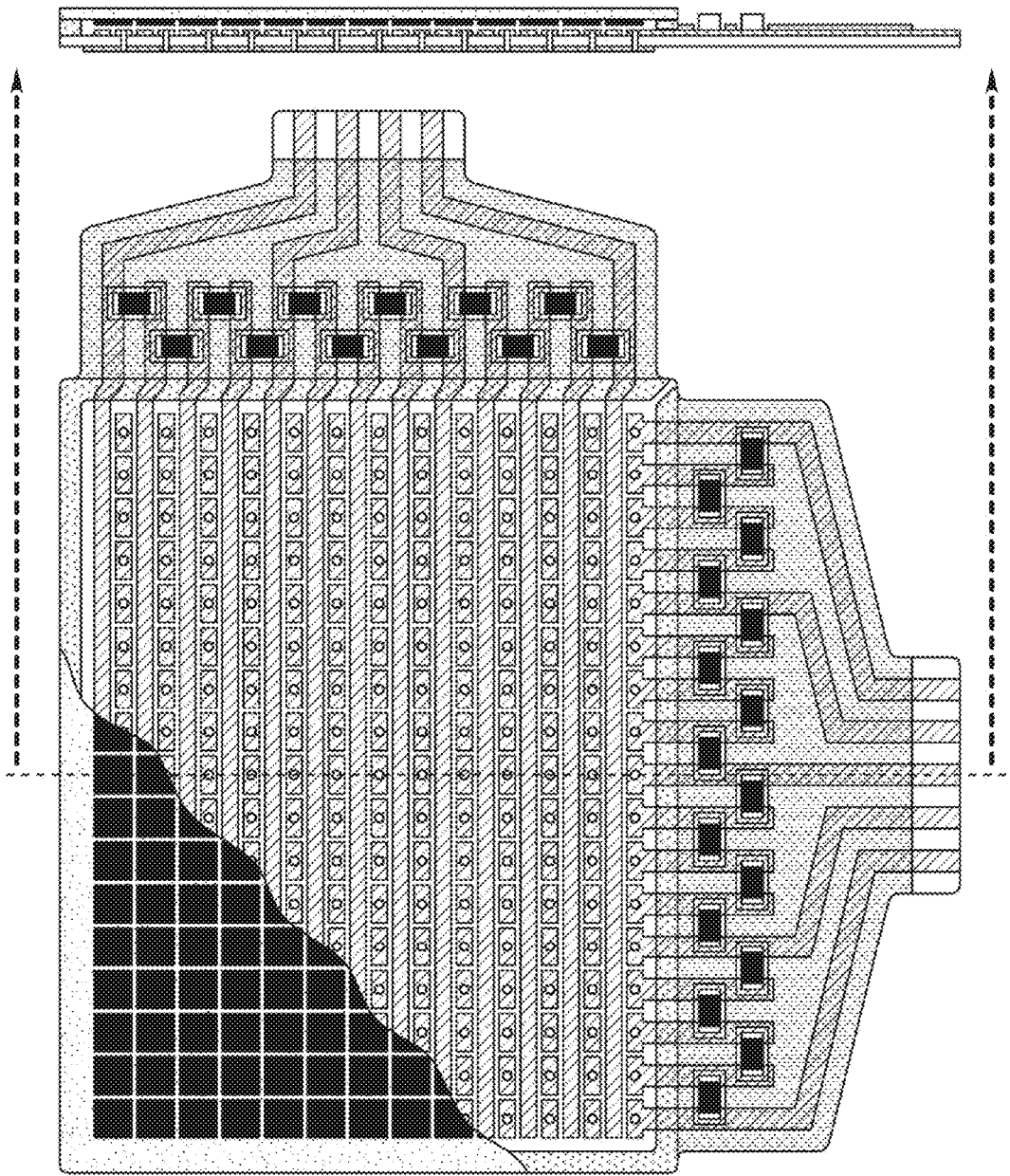
FIG. 50 illustrates a cross-section and top-down view of a shunt-mode interpolating array sensor which consists of a top patterned FSM and a bottom layer which carries interpolating resistors and both row and column electrodes. In the top-down view, the patterned FSM layer is cut away to reveal the exposed row and column electrodes which lie below the FSM, forming shunt-mode sensor elements. The dashed line indicates the location of the cross-section relative to the sensor. Traces on the reverse side of the bottom layer (not visible in the top-down view) interconnect the exposed row electrodes using vias (represented by circles). The traces on the reverse side of the bottom layer are shown in more detail in FIG. 52 (5200)
Figure 57:
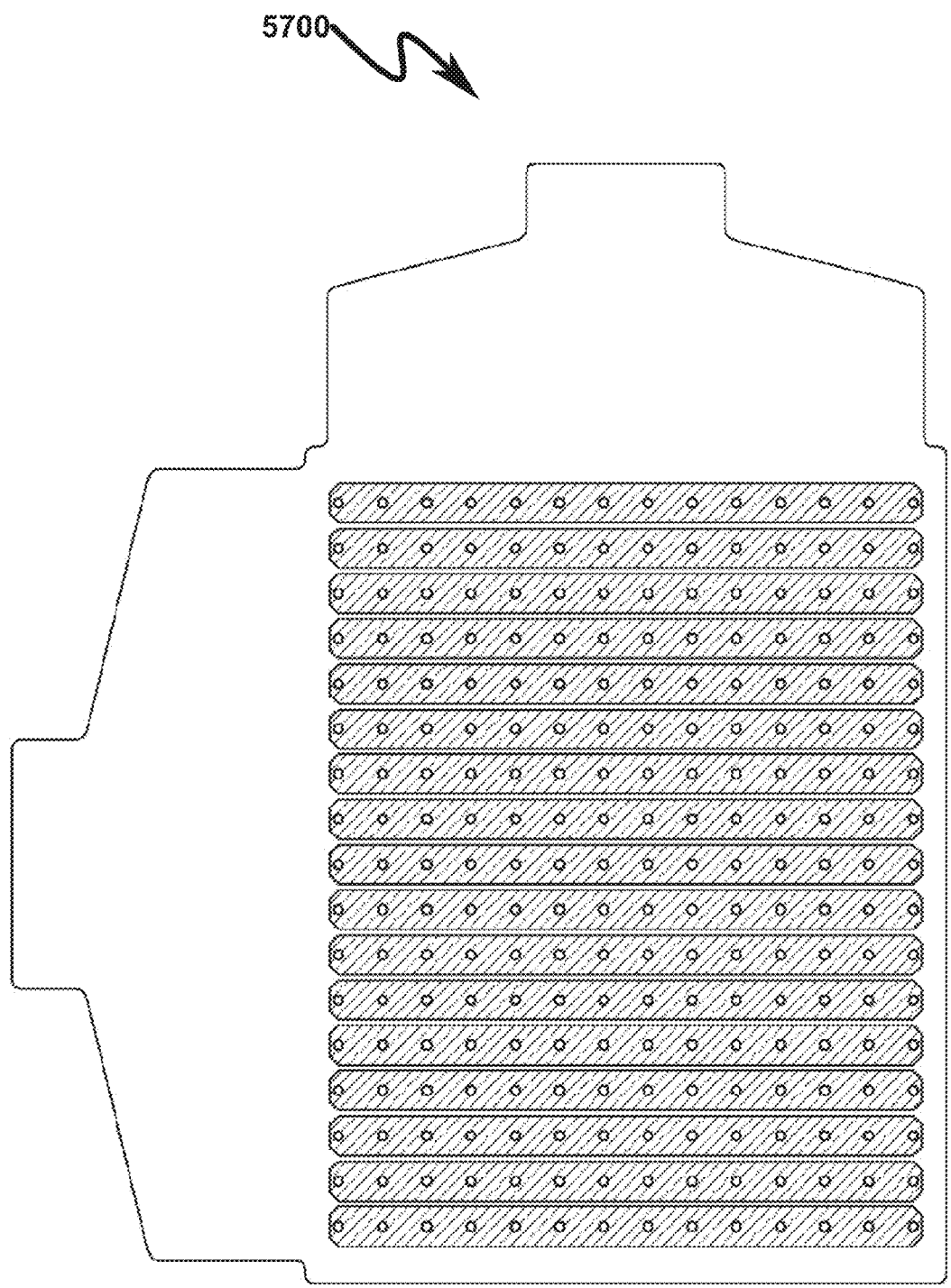
FIG. 57 illustrates a detail of the reverse side of the bottom layer for sensor shown in FIG. 56 (5600). The areas with a striped pattern are conductors which interconnect the row electrodes. Vias, which are represented by circles, connect to the row electrodes on the opposite side.

Some possible shunt-mode configurations are depicted in FIG. 50 (5000)-FIG. 57 (5700). All of these configurations consist of a double-sided circuit board with exposed electrodes on the top side and a force sensing layer that is placed on top of the exposed electrodes. In the shunt mode-configuration, the column and row electrodes cannot both completely reside in the same layer because they would intersect and electrically short with each other. To address this issue, in these examples, the row electrodes are interconnected with horizontal traces on the back of the PCB. The traces on the back can be seen in FIG. 52 (5200), FIG. 55 (5500), and FIG. 57 (5700). Vias are used to connect between the resulting "pads" on the front of the PCB to the traces on the back. This collocates a portion of each row electrode with each column electrode on the front surface, creating the two electrical terminals of the shunt-mode force sensing element. As a result, an array of sensor elements is formed by the pattern of electrodes on the upper surface of the circuit board and the layer of force sensitive material that comes down on top of the pattern. A variety of force sensing materials and patterns of FSM may be used to create the force sensing layer as described later. Also, the electrode patterns themselves can be varied as shown in FIG. 50 (5000)-FIG. 57 (5700).

Figure 51:
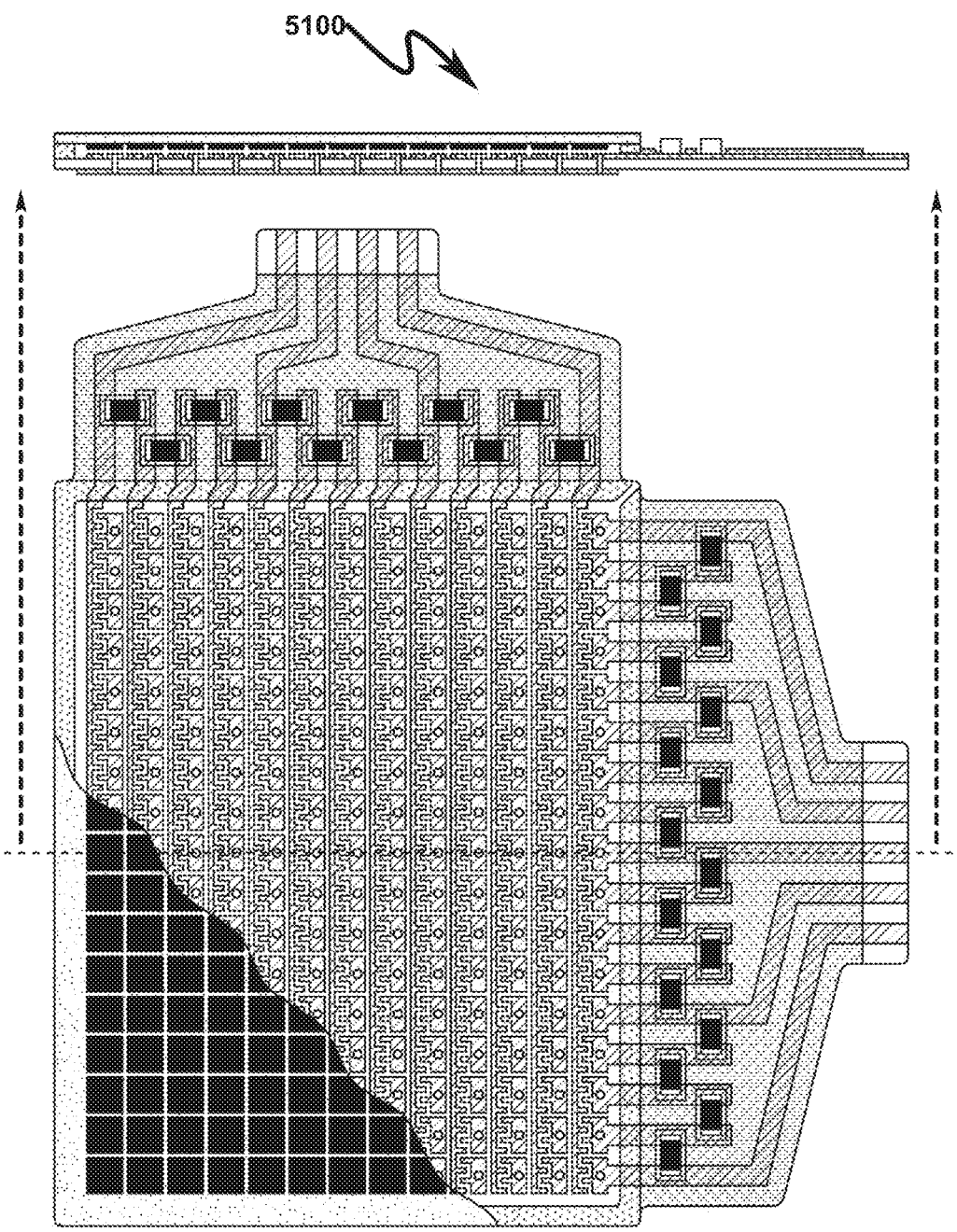
FIG. 51 illustrates a cross-section and top-down view of a shunt-mode sensor with force sensor element electrodes patterned in an inter-digitated finger pattern, which is intended to improve sensitivity. Other elements in this design are similar to those described in FIG. 50 (5000)
Figure 52:
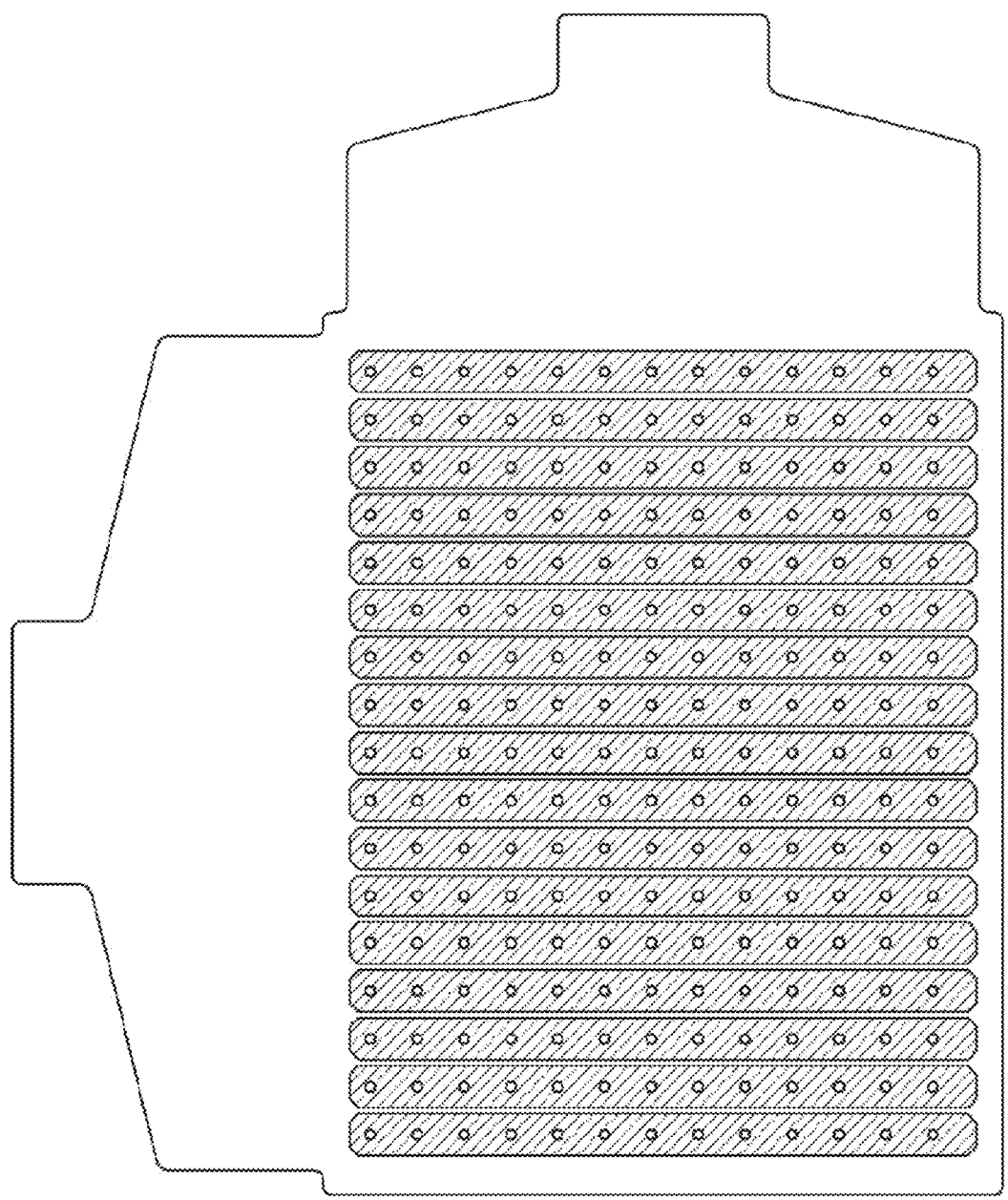
FIG. 52 illustrates a detail of the reverse side of the bottom layer for sensors shown in FIG. 50 (5000)-FIG. 51 (5100). The areas with a striped pattern are conductors which interconnect the row electrodes. Vias, which are represented by circles, connect to the row electrodes on the opposite side.
Figure 53:
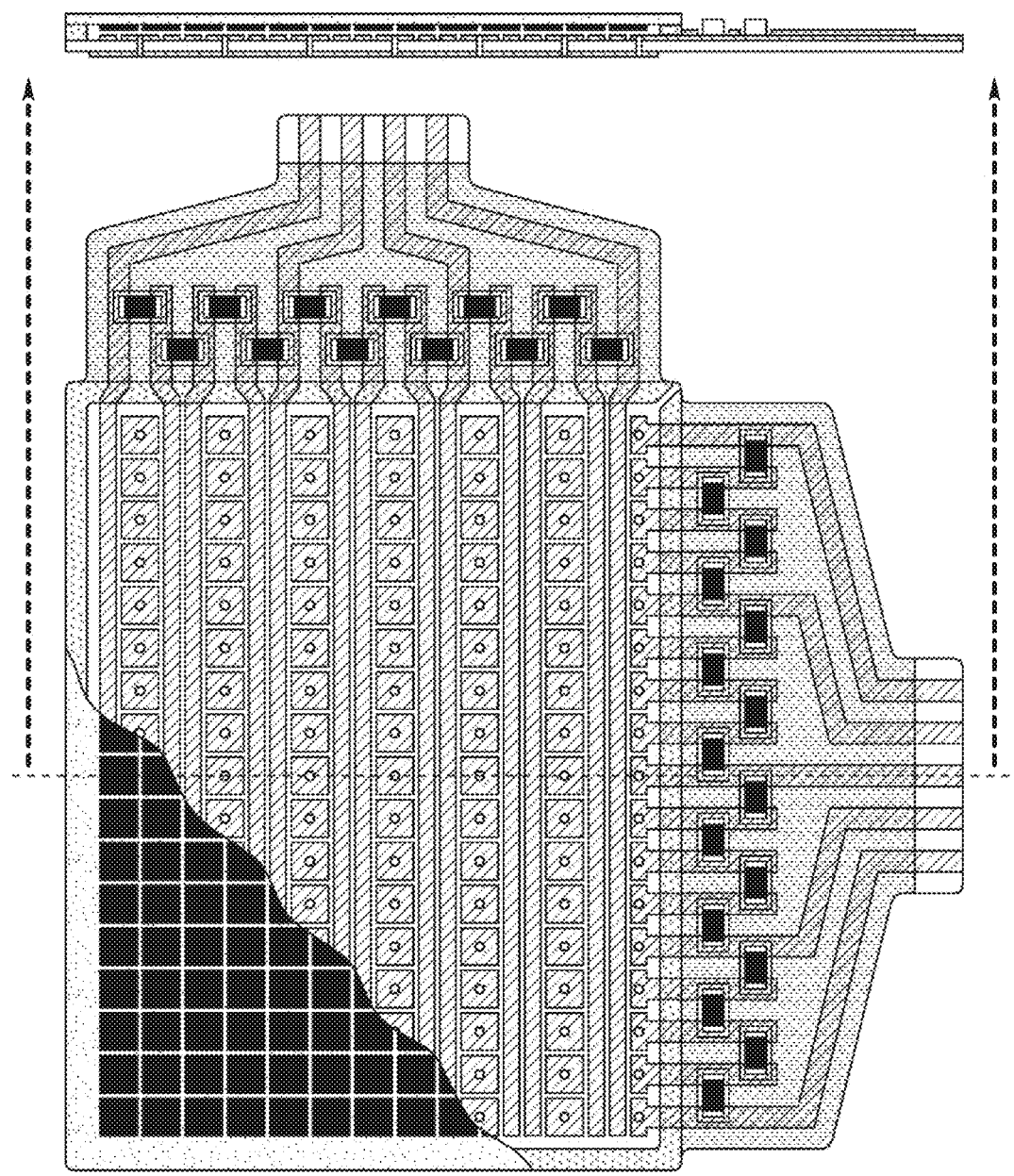
FIG. 53 illustrates a cross-section and top-down view of a shunt-mode sensor with double-width row electrode pad, which halves the number of vias necessary by sharing vias between adjacent sensor elements, and also increases the space around each via which may aid manufacturing. Other elements in this design are similar to those described in FIG. 50 (5000). The traces on the reverse side of the bottom layer are shown in more detail in FIG. 55 (5500)
Figure 54:
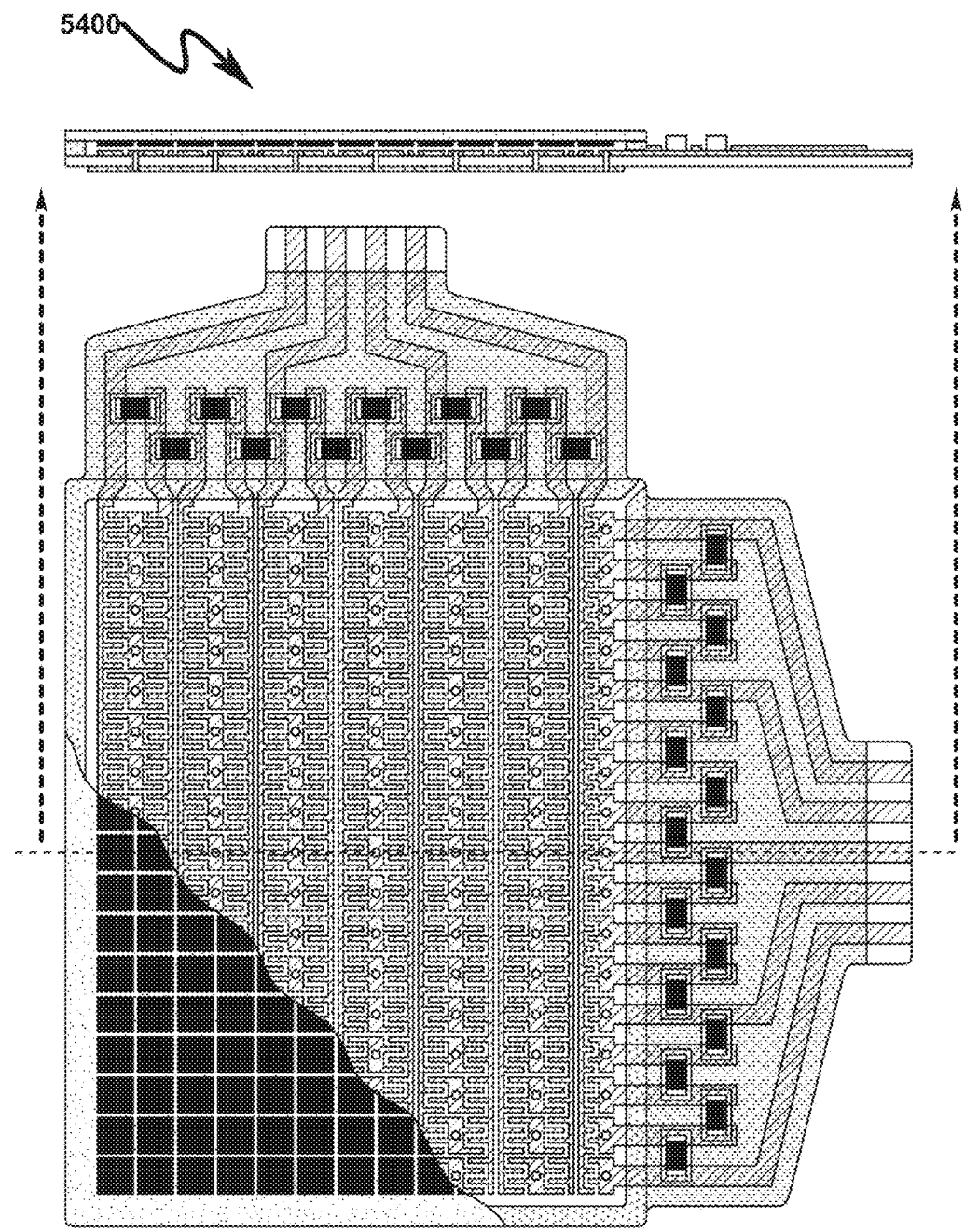
FIG. 54 illustrates a cross-section and top-down view of a shunt-mode sensor with double-width row electrode pads and inter-digitated finger row electrode pattern. This design has the same manufacturing advantage as the previous design and the inter-digitating finger pattern, similar to that shown in FIG. 51 (5100), and is intended to improve sensitivity. Other elements in this design are similar to those described in FIG. 51 (5100). The traces on the reverse side of the bottom layer are shown in more detail in FIG. 55 (5500)
Figure 55:
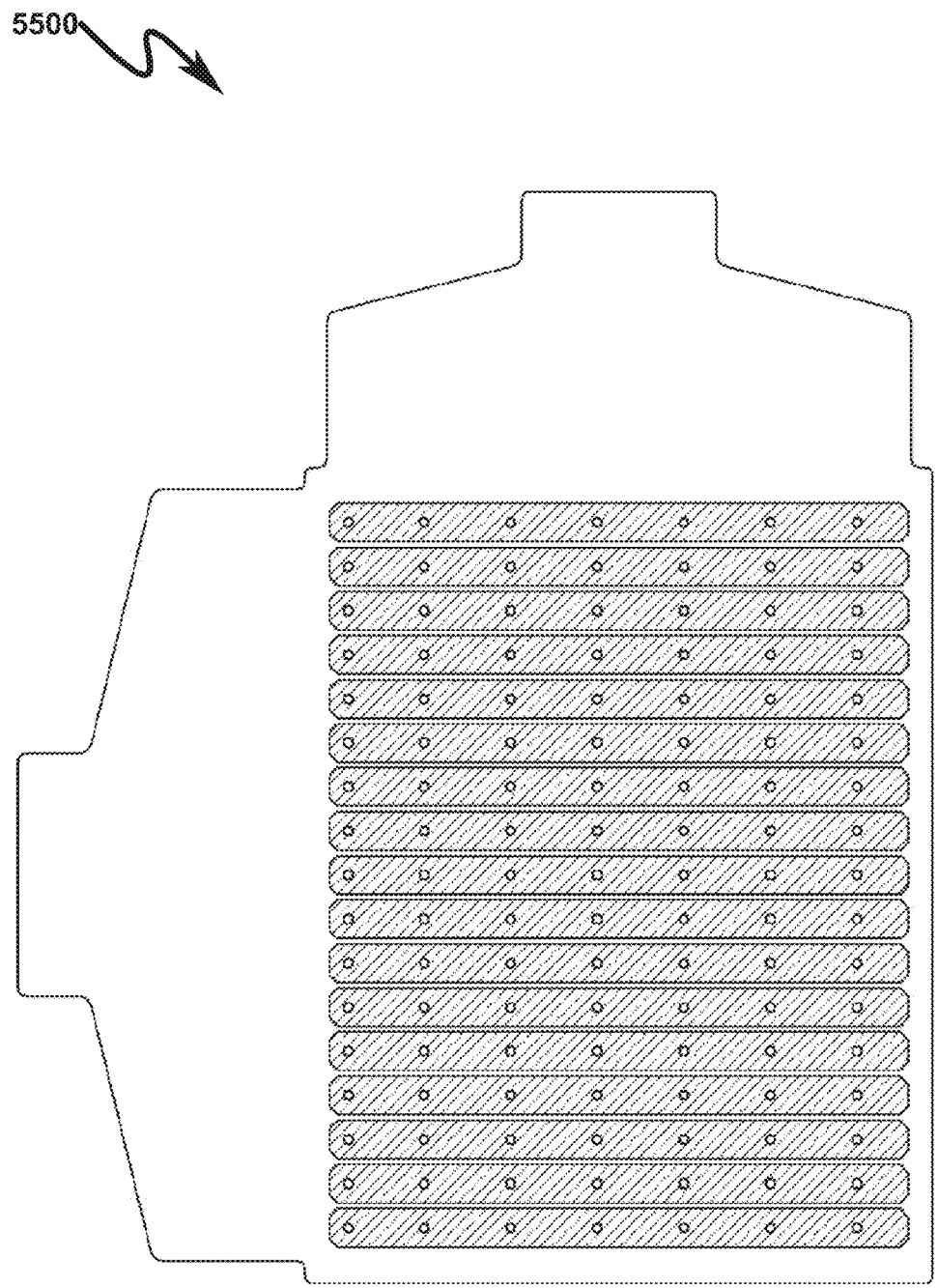
FIG. 55 illustrates a detail of the reverse side of the bottom layer for sensors shown in FIG. 53 (5300)-FIG. 54 (5400). The areas with a striped pattern are conductors which interconnect the row electrodes. Vias, which are represented by circles, connect to the row electrodes on the opposite side.
Figure 56:
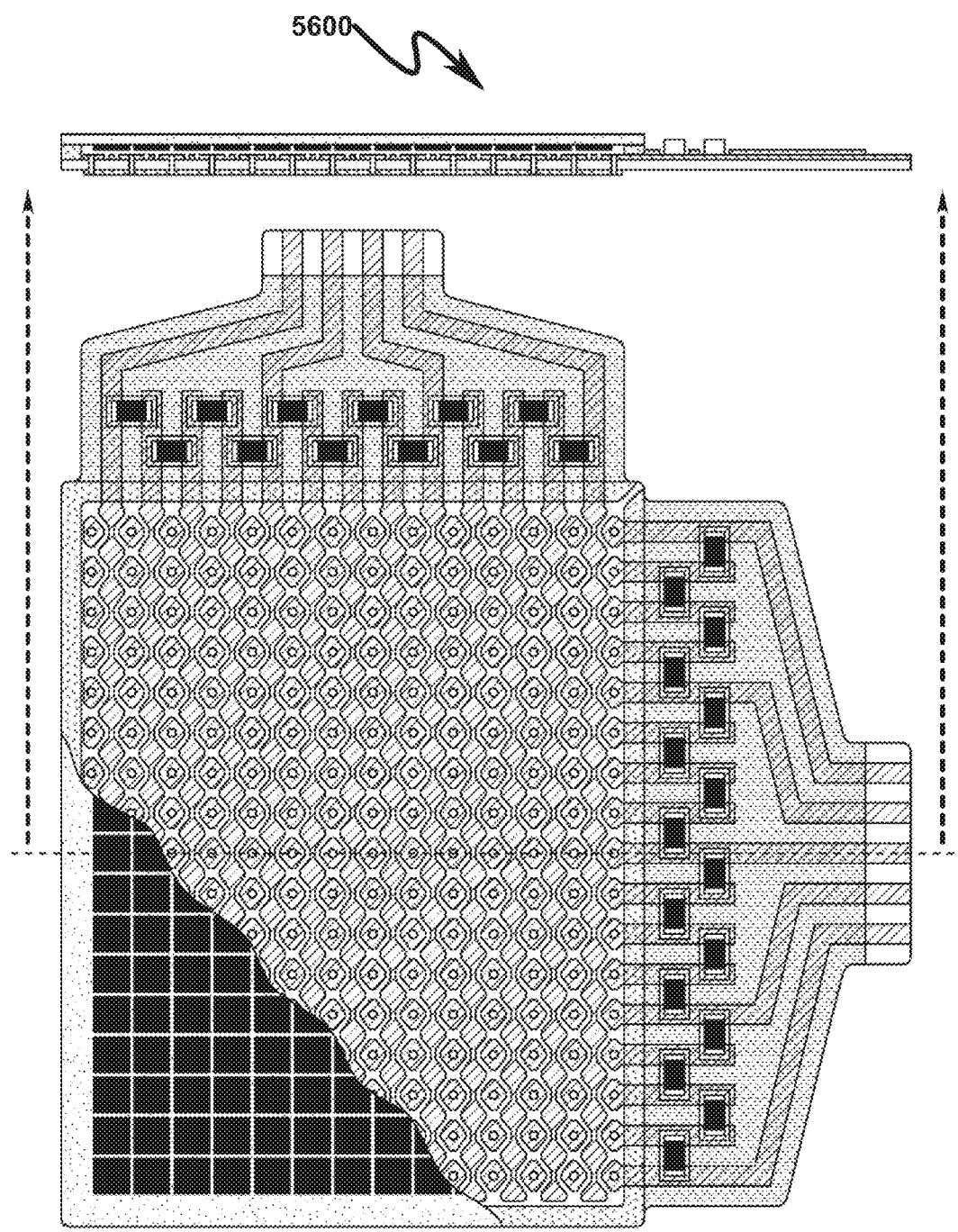
FIG. 56 illustrates a cross-section and top-down view of shunt-mode sensor with diamond-shaped row and column electrode pattern. This pattern is intended to make the sensitivity distribution around each row/column intersection more symmetric. It may also improve manufacturability by reducing the precision needed when creating vias. Other elements in this design are similar to those described in FIG. 50 (5000). The traces on the reverse side of the bottom layer are shown in more detail in FIG. 57 (5700)

FIG. 50 (5000) illustrates a simple pattern where each sensing element consists of two rectangular areas of exposed conductor (the force sensing layer is cut away to show the conductor pattern and the alignment of the patches of force sensing material to the pattern). FIG. 51 (5100) is a variant of this, where inter-digitating fingers are added to the two rectangular areas to increase sensitivity of each force sensing element. FIG. 52 (5200) depicts the pattern of row conductors on the back side of these two designs. FIG. 53 (5300) illustrates a variant of FIG. 50 (5000) where every other sensor element is flipped horizontally. This has the effect of halving the number of vias necessary to create the circuit and increasing the space between vias, which reduces manufacturing cost and can help to increase sensor density. FIG. 54 (5400) depicts a design which combines the inter-digitating fingers of the design in FIG. 51 (5100) and the flipped columns of the design in FIG. 53 (5300). FIG. 55 (5500) depicts the back-side of these two designs. FIG. 56 (5600) depicts a variation of the design in FIG. 50 (5000) where the area around each via is widened into to a diamond-shape. This design may reduce manufacturing cost and increase sensor density by widening the conductor area around each via. It may also help make the sensor more accurate/linear with respect to touch position. FIG. 57 (5700) depicts the back-side of this design.

Force Sensing Layer (FSL) Design

The force sensing layer (FSL) is composed of, or carries, the force sensing material. There are a variety of possible designs for this layer for both thru-mode and shunt-mode configurations. The main difference between these designs is the way in which they provide electrical isolation between adjacent sensor elements. With each of the designs, there are tradeoffs in terms of difficulty/cost of manufacture, difficulty of alignment/assembly with the other sensor layers, and level of electrical isolation between adjacent elements.

Figure 46:
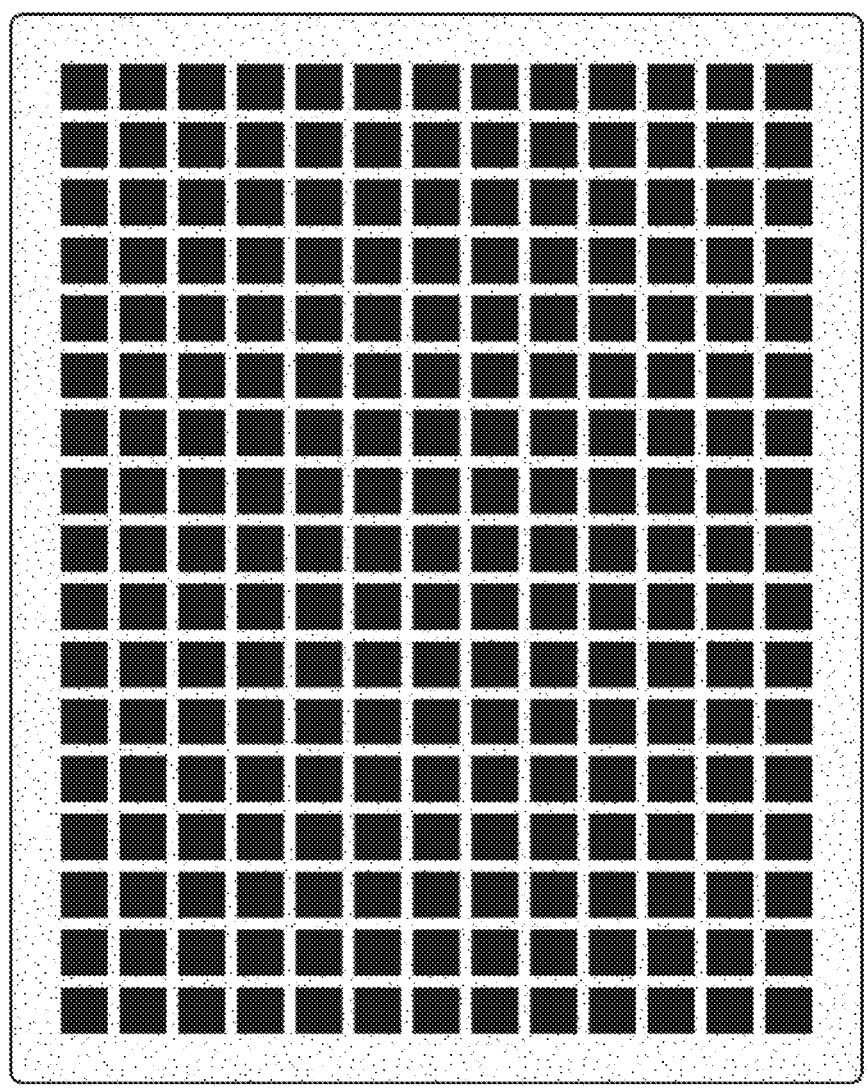
FIG. 46 illustrates detail of a segmented FSM layer wherein the segments of FSM material are shown in black and the substrate holding the FSM material in place is white with a pattern of fine dots and each segment aligns with a single sensor element (at the intersection of a row and column electrode), ensuring that there is no cross-talk between sensor elements. This is the same FSM layer as shown in FIG. 41 (4100) that depicts the FSM layer being used in a thru-mode sensor configuration. This type of FSM configuration can also be used as the force sensing layer in any shunt-mode sensor configuration.

One way to electrically isolate force sensing elements is to create a segmented force sensing layer (FIG. 46 (4600)). In this arrangement, there is a single patch of FSM that aligns to each sensing element. The gap between the patches avoids electrical interconnection. This approach offers the best isolation, but requires accurate alignment between sensor layers. Another way to electrically isolate sensor elements is to use a patterned force sensing layer which has a fine pattern of FSM patches (FIG. 48 (4800)). This pattern is at a smaller scale than the force sensing elements themselves. Thus, multiple patches of FSM will contribute to the sensitivity of each sensor element. This configuration removes the need to have accurate alignment between the FSL and the force sensing elements of the sensor. In this configuration, isolation is not perfect, as some of the FSM patches may form electrical connections to neighboring sensor elements, but is good enough to prevent significant cross-talk between neighboring sensor elements.

Figure 49:
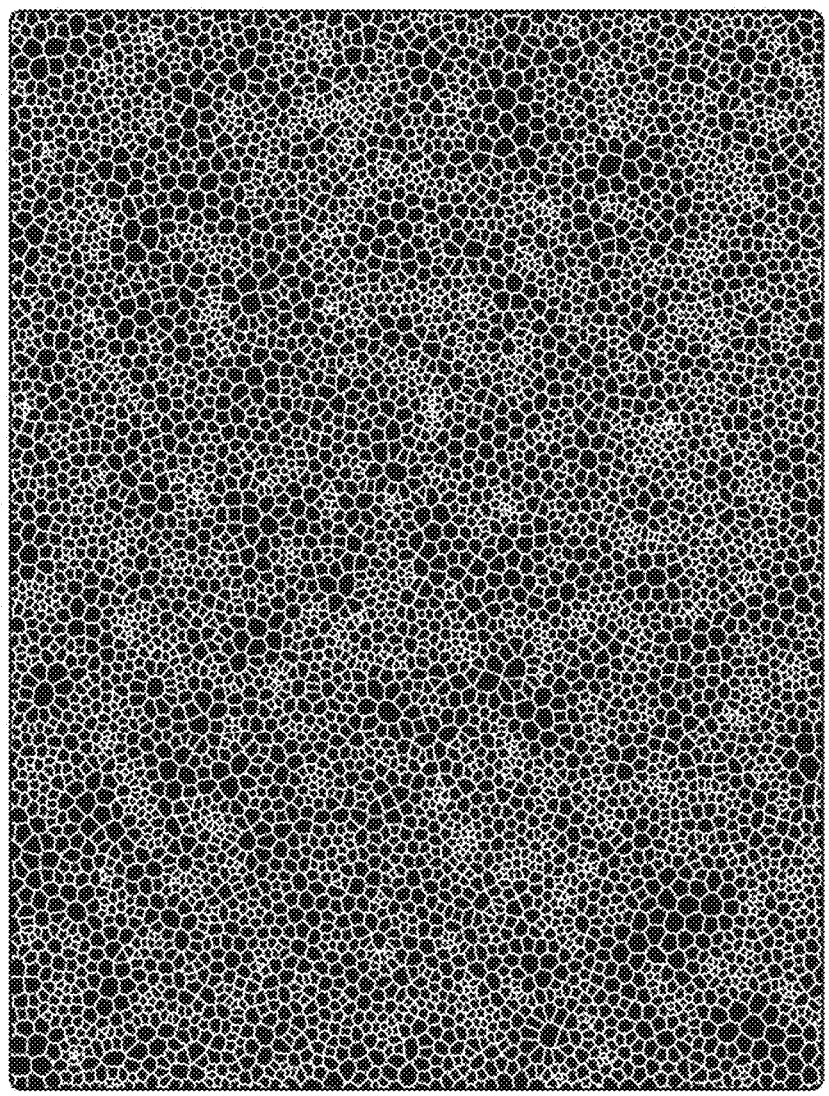
FIG. 49 illustrates detail of a pseudo-random patterned FSM layer wherein the patches of FSM material are shown in black and the substrate holding the FSM material in place is shown in white. This is similar to the patterned FSM, but a random or pseudo-random pattern is used, which may be easier to manufacture than the patterned FSM layer. This can be used instead of the thin FSM layer shown in FIG. 48 (4800) in a thru-mode sensor configuration. This type of FSM configuration can also be used as the force sensing layer in any shunt-mode sensor configuration.

Another similar configuration uses a pseudo-random pattern of FSM patches (FIG. 49 (4900)) which have a smaller scale than the sensor elements. This pattern introduces some randomness into the patterned FSM approach which may help to improve sensor consistency. There is another way to create an array of force sensing elements without needing to pattern the force sensing layer. This approach employs a very thin layer of FSM. Because the layer is very thin, it has a high resistance in the plane of the material, compared to the resistance in the direction perpendicular to the layer. Thus, although the FSM allows current paths between sensor elements, the resistance between them is so high that the effect of this current is negligible. Because the FSM is not patterned, it does not need to be aligned to the other sensor layers.

Another method of isolating sensor elements is to coat the row and/or column electrodes with force sensing material. FIG. 42 (4200) depicts what this looks like when applied to a thru-mode sensor. Note that this design does not need a layer in between row and column electrodes. The coating of force sensing material may be segmented, patterned, or patterned with a pseudo-random pattern. Alternatively, a very thin layer of force sensing material, which has negligible in-plane resistance, can be deposited over the entire pattern of conductors. For shunt-mode sensors, a similar approach would be to coat the electrodes on the upper layer of the PCB with FSM. In this case, the top layer can employ one of the FSM patterns described above, or it may just use a patterned conductive layer, since force sensitivity would be provided by the bottom layer.

Finally, it is possible to create a sensor where the electrodes themselves have force-sensing characteristics. For instance, an electrode patterned from carbon nanotubes may conduct very well, but may have a rough surface structure which results in an analog pressure response.

Interchangeability of Row and Columns

From an electrical perspective, either the row or column electrodes can be used as the drive side, with the other side acting as the sense side. Similarly, from the perspective of sensor construction, row and column electrodes may be swapped. Thus, in thru-mode configurations, the rows can be on the top layer and the columns can be on the bottom layer and similarly, in the shunt-mode configuration, the columns can be routed through the back-side and the rows can be patterned onto the front-side of the circuit board. Although these choices may have some effect on sensor performance, they would typically be based on factors such as ease of sensor layout, mechanical considerations, and electrical interactions with external components. For example, it may be advantageous to place the drive side closer and the sense side farther from sources of electrical noise, such as a display.

Non-Rectangular Sensor Arrays (5800)-(6000)

Figure 58:
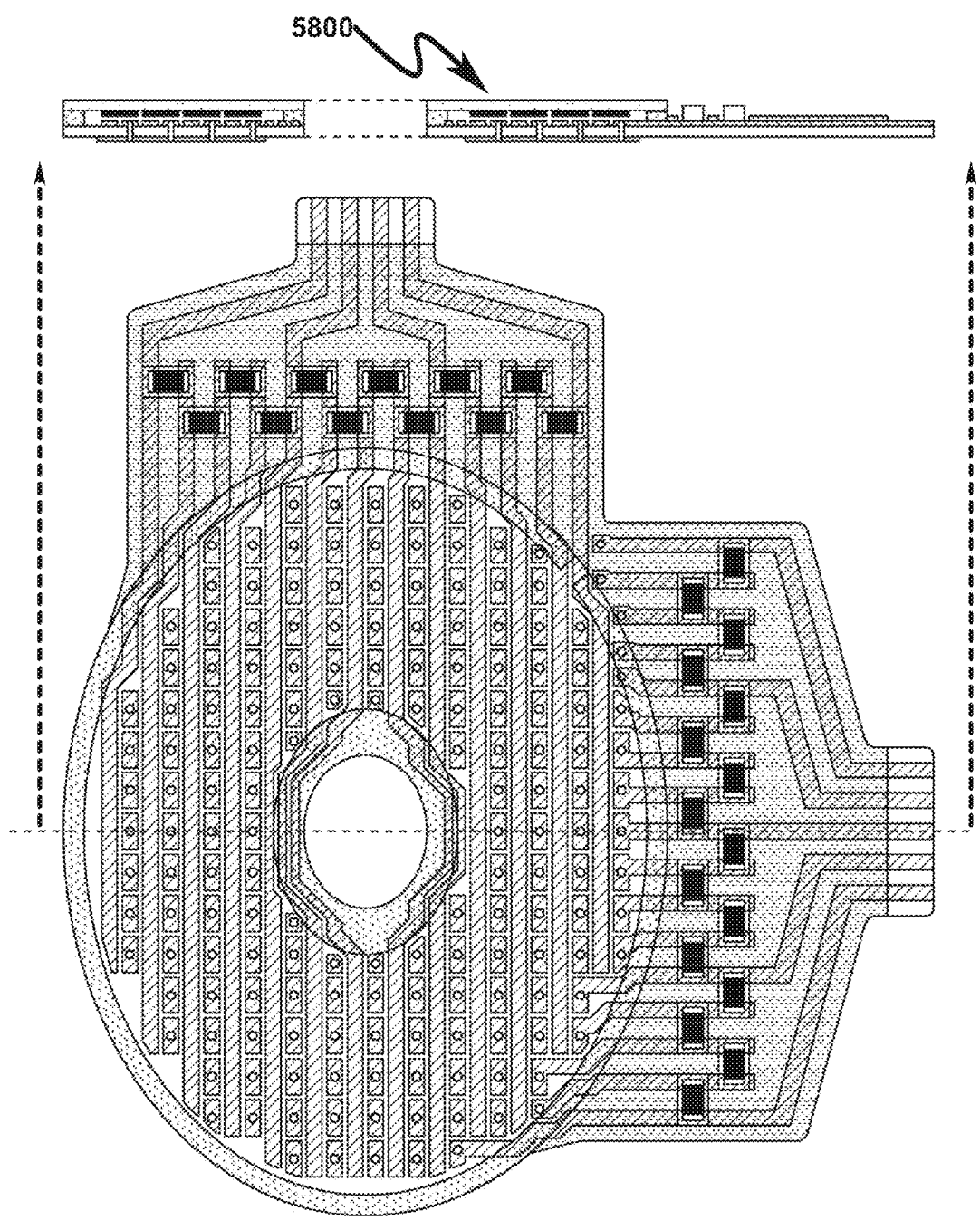
FIG. 58 illustrates a cross-section and top-down view of a shunt-mode oval sensor with a hole in the center. The FSM layer is removed to expose the row and column electrode pattern. Circles represent vias that interconnect with the bottom conductor pattern shown in FIG. 60 (6000)
Figure 59:
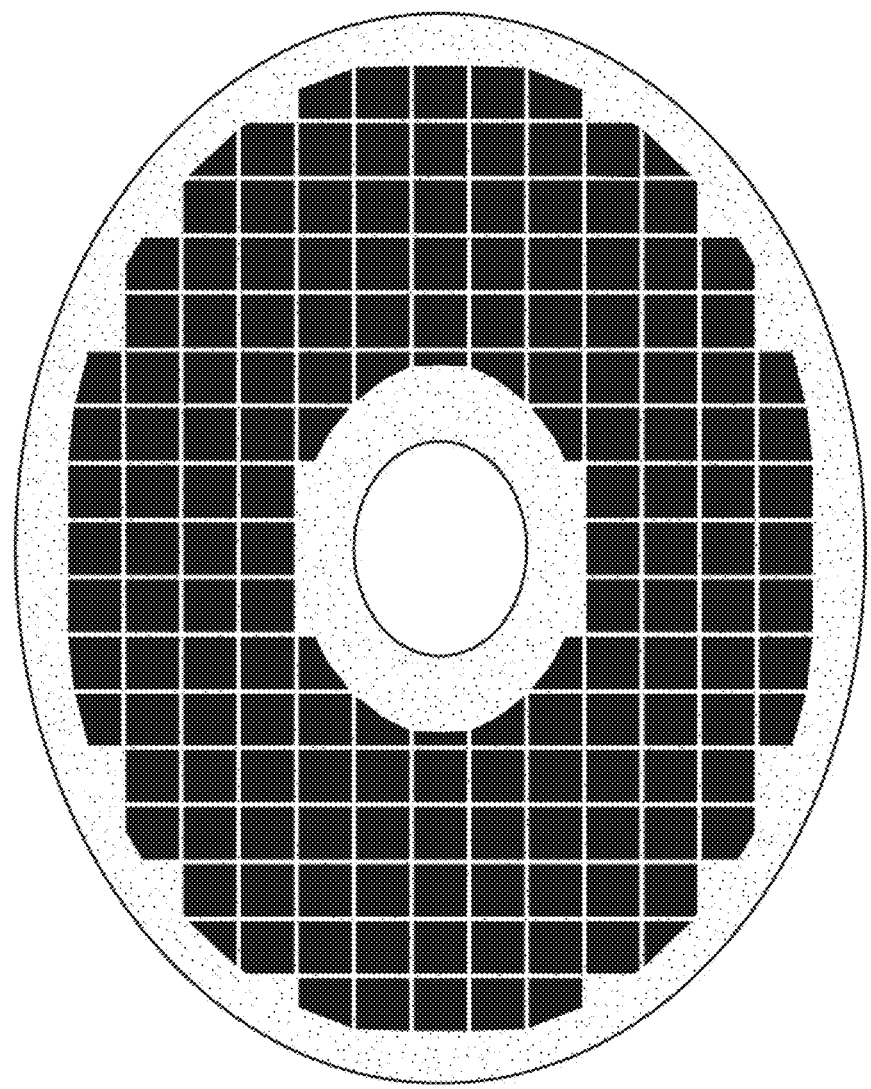
FIG. 59 illustrates a design of a FSM layer for an oval sensor shown in FIG. 58 (5800). This design shows a segmented FSM sensor pattern, but other types of FSM patterns including the ones shown in FIG. 47 (4700)-FIG. 49 (4900) can be used.
Figure 60:
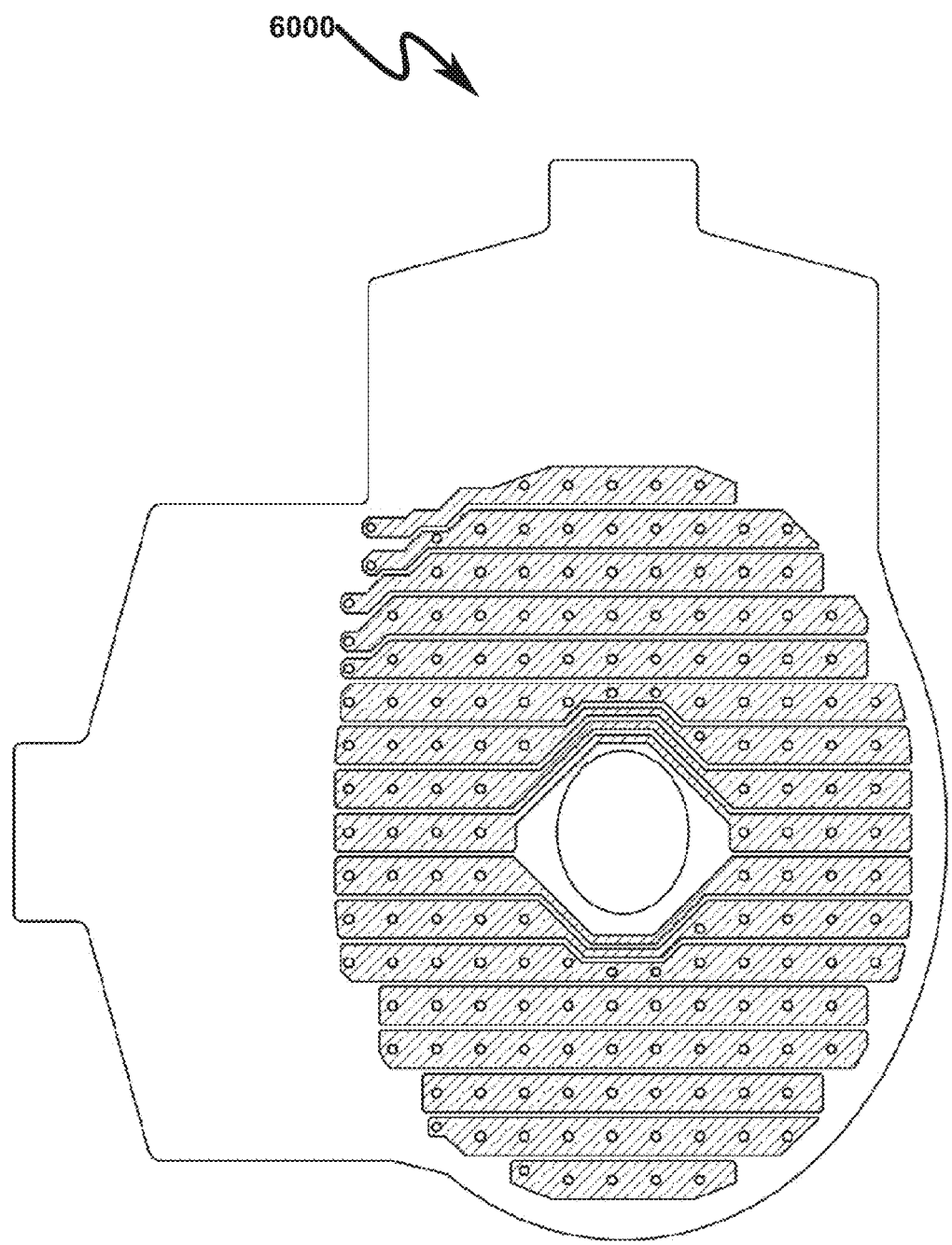
FIG. 60 illustrates detail of a reverse side of the bottom layer for the oval sensor shown in FIG. 58 (5800). The areas with a striped pattern are conductors which interconnect the row electrodes. Vias, which are represented by circles, connect to the row electrodes on the opposite side.

With IFSA technology, non-rectangular arrays such as those depicted in FIG. 58 (5800)-FIG. 60 (6000) can be created. The array in FIG. 58 (5800)-FIG. 60 (6000) is rounded, with a circular opening in the center. To create such a non-rectangular array, the present invention starts with a normal rectangular array as described earlier and removes sensor elements that fall outside of the desired final shape. At the same time, all the row and column electrodes must remain electrically connected; however, in areas where sensor elements have been removed, the present invention can squeeze down the row and column electrodes to hug the outline of the shape since there are no sensor element there. A non-rectangular thru-mode sensor can be made in the same manner. The resulting non-square sensor is scanned electrically in the same way as the original square sensor, and it will also perform the same as a square sensor, so there is no difference from the perspective of the electronics and software. The only difference is that this new sensor just will not be sensitive to touches in areas where sensor elements were removed.

Interpolation Resistors

For the purposes of reducing manufacturing cost, the set of fixed interpolation resistors between adjacent row and column electrodes would typically be located on the same substrate as the sensing area. However, some embodiments could have the interpolation resistors located in a separate location.

The resistances can be provided by any of a number of known ways of creating a resistor, including a resistor component, a printed carbon strip, or another type of resistive material. The value of all the resistors is preferably well controlled and within a known target range. This is especially easy to do with discrete surface mount resistors, which come in a wide variety of sizes and are available with an accuracy level of 1% or better. The resistance level of the row and column interpolation resistors can be the same or different, and is chosen depending on the requirements of the drive and readout circuitry. Typically, higher value interpolating resistors reduce power consumption, but cause a loss in accuracy (because of the nonlinearities mentioned earlier), and vice versa.

When a carbon strip is used, it can simply be printed across the adjacent electrodes. As long as the spacing between the electrodes is fairly constant and the width and height of the strip is consistent, the resulting resistance value between electrodes will be consistent as well. The resistance level can be controlled by varying the composition of the resistive ink or the width/height of the printed strip. The consistency can be further improved by trimming the resistors after the manufacturing step with a method such as laser trimming.

In the illustrations, the interpolating resistors are placed in the area between the sensing area and the drive/sense electronics. In practice, interpolating resistors can be placed anywhere, as long as they electrically interconnect adjacent row electrodes and adjacent column electrodes. For example, they can be placed on the opposite side of the sensor, away from the drive/sense electronics. They can also be placed on the back-side of the PCB (using vias to make the connection), interspersed within the sensing area between the sensing elements, and even embedded within the PCB itself. Finally they can be located in a combination of different locations on a single sensor. For example, some interpolating resistors for the row electrodes may be to the left side of the sensing area, while others may be on the right side.

Manufacturing Processes (6100)

The conductive layers for the sensors can be manufactured with a wide variety of manufacturing processes. All materials, including the FSM are chosen to withstand expected environmental and mechanical conditions for a given application such as repeated flexing, heat, and humidity.

Arguably, the most straight-forward is to use a standard rigid and/or flexible PCB manufacturing process to form the electrodes on a substrate. The process typically starts with an FR4 (for rigid) or KAPTON® (for flex) base material which is coated with a layer of contiguous copper. The copper is then etched to create a pattern of copper conductors. Typically these need to be plated with an inert material, such as gold, to avoid oxidation.

Alternative plating processes such as ENIG (Electroless Nickel Immersion Gold) or a layer of screen-printed carbon can be used to reduce the cost of plating. In such circuits, standard surface-mounting (SMT) processes can be used to attach the interpolating resistors. For shunt-mode sensors, vias can be formed using a standard process which involves drilling holes and then plating to form connections between two layers. Via filling can be used to fill the resulting holes and leave a smooth surface.

Another approach is to use a printed electronics (PE) process where conductive particles are deposited onto a substrate such as PET or Polyimide (KAPTON®) in an additive fashion. Some common conductive materials used in these applications consist of carbon nanotubes, silver nanowires, and polymer inks that are filled with conductive particles. One commonly used material for printed electronics consists of a polymer ink loaded with silver particles, which is typically deposited with a screen printing process. Because materials such as this can degrade as a result of mechanical stress, oxidation, or reaction with other gases/compounds, they may be passivated by over-coating with carbon or a force sensing material. Furthermore, because it is difficult to solder to such a circuit, a printed carbon strip can be used to create interpolation resistors. For thru-mode sensors created with a printed electronics (PE) process, a very similar construction can be used as with rigid/flexible PCB sensors. For the shunt-mode sensors, vias can be created in a fashion similar to how vias are created on a PCB—by drilling holes through the substrate with a drill or laser, followed by an overprint of a conductive material. An alternative is to print the bottom conductor layer, followed by printing an insulator layer with holes in the equivalent places where vias would be on a rigid/flex PCB sensor. Next, the top conductor layer is printed. The holes in the insulator layer allow the pads in the top conductive layer to bridge electrically with the conductive traces on the bottom layer. This creates the same electrical structure, but both conductor layers end up on the top side of the substrate separated by a thin layer of insulator (with holes in the locations of the vias).

Figure 61:
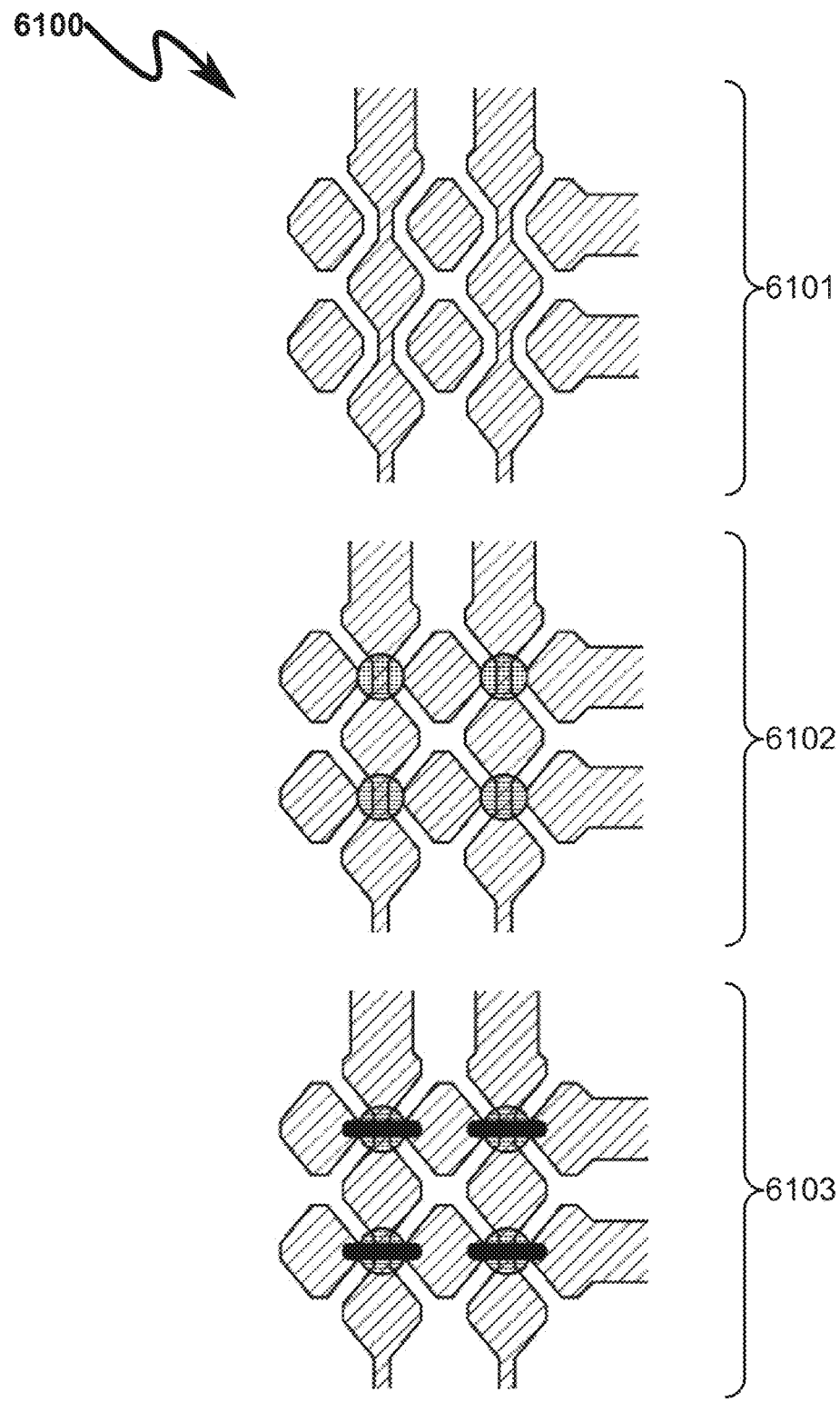
FIG. 61 illustrates diamond pattern shunt-mode IFSA with bridges. This pattern is created by creating pattern of rows and columns (the columns are contiguous but the row pattern has breaks) (6101); depositing insulating material in areas where columns travel between rows (6102); and depositing patches of conductive material that bridges the pads belonging to each row without electrically connecting to the columns (6103)

Yet another method for making shunt-mode sensors is to print the top-side of the sensor pattern first, which may be similar to any of the patterns described earlier for making shunt-mode sensors. As before, the columns are connected within the pattern itself. However, the rows are connected by small bridges. The bridges can be created by depositing a small area of insulator material in each area where a column electrode lies in between two portions of a row electrode. Next, a small conductive "bridge" is deposited over the insulator, connecting the two adjacent portions of a row electrode. This sequence (6101, 6102, 6103) is generally depicted in FIG. 61 (6100).

Other approaches for forming electrodes can include vapor-deposition of metals or conductive materials such as carbon nanotubes. Patterning can be done by a variety of methods including depositing through a stencil, offset press, laser etching, or transfer processes. IFSA sensors can also be created using techniques for making cloth. Conductive thread coated with FSM can be used to create the row and column electrodes. Row electrodes would run in one direction while column electrodes would run in the other direction, forming the warp and weft of a fabric. A force sensing element would be formed at the intersection of each row and column electrode simply as a result of two or more threads coated with FSM touching each other at right angles. At the edges of the cloth, resistive elements interconnect the row and column electrodes, and a connection to the electronics is created using conductive material which attaches at regular intervals to the edge of the force sensing array. In this design, the resistive elements would typically be made of a printed resistive rubber/paint, or a resistive thread that is tightly wound or knotted over the row threads and over the column threads to form an electrical connection.

Transparency of Sensor Array

To create fully transparent sensors, transparent materials may be used for the force sensing materials, conductors, and various substrate layers of a sensor array.

Transparent force sensing materials have been described above. Transparent conductors can include materials such as indium tin oxide (ITO), carbon nanotubes, graphene, silver nanowires, fine-mesh copper, and organic conductors. Substrates can include glass, flexible glass, and polymers such as PET, Polyimide, or Polycarbonate.

Both shunt-mode and thru-mode configurations can be created that are identical to their non-transparent counterparts, except that all the included materials are transparent. One notable configuration that would be straightforward to produce with available manufacturing processes is the shunt-mode diamond-shaped sensor pattern with bridges to connect the diamonds along the rows. See FIG. 61 (6100). To create the IFSA sensor, this pattern would be overlaid with a transparent force sensing material on top.

Another option is to create a partially transparent sensor. This can be done with much more standard materials and techniques. For example, with a shunt-mode sensor, light can shine through the vias, and openings can be provided in the force sensing layer to let light through. A thru-mode sensor can be manufactured with opaque electrodes on a transparent substrate, with gaps in the force sensing material that permit light transmission. Light would be able to shine through the gaps in the electrodes and force sensing materials.

Assembly

Final assembly of IFSA sensors consists of laminating or holding the layers together. Typically, pressure-sensitive adhesive would be applied around the perimeter(s) of the layers. The active area is typically left without adhesive, as air or some other non-conductive fluid (such as mineral oil) is necessary in the active area for the force-sensing material to operate. However, small adhesive areas may be provided within the active area of the sensor to keep the top layer from de-laminating from the bottom. An air-gap/air-channel is typically provided to allow air-pressure inside and outside the sensor to equalize. A filter may be added to the air-gap/air-channel to prevent particles or moisture from entering the active area. Sensors may be hermetically sealed for operation in harsh environments. The top and/or bottom layer may be laminated to other layers such as a display, midframe, or other sensor. Sensor assembly should be done in a clean environment, such as a cleanroom, to avoid particles or other contamination from entering the sensor which can cause inconsistent performance.

Curved or Flexible Sensors

The IFSA technology can be used to create curved or flexible sensors in several different ways. Flexible sensors can be created by using flexible substrates such as Polyimide (also known as KAPTON®), PET, or Polycarbonate for the circuit, and using flexible materials for the FSM as well.

To create a sensor that is permanently curved, a flexible sensor can be laminated onto a curved rigid surface, or it is possible to start with a flat sensor and mold it into/onto a non-flat surface. It is also possible to directly manufacture the sensor electrodes on a curved surface using known techniques such as Laser Direct Structuring (LDS) or by 3D printing using both conductive and insulating materials. In the case of shunt-mode sensors, the force sensing layer can be pre-molded into a curved shape and can be made out of a deformable material such as molded silicone. In this case, force sensing material can be directly deposited onto, or molded into, the force sensing layer. Alternatively, the entire force sensing layer can be made from a flexible/deformable FSM.

There are many applications in which it is desirable for the sensor to remain flexible. For instance, one may want to place sensors into a flexible phone/tablet, the wrist band of a watch or bracelet, into the sole of a shoe, or into clothing. In these cases, sensors built on a flexible substrate can be directly embedded into the application. They may also be manufactured in a fashion similar to how cloth is manufactured, as described earlier.

The sensors can also be designed so that they can be bent/cut (without damaging the traces) to allow them to wrap around or fold into complex shapes. For example, a robot fingertip can be covered in an IFSA sensor by making two cuts in the sensor pattern and joining the edges together (FIG. 62 (6200)). This shape can then be laminated or adhered to the surface of the robot fingertip. The outside can be coated with a rubber shell to distribute force and provide a softer touch. In the case of a shunt-mode sensor, the inside of the rubber shell can be coated with FSM so that it can directly act as one part of the force sensing element, or the entire rubber shell can be impregnated with conductive particles so that it behaves like an FSM.

Electronics Details

The electronics for scanning an IFSA consist of several components. These components are meant to illustrate one embodiment of the invention. It should be clear to the reader that alternative variations and combinations of components can be used in keeping with the spirit of the disclosure. Furthermore, some components may be integrated together (for example, via an integrated circuit or ASIC), can be implemented in software, or removed altogether without substantially limiting the ability to scan the sensor.

Voltage Source

The purpose of the voltage source is to provide a constant voltage for driving the IFSA sensor. Active electronics, such as an amplifier or a linear/switching voltage regulator may be used to provide the constant voltage. The voltage source may be a separate source from the voltage source used to drive the digital portion of the circuitry, or it may be one and the same. There may also be some current-limiting capability built into the voltage source to avoid excessive current draw by the sensor. The current-limiting capability can be implemented simply with a fixed resistor, can be a soft limit designed into the voltage source circuitry, or can be implemented as a hard-cutoff when a certain current level is reached. The current-limiting capability can also be implemented using the digital circuitry. When the microcontroller detects an over-current condition, it can decide to shut off scanning, or modify the state of the scanning hardware to reduce power consumption.

An analog line may be provided that can be used to monitor the voltage generated by the voltage source. This can be used to detect and/or compensate for drops in voltage due to excessive current draw. The compensation can be done via analog circuitry. One way to do this is to feed this voltage into the voltage reference of the ADC used to scan the sensor. Alternatively, this compensation can be done digitally by measuring the voltage generated by the voltage source using an ADC and then multiplying the values read from the sensor by the expected drive voltage divided by the measured voltage.

Drive Circuit

The job of the drive circuit is to drive each active column electrode either to ground or to the voltage level provided by the voltage source. It accomplishes this with a series of analog/digital switches connected to each active column electrode. The column switches may also be provided with the ability to disconnect one or more columns (putting them into a high-impedance state). This can be used for multi-resolution scanning. The control of the column switches within the drive circuit is performed by the control logic, although some aspects of the control sequences may be automated/pre-programmed. Typically, during operation, only one column at a time is driven to the voltage provided by the voltage source, while all the other columns are driven to ground or disconnected (in a high-impedance state). In one embodiment, the drive circuit uses analog switches to connect the column that is being driven high to the voltage source. In another embodiment, the drive circuit could use digital switches to perform the same function. In yet another configuration, the drive circuit could include an integrated voltage source. The integrated voltage source can be shared among all the column electrodes, or there may be multiple voltage sources (as many as one for each column).

Sense Circuit

The sense circuit is similar to the drive circuit, but instead of driving rows to a particular voltage, it either connects the row to be measured to external circuitry or connects the row to ground. Like the column switches, the row switches may also be provided with the ability to disconnect one or more rows (putting them into a high-impedance state), which can be used for multi-resolution scanning. The control of the row switches within the sense circuit is performed by the control logic, although some aspects of the control sequences may be automated/pre-programmed. During operation, typically only one row at a time will be connected to external circuitry. However, in order to allow for faster scans, some embodiments may have multiple copies of the signal conditioning circuitry and/or ADCs. In this case, the sense circuit could also allow multiple rows to be connected to external circuitry at the same time. All other rows would typically be connected either to ground or disconnected (in a high-impedance state).

The sense circuitry may have additional features to support low-power wakeup from a touch (as described in the next section). Also, because the drive and sense circuitry is so similar in function, it may be implemented using a common design. In other words the same chip, ASIC, or circuit could be used as both the drive circuit and sense circuit. The drive and/or sense circuitry can also be designed as a module that can support some fixed number of active row/column electrodes. Larger numbers of row/column electrodes could be supported in a given embodiment simply by increasing the number of these modules.

Signal Conditioning Circuitry

The signal conditioning circuitry takes the raw signal from the sense circuit and prepares it for being read by an ADC. To increase the linearity of the signal produced by the sensor, it is desirable to drive the row being read to ground potential. Thus, the most linear signal conditioning circuit will include a transimpedance amplifier which will drive the input to ground potential, while measuring the amount of current necessary to do so, and feeding that value to an external ADC. A less accurate but simpler method of measuring the current is simply to use a low resistance value pull-down resistor connected to ground, and measuring the voltage across the resistor. In cases where this voltage is too low to be read by an ADC, this voltage can be amplified to match the output range to the range of the ADC and reduce noise. Because the sensor itself already has a resistive path to ground (through the interpolation resistors), even the resistor to ground may be left out, but the resulting output signal will be even less linear.

The signal conditioning circuit can also include filtering to reduce high-frequency noise. This can be in the form of a passive filter (such as an RC low-pass filter), an active filter (such as an op-amp low-pass filter), or simply a capacitor to ground (since the sensor itself can provide the R portion of the RC filter).

An amplifier can also be used to take the relatively high-impedance signal from the sensor and turn it into a low impedance signal for the ADC, or to boost low voltages from the sensor. A programmable gain amplifier can be used to dynamically adjust the sensitivity of the sense circuitry, and a resistive divider can be used to reduce the voltage if it is too high for an ADC.

All of these different approaches are known ways of pre-conditioning a signal before feeding it into an ADC. The particular choice and arrangement of these elements depends on the sensor accuracy required and a tradeoff between accuracy, complexity, power consumption, circuit size, and price. The signal conditioning component can be omitted, but this may result in reduced sensor performance. Note that the signal conditioning circuit can be an independent circuit, or can be incorporated into the sense circuit, into the ADC, or parts of it may be broken up among different components.

ADC

The ADC (analog to digital converter) takes a voltage level produced by the signal conditioning circuit and converts it into a digital representation suitable for processing by a microcontroller. Typically, a successive approximation register (SAR) ADC with at least 8 bits of resolution is used. Greater ADC resolution results in more accurate position and force measurements. The conversion speed of the ADC is also important as it is typically the limiting factor for how fast a sensor can be scanned. As described earlier, multiple ADCs (along with multiple conditioning circuits) can be used in parallel to increase scanning speed. Another factor which affects sensor scan rate is the settling time for the sensor, drive/sense circuitry, and conditioning circuit. Enough time must be given after switching the state of the drive or sense circuitry for the analog input voltage to the ADC to settle. Furthermore, the ADC itself may carry residual charge from the previous measured voltage. Sufficient acquisition time must be given for the ADC to sample the input voltage, especially if the input impedance to the ADC is high. Alternatively, the ADC sampling capacitor may be reset to a consistent state after each sample to avoid any residual charge from the previous sample.

Digital filtering techniques may be used to improve the signal-to-noise-ratio (SNR) of the signal read by the ADC. For example, multiple ADC readings can be combined with a technique such as averaging, or filtered in ways such as a median filter to reduce noise. A transformation into the frequency domain can be used to detect desired frequencies or suppress unwanted frequencies.

Also, the digital voltage output from the ADC can be remapped into a different value using a lookup table or a mathematical calculation to convert the signal into a more useful range, or compensate for non-linearity in the electrical system.

Controller

The controller is the component which performs scan sequences, collects digital values from the ADC, optionally processes those values, and optionally sends information to an external system via an IO interface such as I2C, SPI, UART, USB, Bluetooth, Wi-Fi, etc. Parts of the scanning circuitry including the voltage source, drive circuitry, scan circuitry, signal conditioning, and/or ADC can be incorporated into the controller. The controller may have a program memory which allows code to be loaded with different control sequences/algorithms to change the behavior of the system. Additionally, the controller can use fixed-function logic to automate/accelerate common operations such as scanning or processing the values read from the sensor.

Scanning Details

In addition to the basic full resolution scan of the sensor described earlier, there are several other ways to scan an IFSA sensor that allow different tradeoffs between scan speed, resolution, precision, power, and area. Some of these other approaches can also be used to implement a low power wakeup mode, where the sensor can be in a very low power state, but can still detect the presence of a touch, which can be used to wake the system or trigger a transition into a fast/high resolution scanning state. This section describes some different ways in which an IFSA sensor can be scanned and mentions some of the tradeoffs associated with these approaches.

Basic Scan

The most common way to scan the sensor is the method described earlier. It consists of driving one column at a time, and for each column that is driven high, sensing the value on each row one at a time. This progressively scans the intersection of every active row and every active column electrode. When scanning a sensor element at a particular row/column intersection, all other active column and row electrodes are grounded, creating an interpolation area around that column and row electrode that is two times larger than the distance between adjacent active columns and adjacent rows (FIG. 34 (3400)). The time required for the basic scan is proportional to the number of active row electrodes times the number of active column electrodes.

Parallel Scan

The parallel scan is a variant of the basic scan which improves scan speed without sacrificing resolution. Scan speed is improved by performing ADC conversion on more than one row simultaneously. To do this, there needs to be more than one instance of the signal conditioning and ADC circuitry operating in parallel on multiple rows.

To preserve the interpolation property, there must be at least one grounded active electrode in between each pair of sensed electrodes. However, in embodiments where the sense electronics grounds the sensed electrode (as described earlier, this can be accomplished by pulling the electrode low with a transimpedance amplifier, or using a pull-down resistor with a low resistance value), each electrode is effectively grounded when it is being scanned. This allows, in the limit, scanning all rows simultaneously.

The advantage of the parallel scan is that it can greatly increase scan speed and reduce power consumption, since the scan can happen in a shorter timeframe, allowing the sensor to be powered for a shorter time. The downside is that more electronics may be required to support this. The time required for a parallel scan is proportional to the number of active row electrodes times the number of active column electrodes divided by the number of rows that can be sensed in parallel.

Scan Rate

The rate at which the sensor is scanned can be dynamically decreased to reduce power consumption or increased to reduce input latency. One strategy to reduce power consumption is to perform scans at a low rate, for example, 10 frames per second until a touch is detected, and then to increase scan rate to a higher rate, for example 60 frames per second after a touch is detected, and continue scanning at the higher rate until all touches are removed.

Reduced-Resolution Scan

Another strategy that can be used to reduce power or increase scan speed is to dynamically reduce the resolution of active rows and/or active column electrodes by putting some active electrodes into a high impedance state, effectively disconnecting them electrically from the drive and sense circuitry. This does not significantly reduce the resolution with which a contact can be sensed, because the disconnected electrodes effectively act as additional interpolating electrodes, but reduces the distance at which multiple touches can be distinguished.

For example, resolution along the X and Y axes can be cut in half by putting every other active row and active column electrode into a high impedance state. Resolution can be reduced further by putting larger numbers of row and column electrodes into a high impedance state. For example, to reduce the X and Y resolution by one quarter, one would keep every fourth active electrode electrically connected and each set of three active electrodes between each of these would be put into a high impedance state. As the resolution is decreased, the number of row/column junctions that must be scanned decreases as well. This reduces power consumption and increases scan speed. In some cases, it may be desirable to set different row and column resolutions, or even to have different row and/or column resolutions in different areas of the sensor. Taking this approach to the limit, the result ends up with the lowest resolution scan, where all the columns except the first and last column and all the rows except the first and last row are put into a high impedance state. During the scan, the present invention would drive the first column followed by the last column, while sensing on the first row and the last row for each powered column. In total, only four ADC values would be collected. Using these values, the present invention would be able to compute the average X and Y position of all touches and the total force of all the touches.

Although the present invention gives up multi-touch sensing capability by doing this kind of scan, the present invention gains the ability to scan incredibly fast, with very little power consumption, which can be useful in situations where very fast events are to be detected or where power is being conserved such as in a battery powered device.

Multi-Resolution Scan

Because scan resolution can be varied dynamically, it is possible to combine scans of multiple resolutions in interesting ways. For example, it is possible to overlap multiple low resolution scans (offset by different amounts in X and Y) to create a higher resolution final force image. Low resolution scans can also be used to enable a wake-up mode, where the sensor is scanned at a lower resolution until a touch is detected and then the resolution can be boosted to accurately determine the position of the touch. It is also possible to perform a low resolution scan, and then refine it by performing higher resolution scans in areas where touches are detected. This methodology has the advantage of combining the power efficiency and high speed of low resolution scanning with the precision of a full resolution scan.

Window-Area Scan

When the location of a touch is known in advance, or only touches in a portion of the sensor area are of interest, it is possible to perform a scan in a small window rather than scanning the entire sensor, simply by iterating only through the rows and columns of interest. The window can be moved and/or sized dynamically to follow a touch, and there can even be multiple windows that are scanned at the same time over different, possibly overlapping locations on the sensor.

One and Zero Dimensional Scan

All of the scan approaches described previously scan a grid of sensor row/column junctions. However, when it is only necessary to detect whether or not a touch has occurred irrespective of the position, or it is necessary to track a contact in only one dimension, it is possible to perform an even faster scan. One way to accomplish this is to power on all the columns and then sense on one row at a time. This would provide only the Y position of a touch, but would reduce the number of readings that need to be taken to the number of active rows in the sensor. This can also be combined with the reduced resolution scan idea presented earlier to reduce the number of active rows that need to be sensed, at the expense of reducing Y resolution.

An alternate way to do this is to ground all the rows and power on one column at a time. Touches on or near the powered active column electrode will cause increased current flow from the voltage source. One way to measure this increased current flow is by placing a small value resistor in line between the voltage source and the drive electronics and taking a differential voltage measurement of the voltage across that resistor.

Alternately, in cases where the voltage source voltage drops as it supplies increased current, the present invention can measure the drop in the voltage output by the voltage source. Doing this would provide only the X position of touch, and would reduce the number of readings that need to be taken to the number of active columns in the sensor. This can also be combined with the reduced resolution scan idea presented earlier to reduce the number of active columns that need to be sensed, at the expense of reducing X resolution.

Furthermore, it is possible to make the entire sensor act as one giant pressure-sensitive button. One way that this can be done is by modifying the sense electronics to allow all the rows to electrically connect to a single analog input. By powering all the columns and sensing on all the rows simultaneously, the entire sensor becomes one large pressure-sensitive button. Alternatively, the present invention can power all the columns and ground all the rows, and simply measure the increased flow of current to the column electrodes, or a voltage drop in the voltage of the powered columns. Yet another way to do this is to electrically connect to the force sensing material (this works best in designs where the force sensing material is contiguous). This then forms one electrode, while all the rows and columns form the second electrode. In this case, the present invention can ground all the row and column electrodes, power the FSM, and measure current flow through the connection to the FSM, or the amount of the voltage drop on the electrical connection to the FSM.

Many other variations of these three schemes are possible. For example, with all of these approaches, the present invention can flip the polarity (power what is grounded and ground what is powered), and still achieve the same result. It is also possible to measure current flow/voltage change on either side of any of these circuits and instead of measuring the current flow/voltage change on the powered line, the present invention can measure it on the grounded line or vice versa.

In general, all of these approaches turn the sensor into either a linear position sensor or a single pressure-sensitive button, which greatly reduces scan time, and increases scan speed while sacrificing the ability to acquire a two-dimensional force image. These approaches, especially the ones which turn the entire sensor into a single pressure-sensitive button, can be useful when a low power wakeup is desired. For example, on a battery powered device, the present invention may want the device to go into a low power state whenever the device has not been touched for some time. In this state, the present invention can configure the circuit so that the present invention can read the value of a single electrical line or a small number of electrical lines to determine whether a touch has occurred anywhere on the sensor. Furthermore, this signal can be fed into a hardware wakeup/compare line such that the wakeup can occur without the intervention of any software, allowing the processing unit to be fully shut down when the sensor has not been used for some time, and to wake back up immediately when a touch occurs.

Processing Details

In applications that require touch tracking, after acquiring a force image, the controller typically processes that image to detect and track contacts, which are localized areas of force on the sensor. The following set of steps can be performed to detect and track contacts.

Normalization

Either before or after the baseline subtraction step (described later), it may be desirable to re-scale the input values into a known scale. For instance, it may be desirable to take the raw ADC values from the sensor and map them to known forces such as grams. This can be done via lookup tables, or using mathematical equations. A calibration step may be used at the time of manufacture or when requested to recalibrate the mapping. The calibration may be global (applying to the whole sensor) or can be done at various locations on the sensor. In the latter case, the calibration values can be smoothly interpolated over the whole sensor, with the assumption that variation is gradual over the surface of the sensor.

Baseline Subtraction

The purpose of the baseline subtraction step is to eliminate areas of non-zero pressure which may be caused by imperfections in the sensor, imperfections in device assembly, or persistent pressure points, such as if an object were resting on the sensor. The baseline subtraction algorithm processes one pixel of data in the force image at a time. For each of these pixels, it stores a baseline value, which is subtracted from the force image at each frame. Typically, the baseline is set from the values read out from the first scan of the sensor after it is turned on. The baseline can then be updated from time to time based on the current baseline value and the current force sensor reading at a particular sensor location. Typically, the baseline is updated to a value somewhere between the current baseline value and the value of the current sensor reading. If the amount of increase/decrease in the baseline value per frame is fixed, the baseline will change at a constant rate over time. Alternatively, the rate of increase/decrease per frame can be set as a percentage of the difference between the current pressure reading and the current baseline value. In this case, the baseline will change faster if the difference is greater, and slower when the difference is small. The rate of change can be set to control the rate at which changes in the force distribution are eliminated.

In some applications, the present invention may want the rate of change in the baseline value at each sensor element to be different, depending on whether the baseline is increasing or decreasing. This is because it is often desirable for the baseline to increase slower and decrease faster so that if a user holds down on the sensor for a while, the baseline will increase slowly, avoiding the possibility of throwing off future measurements. Furthermore, if the baseline decreases faster than it increases, the baseline will be able to return to normal more quickly once the user releases the touch on the sensor.

Blob Detection

Typically, the next step after baseline subtraction in processing a pressure distribution is blob detection. Blob detection uses an algorithm that processes the force distribution row by row or column by column to find connected areas of pressure points that have non-zero pressure and assigns to them a unique identifier. For each blob, statistics such as the (X,Y) position of the centroid, area, total force, pressure, and shape of matching ellipse are calculated.

Peak Separation

Peak separation is an optional step that can be used to further subdivide blobs that have more than one pressure peak. Peak separation starts by finding the peaks within each blob. Next, a breadth-first search or algorithm such as a watershed algorithm for the pixels around each peak is performed, where only steps towards pixels with lower force values, and which are not part of other blobs, are taken. This effectively separates the area around each peak and also allows neighboring peaks to be found. Statistics similar as those defined for blobs can be computed for peaks.

Algorithms may be used to adaptively split or merge peaks as desired. For example, it is often desirable to split the peaks formed by two fingers close together, so that the fingers can be tracked independently. At the same time, it is usually desirable to merge the peaks formed by the different bumps in a user's palm, to allow the entire palm to be tracked as one object.

Depending on the application and situation, the present invention may choose to perform blob detection, peak separation, or both algorithms together to detect touches. In some cases where the present invention is not interested in tracking touches, the present invention may do neither of these steps and simply report the array of force readings read from the sensor to the user.

Position Compensation

Because there may be some inherent non-linearity in the sensor, once the present invention has coordinates for blobs, peaks, or contacts, it may be desirable to apply a compensation for the non-linearity to increase tracking accuracy. The compensation is essentially a series of (X,Y) position offsets which vary depending on the location on the sensor.

These offsets can be experimentally measured or mathematically pre-computed at the time the sensor is designed or manufactured, and stored into the sensor's memory. The compensation will take an input (X,Y) position and remap it to a nearby output (X,Y) position. The compensation may also take other factors such as the force or area of the contact into account to make a more accurate adjustment. It may also be applied for some contacts, but not others. For instance, if the user is writing with a stylus on the sensor, the present invention may want to apply the compensation to achieve the highest possible accuracy. However, the present invention may choose not to apply the compensation if the user is touching the sensor with their palm, as the present invention may not care about the accuracy of the palm position since this type of touch is relatively large and imprecise.

Contact Tracking

In order to allow software to make sense of the touches over time, it is necessary to track touches between consecutive frames. In the contact tracking step, the present invention iteratively matches contacts from the new frame to contacts in the old frame. Typically the (X,Y) distance between contact centroids is the key metric used to perform the matching. Each time a pair of contacts is matched, the contact in the new frame is given the ID of the contact in the old frame, and a "contact moved" event is generated. Any contacts that are detected in the new frame (that were not in the old frame) are treated as a new contact and given a new ID, generating a "contact start" event. Any contacts that were in the old frame but are not found in the new frame generate a "contact end" event, and the ID is subsequently recycled.

The results of the touch tracking algorithm may be fed back into the peak separation algorithm. By doing this, the present invention can avoid touches from spuriously appearing/disappearing where there are none as a result of the appearance of false peaks due to noise, variation in the sensor, and/or non-smoothness in the force distribution of a touch. This information can also help the peak separation algorithm determine which peaks should be split or merged. For example, in the peak separation algorithm, if the present invention had detected a touch in the previous frame, the present invention may bias the peak separation algorithm to try to find a peak corresponding to that touch in the next frame, and if there was not a touch in a particular location in a previous frame, the present invention may bias the peak detection not to find a peak in that location in the next frame, or to merge it into another peak. However, this feedback step must be implemented carefully to avoid the situation where a touch that has gone away continues to be tracked, or the situation where a new touch is not detected because it was not seen previously.

Communication with External Components

Typically, external hardware and/or software components are interested in receiving either force images, contact events, or both. The communication interface handles configuration of the sensor, and sending of force images and/or contact events. Typically, communication starts with a handshake which gives the external components information about the sensor such as its version, size, range of forces sensed, capabilities, etc., and establishes the operating parameters of the sensor. The external components then establish what information they would like to request. Next, a data stream is established which sends a stream of information from the sensor at a predetermined frame rate or on the occurrence of a predetermined event. This configuration continues until the external hardware and/or software requests a termination of the data stream or a change in characteristics of the stream such as frame rate, resolution, what data is being sent, etc., or the connection is broken.

Other Embodiments

Active Interpolation Electronics

Instead of using resistors to create the interpolation property along rows and/or columns, it is possible to use active electronics (consisting of transistors, op-amps, etc.), to create the linear falloff of voltages on the drive side and the linear split of current on the sense side. The benefit of active electronics is the ability to reduce or eliminate the non-linear interpolation behavior described earlier, which results from a change of potential on the drive and sense electrodes as a result of current flow through sensor elements. The active electronics may be instantiated on a per column/row basis, or specialized circuits can be created that perform interpolation over a series of rows or columns. For example, an IC could be designed that would connect to each pair of adjacent active electrodes, and also to each of the interpolation resistors between that pair of active electrodes, and create the interpolation property (either voltage falloff or current splitting) over that set of electrodes.

Active electronics for creating the interpolation property on the drive side can be made with a resistive voltage divider circuit (similar to the interpolation resistors) and a series of operational amplifiers which are configured as voltage followers to generate that same voltage at their output. The outputs of the operational amplifiers are connected to the drive electrodes (both active and interpolating). The resistive divider circuit will in this way be electrically isolated from the output of the sensor array, eliminating nonlinearity due to current flow through the sensor elements.

Active electronics for creating the interpolation property on the sense side can be made with a series of transimpedance amplifiers connected to the sense electrodes (both active and interpolating). Each transimpedance amplifier will try to keep the sense electrode that it is connected to at a ground potential. On its output, it will produce a voltage proportional to the current flowing through the sense electrode. The output voltages of the transimpedance amplifiers connected to the sense electrodes can be averaged using an averaging circuit, where the contributions of the different electrodes are weighed differently to create a linear falloff in sensitivity. Another way to implement the sense side is to use a transimpedance amplifier which feeds into a transconductance amplifier at each sense electrode. The output of the transconductance amplifier can then be fed into a series of interpolation resistors similar to those found on a regular IFSA sensor. This combination, which can be described as a current mirror, will produce a current at the output of the two amplifiers that is proportional to the current flowing through the connected sense electrode, but the sense electrode will remain at a ground potential, thereby eliminating the nonlinearity.

Partially Interpolating Force Sensor Arrays

While the embodiments described so far enable interpolation between each pair of row and column electrodes, there may be applications where it is preferable to mix sensor regions with interpolation and other sensor regions without interpolation, or to have interpolation along one sensor axis but not the other.

In one embodiment, it is possible to have interpolating resistors only on the rows or only on the columns. This would create interpolation along one axis, but not along the other, for applications where the heightened sensing accuracy or reduced quantity of drive/sense electronics provided by interpolation is only needed on one axis.

In another embodiment, it is possible to leave out the interpolation resistors between some pairs of adjacent columns or some pairs of adjacent rows. This would have the effect of breaking up the regions in which interpolation occurs, creating separate interpolating sensor zones in proximity of each other. In this design, the electrodes on either side of the "break" in interpolation resistors would preferably be active electrodes so that each separate interpolation zone could be scanned all the way to its edge.

Non-Interpolating Force Sensing Arrays

With all of the described shunt-mode and thru-mode sensors constructions, it is also possible to enable non-interpolating scanning. In this case, there would not be any interpolation resistors. Instead, the multiplexing circuitry would allow the drive and sense electronics to connect any of the electrodes. In other words, all the electrodes are non-interpolating. The multiplexing electronics could also allow connection to multiple electrodes at the same time (for lower resolution and multi-resolution scan modes).

With this approach, it may be possible to more accurately measure position of a contact, to perform better disambiguation of multiple touches, and to better calculate the touch area. For applications that involve a stylus and a finger, it may be possible to distinguish a stylus from a finger touching the sensor simply by measuring the area of the touch.

Furthermore, the multiplexing electronics could be designed in such a way that they could switch between an interpolating mode and a non-interpolating mode. In the interpolating mode, only a subset of the electrodes would be connected to the drive/sense electronics, and the rest of the electrodes would be connected via interpolating resistors as in a normal IFSA. In the non-interpolating mode, all the electrodes would be connected to the drive/sense electronics. This would enable an application to make use of the power, performance, and speed benefits of interpolating sensors, and the increased resolution of non-interpolating sensors.

Integration of IFSA with Other Components
(6300)-(6400)

Flexible Overlays and Underlays

The interpolation property of IFSA sensors allows the ability to increase the resolution of the sensor relative to the drive electronics. For tracking objects, such as fingers, that would typically be much larger than the distance between sensing elements/electrodes, this approach yields very accurate tracking. However, for objects such as a stylus, the size of the contact area may be much smaller than the distance between sensing electrodes. In this case, as the stylus moves over an IFSA sensor, there may be regions (near the centers of sensor elements) where the stylus tracking becomes discontinuous.

To improve the tracking performance for such objects, the present invention can add a thin flexible/compressible layer over the sensor. This layer will allow the object to slightly compress into the layer, increasing the surface area of contact, and thereby creating a more continuous tracking response. To clarify this further, assume the present invention is attempting to use a stylus which has a tip with a 1.25 mm diameter, and the sensor the present invention is using has approximately a 1 mm distance (0.25 mm-2.5 mm) between nearby sensor elements. If contact is made with the sensor directly with the stylus, only a point contact will be made, and the sensor will be able to tell only which sensor element is being touched, but not where the stylus is between sensor elements. Now, if the present invention adds a flexible material which is 0.625 mm in thickness on top of the sensor, and touch it with the stylus, the stylus will be able to compress slightly into the flexible material. As it compresses into the material, the surface area of the contact will increase to a diameter of approximately 1.25 mm. Now, as the stylus moves across the surface, it will always activate more than one sensor element. As a result, the present invention will be able to track it at a resolution significantly higher than the 1 mm pitch between sensor elements.

The only downside of this approach is that the flexible layer may be difficult to write on, due to increased friction. To combat this, the present invention can put another thin textured layer on top of the flexible layer to improve the surface feel. In another embodiment, the present invention could add the flexible layer below the sensor as well, and achieve the same effect of increasing the contact area of the stylus.

Integration with Displays

IFSA sensors can be integrated with displays in order to create a touch display. Transparent versions of the sensors can be overlaid on top of a display. Opaque versions of the sensor can be placed below a display. The possible display types include OLED, electrophoretic displays (such as e-paper displays), LCD, and reflective LCD. In all of these combinations, care must be taken to avoid bumps or particles being trapped between the layers, as these particles can create pressure concentrations that degrade sensor accuracy.

Today, most displays are built on top of rigid substrates such as glass. However, a rigid display may not transmit forces well enough to allow accurate touch. Thus, it is preferable to use a flexible display. Advantageously, these display technologies can also be manufactured on flexible substrates, such as flexible polymer film or flexible glass, creating flexible displays. These flexible displays, when overlaid on an IFSA sensor, minimally affect IFSA sensor performance.

It may also be possible to integrate the IFSA sensing technology into the layers of the display itself. For instance, it may be possible to collocate the electrodes of the IFSA with the electrodes of a display, such as an LCD display, and to collocate the FSM with some of the other layers of the display, such as the color-filter/polarizer. As another example, it is possible to place a transparent IFSA sensor in between the TFT panel of an LCD and a backlighting illumination source.

In the case where it is desirable to have a display directly on top of a shunt-mode IFSA sensor, it is possible to have the display act as the top layer. To do this, the bottom side of the display can be directly coated with any of the already mentioned FSM materials such as printed carbon ink. Alternatively, an FSM material such as a carbon-impregnated film can be laminated, bonded, or fused onto the back side of the display. Also, it is possible to create a display substrate which already has FSM impregnated into the bottom layer, so that there does not need to be an additional printing/lamination step onto the bottom of the display. In all these cases, the display would act as the top layer of an IFSA and it would simply have to be placed on top of a layer with the shunt mode electrode pattern to create a combination display+IFSA sensor. Alternately, the bottom of the display substrate can act as the top layer of a thru-mode sensor or the bottom layer (containing electrodes) of a shunt-mode sensor. The benefit of all these options is the possibility of increased yield, reduced cost, and reduced overall thickness.

Various layers in the display stack can also be designed to be flexible in order to improve the resolution of stylus tracking as described in the previous section. For example, in the case where a display has a front-light or a backlight, it may be possible to choose a light-transfer material that is flexible and transparent such as silicone. In this case, the front-light/back-light would help to create a better force distribution over the sensor, increasing tracking accuracy. Additionally, this approach may help to improve display and sensor reliability by softening accidental impacts.

Integration with Other Sensing Technologies

IFSA sensors can be integrated with many other types of sensing technologies, including capacitive, electromagnetic resonance (EMR), optical, acoustic, etc. Some possible sensor and display combinations are depicted in FIG. 63 (6300)-FIG. 64 (6400). Detailed below are some ways in which IFSA can be integrated with these sensing technologies.

Capacitive Touch

A capacitive touch sensor can be overlaid on top of an IFSA sensor. The rows and/or columns of the IFSA sensor can even serve double-duty as row/column lines on the capacitive sensor. This configuration can be used to increase the sensitivity of the system to very light touch. The capacitive sensor can also be used to detect finger "hover"/"proximity" above the IFSA sensor (it could also be used to detect proximity of palms, hands, faces, or other body parts/conductive objects to the sensor). Another benefit of this configuration is that it would be possible to distinguish conductive objects, such as fingers, from non-conductive objects, such as a plastic stylus.

This is because the conductive object would have both a force signature (via the IFSA sensor) and a capacitive signature (via the capacitive sensor), while the non-conductive object would have only a force signature, and would be invisible to the capacitive sensor. Furthermore, it may be possible to use the combined signal of a capacitive sensor and IFSA to improve overall sensing accuracy and/or performance.

Because IFSA sensors can handle precise touch-tracking, the complexity and cost of the capacitive sensor can be reduced, and the capacitive sensor can be tuned for hover/proximity detection rather than touch detection to enable both hover (via the capacitive touch sensor) and touch and force sensing (via the IFSA force sensor).

Because the capacitive sensor may sense a touch before it is sensed by the IFSA sensor, the capacitive sensor can also be used as a wakeup source. This would allow the system to save power by shutting off the IFSA sensor whenever the capacitive sensor is enabled. Conversely, the IFSA sensor could be used to calibrate the capacitive sensor. Whenever a "contact start" or "contact end" event is registered on the IFSA, the capacitive sensor can use these events to calibrate its touch sensitivity. In this way, the capacitive sensor's ability to measure hover distance/proximity can be dynamically refined at runtime.

Both mutual-capacitive and self-capacitive style capacitive sensors can be used. Mutual-capacitive sensors consist of a set of row and column electrodes, forming a capacitor at the intersection of each column and row. Each of these capacitors can be measured by capacitive sensing electronics to create a grid of capacitance values. The presence of a finger creates a capacitive coupling to ground which causes the measured capacitance between the row and column electrodes to drop. Self-capacitive sensors consist of one or more capacitive "pads." Each one has a connection to the sensing electronics. In a self-capacitive sensor, the capacitance of each pad to ground is measured. This capacitance increases as a finger approaches. Mutual-capacitive sensors are typically more accurate, but operate at a shorter range and are more susceptible to electrical noise. Self-capacitive sensors are typically less accurate (since it is difficult to create a high-resolution grid), but can operate at a larger range, and are typically less susceptible to electrical noise. Either one can be used with IFSA.

Because capacitive touch sensors can be made on a similar substrate as IFSA sensors, it may be possible to pattern all or some of a capacitive touch sensor's layers onto the unused sides of an IFSA sensor. For instance, in a thru-mode IFSA sensor, it may be possible to pattern a set of cap touch sense electrodes onto the top side of the top substrate and to use the electrodes on the bottom side of the top substrate as both the IFSA and cap touch drive electrodes. In a shunt-mode IFSA sensor, it may be possible to pattern a set of cap touch electrodes or areas onto the top of the force sensing layer.

In one configuration, the FSM of an IFSA sensor itself can be used as a capacitive touch sensor. In this configuration, one or more connections would be made to the FSM, and the sensor could alternately switch between a capacitive sensing mode and a force sensing mode. This would effectively turn the FSM into a self-capacitive sensor, which would be good for detecting hover/proximity. In the capacitive sensing mode, the IFSA electrodes can be grounded/floating, allowing the capacitance of the FSM to be measured without influence from the IFSA row/column electrodes. In the force sensing mode, the FSM can be disconnected (or put into a high impedance state), and the IFSA can be scanned as usual.

In another configuration, the electrodes of the IFSA could be used to create a mutual capacitive sensor. In this case, the same sensor could be used for both capacitive and resistive sensing. This approach would enable light touch and hover/proximity sensing via the capacitive scan mode, and more accurate, higher pressure force sensing via the resistive IFSA scan mode. The main challenge in this configuration is that the FSM could block some of the electric field. To avoid this, the FSM could be designed to be transparent to some portion of the capacitive field of the sensor. Alternatively, in a shunt-mode IFSA, the entire sensor could be flipped upside down, so that the side with the electrodes becomes the side closer to the user, thus avoiding the problem altogether.

Another difficulty with using the electrodes for both capacitive and resistive sensing is that the interpolating resistors could interfere with capacitive measurements. To avoid this problem, the present invention can replace the interpolating resistors with inductive components (such as ferrite chip inductors). At low frequencies (force sensing scan) these would act as resistors. At high frequencies (capacitive scan) these would increase their impedance and block the capacitive signals from passing. Another way to accomplish this would be to use small ICs instead of the resistive networks between adjacent active lines. The ICs could switch between a resistive mode, where the interpolating lines are hooked up to each other via resistors and a capacitive mode, where the interpolating lines are disconnected from each other or where each active line connects to several adjacent interpolating lines. In all of these cases, the present invention would preserve the high resolution and interpolation of the resistive scan. In the capacitive scan mode, the scan resolution would reduce back down to the active line resolution. Another challenge with this approach is that the presence of the FSM could interfere with capacitive scanning. Luckily, when users are not touching or touching only lightly, the resistance of the FSM is high. Thus, the capacitive scan mode would be minimally affected. Furthermore, the present invention could switch between resistive and capacitive scan modes in different areas of the sensor. In areas where no touch is detected, the scan could switch to capacitive mode. In areas where a touch is detected, the scan mode could switch to resistive.

In the case where it is desired to combine capacitive touch, IFSA, and a display, a display can also be placed in between a transparent capacitive touch sensor and a non-transparent IFSA sensor, creating a touch display with both the hover and light touch capability of capacitive touch and the precision and force sensitivity of IFSA.

Other configurations using transparent IFSAs are possible, where both the capacitive sensor and the IFSA sensor (or a sensor combining both elements) are placed on top of the display.

Magnetic/Electromagnetic Sensing

Because IFSA sensors are transparent to magnetic fields, it is possible to place an electromagnetic sensor such as an electromagnetic resonance (EMR) sensor (often used for stylus tracking) below the IFSA sensor and sense through it. It is also possible to place RFID/NFC reader/writer coils below the sensor, since RFID/NFC works in a similar way by sending electromagnetic pulses to an RFID/NFC tag/transceiver. Because magnetic fields can be used to transmit power, it is also possible to use coils below an IFSA sensor to transmit power to a nearby device. In fact, all of these technologies (EMR, RFID, NFC, and wireless power) can be combined since they all use one or more conductive coils to generate a magnetic field. In the remainder of this section, the present invention will refer to technology that enables EMR/RFID/NFC sensing as just EMR sensing.

By combining EMR sensing with IFSA, it becomes possible not only to detect the location and force of objects on top of the sensor, it also becomes possible to uniquely identify objects which have an EMR/RFID/NFC tag/transceiver. It also becomes possible to transfer power or data between the objects and the sensor. These objects can include things like keyboards, computer mice, buttons, sliders, knobs, styli, and even mobile phones and tablets. By placing multiple EMR/RFID/NFC transceivers into these objects, it becomes possible to sense not just the position but also the orientation of the objects (for example, with a stylus, if a transceiver is put into both the tip and eraser sides, it is possible to tell whether the user is writing or erasing).

Also, it is possible to combine the information from the IFSA sensor and the EMR sensor to extract additional information. In the case of a stylus, for example, by comparing the position of the stylus touch and the position of the EMR transmitter, it is possible to determine the tilt angle of the stylus. It may also be possible to combine the signal of an EMR sensor and an IFSA sensor to improve overall accuracy and/or performance. This is possible because the EMR sensor may have better "relative" tracking performance (in other words, it may be better at measuring a small change in position), while the IFSA sensor may have better "absolute" tracking performance (in other words, it may have a more accurate estimate of an object's position, but may not be able to accurately measure very small movements). This is because EMR sensors can be affected by the presence of ferrous objects and external magnetic fields, which typically do not affect IFSA sensors.

Because an EMR sensor is typically manufactured on a PCB layer, it is possible to combine the bottom PCB used for an IFSA sensor with the PCB used for the EMR sensor, creating a 3-4 layer PCB with both functionalities. Another way to combine an IFSA sensor with an EMR sensor is to pattern one portion of the EMR sensor (containing row or column magnetic coils) on one unused side of the IFSA sensor and to pattern the other portion of the EMR sensor on the other unused side of the IFSA sensor. This is most conveniently done on a thru-mode IFSA sensor, where both the top and bottom substrate have one unused side.

The sensor combination with IFSA and EMR can also be placed below a display to create a touch-screen with the added capabilities allowed by an EMR sensor since both EMR signals and IFSA signals are not blocked by a display.

Alternatively, it is possible to place a transparent IFSA sensor on top of a display while placing an EMR sensor below the display.

Optical Sensing

Optical sensing technologies have been demonstrated that can track fingers or objects optically. Some of these technologies work by shooting light beams across the surface and detecting when one or more of the beams is interrupted. Others use an array of emitters and receivers and detect light that bounces off of a user. This type of sensor can even be integrated into a display such as an OLED or LCD display. Other technologies use a camera to see the location of user's hands. Also, various ingenious designs have been shown that can compress the optical path of these types of sensors into thin films and even display backlights.

The IFSA sensing technology can be integrated with many of these optical sensing technologies either by placing the IFSA below the optical sensor or by placing a transparent IFSA on top of the optical sensor. Some of the optical sensing technologies described are good at sensing hover and proximity, but can not accurately detect when a touch has actually contacted a surface or the force of a touch. This can be especially true in outdoor environments, where bright sunlight can interfere with optical sensor operation. The output of the IFSA sensor and optical sensor can be combined to create a combination that is more robust and can track objects above the touch surface, accurately detect contact with the surface, and measure the force applied to the surface.

Combination of Capacitive, Electromagnetic, and Optical Sensors

All four technologies (IFSA, EMR, capacitive, and optical touch) can be combined together to get all the features of these technologies (force sensing, hover and light touch, tracking/powering of EMR/NFC/RFID transceivers) in a single sensor. As described previously, these sensors may share various layers in the stackup to reduce cost and thickness. These can also be combined with displays to create new user interfaces, hardware devices, and unique user experiences.

Characteristics and Advantages

In addition to having high accuracy, scalability to large sizes, and per-touch force sensitivity, the present invention has many other desirable characteristics. First, sensors based on the present invention are insensitive to electrical noise, thus they do not require significant electrical shielding and can operate robustly in many environments. This also reduces the amount of filtering and post processing that must be done on the signals, which reduces the complexity of the analog circuits and filtering algorithms, and reduces power consumption.

Present invention sensors provide a high dynamic range of force sensitivity from several grams to several kilograms of force per touch point. Unlike capacitive sensors, the present invention sensors can sense any object, such as a plastic stylus, and not just conductive objects such as human fingers. It can also sense the fingers of users who are wearing gloves, or who have very rough skin.

The present invention greatly simplifies the design process. The touch-separation resolution and the touch tracking resolution of the present invention sensors can be controlled separately and can easily be tuned to the demands of a particular application. A given sensor configuration can be increased or decreased in size without changing the sensor characteristics, thus a particular sensor design can be applied to a wide range of products, reducing design cost, and time to market. Furthermore, even the shape of the present invention sensors can be changed without changing the sensor performance. For example, a rectangular sensor design can be easily modified to produce round, oblong, donut, peanut shaped sensors, and any other shape that can be mapped to a two-dimensional surface. The modified sensor will have the same performance (including touch-tracking accuracy and force sensitivity) as the original rectangular sensor design.

The present invention sensors can be wrapped around non-flat surfaces, and can even be manufactured directly on the exterior surfaces of devices using a variety of different manufacturing methods. The sensors may even be incorporated into textiles and soft materials.

The present invention sensors can be manufactured with straightforward manufacturing processes which include standard rigid or standard flexible printed circuit board (PCB) manufacturing methods which usually involve a subtractive process or printed electronics (PE) methods which involve the printing of conductive inks using additive processes. One major advantage of the ability to build the sensor on a rigid or flexible PCB is that all the sensing electronics (as well as other electronics) can be directly attached to the same PCB substrate as the sensor itself using a standard process such as SMT (surface mount). The electronics can be placed on the same surface as the sensor, or can be mounted on the backside of the sensor surface. Also, some components (for example resisters) can even be embedded into the sensor substrate. Alternately, the sensor can be added to a pre-existing circuit board design that may have other functionality besides being a sensor. For example, one could take a TV remote or game controller PCB (which already has a PCB with discrete buttons), a microcontroller, transmitter, and other circuitry and add an IFSA sensor area to that same PCB with minimal design changes.

The scanning electronics do not need any exotic components and can be built either with off the shelf parts or with an application specific integrated circuit (ASIC). In many cases, the scanning electronics can be implemented with a single microcontroller and some small and inexpensive discrete components (such as resistors and capacitors).

Compared with other touch technologies, the present invention technology is inherently low power and supports many ways to reduce that power further. For example, the present invention supports multi-resolution scanning, which allows the user, or the software using the sensors, to reduce scan resolution, while at the same time increasing speed and reducing power consumption in real time. The sensor design also supports even lower power modes with reduced functionality which can detect the presence and/or rough location of a single or multiple touches without having to perform a full scan of the sensor. The present invention supports very fast frame rates for applications that require fast feedback or response, such as musical instruments.

Finally, the present invention is robust and can be designed to survive the stringent environmental requirements of consumer, military, automotive, and industrial electronics. Because it senses force rather than changes in capacitance, it can operate in the presence of water or other fluids, and can be hermetically sealed, permitting it to function underwater and in the most hostile environments.

Exemplary Application Contexts

The sensors presented in the present invention can be used for many different applications. These applications fall into categories which include general purpose multi-touch input, replacing simpler discrete controls such as buttons or sliders, and measuring pressure distributions. In the first category are applications such as phone, tablet, laptop, and display touch panels and also writing pads, digitizers, signature pads, track pads, and game controllers. In the second category are applications in toys, musical instruments (such as electric pianos, drums, guitars, and keyboards), digital cameras, hand tools, and replacing dashboard controls on automobiles and other vehicles. In the third category are applications in scientific/industrial measurement (such as measuring the shape or flatness of a surface), medical measurement (such as measuring the pressure distribution of a person's feet or their movement in a bed), and robotics applications (such as coating a robot with sensors to give it the ability to feel touch and contact).

Furthermore, there are many other applications beyond the ones that are listed, and many applications may use the sensors in different modalities. For example, in some applications a sensor could be used as a general purpose input, a set of simple controls such as buttons or sliders, and as an area pressure sensor. These different uses could be simultaneous, could be separated in time, or could be separated in space (different areas of the sensor behave in different ways). More importantly, the different uses of the sensor can all be enabled in software, giving the designer/developer an incredible level of flexibility in the way that they use the sensor.

In user interface applications, the present invention sensors are extremely useful because they can distinguish between a light touch and a press. In direct manipulation interfaces such as smart phones or tablets, light touch is often used by users when they are moving their fingers from one area to another, scrolling, sliding, or want more information about an on-screen item. Heavy touch can be used for dragging, selection, activation, and engagement of a control. Furthermore, different levels of heavy touch can be used to modulate the strength/amplitude of an interaction. In indirect manipulation applications such as track pads, writing pads, and digitizer pads, light touch can be used for moving a cursor onscreen and hovering over an item to get more information, while heavy touch can be used (as a clutch) for dragging, selection, activation, or manipulation. Finally, pressure can be used to gauge user intent. For example, in applications where physical controls are simulated such as buttons, sliders, and knobs (for example, when emulating a keyboard, a recording mixer, or a generic control panel), the controls can ignore light touch in order to allow the user to comfortably rest their hands on the interface without accidentally activating anything.

Because of the high accuracy of the present invention sensors, they can be used to capture fine motion. This is very important in applications such as tracking a stylus with high precision to enable writing, drawing, sketching, painting, calligraphy, and other interactions involving a stylus. A soft layer can be added above or below the sensor to create a nicer surface feel and to further improve tracking accuracy. The present invention sensors can be combined with displays. This can be done either by creating a transparent sensor and layering it on top of the display, by incorporating the technology into the substrate of the display itself, or by layering the sensor behind the display and feeling force through the display. This works especially well with flexible displays.

The present invention sensor can also be combined with other sensing technologies. For example, a capacitive touch sensor can be placed on top of the present invention sensor to enable the detection of hover above the surface and extremely light touch.

Because the present invention sensor is transparent to magnetic fields, a magnetic/electromagnetic sensor, such as an EMR sensor, can be placed below the present invention sensor to enable the detection/tracking of styli or other devices with active or passive magnetic/electromagnetic tags. A display can also be layered into any of these stack-ups. The combination of these different sensor technologies can enable richer interactions.

Because the present invention sensors feel pressure, and pressure is easily transferred through most deformable surfaces, the present invention sensors can also be embedded below a variety of deformable surfaces. For example, they can be embedded underneath flexible/deformable floors, under flexible robot skin, or under paint on a wall. They can be embedded into the surfaces of tables, or onto mats that lay on top of tables.

The present invention sensors can also be used to add sensing to unused surfaces. For example, they can be placed on the back of a phone, tablet, or game controller to allow extra degrees of interaction by touching the back of the device.

Visual feedback on the screen can be used to give the users a sense of where and how hard they are touching.

Sensors can also be placed on the back of a digital watch or other small devices, where space for a user-interface device is extremely limited, thereby increasing the available touch-area without increasing the size of the device.

The present invention sensor can be manufactured on a flexible substrate, allowing them to be embedded into flexible devices.

Some example applications include creating a flexible phone or a flexible tablet, using the sensor in the wristband of a digital watch or bracelet, and putting the sensor into the sole of a shoe or sneaker or into clothing to track a user's motions, detect impacts or provide a portable user-interface.

The present invention sensors can also be designed such that they can be cut or folded to wrap around complex surfaces such as a robot fingertip. Or, they can be directly manufactured onto complex surfaces. In short, almost any surface can be imbued with touch sensitivity by layering one of the present invention sensors on, behind, or inside of it.

Exemplary Tablet Interface Embodiment (6500)-(8000)

Tablet Form Factor Overview (6500)-(7600)

Figure 65:
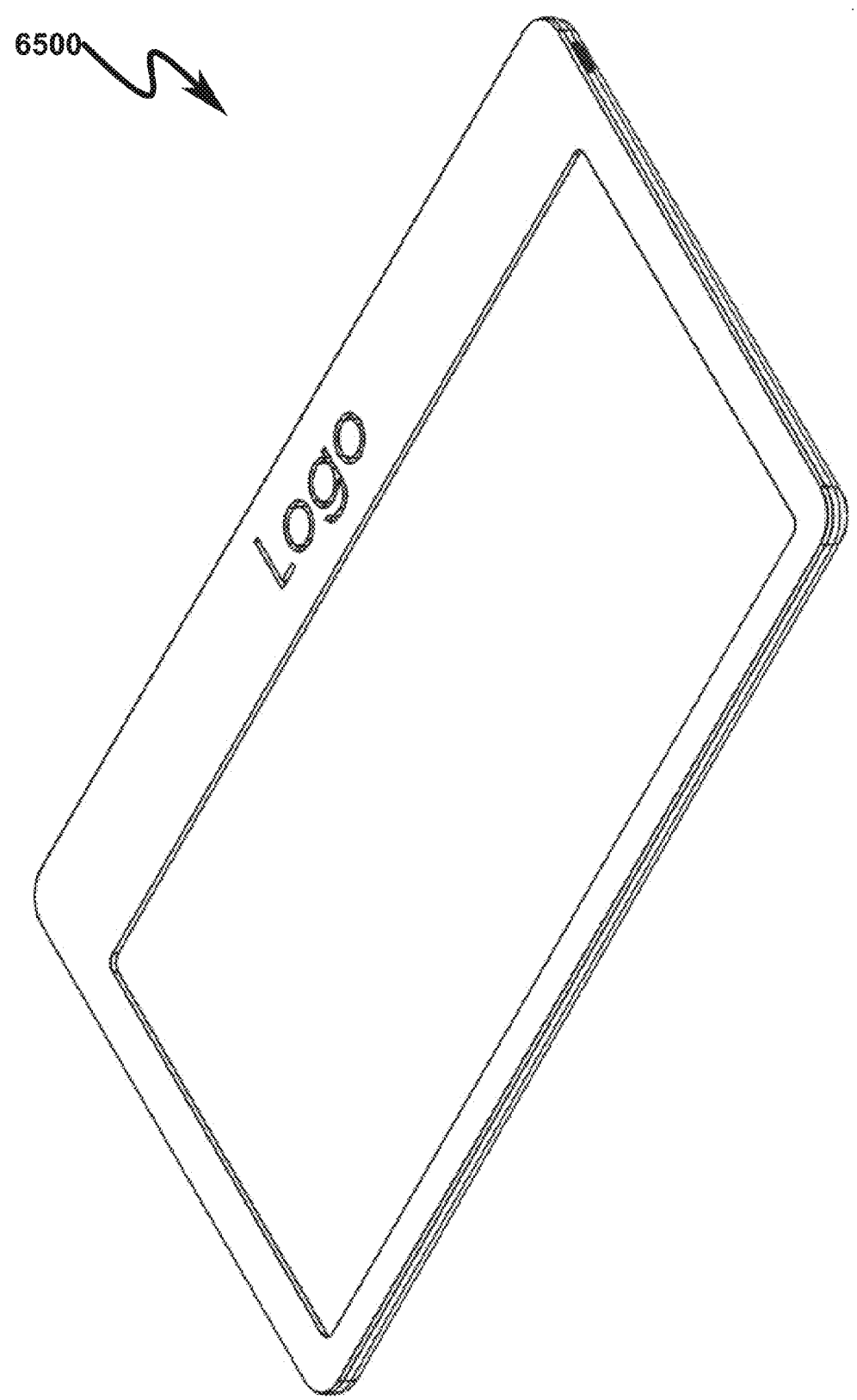
FIG. 65 illustrates a top right front perspective view of a preferred exemplary invention embodiment as applied to a tablet form factor interface application context.

While the present invention may be embodied in a wide variety of forms based on application context, one preferred exemplary invention embodiment as applied to a tablet form factor. This user interface context is generally depicted in the views of FIG. 65 (6500)-FIG. 76 (7600). Here the tablet user interface (assembled in FIG. 65 (6500) and depicted in the assembly view of FIG. 66 (6600)) is comprised of a tablet base (FIG. 67 (6700)) that supports a printed circuit board (PCB) (including the VIA and associated control electronics) (FIG. 68 (6800)-FIG. 69 (6900)), pressure membrane (FIG. 70 (7000)), overlay (FIG. 71 (7100)), and covering bezel (FIG. 72 (7200)) with backlit LOGO indicia.

Figure 66:
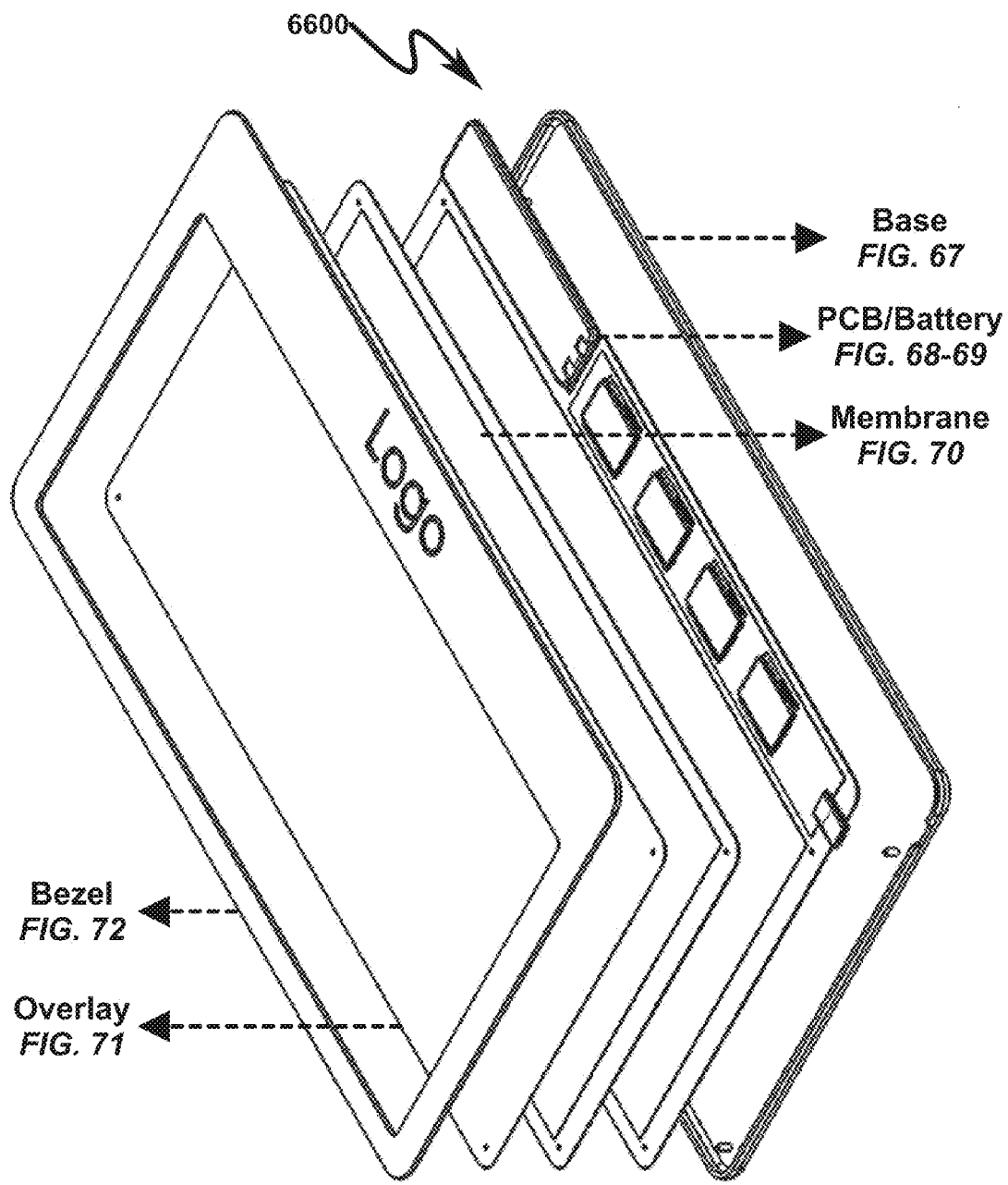
FIG. 66 illustrates a top right rear perspective assembly view of a preferred exemplary invention embodiment as applied to a tablet interface application context.

This exemplary embodiment of the invention as depicted in FIG. 65 (6500)-FIG. 66 (6600) is designed to target applications in desktops/laptops or tablet user interfaces. For desktop/laptop use, it will typically be used by connecting it to a computer via the USB port. For tablet use, it will typically be charged and/or configured via the USB port, but transmit data via Bluetooth/Bluetooth LE. The device may be designed to magnetically latch to a tablet/tablet cover, and could have interchangeable and possibly back-lit overlays.

Assembly View (6600)

Figure 67:
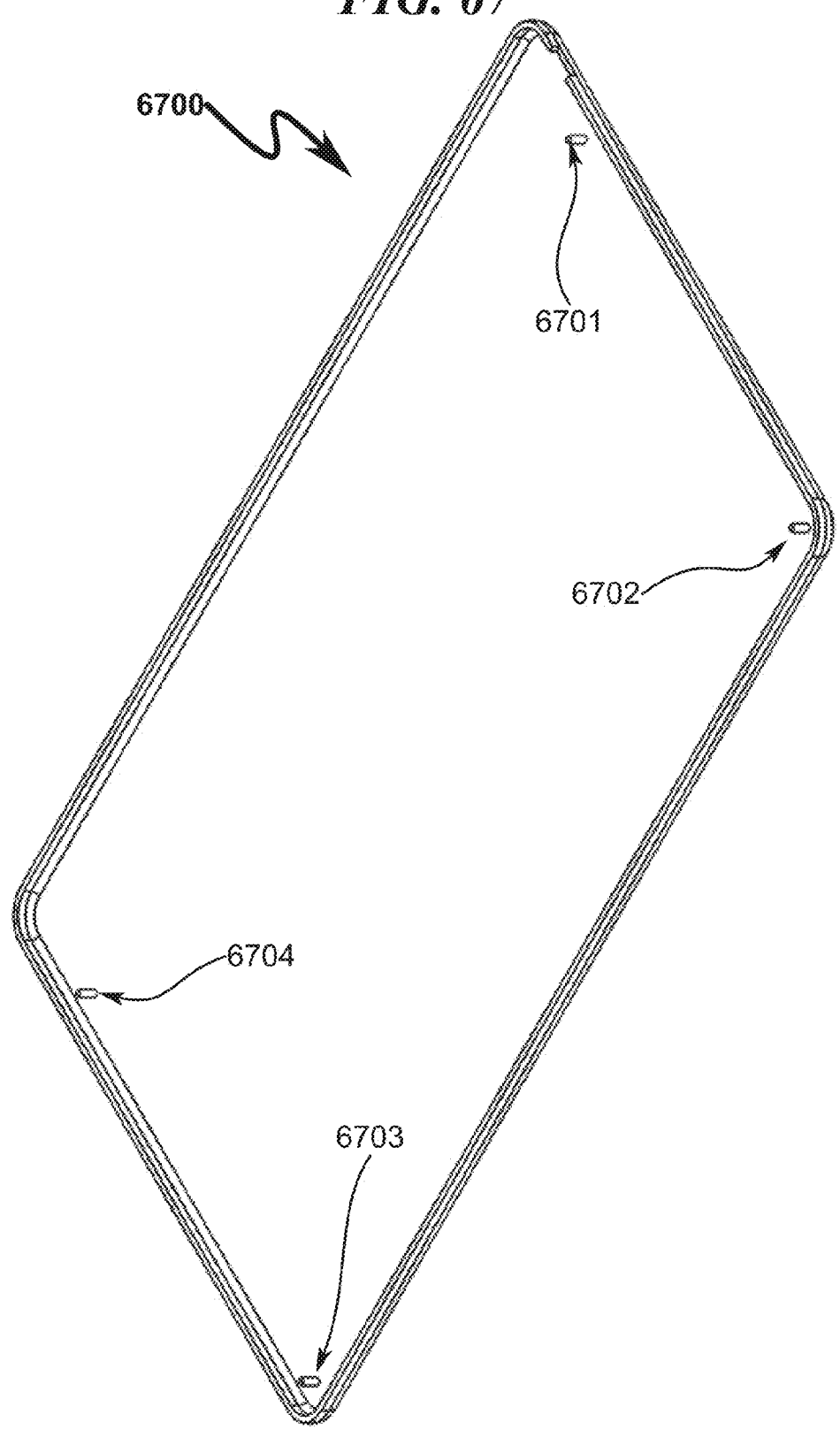
FIG. 67 illustrates a top right front perspective view of a base component of a preferred exemplary invention embodiment as applied to a tablet interface application context.
Figure 68:
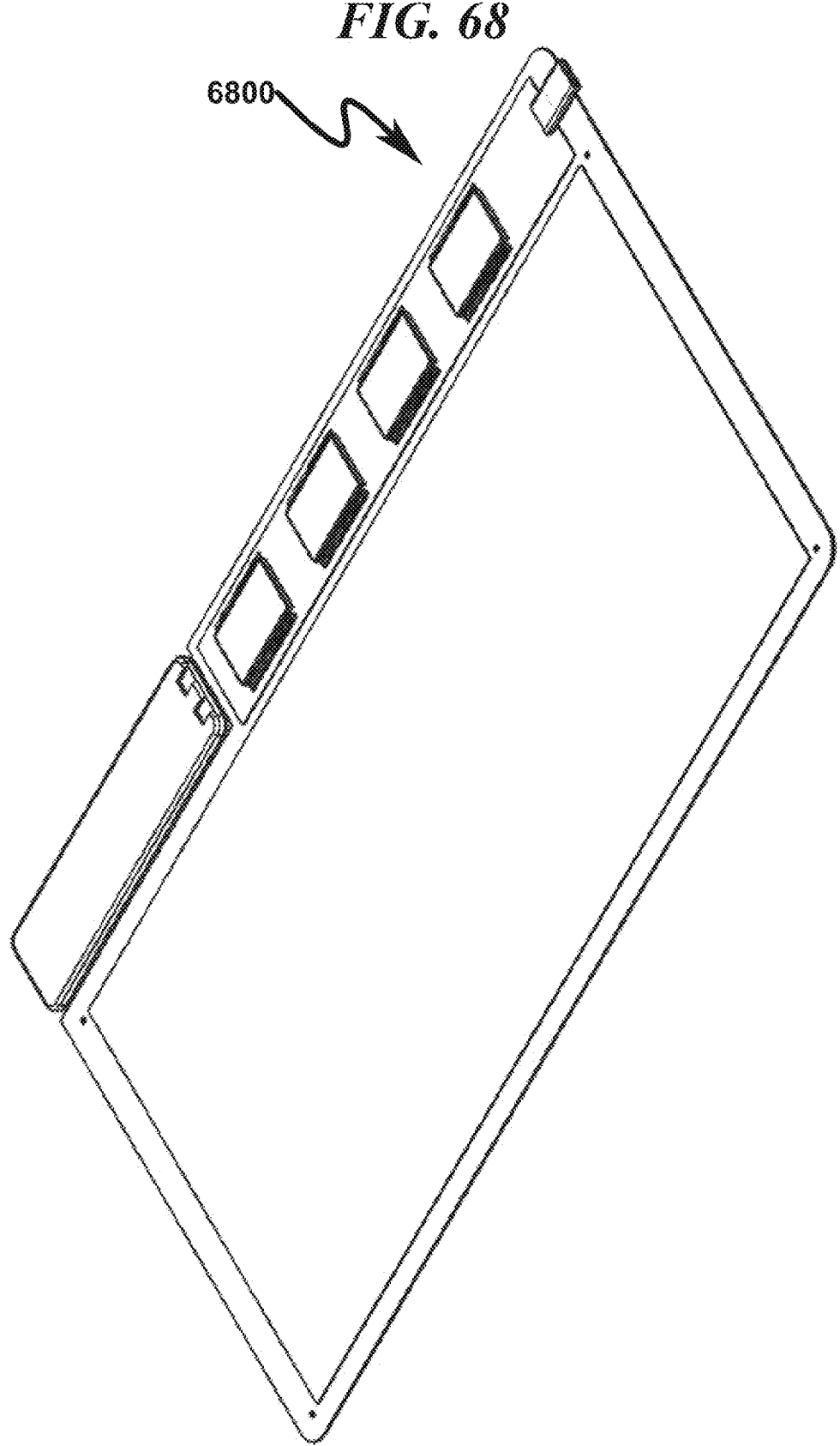
FIG. 68 illustrates a top right front perspective view of a PCB/battery component of a preferred exemplary invention embodiment as applied to a tablet interface application context.
Figure 69:
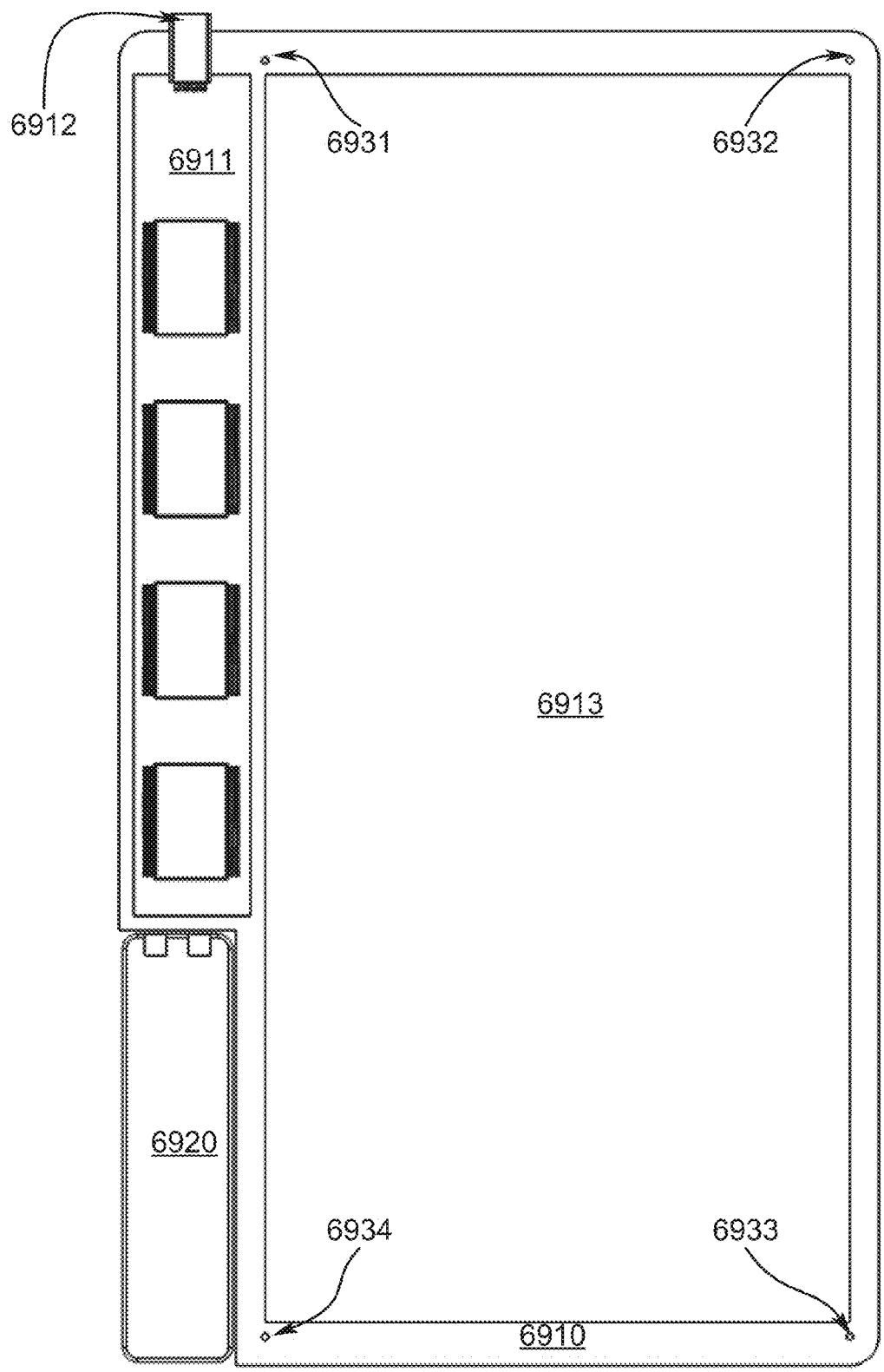
FIG. 69 illustrates a top view of a PCB/battery component of a preferred exemplary invention embodiment as applied to a tablet interface application context.
Figure 70:
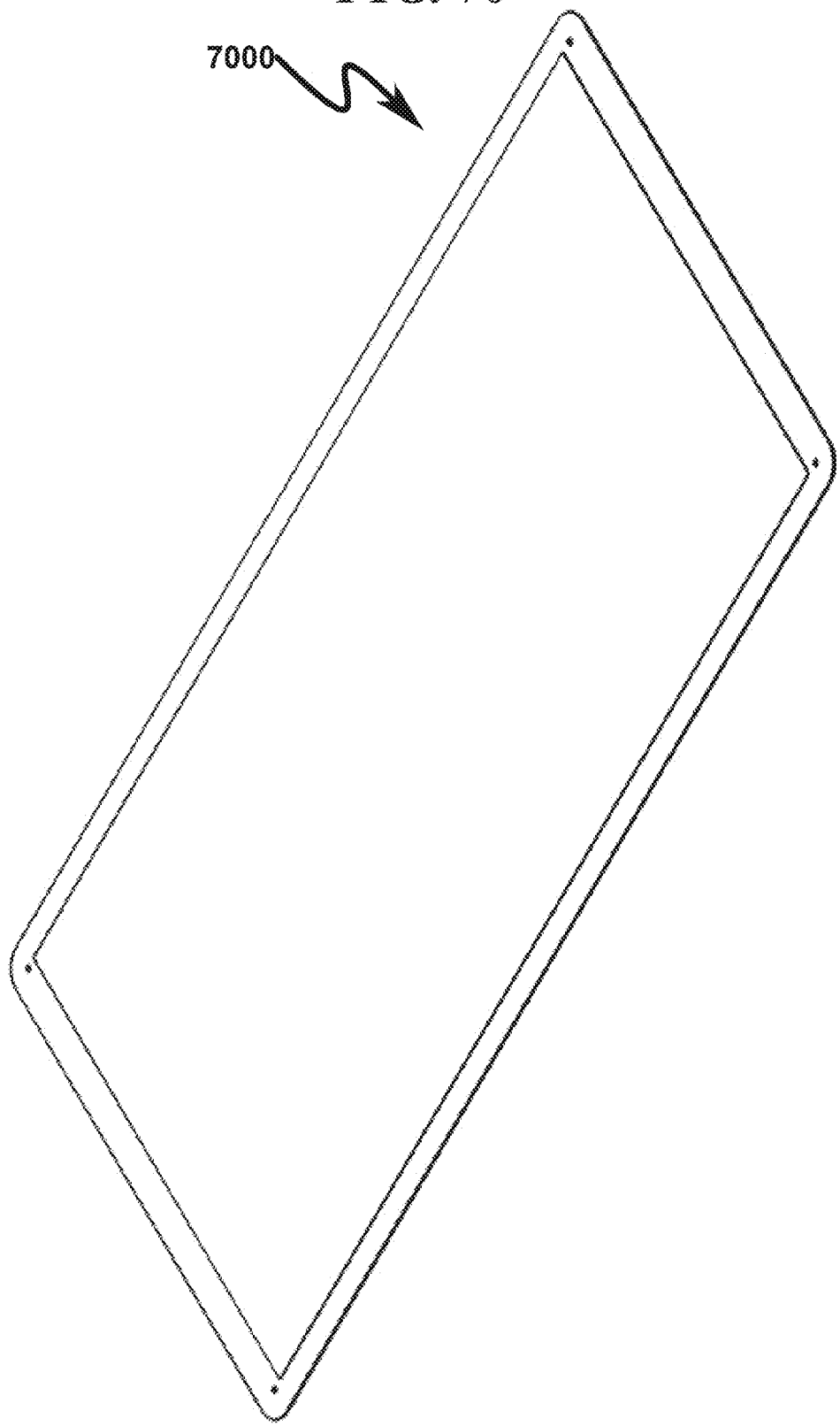
FIG. 70 illustrates a top right front perspective view of a pressure membrane component of a preferred exemplary invention embodiment as applied to a tablet interface application context.
Figure 71:
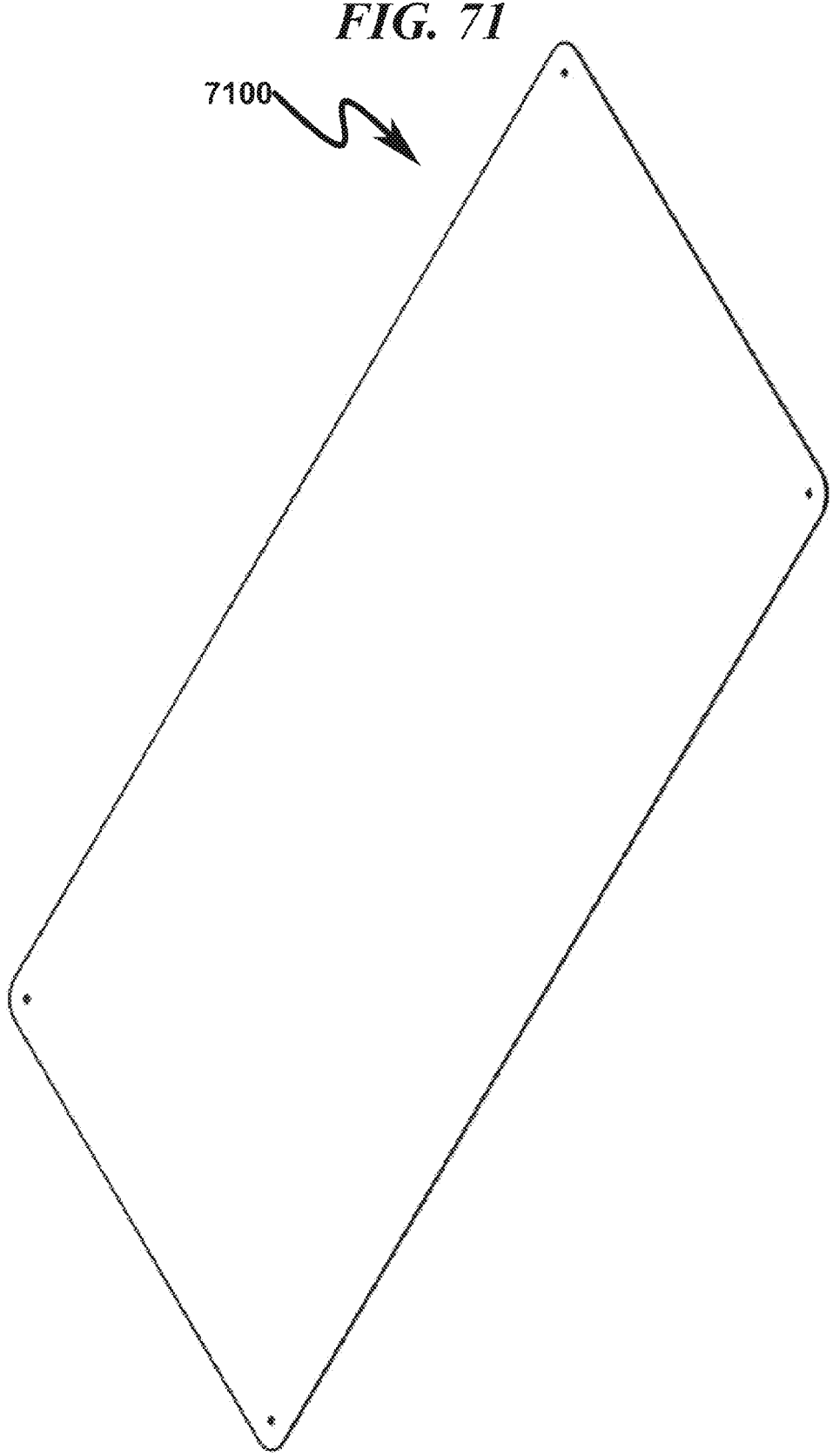
FIG. 71 illustrates a top right front perspective view of an overlay component of a preferred exemplary invention embodiment as applied to a tablet interface application context.
Figure 72:
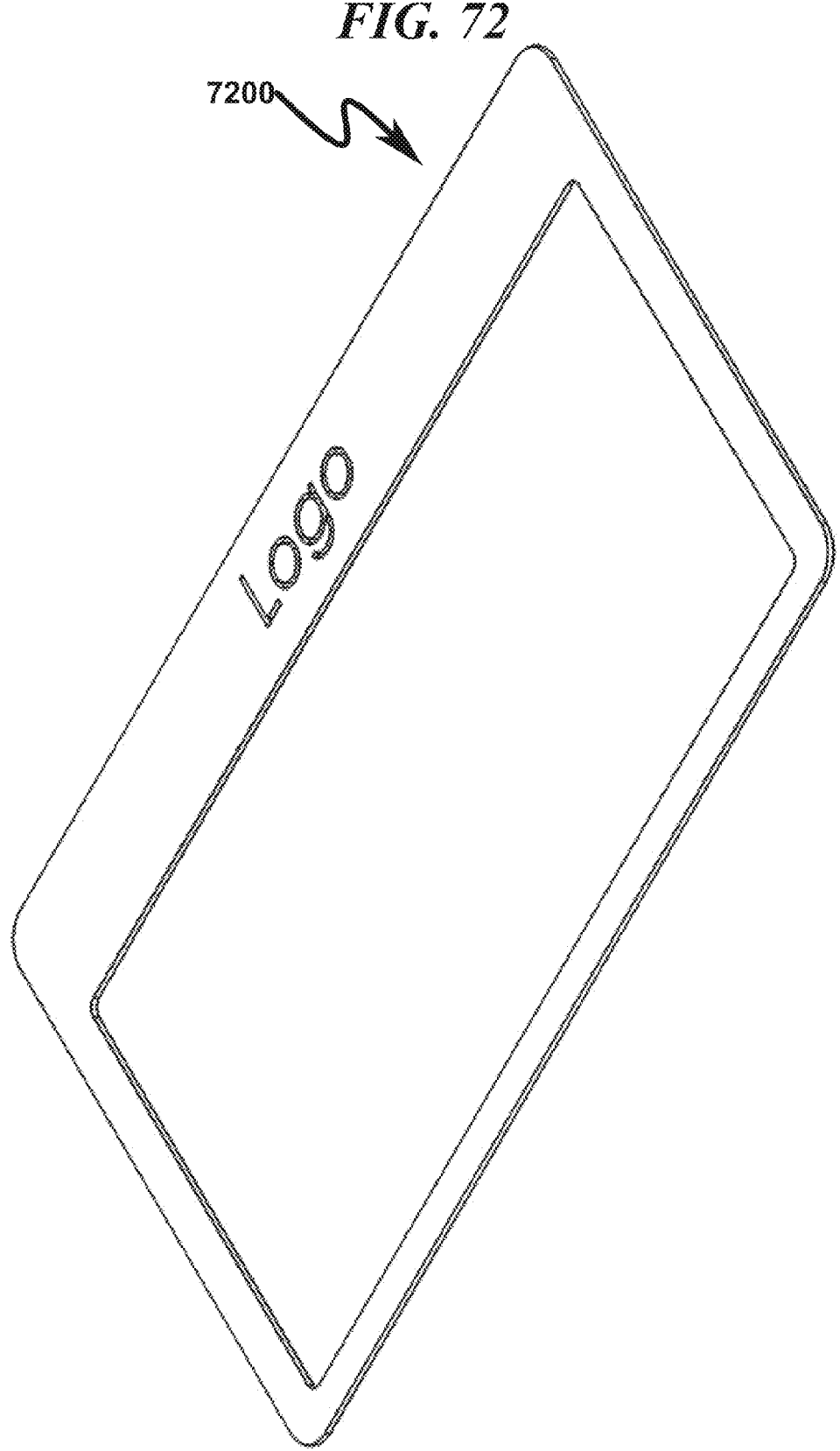
FIG. 72 illustrates a top right front perspective view of a bezel component of a preferred exemplary invention embodiment as applied to a tablet interface application context.

As generally depicted in FIG. 66 (6600), the assembly stack for this preferred exemplary embodiment incorporates a base (FIG. 67 (6700)), PCB/battery (FIG. 68 (6800)-FIG. 69 (6900)), membrane (FIG. 70 (7000)), overlay (FIG. 71 (7100)), and bezel (FIG. 72 (7200)).

Base (6700)

As generally depicted in FIG. 67 (6700), the base for this preferred exemplary embodiment will preferably be made of a rigid material such as aluminum, with alignment pins (6701, 6702, 6703, 6704) utilized to help align the layer stack comprising the tablet system.

PCB/Battery (6800)-(6900)

As generally depicted in FIG. 68 (6800)-FIG. 69 (6900), the PCB (6910)/Battery (6920) layer includes the following:
  Area (6911) for microcontroller, analog sensing circuits, power/battery management, BLUETOOTH® radio, USB TX/RX, and other electronics;
  Micro-USB connector (6912);
  Sensor active-area (6913);
  Battery (Li-Poly or similar power source) (6920); and
  Alignment holes (×4) (6931, 6932, 6933, 6934).

Force Sensing Membrane (7000)

As generally depicted in FIG. 70 (7000), the force sensing membrane layer includes the following:
  Substrate (such as PET or KAPTON®);
  Force-sensing material such as FSR on the underside of the substrate; and
  Alignment holes (×4).

Overlay (7100)

As generally depicted in FIG. 71 (7100), the overlay may be pliable, with a slippery upper surface. It is anticipated that overlays may be swappable, with different graphics, or tactile relief patterns. Overlays are also anticipated in some configurations to be back-lit or side-lit.

Bezel (7200)

As generally depicted in FIG. 72 (7200), the covering bezel may include the following:
  Graphic/logo, which can be a light-pipe, and may be back-lit with constant or changing illumination patterns;
  Opening for the overlay; and
  Opening for a USB port or other communication interface.

Mechanical Properties (7300)-(7600)

Figure 73:
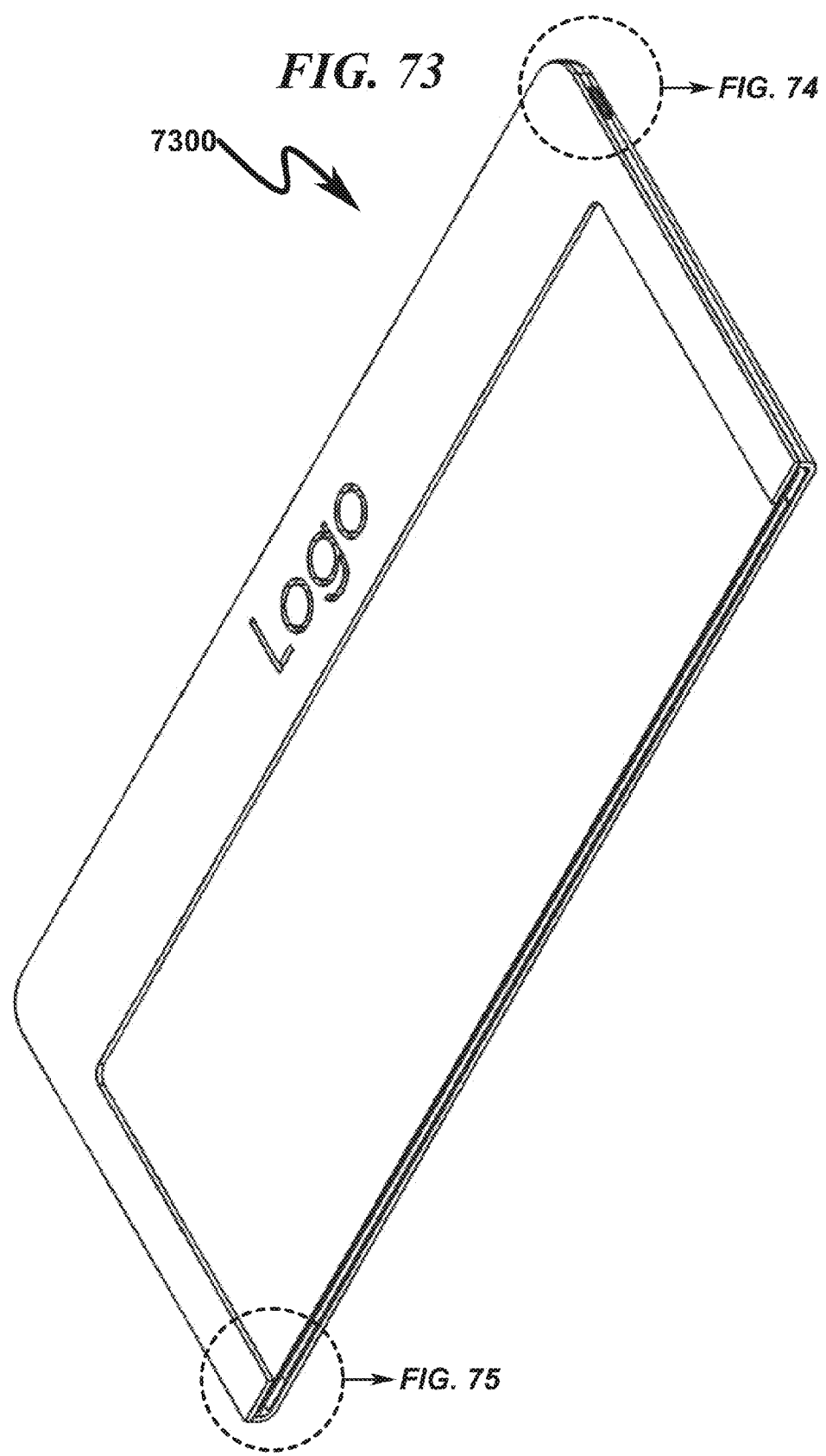
FIG. 73 illustrates a front cross section view of a preferred exemplary invention embodiment as applied to a tablet interface application context.
Figure 74:
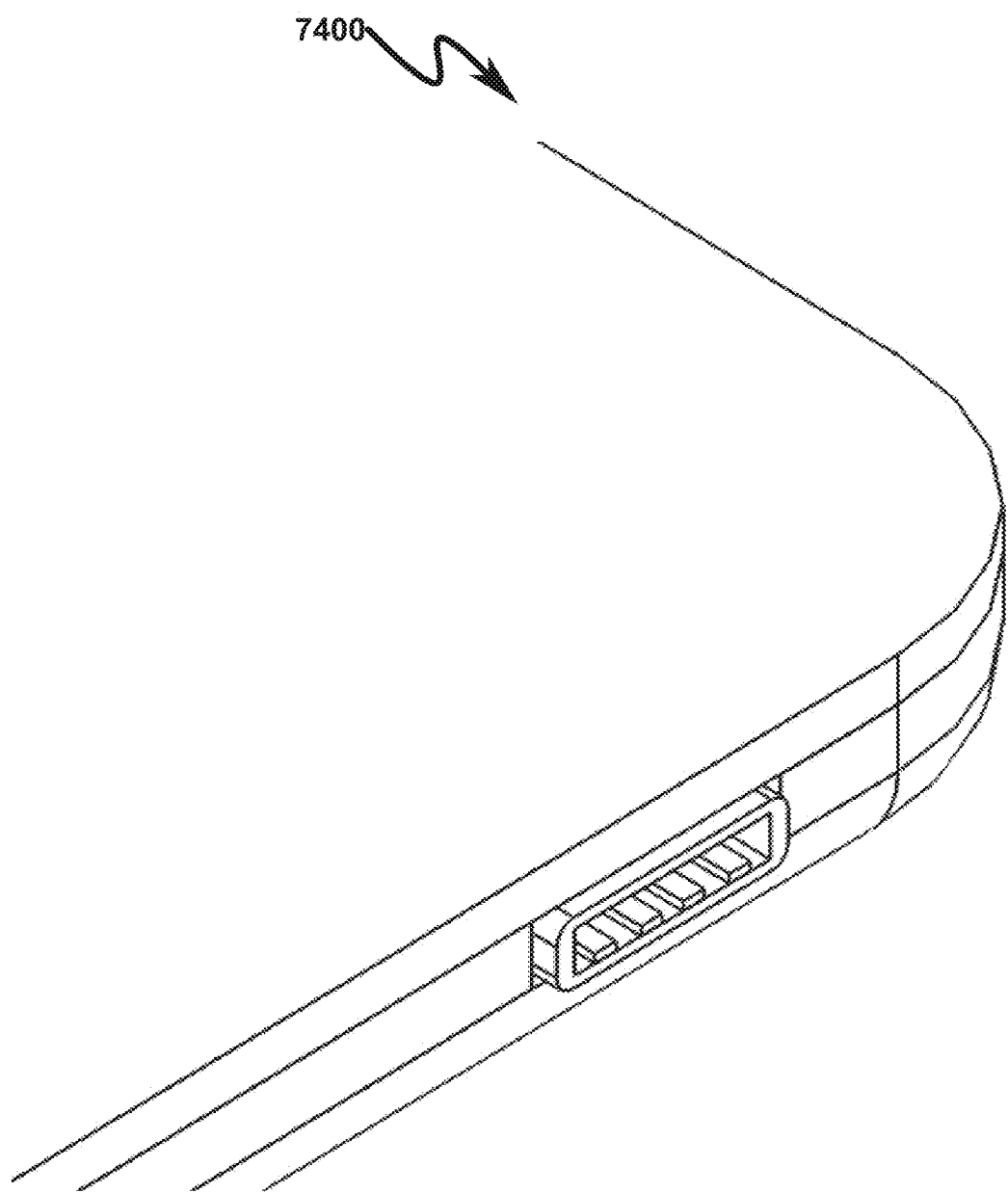
FIG. 74 illustrates a detail perspective view of a USB connector in a preferred exemplary invention embodiment as applied to a tablet interface application context.
Figure 75:
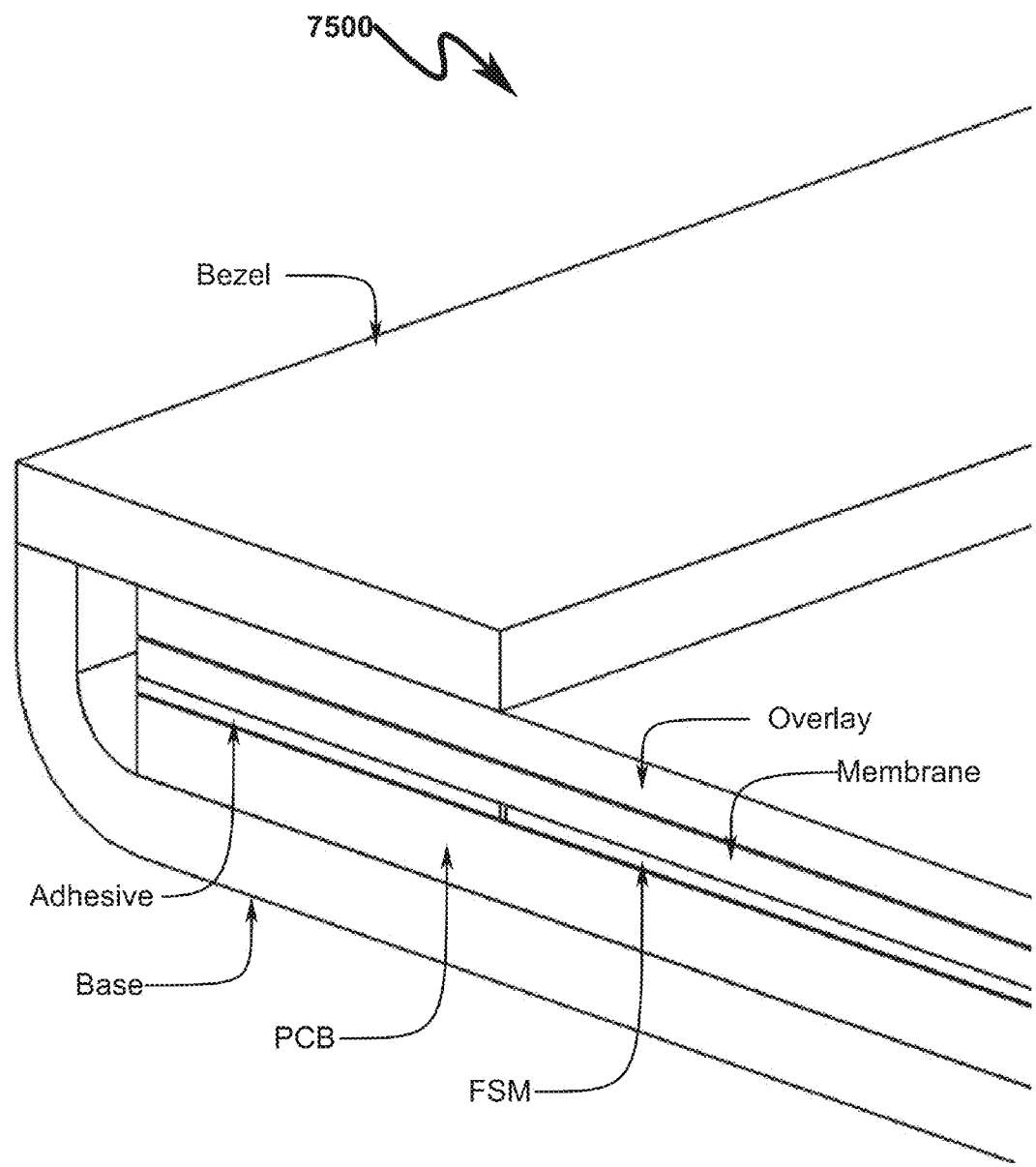
FIG. 75 illustrates a detail perspective side cross section view in a preferred exemplary invention embodiment as applied to a tablet interface application context.
Figure 76:
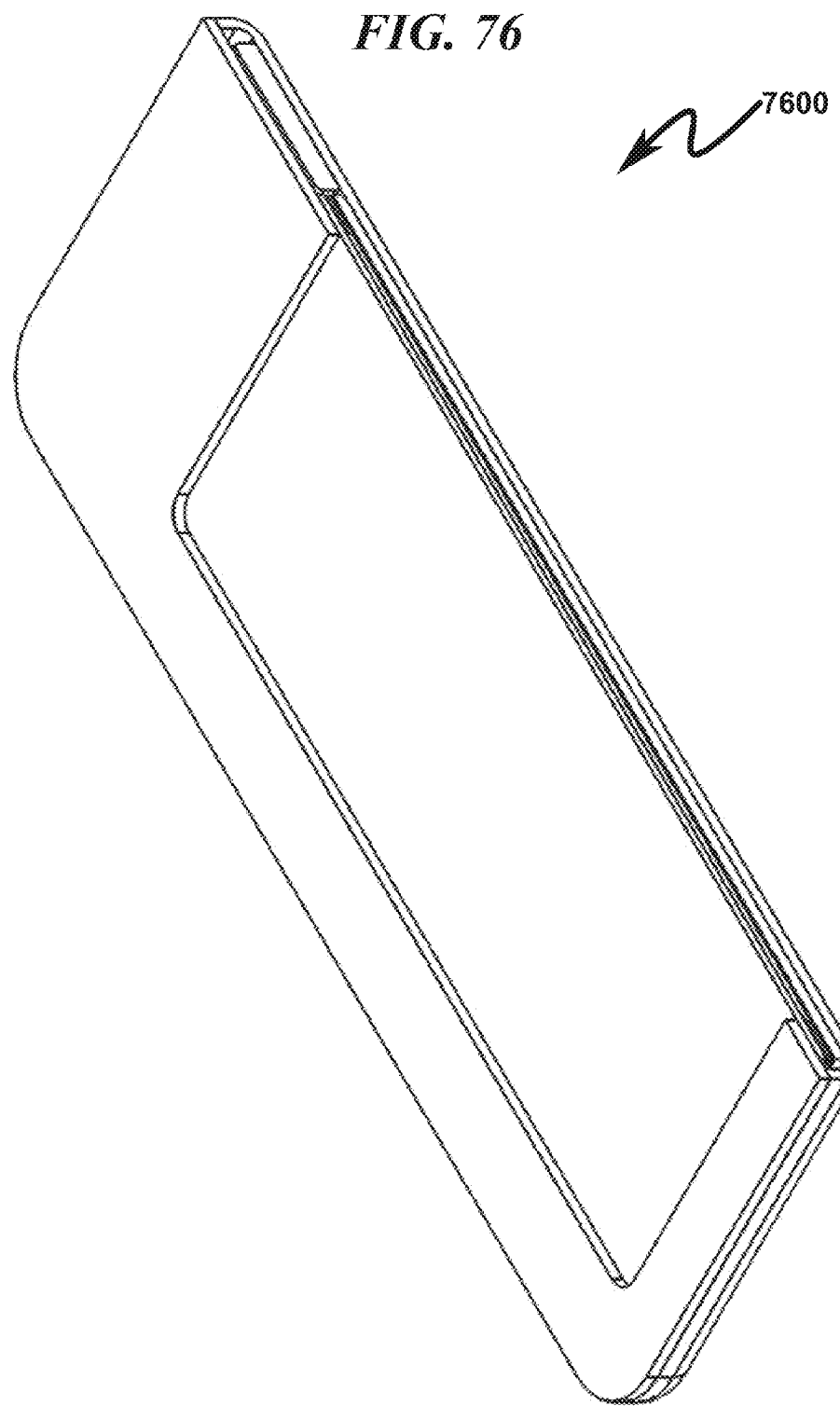
FIG. 76 illustrates a side cross section view of a preferred exemplary invention embodiment as applied to a tablet interface application context.

As generally depicted in the sectional and detail views of FIG. 73 (7300)-FIG. 76 (7600), while mechanical construction may vary widely, it is anticipated that some preferred invention embodiments may be configured to a thickness of approximately 4.25 mm. The reduced complexity of the electronics needed to monitor the VIA results in a reduced area required for electrical components and battery capacity and as such may result in some configurations being significantly thinner than competing technologies.

The device may be held together by clasps between base and bezel and thin adhesive layers between base and PCB, PCB and membrane, and membrane and bezel. The overlay may be configured to simply drop in or may have some means of coupling to the base cavity, which may include magnets or clasps.

Exemplary Touch Pad Schematic/Layout (7700)-(8000)

Figure 77:
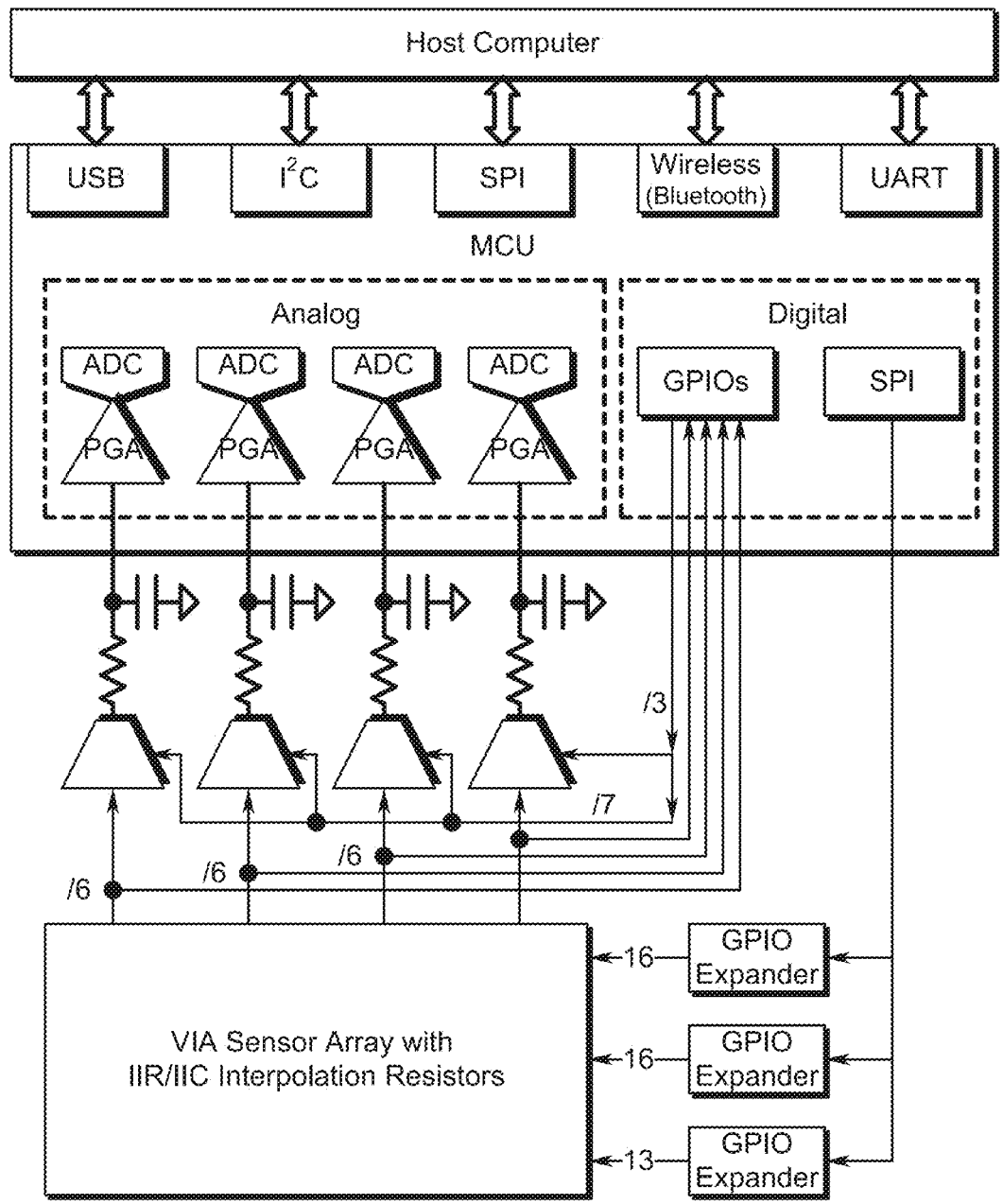
FIG. 77 illustrates an exemplary system block diagram schematic for a pressure sensitive touch pad embodiment of the present invention.
Figure 78:
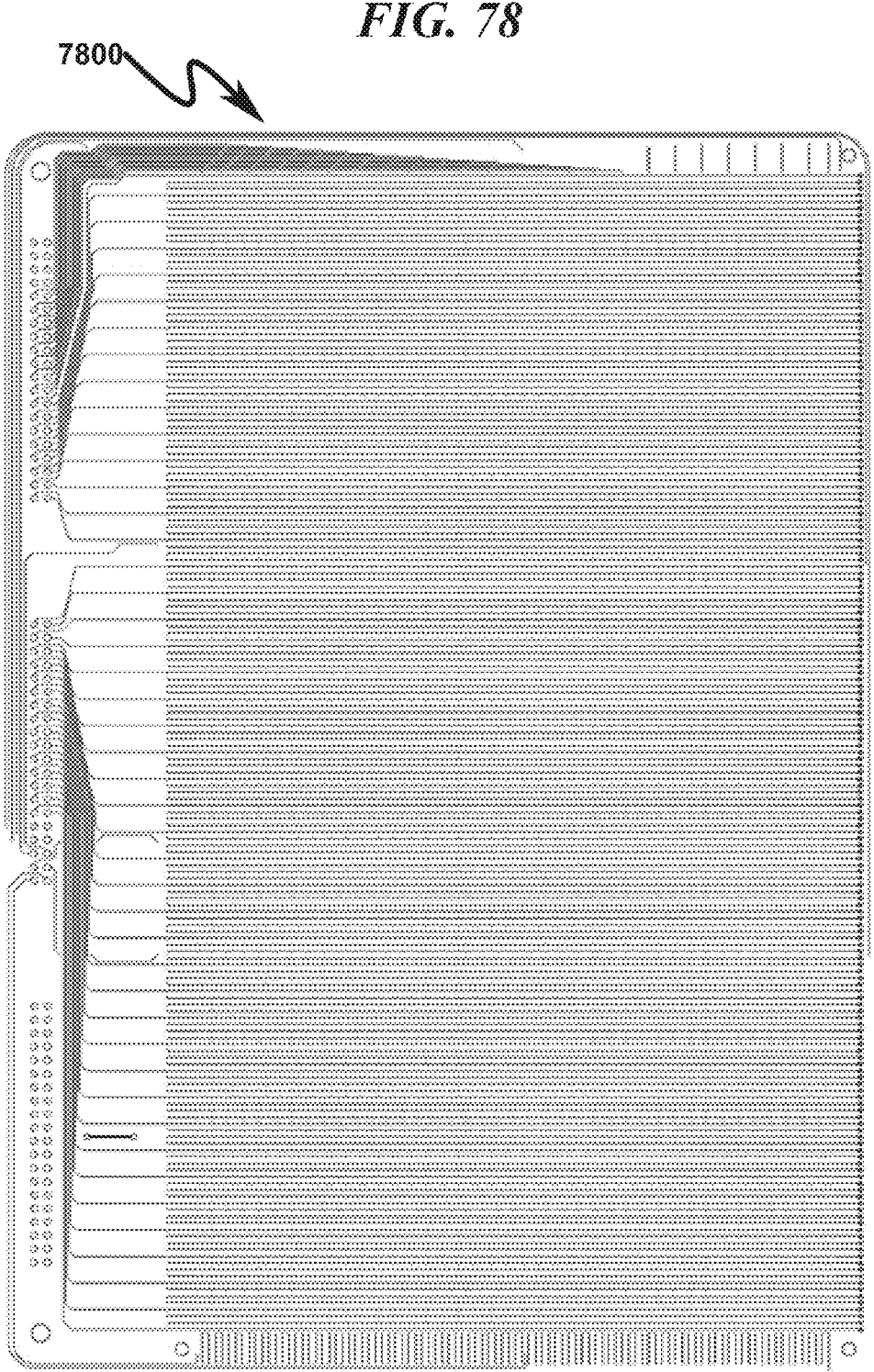
FIG. 78 illustrates an exemplary top copper layout for a pressure sensitive touch pad embodiment of the present invention.
Figure 79:
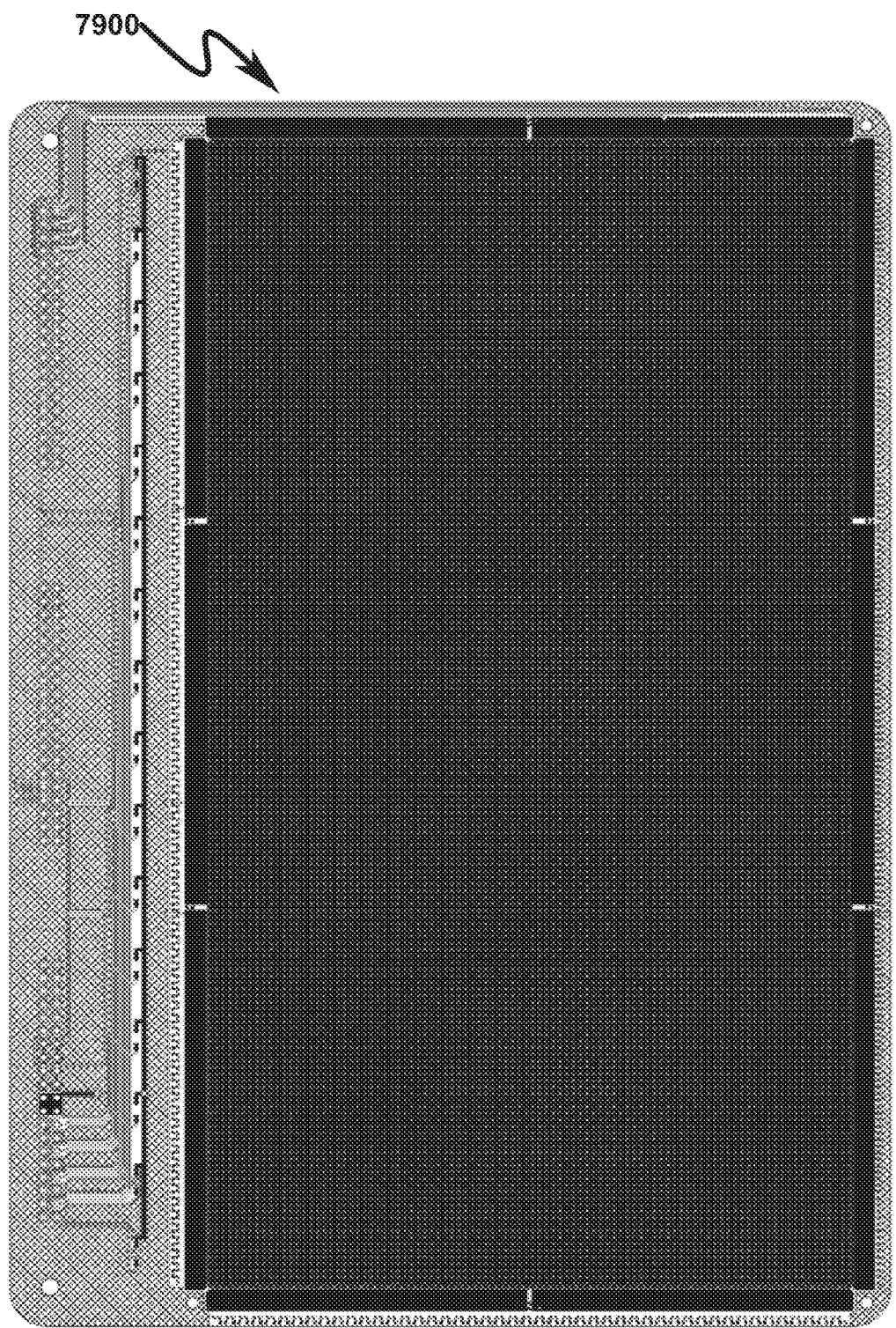
FIG. 79 illustrates an exemplary bottom copper layout for a pressure sensitive touch pad embodiment of the present invention.
Figure 80:
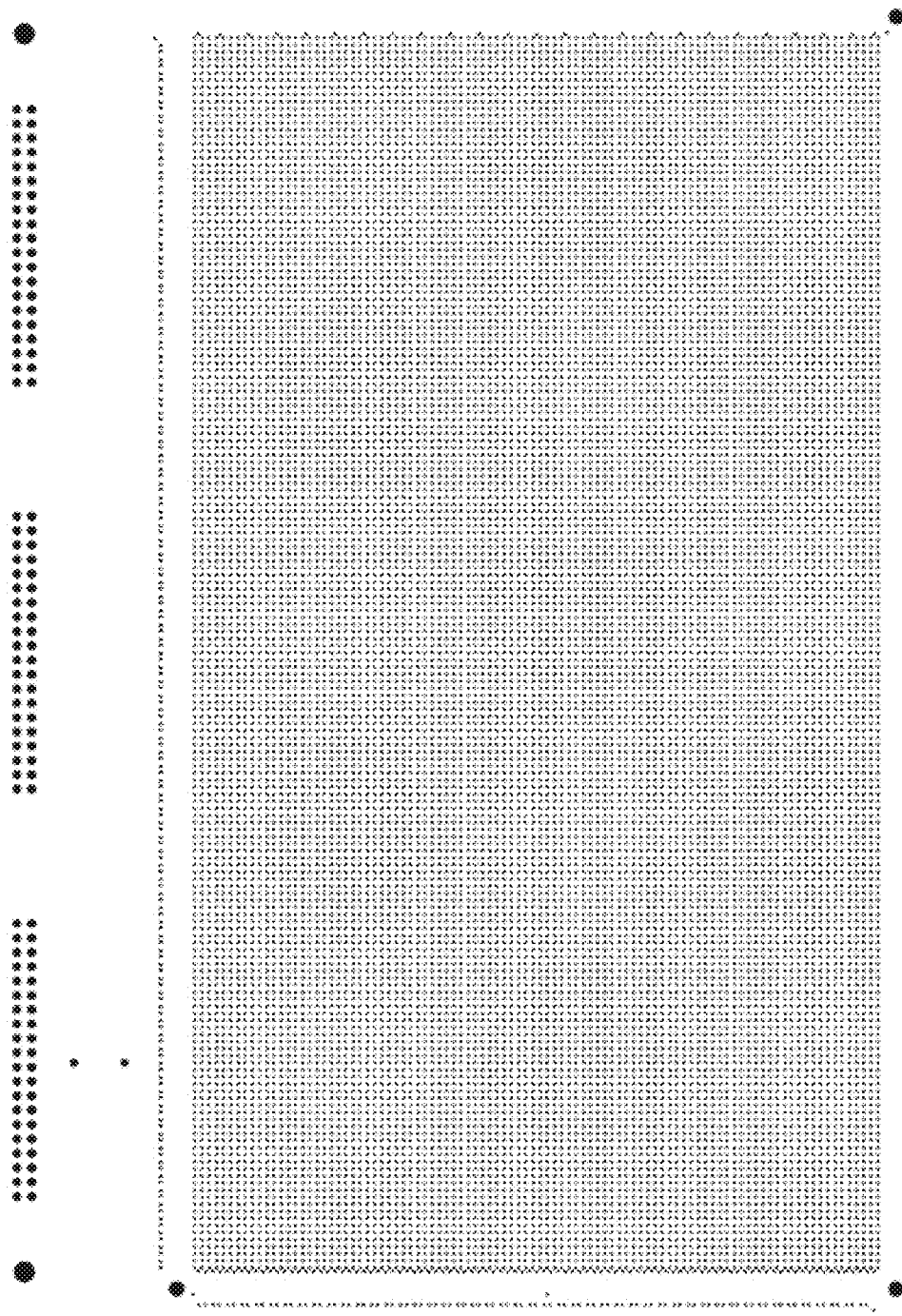
FIG. 80 illustrates an exemplary via layout for a pressure sensitive touch pad embodiment of the present invention.

The exemplary construction application context as generally illustrated in FIG. 65 (6500)-FIG. 76 (7600) may be implemented using a microcontroller and PCB as generally depicted in the schematic block diagram of FIG. 77 (7700) and PCB layout of FIG. 78 (7800) (top copper), FIG. 79 (7900) (bottom copper), and FIG. 80 (8000) (via pads). This layout generally depicts a typical VIA array that is mated with a pressure sensitive material and embedded in the tablet form factor as generally illustrated by FIG. 65 (6500)-FIG. 76 (7600). The schematic depicted in FIG. 77 (7700) makes use of conventional microcontroller technology with integrated host computer communications (USB, I2C, SPI, wireless (BLUETOOTH®, BLUETOOTH LE®, other 2.4 GHz interface, etc.), UART), ADC inputs, general purpose digital I/O (GPIOs) in conjunction with GPIO expanders and multiplexers to implement the column drivers and row sense circuitry depicted in this document.

Capacitive Interpolation Sensor (8100)-(8800)

Overview

Figure 81:
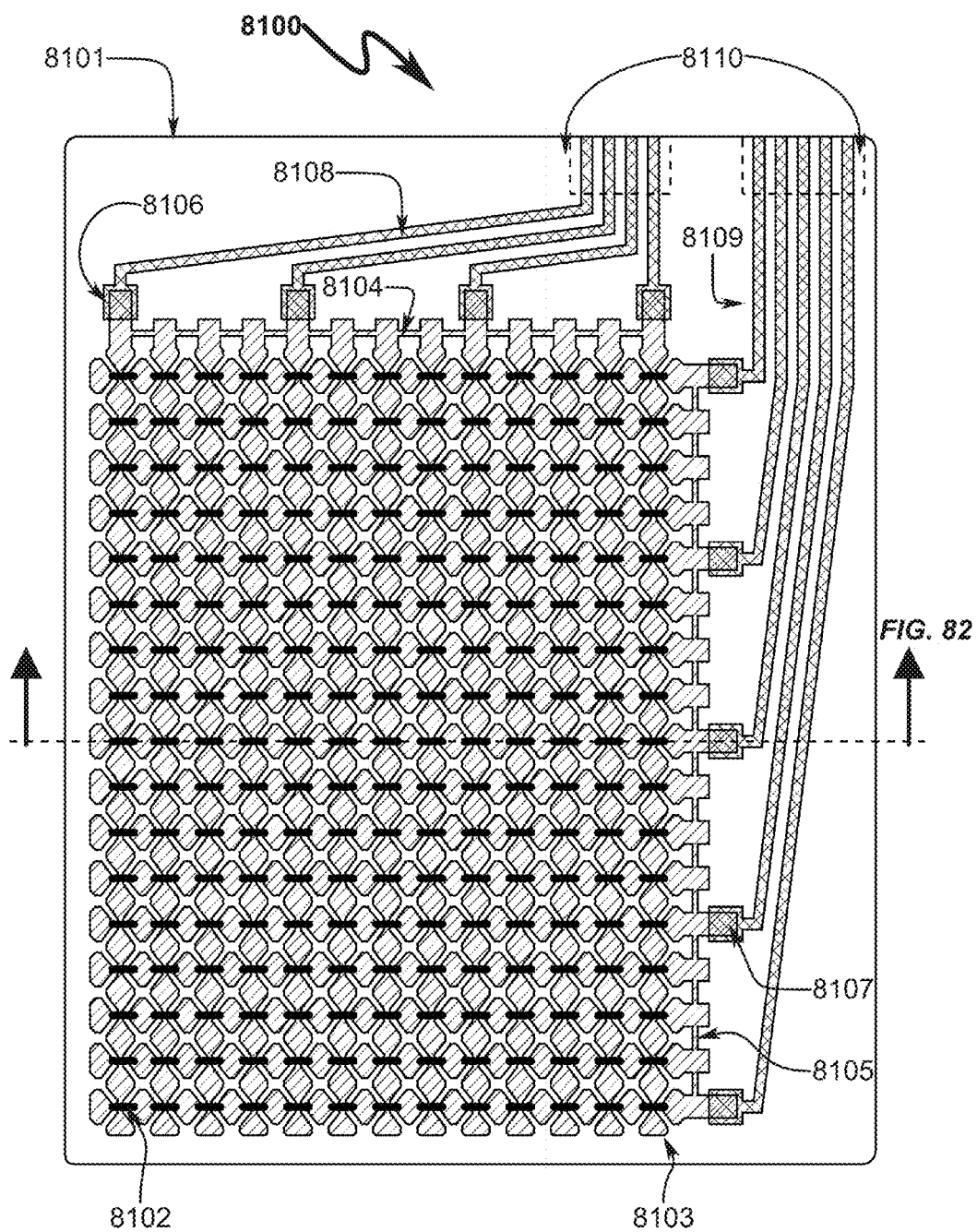
FIG. 81 illustrates a top view of an exemplary embodiment of a present invention capacitive sensor layout employing a single-sided diamond pattern with bridges.
Figure 88:
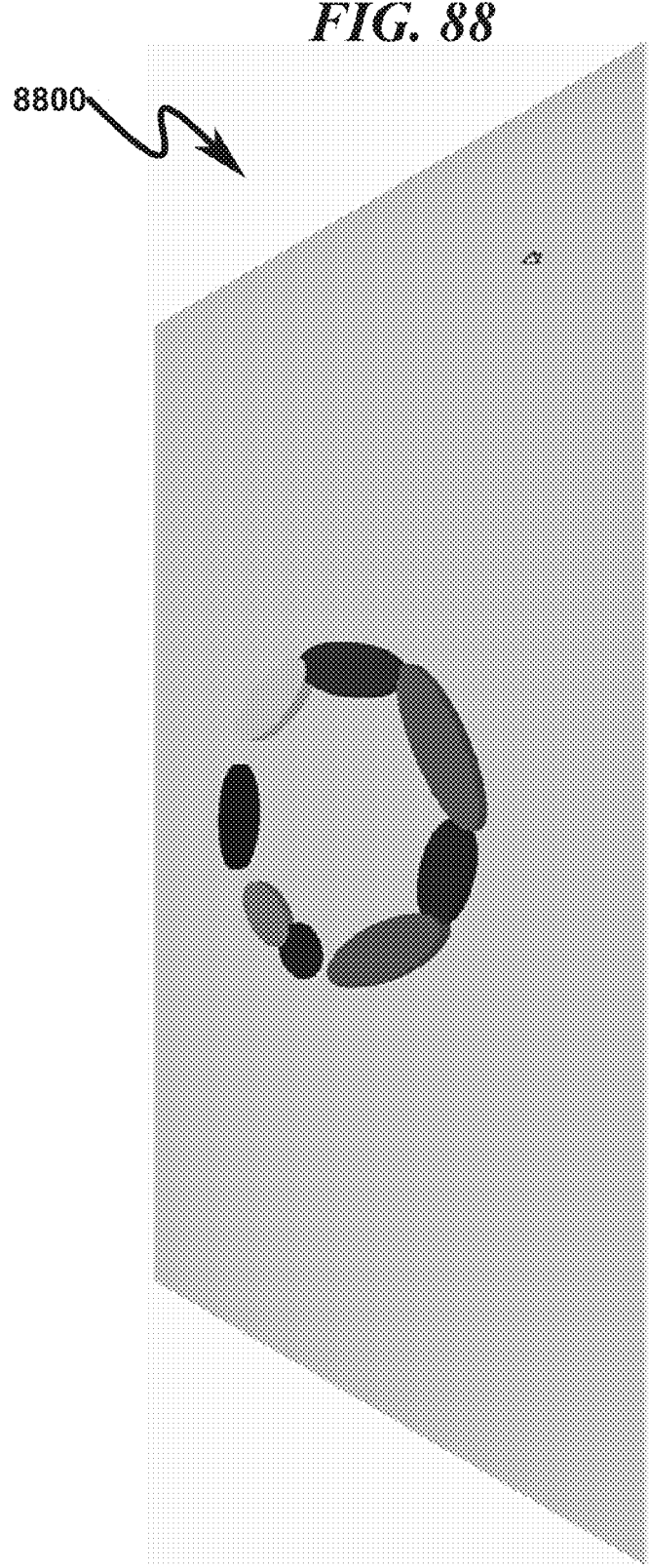
FIG. 88 illustrates exemplary individual detected ellipse data computed by the CCD based on the TSM data.

Yet another embodiment of the present invention may utilize the interpolation concepts associated with the FSA in the context of a capacitive sensor array as depicted in FIG. 81 (8100)-FIG. 88 (8800). The designs depicted in these drawings describe two exemplary configurations:
  single-sided diamond pattern with bridges (as generally depicted in FIG. 81 (8100)-FIG. 82 (8200)); and
  double-sided with straight rows and columns (as generally depicted in FIG. 83 (8300)-FIG. 84 (8400)).

These two designs are specifically targeted for transparent capacitive sensors. This type of sensor typically resides between a display and a protective upper layer (such as a plastic film or glass layer). There may also be transparent shielding layers between the sensor and the display. Note that in the case of the diamond-patterned sensor, it could also be flipped upside down and then laminated to the display. In this case, the substrate could become the layer that the user touches. In the case of the double-sided sensor, the two sides (rows and columns) could be printed on separate substrates, and the substrates could then be laminated together. In this case, it is not possible to do the same trick of flipping the sensor upside down, to have one of the substrates act as the touch-surface.

Single-Sided Diamond Pattern with Bridges (8100)-(8200)

Figure 82:
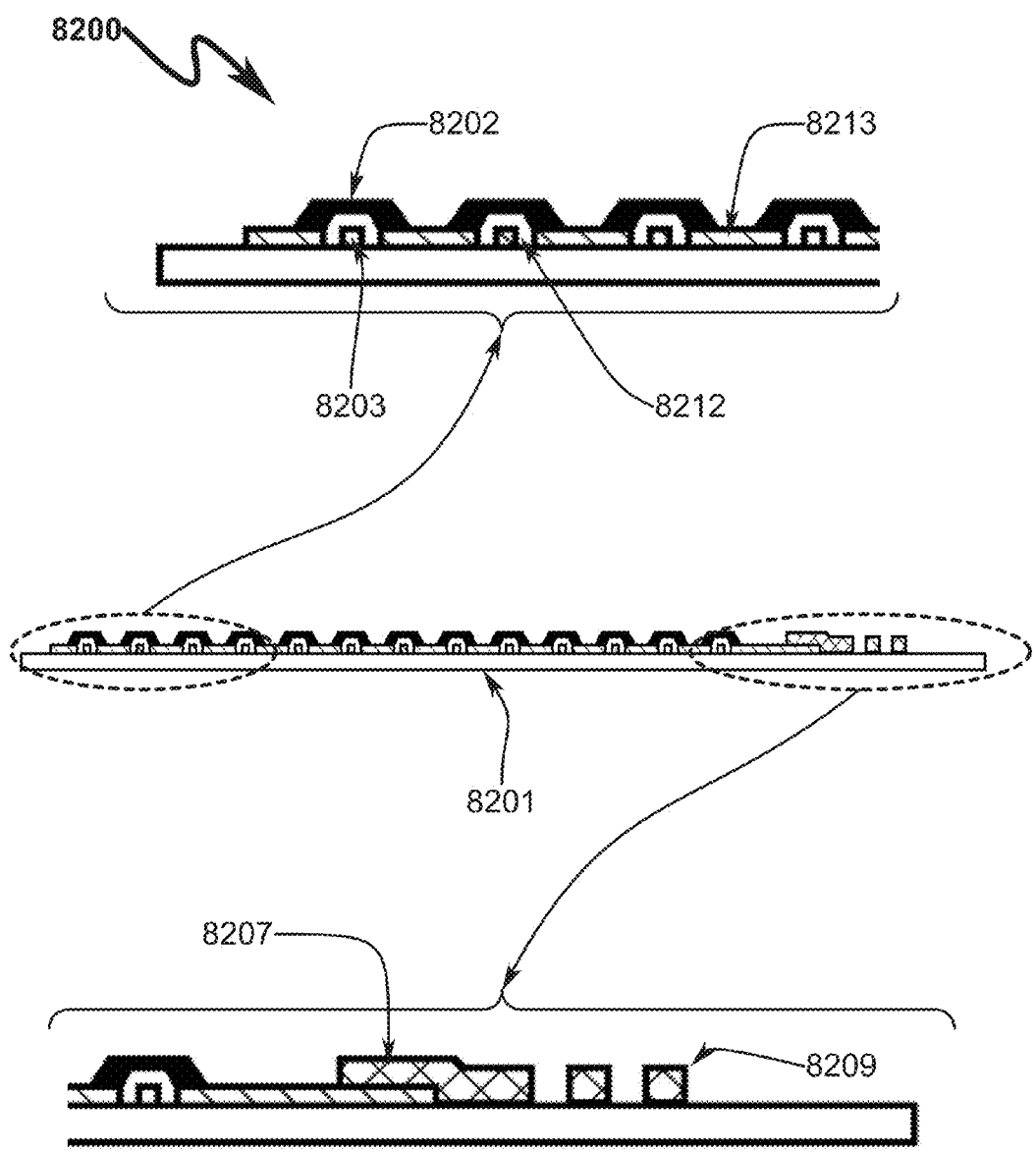
FIG. 82 illustrates a sectional view of an exemplary embodiment of a present invention capacitive sensor layout employing a single-sided diamond pattern with bridges.
Figure 83:
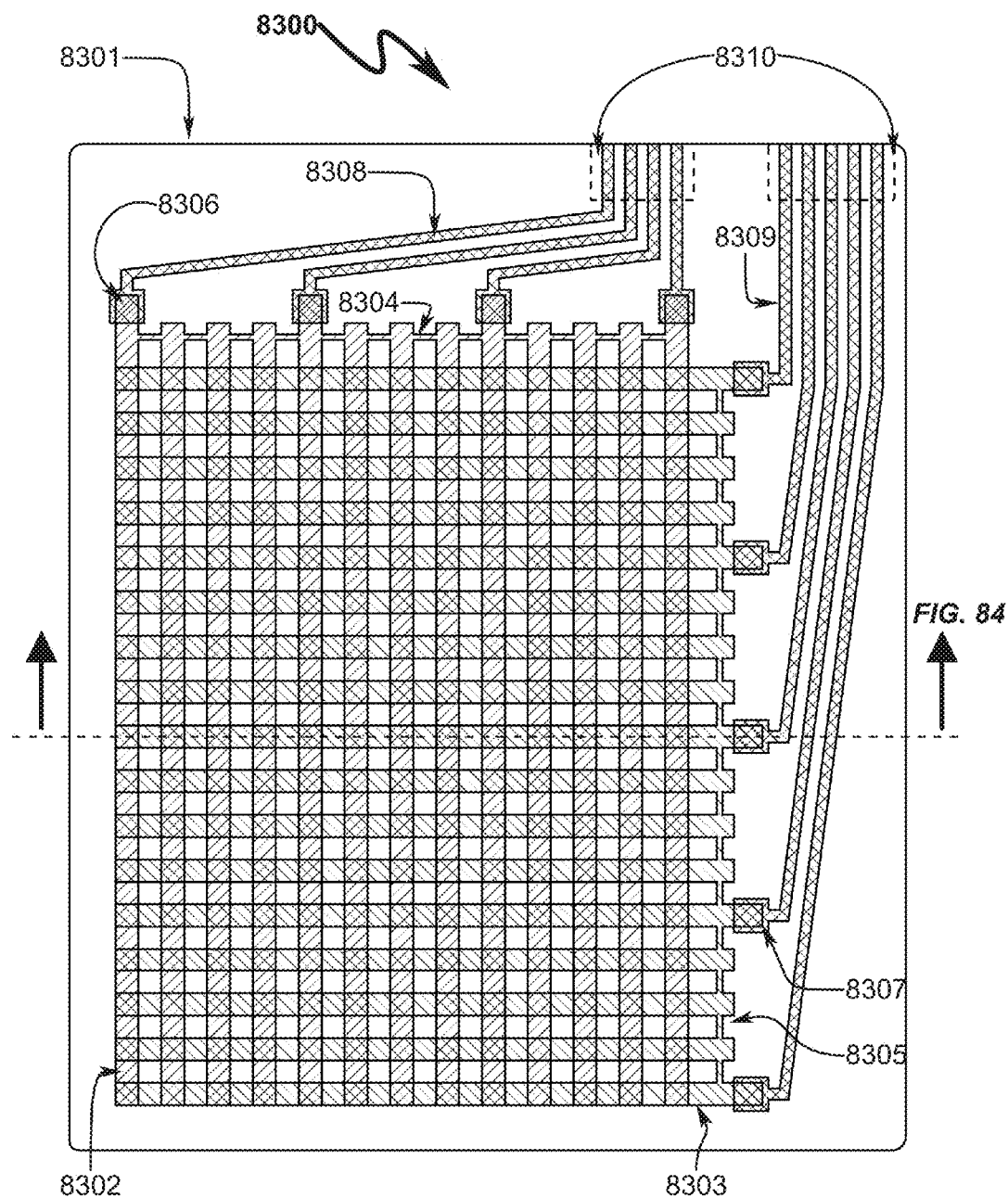
FIG. 83 illustrates a top view of an exemplary embodiment of a present invention capacitive sensor layout employing a double-sided pattern with straight rows and columns.

As generally depicted in FIG. 81 (8100)-FIG. 82 (8200), a capacitor sensor employing a single-sided diamond pattern is illustrated that is formed on a substrate (8101) such as glass or plastic. In this preferred embodiment, conductive bridges (8102) (with dielectric below to avoid shorting with columns) are formed between transparent conductors (8103) (such as ITO, carbon nanotubes, conductive polymer, nanowires, patterned conductor, etc.) to form the VIA. This array is attached to column (8104) and row (8105) interpolation resistors formed either by depositing a resistive material or simply by leaving a thin bridge of the transparent conductor on the substrate (8101) surface. These IIC and IIR resistors (8104, 8105) are electrically coupled via column (8106) and row (8107) connections to active column trace lines (8108) and active row trace lines (8109). These column (8108) and row (8109) trace lines are routed to areas (8110) for bonding conductive flexes which interconnect with drive and sense electronics (or in some cases configured for directly bonding electronics to the substrate (8101).

Referring to the sectional view of FIG. 82 (8200), the substrate (8201) is seen supporting the column transparent conductors (8203) and row transparent conductors (8213). A dielectric layer (8212) separates the column transparent conductors (8203) and row transparent conductors (8213) and supports the conductive bridges (8202). Also depicted in this cross section are the row trace connections (8207) and row traces (8209) that may be formed using etched or printed conductive material.

Double-Sided Pattern with Straight Row/Columns (8300)-(8400)

Figure 84:
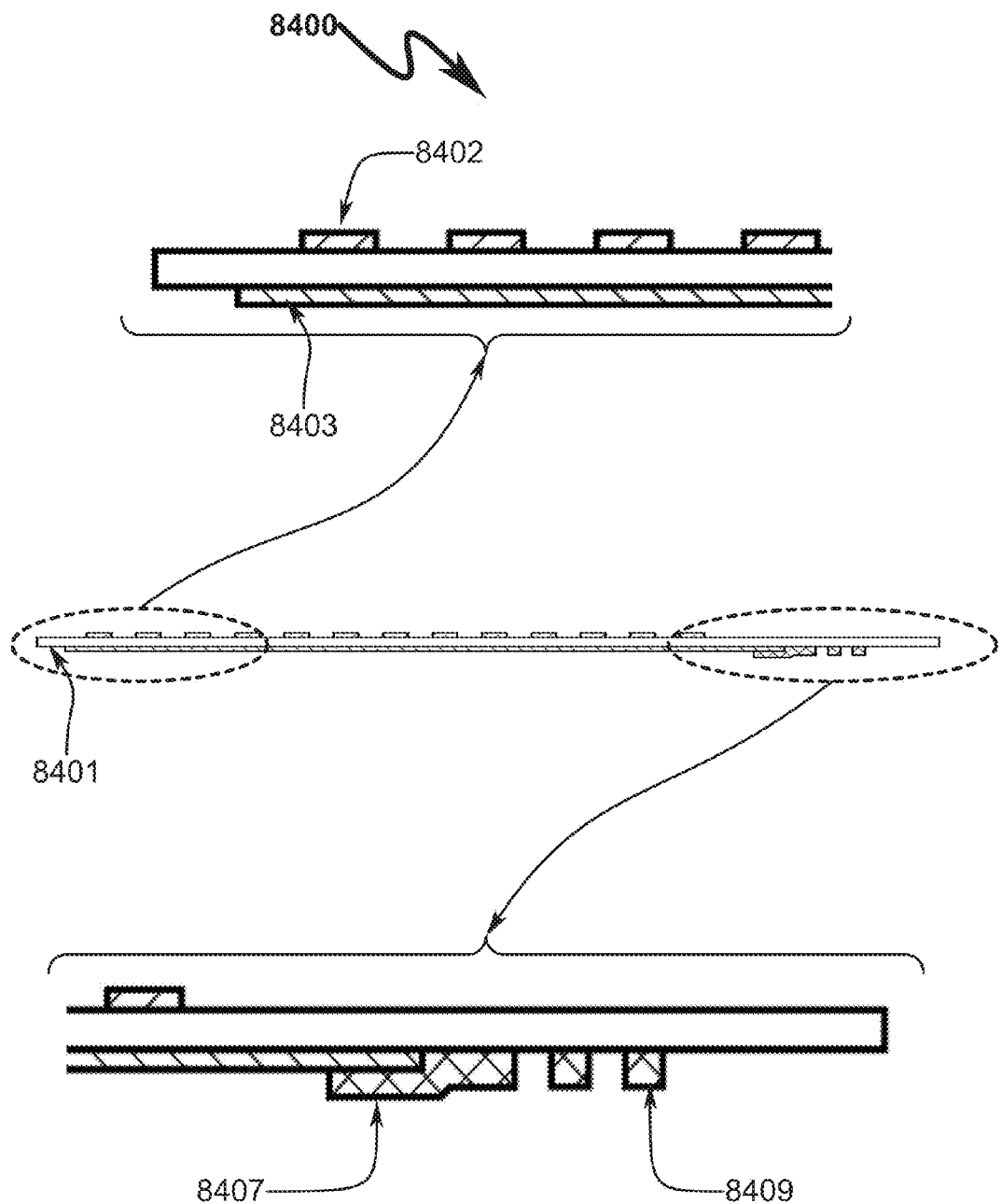
FIG. 84 illustrates a sectional view of an exemplary embodiment of a present invention capacitive sensor layout employing a double-sided pattern with straight rows and columns.

As generally depicted in FIG. 83 (8300)-FIG. 84 (8400), a capacitor sensor employing a double-sided pattern with straight rows and columns is illustrated that is formed on a substrate (8301) such as glass or plastic. In this preferred embodiment, columns (8302) and rows (8303) are on opposite sides of the sensor (so they do not short) and may alternatively be deposited onto separate substrates (one for rows and one for columns). The columns (8302) and rows (8303) are formed of transparent conductors (such as ITO, carbon nanotubes, conductive polymer, nano-wires, patterned conductor, etc.) to form the VIA. This array is attached to column (8304) and row (8305) interpolation resistors formed either by depositing a resistive material or simply by leaving a thin bridge of the transparent conductor on the substrate (8301) surface. These IIC and IIR resistors (8304, 8305) are electrically coupled via column (8306) and row (8307) connections to active column trace lines (8308) and active row trace lines (8309). These column (8308) and row (8309) trace lines are routed to areas (8310) for bonding conductive flexes which interconnect with drive and sense electronics (or in some cases configured for directly bonding electronics to the substrate (8301).

Referring to the sectional view of FIG. 84 (8400), the substrate (8401) is seen supporting the column transparent conductors (8402) and row transparent conductors (8403). Also depicted in this cross section are the row trace connections (8407) and row traces (8409) that may be formed using etched or printed conductive material.

Sensor Manufacturing

One advantage of both of these designs is that they can be manufactured with the same exact process currently used to make capacitive touch sensors. The main difference is that this invention embodiment adds the in-between (interpolating) rows and columns and changes the mask pattern for the transparent conductive material (usually ITO) to create little conductive lines, which act as the interpolating resistors. The resistance can be adjusted by changing the width of these lines. Besides changing the mask patterns (and possibly some changes to the test procedures), there are no extra steps involved in manufacturing these capacitive sensors.

Capacitive Sensor Advantages

The advantage of an interpolating capacitive sensor based on this disclosed design is that it has much better linearity than a conventional capacitive sensor. This results in:
much better touch and stylus tracking without needing to calibrate the sensor;
better estimation of touch shape and area;
better signal; and
the ability to use much thinner cover-glass/plastic between the user's finger and the sensor, allowing for much thinner devices.

The last point is very important in the construction of mobile/portable devices such as tablets, cellphones, smartphones, and the like.

For an opaque capacitive sensor, it is possible to use one of these designs, and incorporate the use of one of the IFSA conductor patterns discussed previously, and just remove the force sensing material. The force sensing material would typically be replaced with a dielectric such as a thin plastic film or glass in this application.

Exemplary Cup Pressure Profiles (8500)-(8800)

Figure 85:
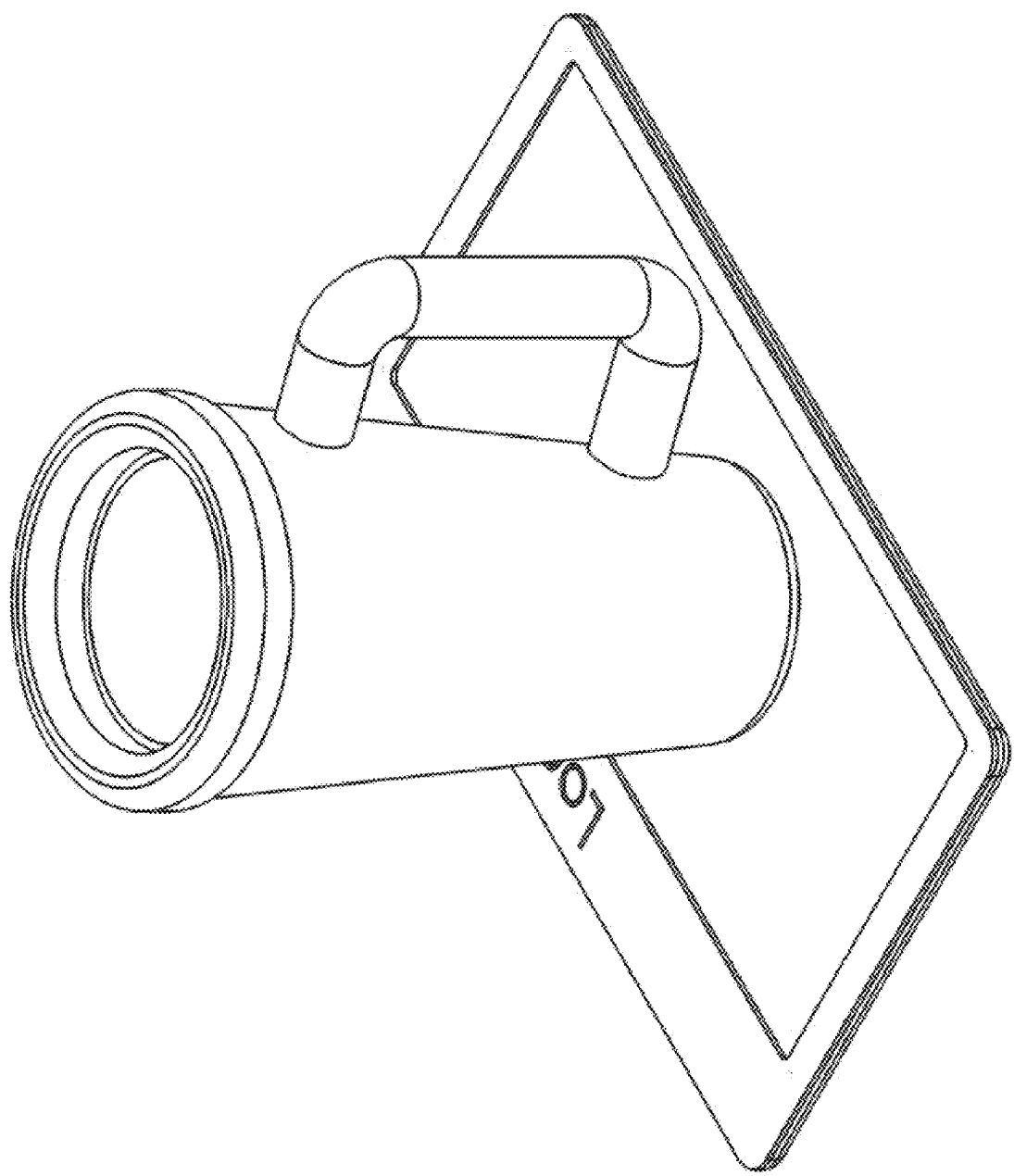
FIG. 85 illustrates an exemplary touch sensor tablet contacting a drinking cup to produce a pressure profile.
Figure 86:
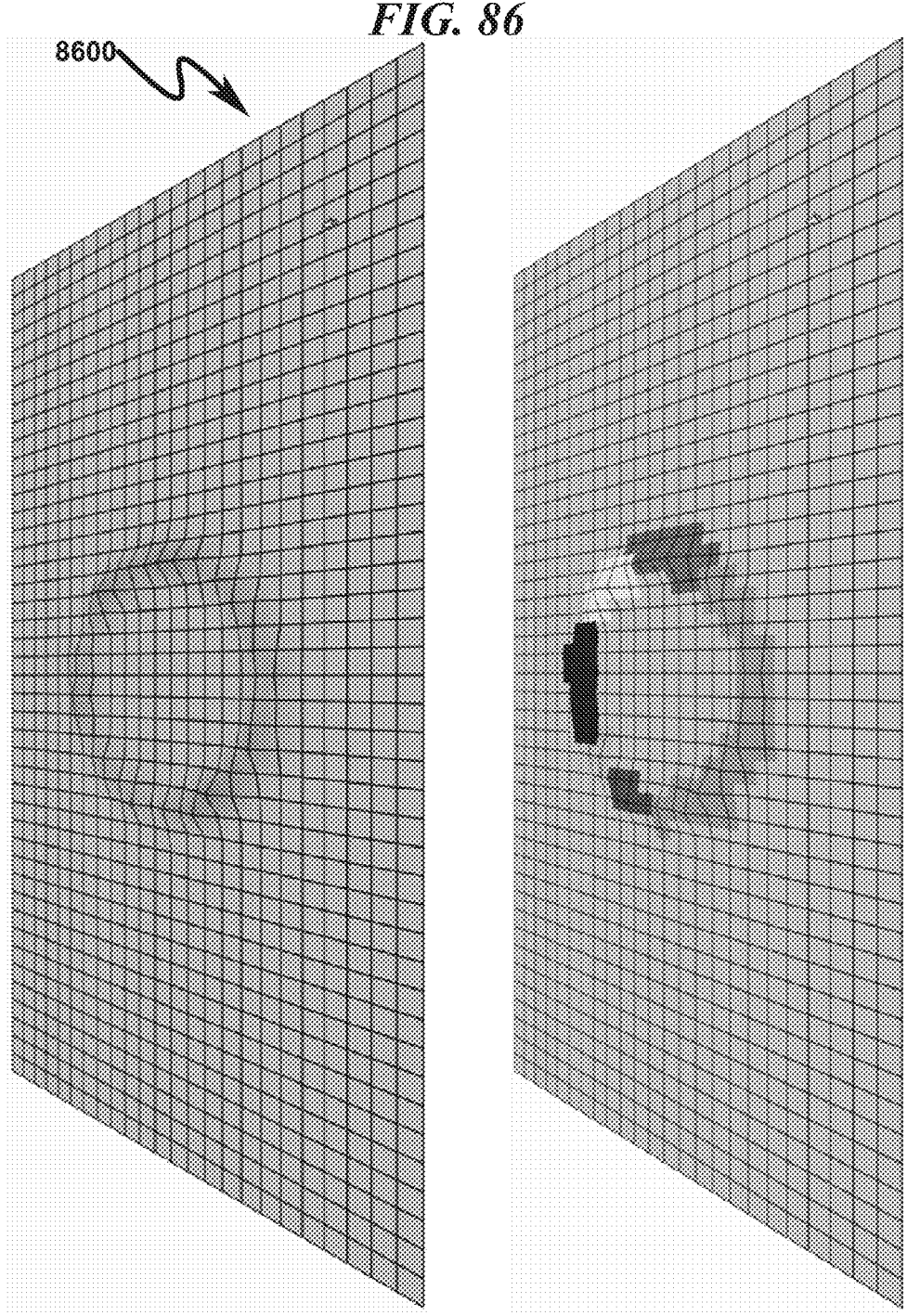
FIG. 86 illustrates the TSM data obtained by the CCD by scanning the TSA, and the associated pressure regions detected.
Figure 87:
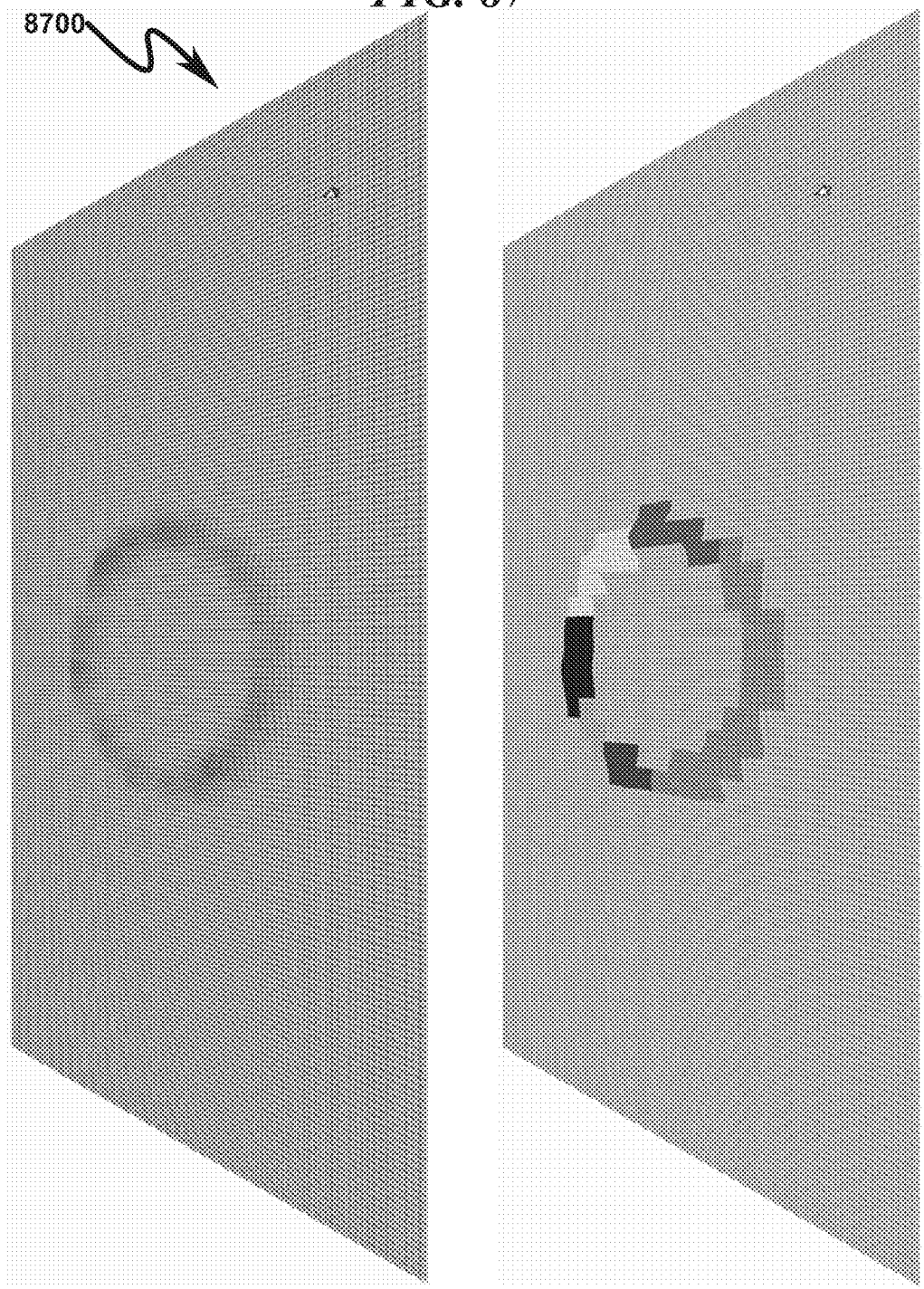
FIG. 87 illustrates an approximate reconstruction of the forces seen by individual force sensing elements in the VIA obtained by performing an upsampling operation of the TSM and the associated pressure regions detected.

An example of the present invention as applied to a pressure sensor tablet form factor is depicted in FIG. 85 (8500) wherein a drinking cup is contacted with the pressure sensor tablet surface. FIG. 86 (8600) depicts a profile of the sensed pressure without interpolation and the grid associated with the TSM read out from the TSA along with detected pressure regions. FIG. 87 (8700) depicts an approximate reconstruction of the forces seen by the individual force sensing elements in the VIA obtained by performing an upsampling operation of the TSM. FIG. 88 (8800) depicts the individual detected ellipse data computed by the CCD based on the TSM data depicted in FIG. 86 (8600). Note that the TSM data as illustrated in FIG. 86 (8600) can be used to reconstruct the fine detail as seen in the upsampled data depicted in FIG. 87 (8700) and to generate the discrete regions of detection in FIG. 87 (8700) and ellipses in FIG. 88 (8800).

Exemplary Paintbrush Pressure Profiles (8900)-(9200)

Figure 89:
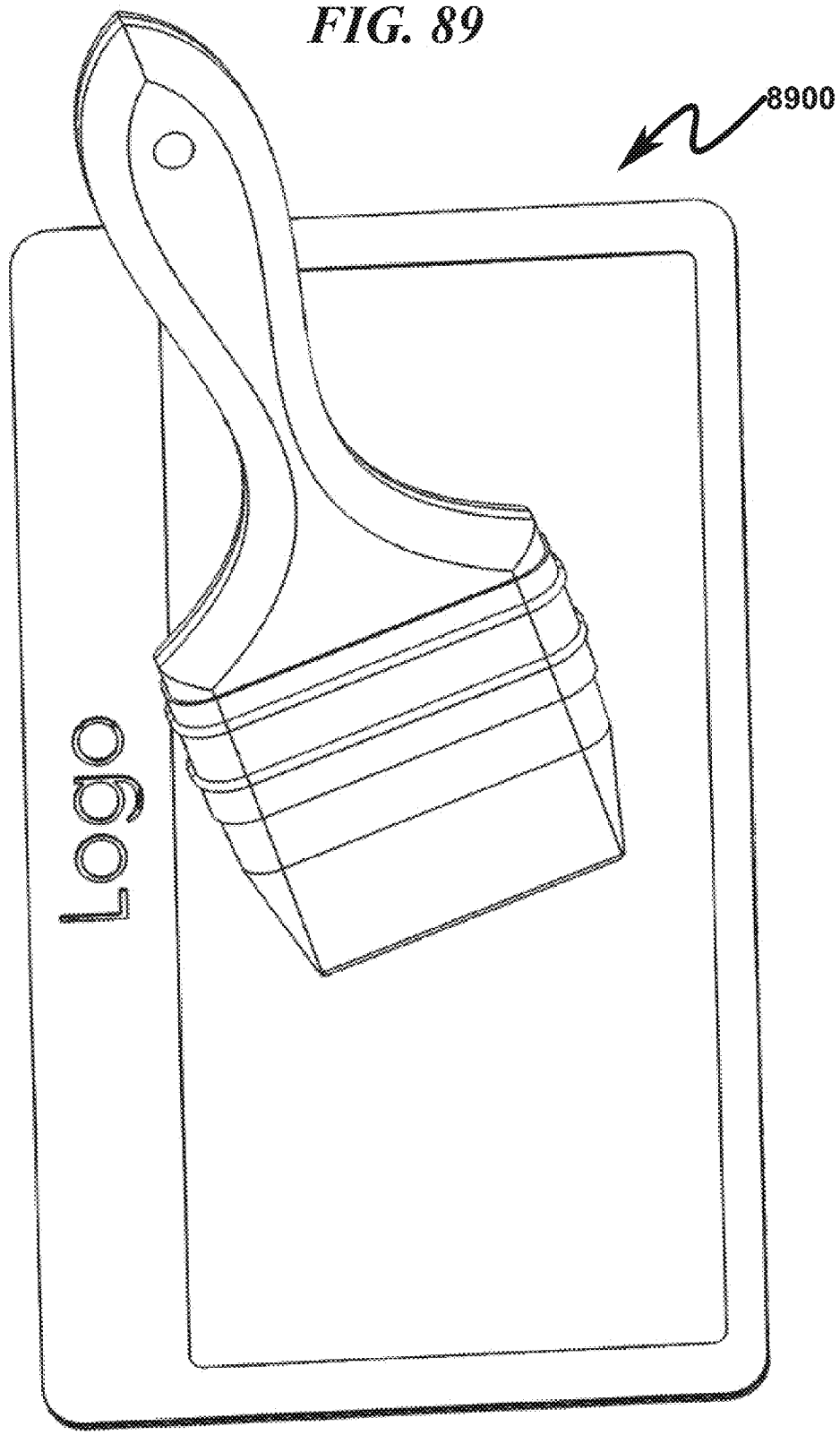
FIG. 89 illustrates an exemplary touch sensor tablet contacting a paintbrush to produce a pressure profile.
Figure 90:
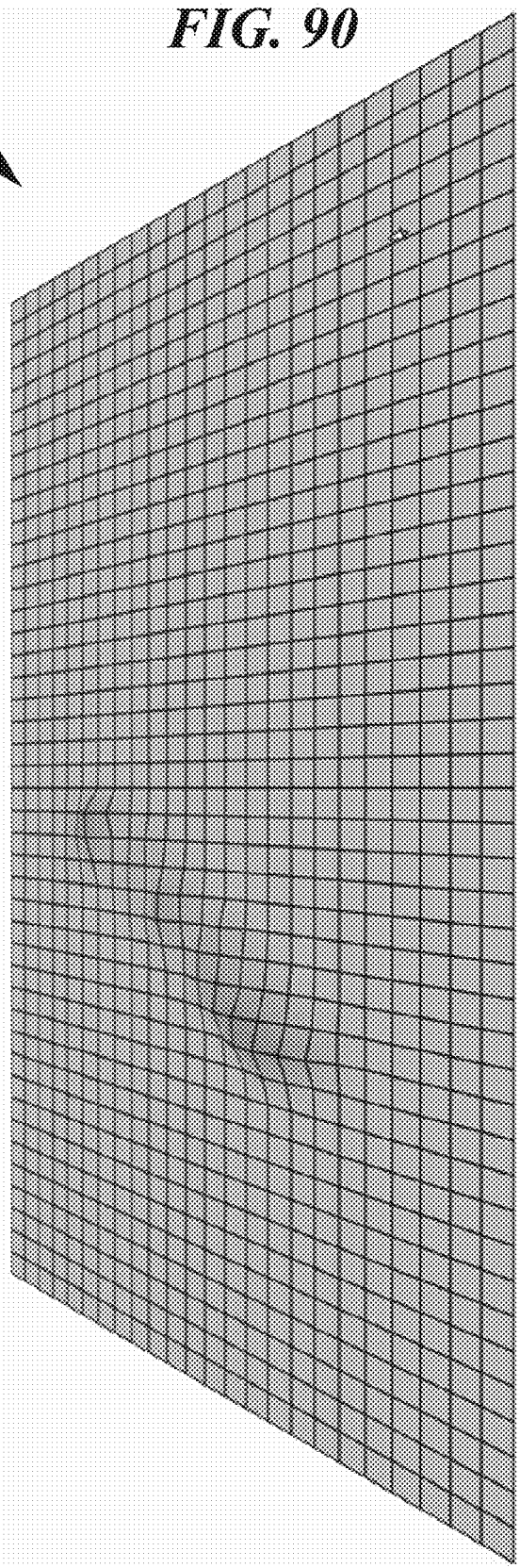
FIG. 90 illustrates the pressure profile of the TSM data obtained by the CCD by scanning the TSA.
Figure 91:
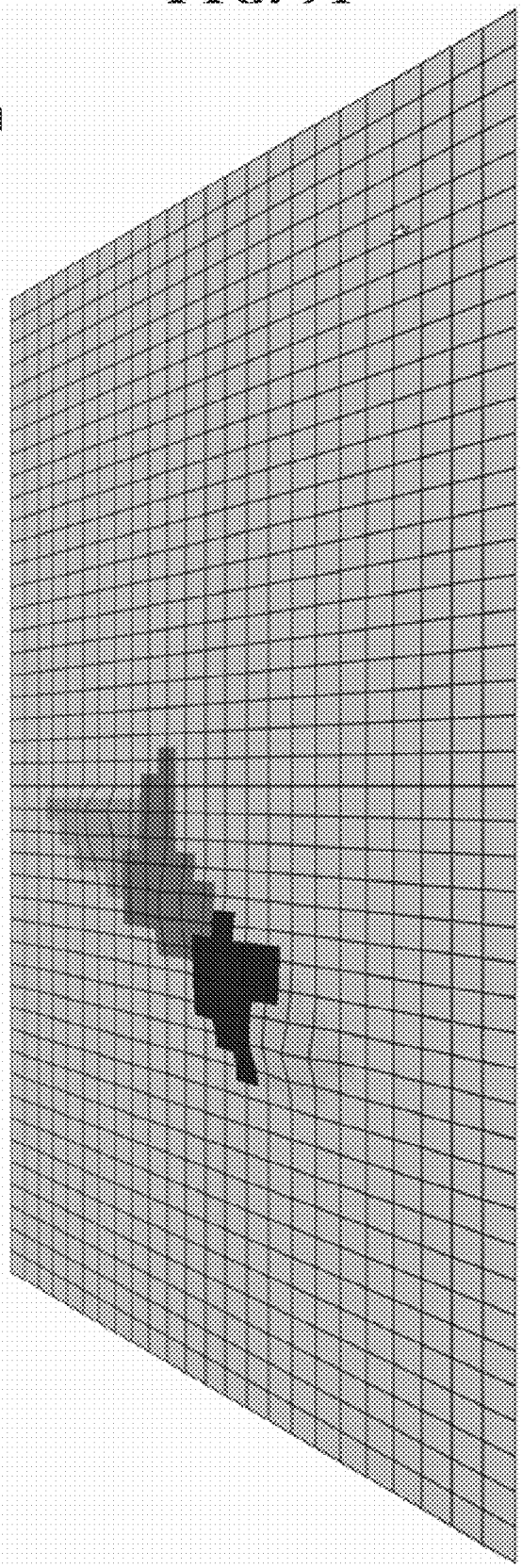
FIG. 91 illustrates the associated pressure regions detected based on the pressure profile.
Figure 92:
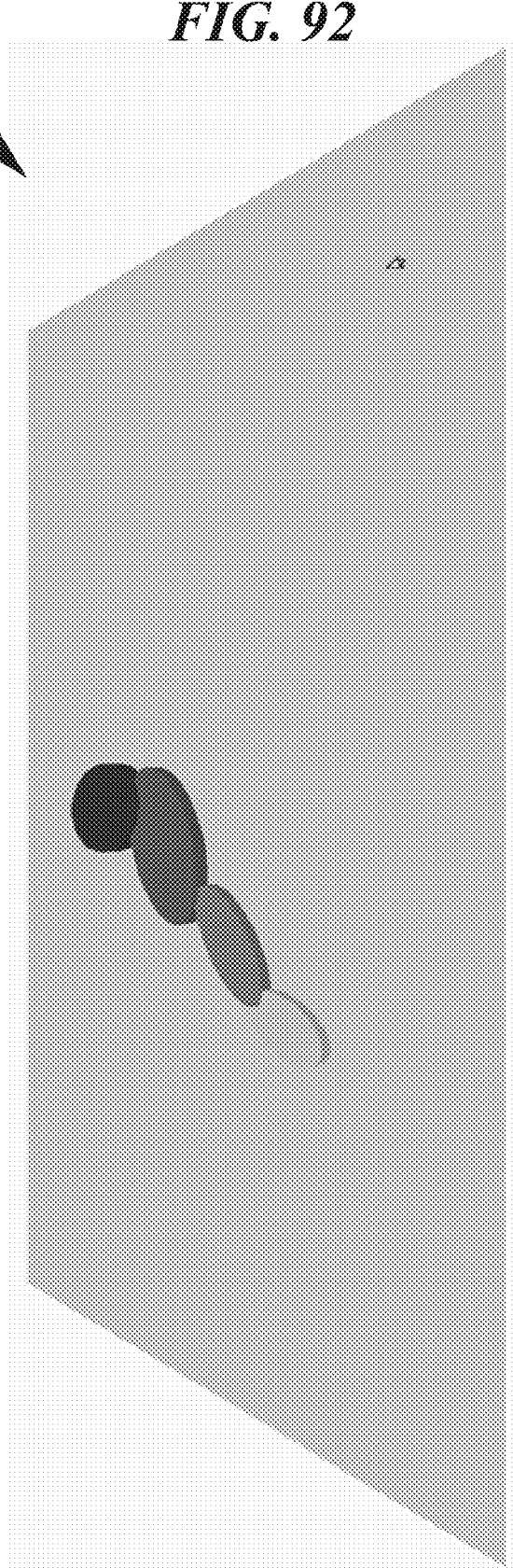
FIG. 92 illustrates exemplary individual detected ellipse data computed by the CCD based on the TSM data.

An example of the present invention as applied to a pressure sensor tablet form factor is depicted in FIG. 89 (8900) wherein a paintbrush is contacted with the pressure sensor tablet surface. FIG. 90 (9000) depicts the pressure profile of the TSM obtained by the CCD by scanning the TSA. FIG. 91 (9100) depicts the associated pressure regions detected based on the pressure profile. FIG. 92 (9200) depicts the individual detected ellipse data computed by the CCD based on the TSM data depicted in FIG. 90 (9000).

As can be seen from this example, the pressure sensor VIA is both sensitive and capable of detecting shape/ellipse data associated with individual areas of the contact region. This example also depicts the extreme sensitivity of the system using the interpolation techniques taught by the present invention.

Capacitive Touch Sensor Description (9300)-(12500)

Overview of Interpolation Capacitive Sensor Circuits

The main benefit of interpolating force-sensing sensors that have been described above is that it is possible with these configurations to increase the linearity of the sensor and its ability to track touches at a higher resolution than the resolution of the active electronics. The same is true for interpolating capacitive sensors. Although most existing capacitive sensors already have some level of interpolation (due to the fact the electric field lines spread through the space around the sensor), capacitive sensors tend to have very non-linear interpolation behavior. This is problematic in cases where high precision is important, especially for use to detect touch input or stylus input. Currently, designers of existing capacitive touch sensors deal with this non-linearity by creating look-up tables which numerically map non-linear sensor (X,Y) positions into a linear space. However, these look-up tables are typically created under one set of conditions and cannot fully compensate for the non-linearity of the sensors under all conditions.

Using the techniques taught by the present invention it is possible to increase the resolution of a capacitive sensor without needing to increase the number of drive and sense lines in the electronics. Doing this creates a much more linear and predictable sensor response, yielding much better finger touch and stylus performance. However, there are some differences between the techniques used to add interpolation to a force-sensing sensor and a capacitive sensor as described below.

Interpolation Resistor Values (9300)

In the case of interpolating force-sensing sensors, the present invention targets a resistance of approximately 1KΩ between active lines to achieve the desired interpolation behavior (for a sensor with three interpolation resistors between each pair of active lines such as the sensor in FIG. 33 (3300), the value of each interpolation resistor would be 1K/3=333Ω).

For interpolating capacitive sensors, it may be generally determined that a resistance of 1KΩ between active lines on the receive side is too low, causing a very low signal at the receive side of the sensor. Experimentation has determined that a resistance of 10KΩ between active lines on the receive side provides a much stronger signal (for a sensor with three interpolation resistors between each pair of active lines such as the sensor in FIG. 93 (9300), the value of each interpolation resistor would be 10K/3=3.3KΩ).

Generally, it has been found by experimentation that higher resistors on the receive side yielded a higher signal. However, at a certain level, higher resistances cause the sensor itself to begin acting as a low-pass RC filter, thus resistances much higher than 10K between active lines may cause signal loss. Higher resistance on the transmit side reduces power consumption, but similarly may cause RC losses if they get too high. Both experimental and analytical approaches can be used to find the optimal transmit and receive resistor values for a given sensor configuration.

Scanning the Sensor

The main difference between scanning a force-sensing interpolating sensor and a capacitive interpolating sensor is that for a capacitive interpolating sensor, the present invention optimally sends and receives an AC or oscillatory waveform such as a square wave or a sine wave, while for a force-sensing interpolating sensor, the present invention optimally sends and receives DC signals.

As a result, it is only required that the sensor system employ different circuitry to generate and capture the signal. This circuitry is described in later sections.

Sensor Behavior

In the case of interpolating force-sensing sensors, the received signal is generally at ground potential or close to ground potential when no force is applied, and increases as a user applies force.

In the case of interpolating capacitive sensors, the received signal is generally highest when no touches are applied. This is due to the capacitive coupling between row and column electrodes. When a finger or other conductive object approaches the sensor, conductive paths are created for the electric field lines emanating from the transmit portion of the sensor through the user's body to ground. This causes a reduction in the signal received on the receive electrodes. Thus, the signal starts out high, and reduces as the user approaches. Experiments have determined that interpolating capacitive sensors have very little sensitivity to force. They mostly respond to the shape and area of each touch or conductive object in contact with the sensor.

Processing Sensor Data

Software algorithms similar to those described for interpolating force-sensing sensors can be used to detect the baseline level for interpolating capacitive sensors to baseline away (subtract) the signal level when no touches are detected. Because all of the processing algorithms described previously depend on a signal strength that increases from zero when a touch is detected, the signal from the interpolating capacitive sensor can be inverted by subtracting the signal received from the sensor from the measured baseline. This effectively inverts the sign of the signal such that a touch results in a positive increase in the signal. This allows all the later stages of processing to deal with a signal that increases where there are touches, thus allowing all the touch-processing algorithms described for interpolating force sensing sensors to work on the signal produced by interpolating capacitive sensors without significant modification.

Capacitive Transmit Electronics

As previously mentioned, an interpolating capacitive sensor must be driven with AC or oscillatory waveforms. These are usually in the form of square or sine waves. In the following sections, various methods are proposed for generating these waveforms. Note that these methods can be used as part of a capacitive sensor or within an active stylus to generate a signal.

Square Wave Generation

In order to generate a square wave, one can use a standard PWM module found on most modern microcontrollers (MCU). These PWM modules can be used to generate a periodic control signal inside the microcontroller. When combined with a standard GPIO module, it is possible to create a square wave output on a GPIO at a fixed frequency. This frequency can be tuned by the firmware, as PWM modules are often capable of generating a wide range of frequencies. Unfortunately, the output voltage is usually limited to logic level (1.8V-5V) for the given microcontroller. To increase SNR, it is desirable for the amplitude of the transmitted signal to be as high as possible. Therefore, it is beneficial to use the PWM output as a control signal for circuitry that can generate higher voltage levels.

Square Wave Generation Using a PWM with an Analog MUX (10000)

Figure 100:
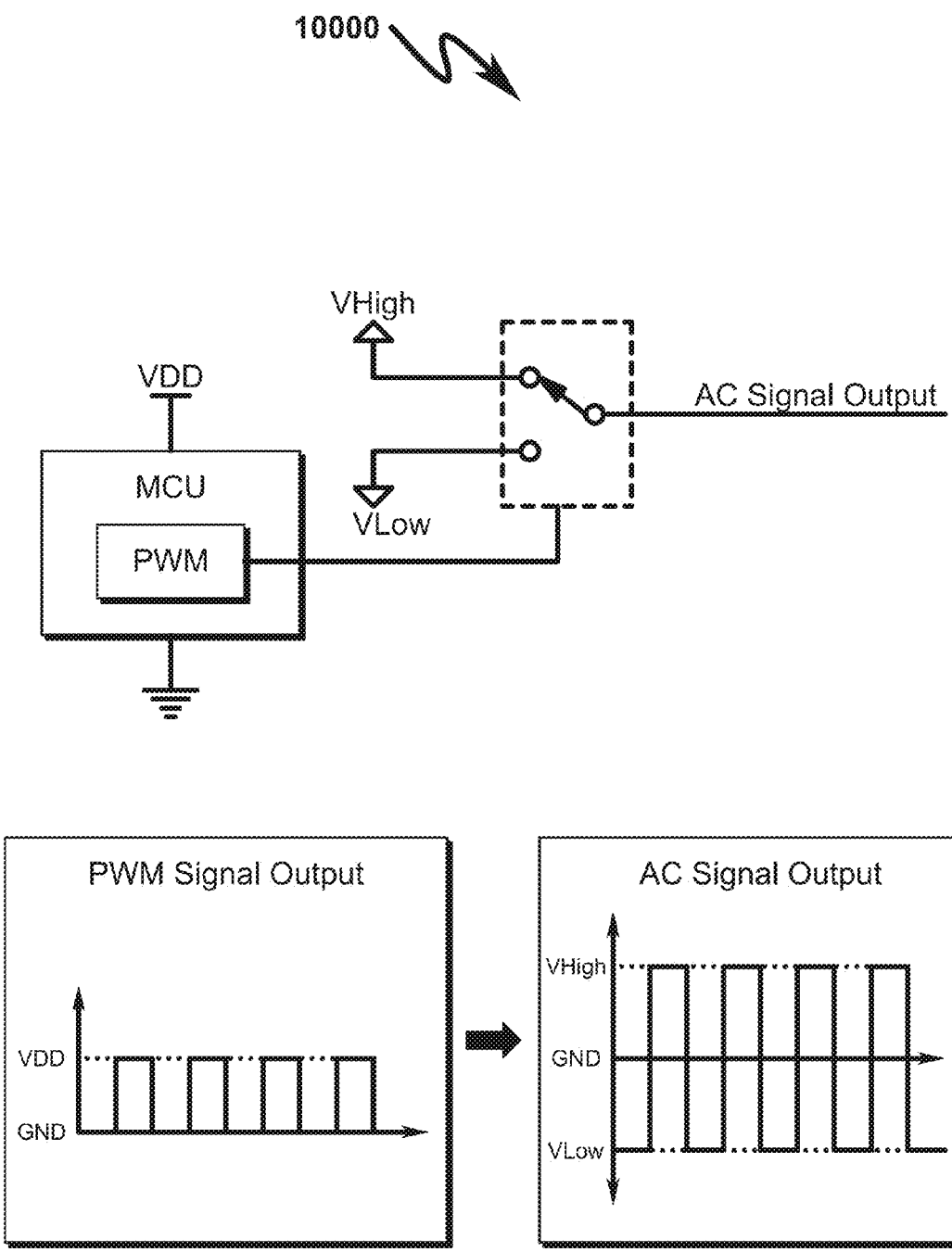
FIG. 100 illustrates circuitry that generates a square wave transmission signal using a PWM module and an analog switch.

FIG. 100 (10000) shows how a PWM module can be paired with an analog mux to generate a high-voltage square wave output. Basically, the analog mux takes two voltages (a high voltage and a low voltage) and uses the PWM as a control signal. The PWM signal muxes between the high and the low voltage levels, creating a high-voltage square wave with the same frequency as the PWM. The frequency used in many preferred invention embodiments is 200 Khz, but other frequencies can be chosen as well. The frequencies can also be varied dynamically to reduce susceptibility to external noise or in cases where it is desirable to transmit multiple frequencies at the same time.

This circuit allows the present invention to decouple the voltage levels of the MCU from the voltages levels that are used to drive the sensor. VHigh can be higher than the voltage that the MCU operates on. In addition, VLow can be lower than the ground level of the MCU. For example, while a typical MCU may operate at 3.3V or 1.8V, the present invention may use a VHigh of +5V and a VLow of −5V, resulting in a transmitted signal with an amplitude of 10V. As an alternative example, the present invention can use an even higher "high voltage" of 12V and a low voltage of 0V, resulting in a signal with an amplitude of 12V.

Square Wave Generation Using a PWM with a Comparator (10100)

FIG. 101 (10100) shows an alternative method for generating a high-voltage square wave. In this configuration, the PWM output is fed into the non-inverting input of an operational amplifier (OPAMP). The OPAMP is configured to be a comparator, which means that the output will be VHigh when the PWM signal is greater than Vref, and the output will be VLow when the PWM signal is lower than Vref. As depicted in the diagram, the waveforms are nearly identical to the waveforms seen in FIG. 100 (10000). R1 and R2 form a simple voltage divider to create Vref. In most practical applications, R1 will be equal to R2, which will create a Vref at VDD/2 (as seen in the "PWM Signal Output" graph in FIG. 101 (10100).

Sine Wave Generation

At times, it can be advantageous to transmit sine waves instead of square waves. Square waves are made up of several different frequencies, while a sine wave is a single frequency. When driving an interpolating capacitive touch sensor, it is possible to drive multiple electrodes at the same time. If each electrode is driven with a different frequency, then the receive side can determine how much energy was received of each frequency, and thus determine the contribution from each drive electrode. Driving with a sine wave instead of a square wave makes the signal cleaner and easier to filter and interpret on the receive side. For example, sine waves can be better filtered with low-pass, high-pass and band-pass filtered and can be decomposed using algorithms such as an FFT.

Sine Wave Generation Using an Oscillator (10200)

Figure 102:
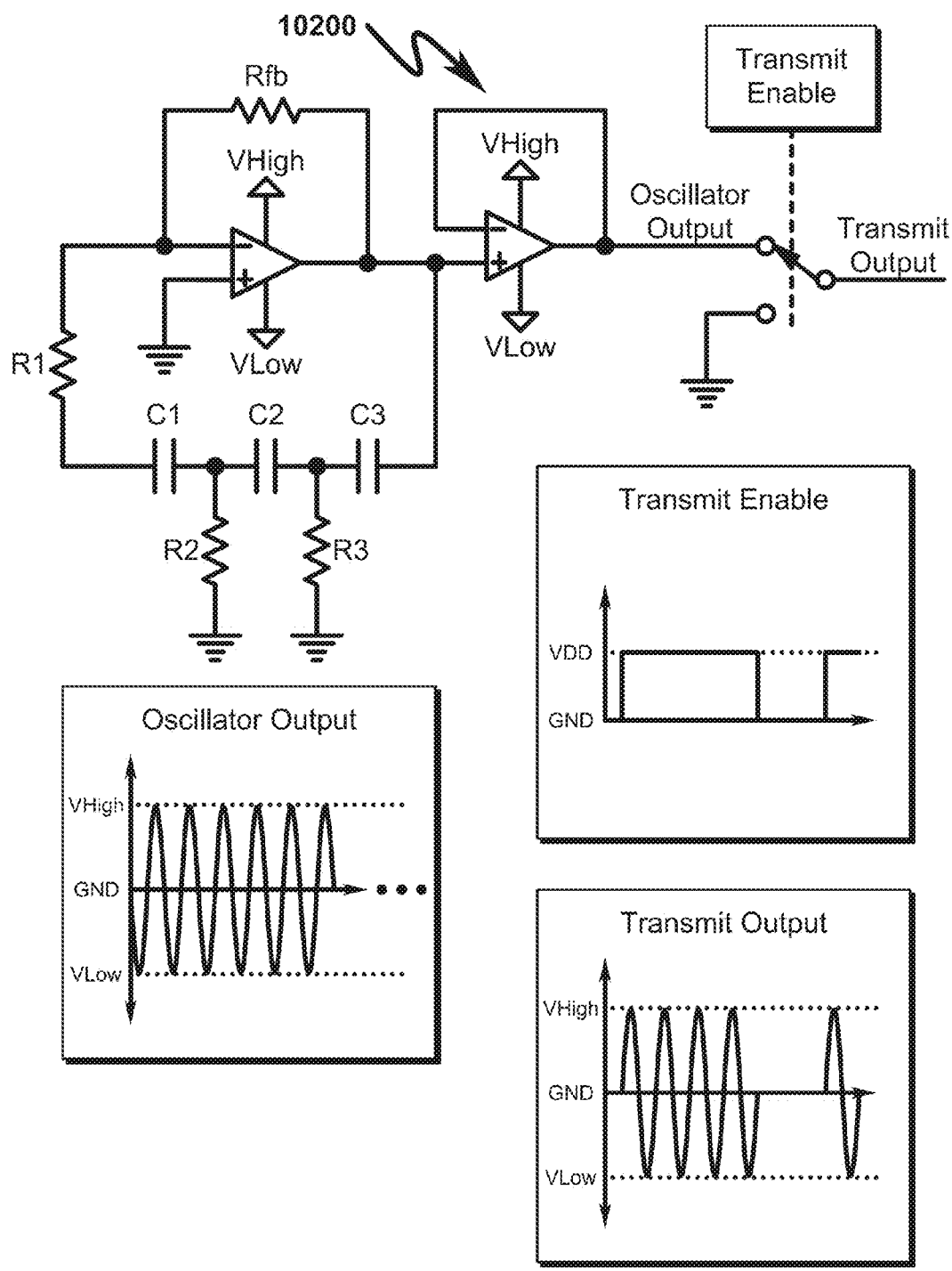
FIG. 102 illustrates circuitry that generates a sine wave transmission signal using a phase-shift oscillator, a voltage follower, and an analog switch.

There are various ways to generate a sine wave. One way is by building a phase-shift oscillator, as can be seen in FIG. 102 (10200). The output of the OPAMP is fed into a series of filters which shift the phase of the output by 180 degrees. This causes a condition where the OPAMP experiences positive feedback and begins to oscillate. The output of this stage will be a sine wave. The R and C values in the circuit can be tuned to select a specific oscillation frequency. In FIG. 102 (10200), a voltage buffer is placed at the output of the oscillator to prevent loading of the oscillator stage by the sensor electrode. This allows the oscillator to be tuned without having to worry about the specific input impedance characteristics of the sensor it is driving. An analog mux is added to the output to enable/disable the transmission of the sine wave. Feedback mechanisms can be added to allow on-the-fly variation of the frequency generated by the oscillator circuit.

Sine Wave Generated Using a High-Speed DAC and Amplifier (10300)

Phase-shift oscillators are fairly straightforward to build, but they have several drawbacks. Temperature changes can greatly affect the resistance values in the feedback loop, which will cause the frequency to drift. Also, there is not an easy way to reliably enable/disable the oscillator in an efficient manner (oscillators often take time to stabilize when they are first enabled).

Therefore, it is often advantageous to generate sine waves with a digital approach. FIG. 103 (10300) shows a sine wave generation technique that uses a digital-to-analog converter (DAC) to generate a digital representation of a sine wave. In this implementation, a DAC peripheral is using direct memory access (DMA) to read values out of a sine wave lookup table in memory (the memory must be preloaded with a digital representation of a sine wave). The DAC takes these digital values and converts them to analog (as seen in the "DAC Output" waveform). The DAC output, however, cannot be used directly to drive an electrode. This is because the signal created by a DAC is often jagged, since the DAC is converting discrete values (causing a discrete staircase effect). Thus, it may be beneficial to low-pass filter the DAC output to create a smoother sine wave signal. After this filter, the signal can be used to drive an amplifier, which boosts the amplitude of the signal used to drive the electrode, thereby increasing the SNR of the system. In this circuit, a transmit enable signal is used to enable/disable the DAC.

One of the biggest benefits of this approach is that it allows the circuit to easily select the desired transmit frequency and amplitude through software. This can be useful in cases where frequency hopping is used to avoid noise, or in cases where it is desirable to transmit multiple frequencies simultaneously on different electrodes or even the same electrode.

Capacitive Receive Electronics

As previously mentioned, an interpolating capacitive sensor must detect AC or oscillatory waveforms. These are usually in the form of square or sine waves. In the following sections, various methods are proposed for detecting these waveforms. Note that these methods can be used as part of a capacitive sensor or within an active stylus to detect oscillatory signals.

Receive Circuit Using a Preamp, Rectifier, and Integrator (10400)

Figure 104:
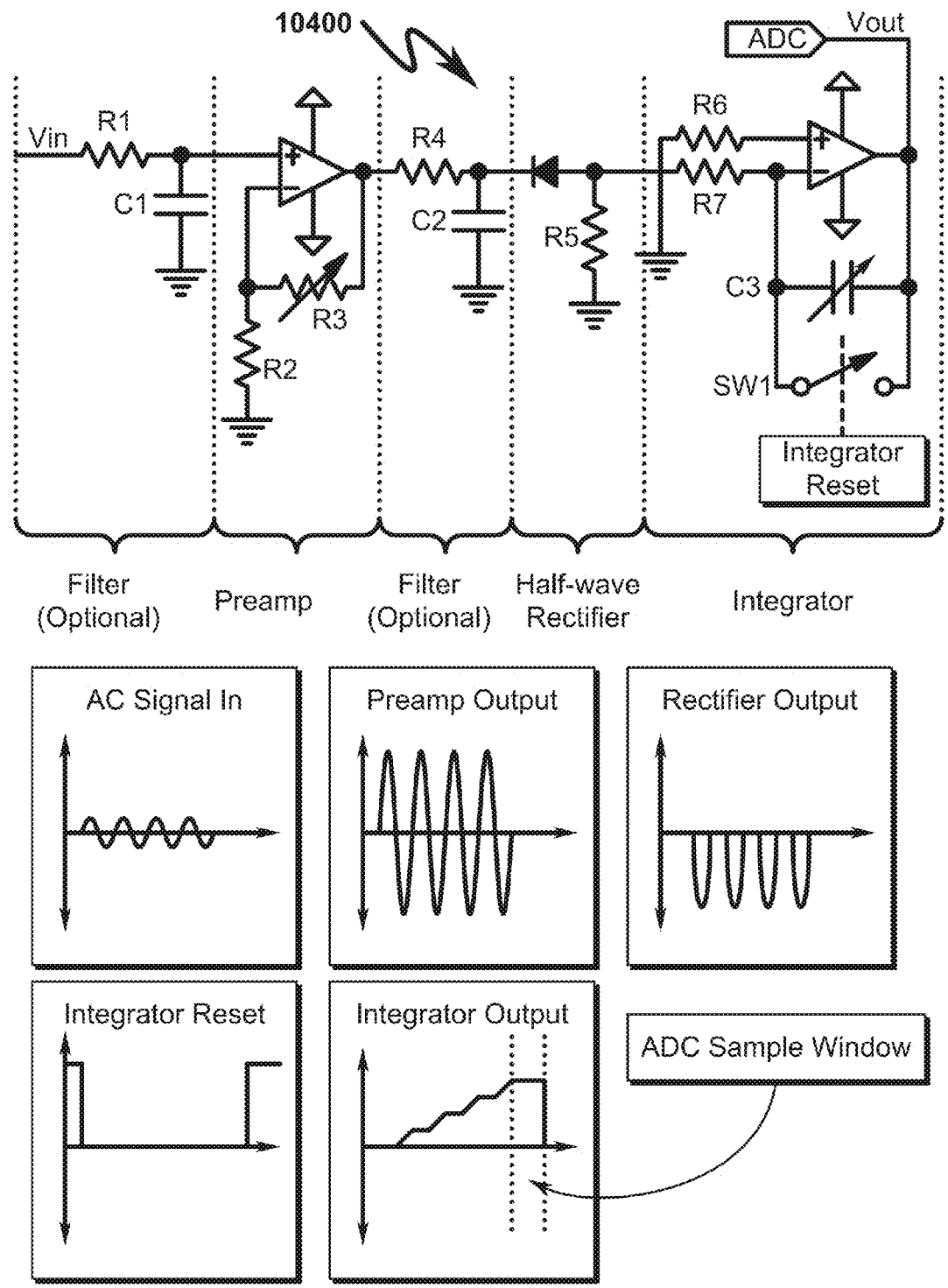
FIG. 104 illustrates circuitry that converts a received AC signal into a DC signal that can be read by an ADC, where the DC value corresponds to the receive strength of the AC signal.

Since the present invention transmits AC frequencies to drive the interpolating capacitive sensor, the receive electronics must be able to reliably detect the strength of a received AC signal. In a system that is using a single transmit frequency, it is possible to build an AC detector circuit as shown in FIG. 104 (10400). This circuit takes a received AC signal and converts it to a DC signal that can be read by an ADC. This resulting DC voltage level indicates the strength of the received AC signal. This is accomplished through a multi-stage signal processing approach as described below.

The first stage is a simple RC filter that is used to reject high-frequency noise. The filter is optional, as it may not be needed in instances where the noise is low enough. The cutoff frequency for this filter can be chosen so that only the desired frequency ranges are passed through. For this particular circuit configuration, the present invention transmits a 200 KHz frequency for the transmit signal. Therefore, the component values selected were R1=1000Ω and C1=100 pF. This yields a cutoff frequency of about 1.6 MHz. It is important to note that this filter does not necessarily have to be an RC low-pass filter, as depicted in the figure. One skilled in the art can use a high-pass filter, band-pass, or notch filter to combat various noise profiles. A passive filter is used here in order to simplify the components needed in the circuit. This filter can be replaced with an active filter to more effectively reject noise.

After this first filter stage, the signal is fed into a non-inverting, variable-gain amplifier (preamp). For this particular circuit configuration, R2=100Ω and R3=10KΩ are chosen for this example. Since R3 is a variable resistor, it is possible to achieve variable gain up to a maximum of 101×. It is important to select an operational amplifier (U1) with a sufficient Gain-Bandwidth Product (GBP). For this circuit configuration, the GBP is 25 MHz. This means that for a gain of 101, this amplifier stage has a bandwidth of about 248 KHz, which will allow the present invention 200 KHz signal to pass through. In practice, it is usually not required that the full gain of the amplifier at this stage, so a GBP of 25 Mhz is more than enough at this stage. An inverting amplifier can be used in this stage as well, since the polarity of the amplified signal does not significantly affect the later stages.

After the preamp stage, another optional filtering stage is illustrated. In this configuration, R4=1KΩ and C4=510 pF are chosen, which yields a cutoff of 312 KHz. As mentioned before, this filter could be replaced with an active filter and could be a high-pass, band-pass, or notch filter.

After the second filter stage, the signal is fed into a half-wave rectifier. This stage blocks the positive side of the waveform, and allows only the negative side to pass through. This allows feeding the signal into the final stage, an integrator. Before the rectifier, the signal is charge-balanced. If the full version of the signal were fed into an integrator, the result would yield zero (the sum of charge after each period of the waveform would be approximately zero). Blocking the positive side of the waveform provides an unbalanced signal that can be properly integrated. Note that the reason that the present invention only passes the negative side of the signal is that the integrator is an inverting integrator, and it is desirable that the integrator to produce a positive signal. In the case of a non-inverting integrator, one would change the polarity of the half-wave rectifier to allow the positive side of the waveform to pass through.

As already mentioned, the final stage is an analog integrator. It is important to note that this integrator has negative gain. By feeding in a negative signal from the rectifier, the output of the integrator will be positive. This allows use of ADCs that are only able to sample positive voltages. For this circuit configuration, R6=100Ω, R7=100Ω, and C7=10 nF are chosen. C7 is a variable capacitor, which allows changing of the charge rate of the integrator. For the integrator stage, it is important to select an operational amplifier (U2) that is unity-gain stable. Otherwise, the integrator will be unstable and the output may oscillate.

SW1 is an analog switch that can be closed/opened by a signal generated from a GPIO on the CCD. Most standard analog switches can be used for SW1. For instance, Texas Instruments makes the TS12A4516, which is perfect for this application. When SW is closed, the charge that is stored by the integrator capacitor is cleared. This in essence resets the integrator. This switch is an important part of the AC signal detector. SW1 must stay closed (integrator is in reset) when selecting which row that is connected to during a scan. This prevents integrating any switching noise that gets through the first few stages of this circuit. Once the correct row is connected to the input of the AC detector, SW1 is opened to start integrating. This gives the most reliable ADC reading for each row.

In FIG. 104 (10400), an ADC Sample Window is also shown on the integrator output waveform. For an integrator, the output settles to a DC value when there is no voltage at the input. For this system, a finite number of cycles from the transmit side of the sensor are integrated. Therefore, after receiving the fixed set of pulses, the integrator output will settle to a DC value. This is where the signal is sampled with the ADC. After the ADC sampling is complete, the integrator is reset and the circuit is made ready to receive the next row.

For this circuit, it is important to note that two parameters can change to tune system performance (R3 and C7). The amount of signal received often depends on the configuration of the sensor this circuit is connected to. Therefore, for a given sensor, R3/C7 must be adjusted accordingly. Typically, the signal will be highest when there is nothing in contact with the sensor, and will decrease when a finger approaches the sensor. To maximize the dynamic range of signal values captured by the ADC it is desirable that the signal that is output by the integrator when there is no touch to be at the upper range of the ADC without clipping. Furthermore, it is desirable to make sure that neither amplifier is being pushed beyond its gain bandwidth product. R3 and C7 can be adjustable either manually (by tuning a variable resistor/variable capacitor), can be adjustable in the design stage, or can be adjustable digitally via software.

Multi-Frequency Receive Circuit with Preamp and High-Seed ADC (10500)

It is important to note that the circuit in FIG. 104 (10400) is not able to distinguish multiple received frequencies. In the case where multiple frequencies need to be captured on a single receive electrode, it is possible to use the approach depicted in FIG. 105 (10500). This circuit is an amplifier that feeds into a high-speed ADC. This high-speed ADC must have a sampling rate higher than 2× the maximum transmit frequency used in the system. One skilled in the art will know that this is to keep the sampling frequency above the Nyquist rate, which eliminates alias effects in the captured signal. In order to capture at such a high rate, it is usually necessary to have an ADC capturing the waveform through a direct memory access (DMA) interface. This allows the ADC to write captured values directly into memory without requiring dedicated CPU cycles.

Software algorithms can then be applied to the signal to perform filtering (for example high-pass, low-pass, band-pass or notch filtering in software) and to detect the amplitude of signals at the transmitted frequency or frequencies. In some circumstance, this approach can be advantageous over the previous approach, even in cases where just one frequency needs to be detected, because it eliminates the rectifier, which cuts the amplitude of the captured signal in half, and because it also eliminates the integrator, which can be difficult to tune and can saturate if the input signal is too high.

Multi-Frequency Separation of Frequencies Using an FFT (10600)

Figure 106:
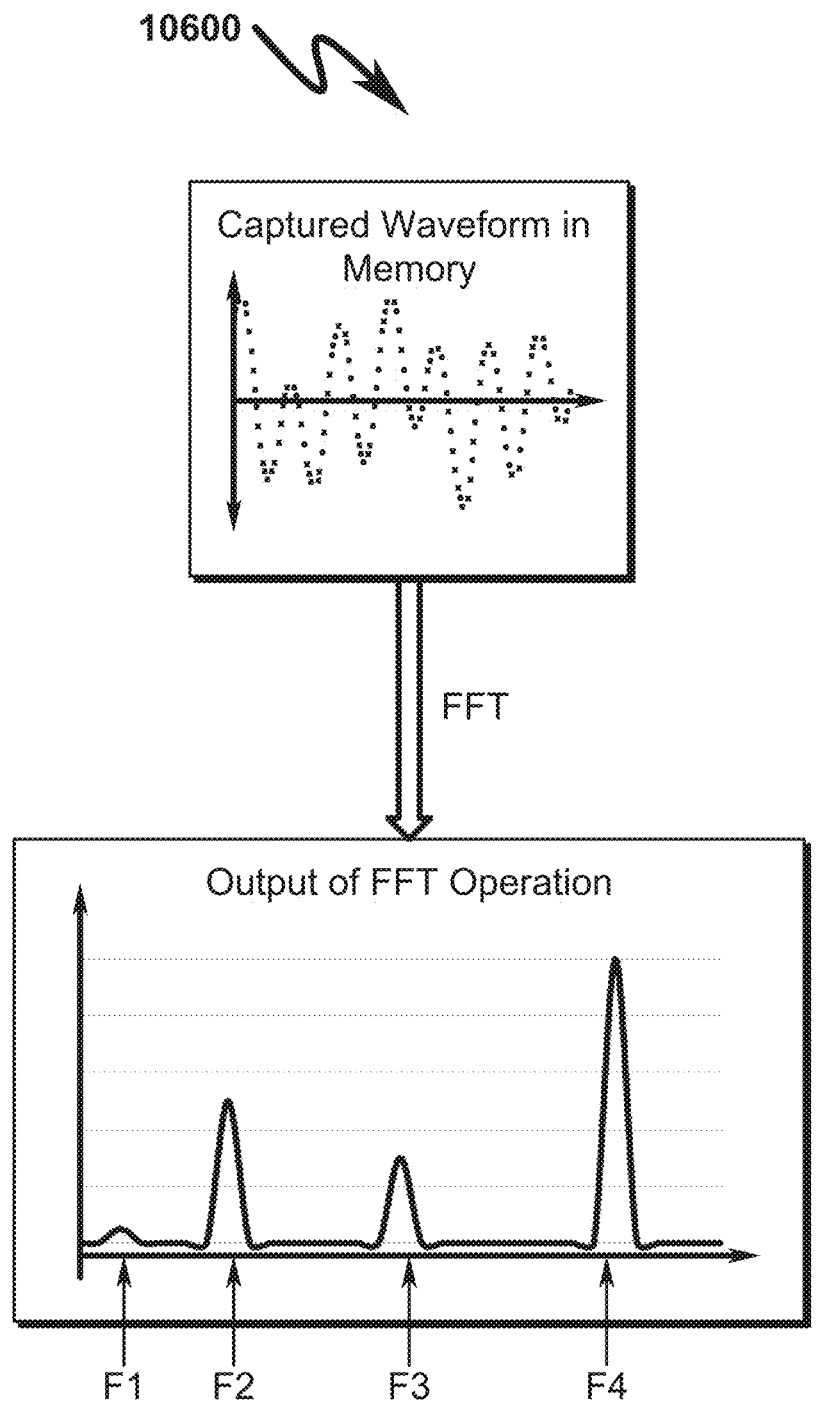
FIG. 106 illustrates using an FFT on a captured waveform to determine the frequency composition of a signal.

Once the waveform is accurately captured, it is possible to run an FFT algorithm (FIG. 106 (10600)) in order to convert the signal from the time-domain into the frequency-domain. This will reveal which particular frequencies make up the received signal and also indicate how much energy was received in each frequency band. In FIG. 106 (10600), it can be seen that the FFT reveals that the received signal is made up of four frequencies (F1, F2, F4, and F4), and it is possible to see the strength at which each was received.

Digitally capturing the signal and performing an FFT makes it possible to simultaneously drive a sensor on multiple columns with different frequencies and to reconstruct digitally the contribution of the signal which comes from each column. It also allows the sensor to determine frequencies at which there is excessive electrical noise and to frequency hop to other channels which may have less noise.

Scanning a Capacitive Sensor

Scan Circuitry with Single Transmitter/Receiver (9300)

Figure 93:
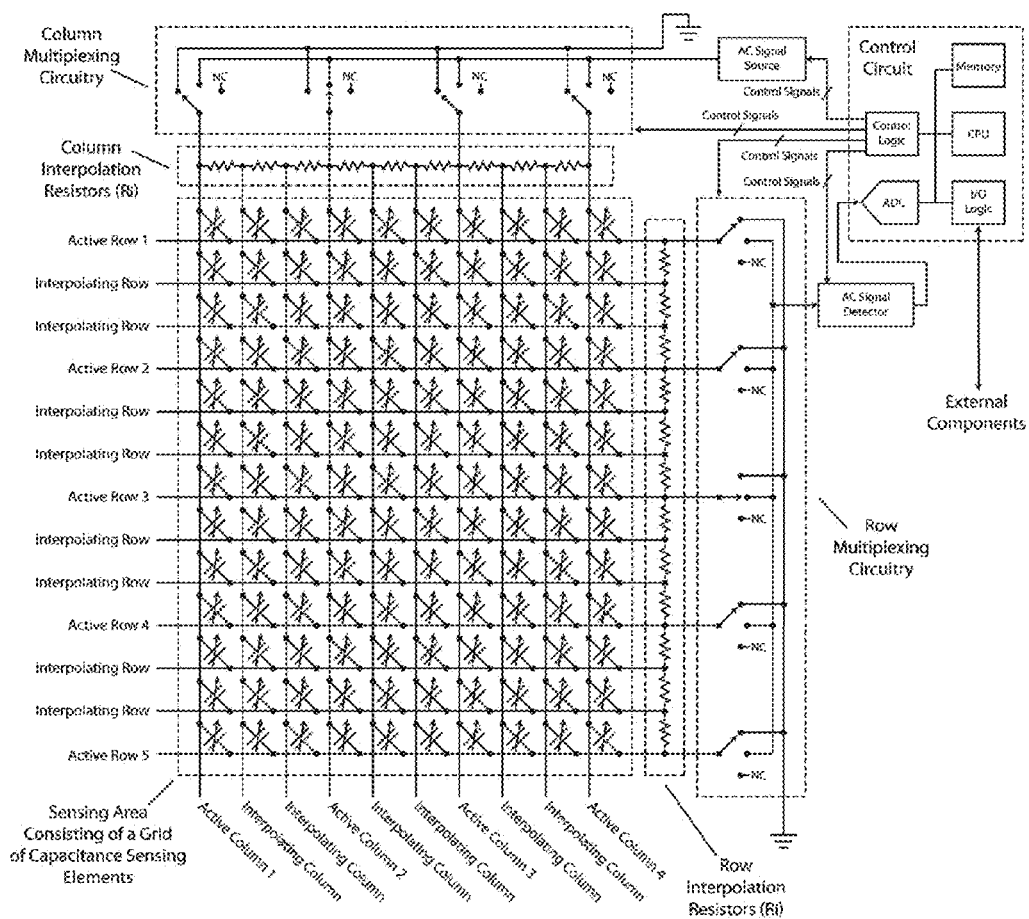
FIG. 93 illustrates an interpolating capacitive touch sensor system that transmits a single frequency from a single active drive electrode to a single active receive electrode.

FIG. 93 (9300) shows scanning circuitry that supports scanning an interpolating capacitive sensor one active row-column intersection at a time.

Exemplary Scanning Method for Single Transmitter (11600)+(11700)

Figure 116:
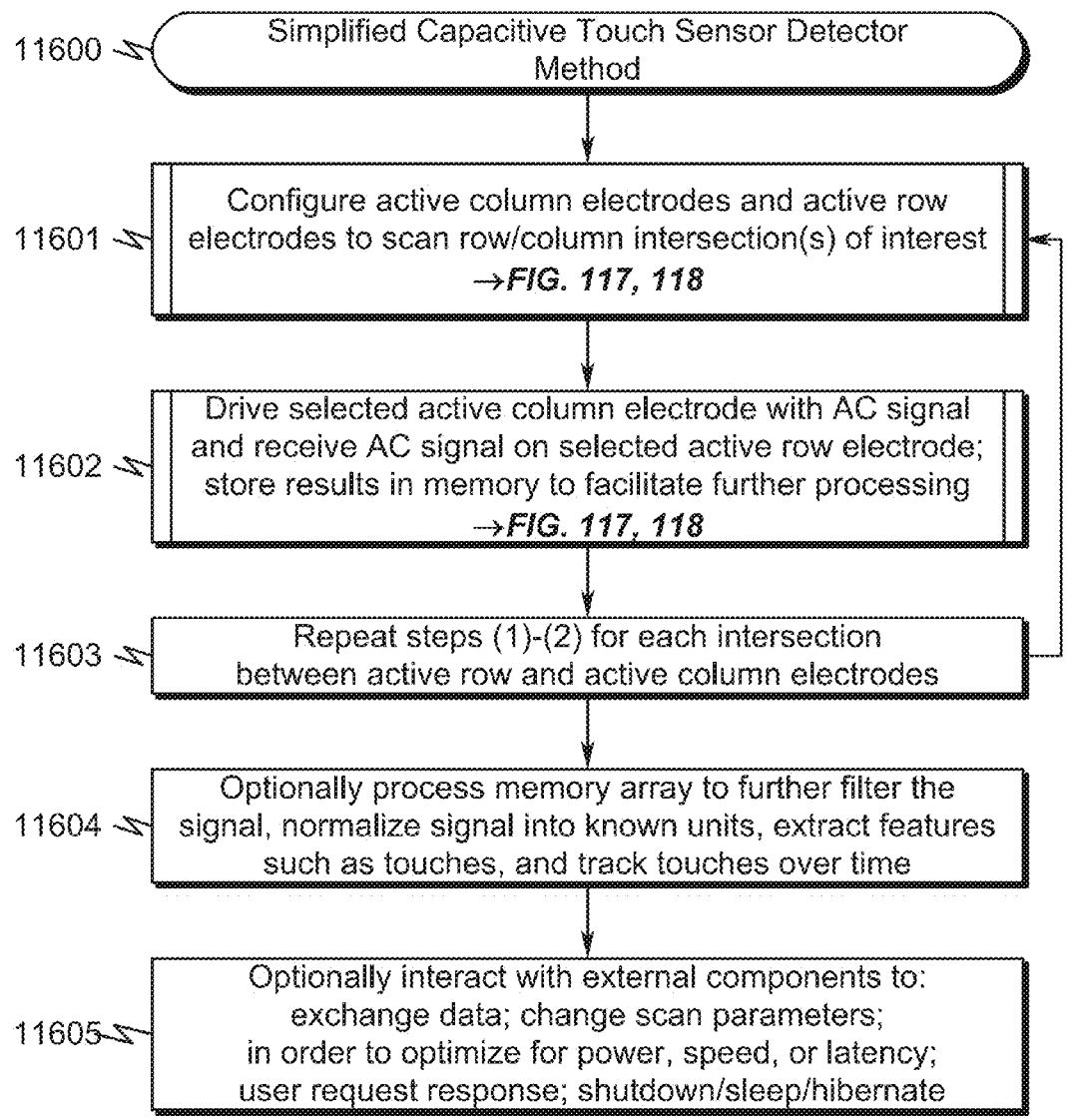
FIG. 116 illustrates a flowchart depicting the scanning method for an interpolating capacitive touch sensor.
Figure 117:
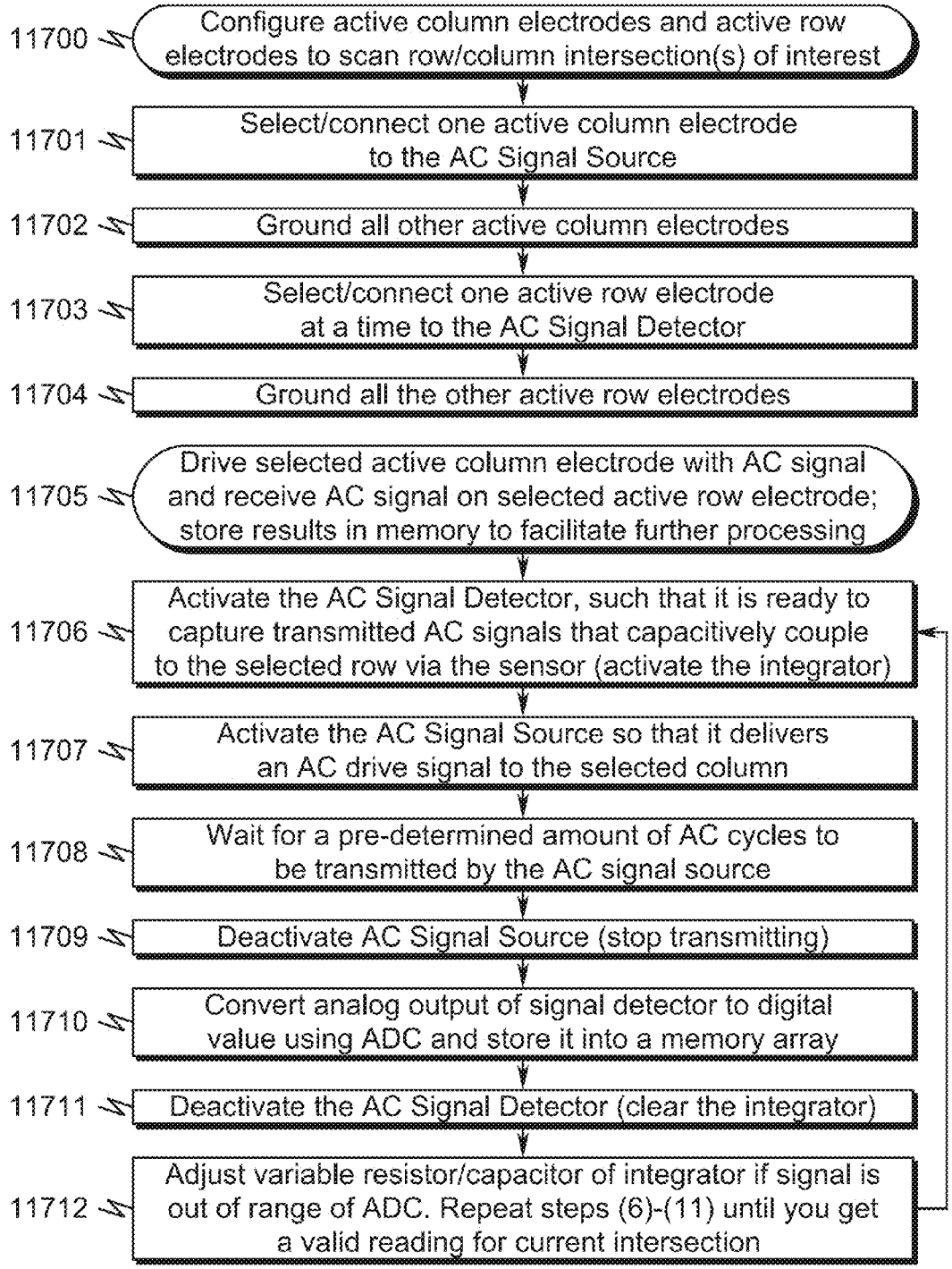
FIG. 117 illustrates a flowchart depicting the scanning method subroutines for an interpolating capacitive touch sensor system that embodies the structure shown in FIG. 93.

An exemplary method for scanning this type of sensor is shown in FIG. 116 (11600), with the appropriate sub-routines detail defined in FIG. 117 (11700).

Scan Circuitry with Single Transmitter/Multiple Receivers (9400)

Figure 94:
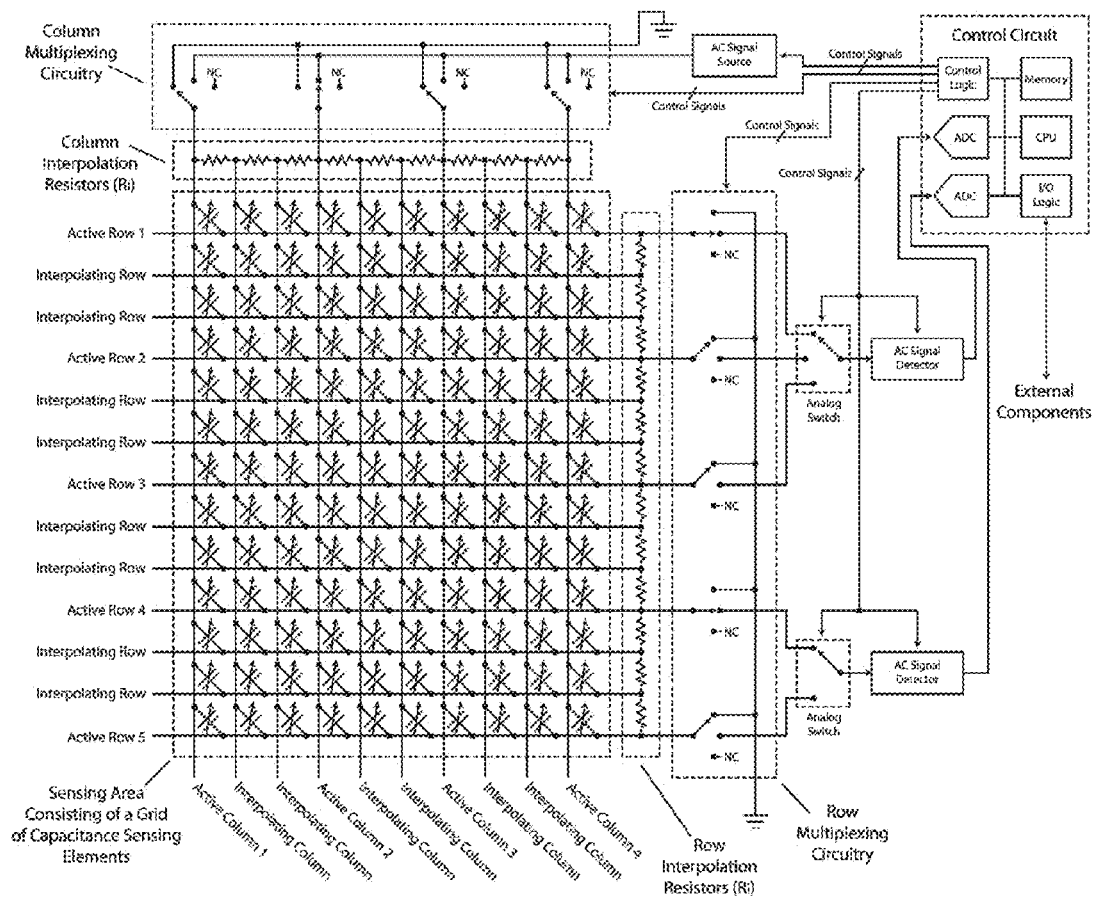
FIG. 94 illustrates an interpolating capacitive touch sensor system that transmits a single frequency from a single active drive electrode to multiple active receive electrodes.

FIG. 94 (9400) shows scanning circuitry that supports scanning multiple rows of an interpolating capacitive sensor simultaneously. Instead of having all the active rows connected to a single AC Signal Detector and ADC, there are multiple instances of the AC Signal Detector and ADCs. Analog switches allow each AC Signal Detector and ADC to connect to more than one active row. (Texas Instruments part TS12A12511 or a similar part with the appropriate number of throw terminals would work well for this).

Exemplary Scanning Method for Multiple Receivers (11600)+(11700)

The method for scanning this type of sensor is the same as the method depicted in FIG. 117 (11700) for a sensor with a single transmitter and receiver, however, for each scan cycle, multiple AC Signal Detectors can be connected to multiple active sense electrodes and multiple ADC samples can be taken, reducing overall scan time.

Scan Circuitry with Multiple Transmitters (Multiple Frequencies) (9500)

Figure 95:
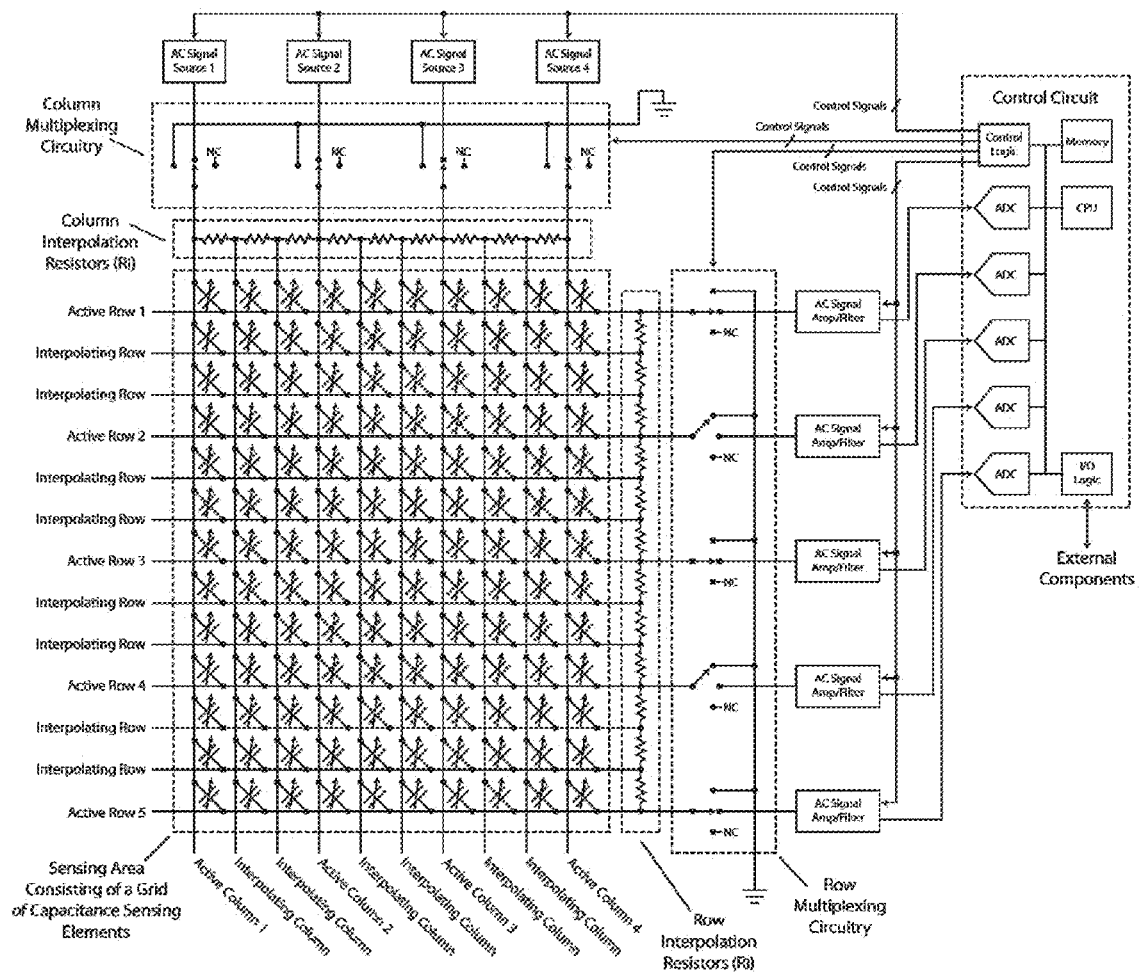
FIG. 95 illustrates an interpolating capacitive touch sensor system that transmits multiple frequencies from multiple active drive electrodes to multiple active receive electrodes.

FIG. 95 (9500) shows scanning circuitry with multiple transmitters on the column lines. Using this circuitry, it is possible to transmit different frequencies simultaneously on different columns, and to reconstruct, for a given row, the contribution of the signal coming from each active column.

To reconstruct the signal contribution from each active column, multiple samples of the signals must be collected by the ADC over time. Then, an FFT can be applied to the signal to determine the amplitudes at each transmitted signal. These signal amplitudes can then be mapped back to the column positions at which they were generated and written to a TSM. Alternatively, multiple AC Signal Detectors, tuned to different frequencies can be used in parallel to detect multiple frequencies. However, this may be prohibitive from a power and cost standpoint.

If there is only a single AC Signal Amp/Filter in the system, this procedure can be performed once for each row until the entire capacitive sensor profile is reconstructed. Furthermore, it may be advantageous to drive only a subset of columns simultaneously, to allow more separation between frequencies and more spatial separation between driven columns. In this case, the Column Multiplexing Circuitry can be used to ground the columns which aren't being actively driven. Then, several passes with different combinations of driven and grounded columns can be performed to reconstruct the entire capacitive sensor profile.

Exemplary Scanning Method for Multiple Transmitters (11600)+(11800)

Figure 118:
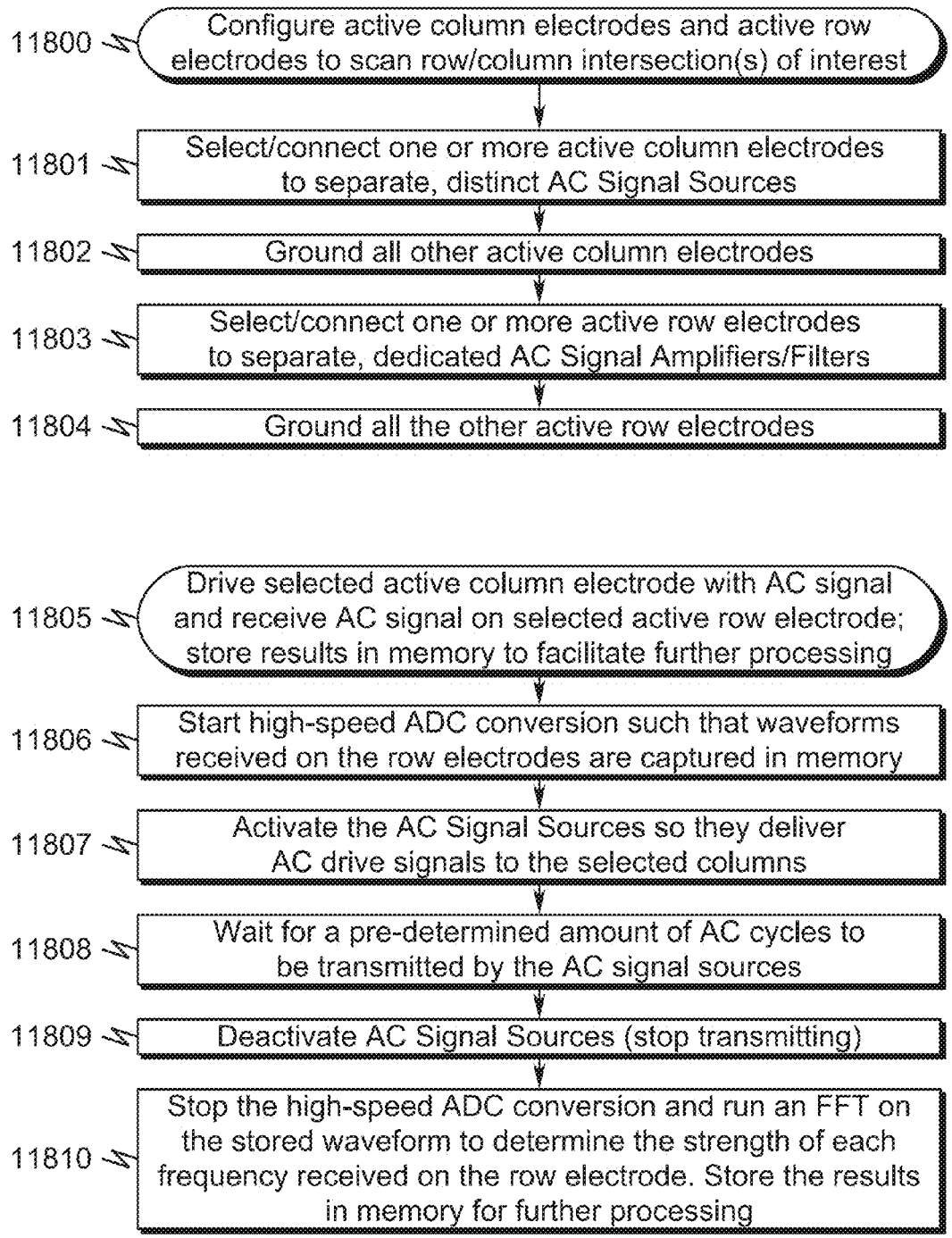
FIG. 118 illustrates a flowchart depicting the scanning method subroutines for an interpolating capacitive touch sensor system that embodies the structure shown in FIG. 95.

The method for scanning this type of sensor is shown in FIG. 116 (11600), with the appropriate sub-routines defined in FIG. 118 (11800).

Scan Circuitry with Multiple Transmitters/Receivers (Multiple Frequencies)

Taking this one step further, it is possible to use multiple transmitters on the columns and multiple receivers on the rows as shown in FIG. 95 (9500) to scan a two-dimensional array of sensor elements simultaneously. In this case, multiple transmitters can simultaneously transmit different frequencies, while multiple receivers simultaneously sample multiple rows. Then FFTs can be applied to the signals at each row to reconstruct the different contributions at each row from the transmitters at each column and to reconstruct a two dimensional array of signal values.

As mentioned in the previous description, it may be advantageous to drive a subset of columns and/or to scan only a subset of rows simultaneously. In this case, all the other rows and/or columns can be attached to ground using the Column and Row Multiplexing Circuitry. Then, several passes can be performed with different driven Row/Column combinations to reconstruct the entire capacitive sensor profile. As an example, in FIG. 95 (9500), it can be seen by looking at the state of the Column and Row Multiplexing Circuitry, that all the Columns are being driven simultaneously, while only every other row is being scanned simultaneously.

Supporting Active Stylus

Capacitive touch sensors can generally be used with one of three types of stylus. The first type of stylus attempts to mimic the capacitive properties of a human finger. These types of styli are typically made of conductive material and have a big, squishy (pliable), rubber tip. The downside of this type of stylus is that they are very imprecise and it is difficult to do palm-rejection with this type of stylus since it is difficult to determine which touch is coming from the stylus and which touch is coming from a finger/palm.

The second type of stylus is an active stylus which automatically synchronizes to the transmit circuitry of the sensor, and generates an inverse signal to the signal the sensor expects. These types of styli essentially mimic the capacitive signature of a finger. Because these do not need any special mode of communication with the capacitive sensor, no additional discussion of these types of active styli is presented here.

The third type of stylus is an active stylus which is able to communicate with the sensor to determine its location relative to the sensor grid. This type of stylus can be configured to transmit data to the sensor, receive data from the sensor, or to do both. The advantage of this approach is that an active stylus using one of these approaches can achieve much greater accuracy, and that this kind of active stylus is easy to distinguish from a finger or palm, allowing the user to rest their hand on the surface of a sensor while using the stylus and facilitating other types of interaction.

The rest of this section describes ways of implementing this type of active stylus with an interpolating capacitive sensor.

Synchronization of Sensor and Stylus

In order to support an active stylus, it may be important to synchronize the sensor with the stylus. If a sensor is sending signals to a stylus, the stylus needs to know where in a particular scan the sensor is at a given time. If a stylus is transmitting a signal, the sensor needs to know when to activate its receive circuitry. Furthermore, if the stylus attempts to transmit while a sensor is just scanning for touches, this may cause unwanted electrical noise and may confuse the sensor. Thus, an active stylus which transmits should have a way of only transmitting when the sensor is looking for the stylus. Synchronization methods will be discussed in the following sections for each of the different types of scans.

Performing a Stylus Scan (12400)

Figure 124:
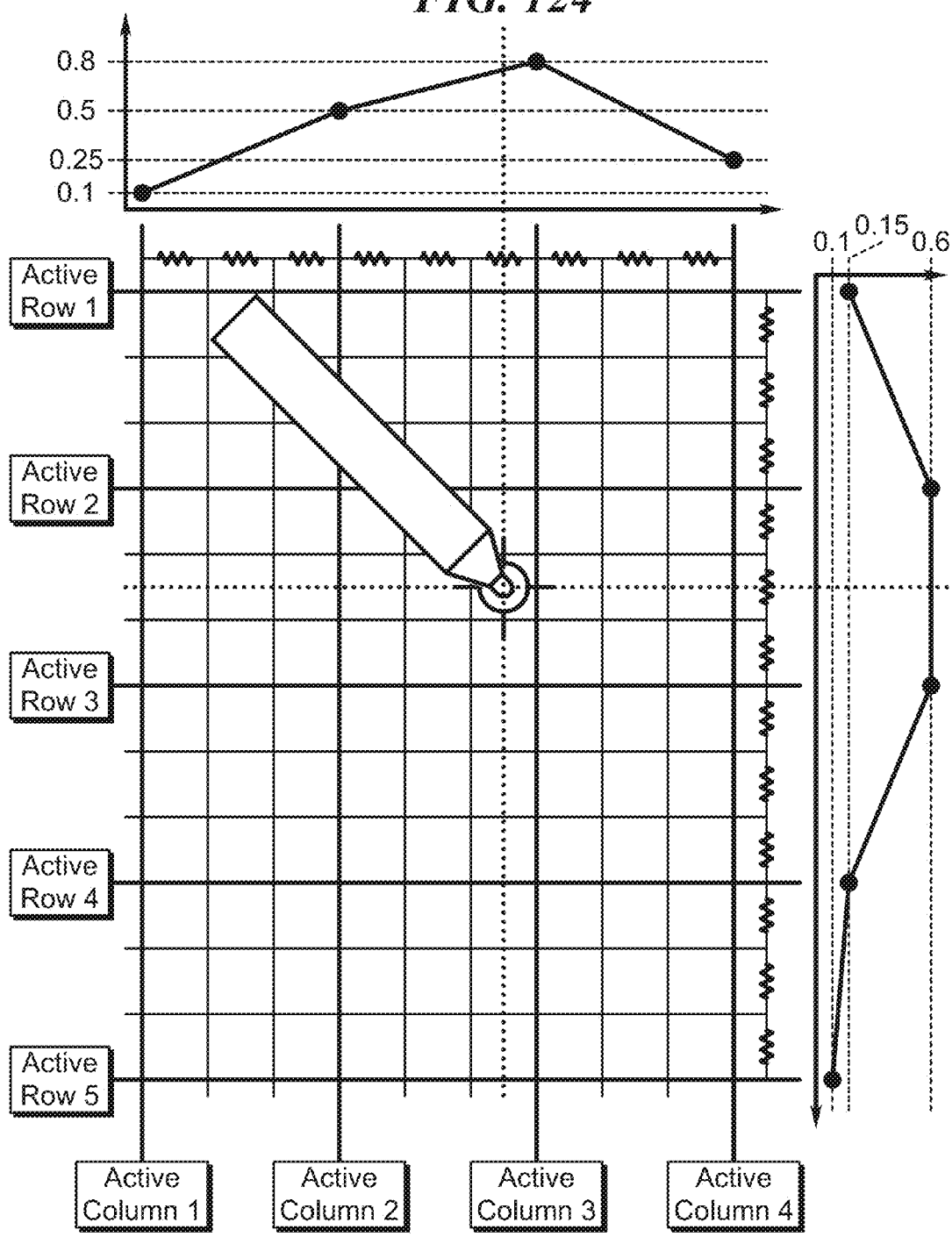

FIG. 124 (12400) depicts the interaction between and active stylus and an interpolating capacitive sensor. Because the sensor generally only communicates with one stylus at a time, a full matrix scan is not necessary for detecting the position of a stylus. Instead, to determine the position of the stylus, the present invention needs only to determine its X position and its Y position. To determine the X position, one scan along the columns may be performed, measuring the signal strength between each active column and the stylus. An interpolation algorithm can then be used to determine the coordinate of the stylus along the X axis. Next, the same procedure can be performed along Y, this time measuring the signal strength on each active row to the stylus. FIG. 124 (12400) shows the amount of coupling between the stylus and the sensor in the form of two graphs (one below and one to the right of the sensor). In the configuration where the stylus is transmitting and the sensor is receiving, the dots on the graph indicate the amount of signal that is received at each active electrode (along X and Y). In a configuration where the sensor is transmitting and the stylus is receiving, the dots indicate the amount of signal the stylus will receive from each active electrode.

Because this type of scan only needs to be done along active columns and rows (instead of all the active column-row intersections), this type of scan can be performed very quickly (much faster than scanning for multiple touches). Furthermore, because stylus latency is much more noticeable than finger latency, and because writing and sketching involves very fast and precise motions, this type of scan can be performed at a higher frequency than scans for fingers.

Stylus Interpolation Algorithm

Because an active stylus receives/transmits signals to the VIA wirelessly, a non-zero signal strength will typically be detected for each active row and active column of the sensor (FIG. 124 (12400)). However, the signal strengths reported for rows/columns that are far away from the position of the stylus at a given point in time are generally very low. For example, note that the bottommost active row of FIG. 124 (12400) has a very low signal. Thus, before computing the interpolated X or Y position, the present invention must first determine which signals should be interpolated.

In one preferred exemplary approach, two neighboring locations with the two strongest signals and the two additional locations adjacent to those (four locations in total) are used to compute an interpolated position. Referencing FIG. 124 (12400), it can be seen that active columns 2 and 3 have the strongest signals. The two neighboring locations are active columns 1 and 4. Thus, active columns 1, 2, 3 and 4 will be used in this case to compute the X stylus location. Similarly, along the rows, active rows 2 and 3 have the strongest signals and their neighbors are active rows 1 and 4. Thus active rows 1, 2, 3 and 4 will be used in this case to compute the Y stylus location.

To compute the X and Y location, the weighted average position of the four selected columns is computed, where the weight is the signal strength. The interpolated position is computed as the sum of the four positions multiplied by their respective signal strengths divided by the total of the signal strengths at the four locations. The formula is thus:

InterpolatedPosition=(Position1*SignalStrength1+
Position2*SignalStrength2+
Position3*SignalStrength3+
Position4*SignalStrength4)/(SignalStrength1+
SignalStrength2+SignalStrength3+
SignalStrength4)

As an example, since the signal strengths of the selected active columns 1, 2, 3 and 4 in FIG. 124 (12400) are 0.1, 0.5, 0.8, and 0.25 respectively, the interpolated X position is computed as: (1*0.1+2*0.5+3*0.8+4*0.25)/(0.1+0.5+0.8+0.25)=2.73. Since the signal strengths of the selected active rows 1, 2, 3 and 4 are 0.15, 0.6, 0.6, and 0.15 respectively, the interpolated average Y position is computed as (1*0.15, 2*0.6, 3*0.6, 4*0.15)/(0.15+0.6+0.6+0.15)=2.5.

Stylus Tin Sensor

One challenge with an active stylus as described so far is that it may be difficult to determine whether the stylus is in the air or touching the sensing surface. The reason for this is that the stylus will continue to transmit/receive signals from the sensing surface even when it is above the sensor, and it may be difficult to determine purely from the signals whether the stylus is touching the surface or not. Furthermore, in the case of a purely capacitive touch sensor, it may be difficult to determine the amount of force that is being applied to the stylus.

To address this problem, a tip sensor may be included in the stylus to determine whether the stylus is in contact with the sensor surface and to determine the amount of force exerted onto the stylus by the user. There are many known ways to implement this type of tip sensor such as a switch, an optical force sensor, a capacitive force sensor, a resistive force sensor, an inductive force sensor, etc.

Information about whether the stylus is touching and the amount of force exerted on the tip can be relayed via BLUETOOTH® wireless communications or via a signal transmitted from the stylus to the interpolating capacitive sensor. This information can be used in application software to (for example) change the darkness or width of a stylus stroke rendered to the screen.

In addition to a sensor at the tip, the stylus may have other sensors embedded in the body or on the other end, in the form of an "eraser". All of these types of sensors can be implemented in a similar fashion and can transmit data to/from the device via BLUETOOTH® wireless communications or via a signal transmitted from the stylus to the interpolating capacitive sensor.

Stylus Hover

In cases where the stylus is not in contact with the surface, it may be possible to determine the approximate stylus position and height above the sensor. This can be extremely useful in applications where a display and a touch sensor are not co-located, allowing a user to see where the stylus is before touching it down. It is also useful for implementing virtual drawing tools such as an airbrush (since real airbrushes apply paint when in the air above the surface being painted).

The position of a hovering stylus can be simply determined in the same way as the position for a stylus that is touching the sensor. The height can be determined by looking at the total signal strength received at the four X and Y active columns and rows with the highest signals (described previously). For a stylus in contact with the surface of the sensor, the sum of these signal strengths is typically constant. As the stylus moves away from the surface of the sensor, the sum of the signal strengths will decrease in a repeatable manner. The relationship between total signal strength and height above the sensor surface can be measured analytically, and then stored in a lookup table, which can be accessed at runtime to compute the height of the stylus above the sensor surface.

Multiple Styli

Multiple active styli can be used with an interpolating capacitive sensor either simultaneously (two or more styli used at the same time), or non-simultaneously (the user can have many different active styli, but use them only one at a time).

Because each stylus has a receiver/transmitter, communication between multiple styli and a given interpolating capacitive sensor can be sequenced in time, so that each stylus can have a chance to determine an X/Y position separately. Furthermore, each stylus can have a unique ID, communicated via BLUETOOTH® wireless communications or transmitted from the stylus tip to the interpolating capacitive sensor. The unique ID can be used to give different styli different functions, such as different tip shapes, different colors, or different user identities (the device can determine which user is writing based on which stylus is being used). Alternatively, communications between multiple styli and the interpolating capacitive sensor can occur in different AC frequency bands.

Multiple Receivers/Transmitters

A single stylus can have multiple receivers/transmitters (which will be referred to as transceivers), allowing finer grained determination of stylus orientation. For example, if there are two transceivers at the tip next to each other, stylus rotation can be determined based on the relative (X,Y) positions of the two transceivers. Alternatively, if there are two transceivers, one above the other, near the tip, stylus tilt can be determined by determining the relative (X,Y) positions of the transceivers, as well as the height of the upper transceiver. There can also be transceivers on the back-side of the stylus, to support an erase feature.

Sensor Circuitry/Method for Transmission to Stylus (9600)+(11900)+(12000)

Figure 96:
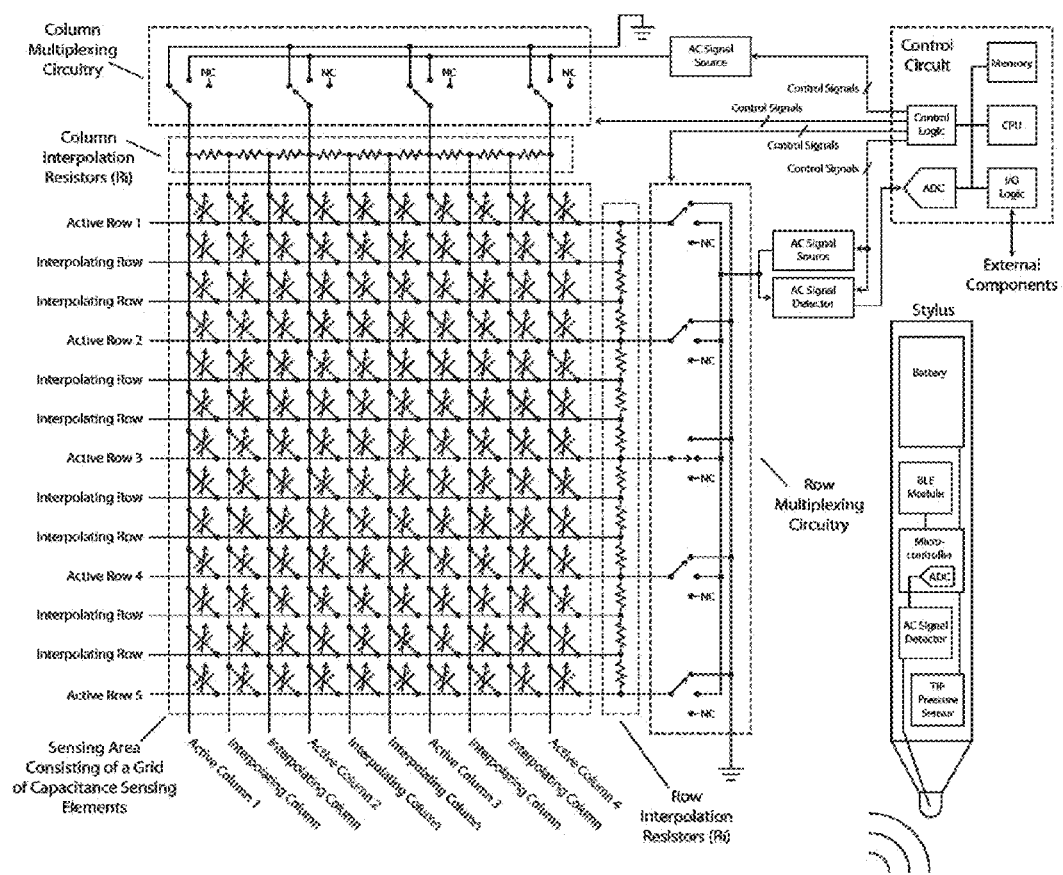
FIG. 96 illustrates an interpolating capacitive touch sensor system that transmits a single frequency from a single active drive electrode to a receiving stylus.
Figure 119:
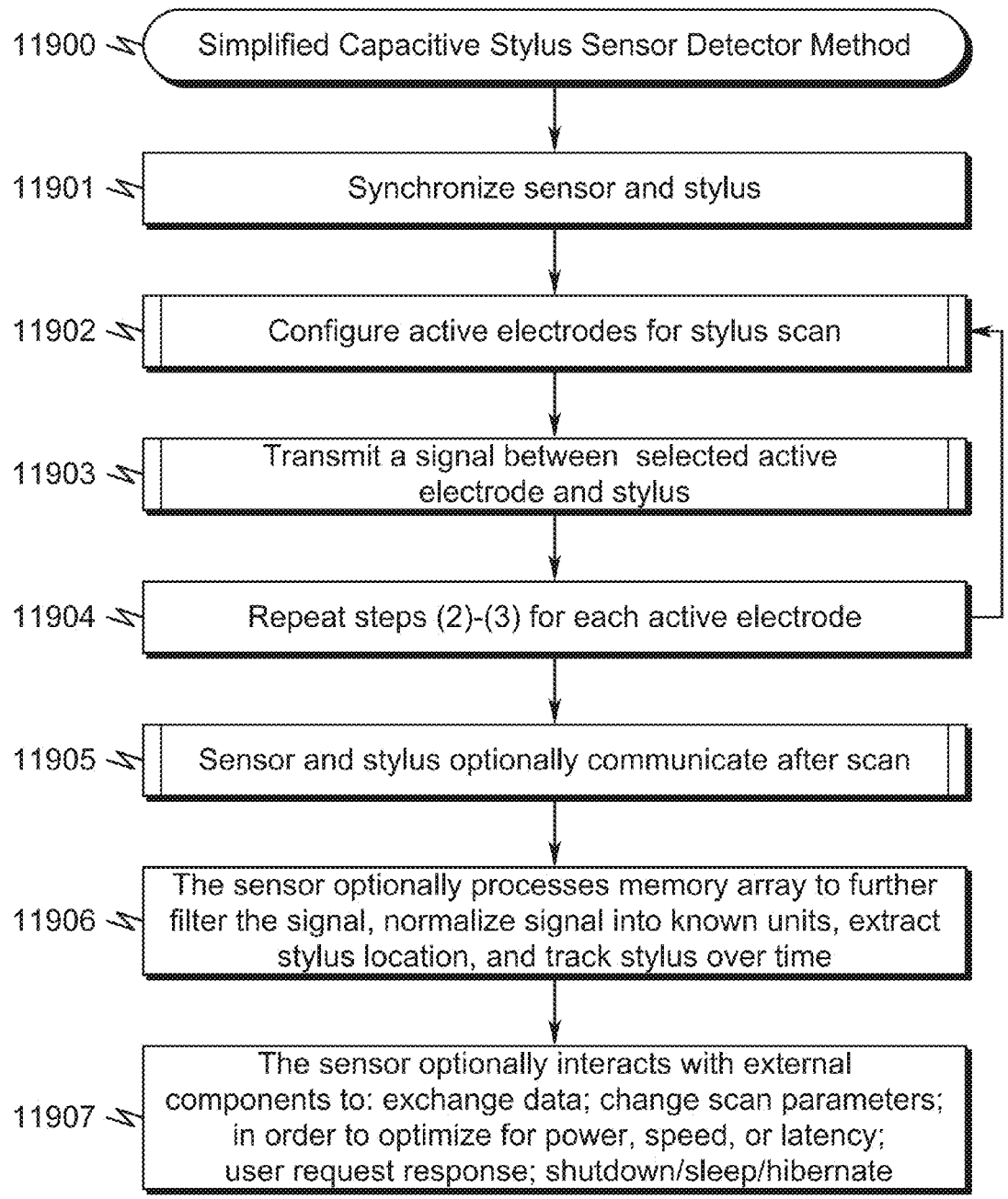
Figure 120:
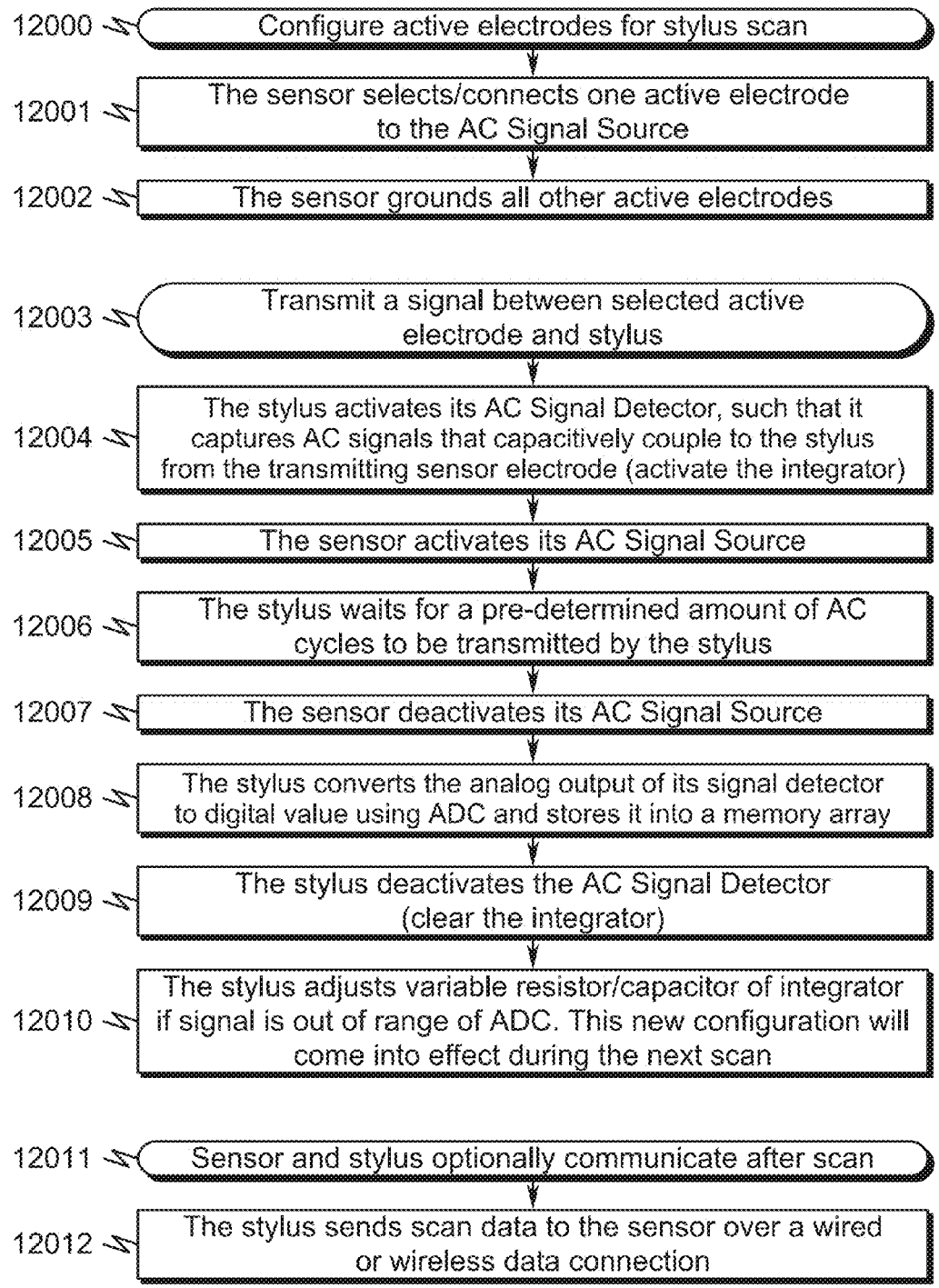

FIG. 96 (9600) depicts a circuit configuration in which the sensor transmitted AC signals to a stylus which is configured to receive these signals. An exemplary method associated with this scanning circuitry is illustrated in FIG. 119 (11900), with sub-routines further defined in FIG. 120 (12000).

The sensor/stylus interaction is as follows. First, the sensor and stylus must synchronize with each other. To accomplish this, the sensor transmits a unique synchronization frequency on all of the sensor rows/columns at the same time. The stylus waits until it detects the presence of this particular frequency. This marks the beginning of a scan. After the sensor sends its synchronization beacon, the sensor connects one active electrode at a time to the AC Signal Source and transmits a predetermined number of pulses to the electrode. Since the stylus and sensor are synchronized, the stylus knows how long each electrode transmission will take.

The stylus goes into receive mode while the sensor is transmitting, and converts the signal receive strength into a digital value using a method like that shown in FIG. 104 (10400). The stylus logs the receive strength of the signals from each electrode that it received during the scan. After the scan is complete, the stylus can send the raw data to the sensor over BLUETOOTH® wireless communications or other similar wireless data channel so that the sensor can process the data and calculate the position of the stylus. In another embodiment, the stylus can internally compute its own position using its on-board microcontroller and send the computed position to the sensor.

Alternatively, synchronization can be performed by using BLUETOOTH® wireless communications. This is due to the fact that the BLUETOOTH® wireless communications transmitter and receiver need accurate time synchronization, and this same synchronization can be used to generate a common time-base and schedule between the stylus and the sensor, which can be used to synchronize the signals sent on each column and row. Yet another way to perform synchronization is for the sensor to send a synchronization pulse sequence for each row/column being scanned. The sequence can be encoded using Amplitude Modulation, Frequency Modulation, Phase Modulation or other known modulation scheme.

Sensor Circuitry/Method for a Transmitting Sensor (9700)+(11900)+(12100)

Figure 97:
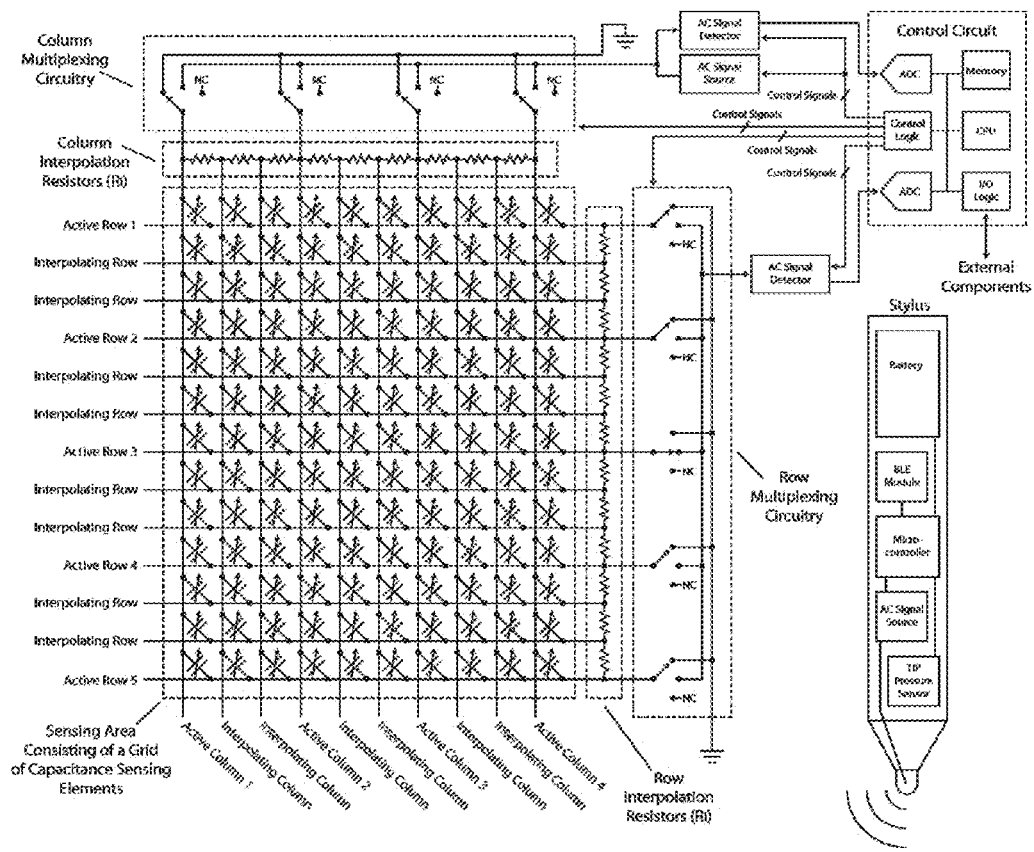
FIG. 97 illustrates an interpolating capacitive touch sensor system that receives a single frequency from a transmitting stylus on a single active receive electrode.
Figure 121:
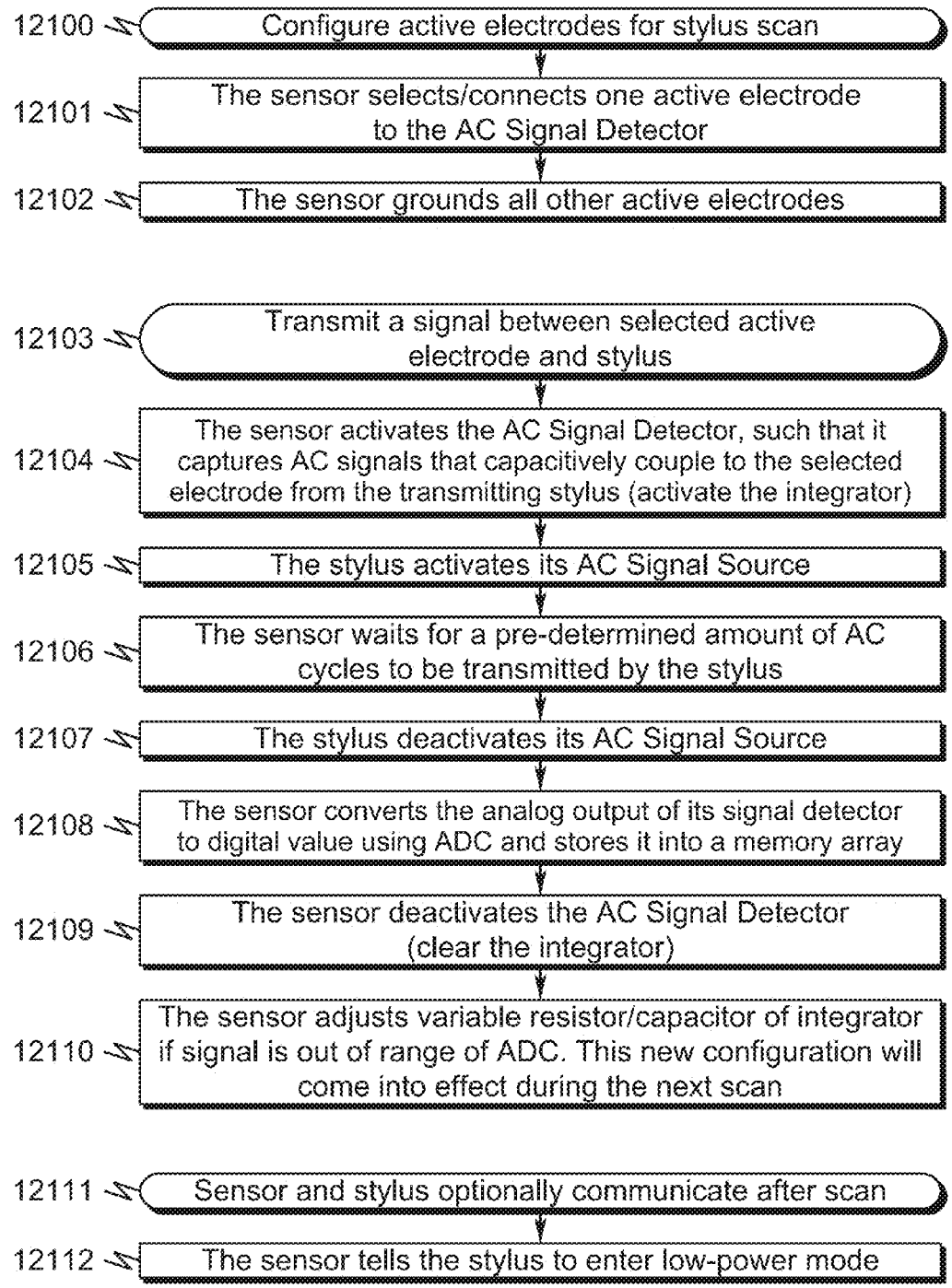

In this configuration, the stylus will be transmitting AC signals to the sensor, which is configured to receive these signals (see FIG. 97 (9700)). The method for this scan is illustrated in FIG. 119 (11900) with subroutines defined in FIG. 121 (12100).

In this exemplary embodiment, the stylus can be in a low power mode until the sensor is ready to scan for the stylus. This prevents the stylus from transmitting during a scan for touches. When the sensor is ready to start a stylus scan, the sensor can signal to the stylus to start transmitting pulses using the BLUETOOTH® wireless communications connection.

The stylus will emit a predetermined number of pulses at a periodic interval. Since the sensor knows how long each of these pulses takes, the sensor can electrically couple each active electrode in turn up to the AC Signal Detector, and receive while the stylus should be transmitting. The sensor will generate a list of received signal strengths that can be used to calculate the position of the stylus. After the scan, the sensor can instruct the stylus to go back into a low power mode until it is time for the next scan.

Sensor Circuitry/Method for Bdirectional Stylus (9800)

Figure 98:
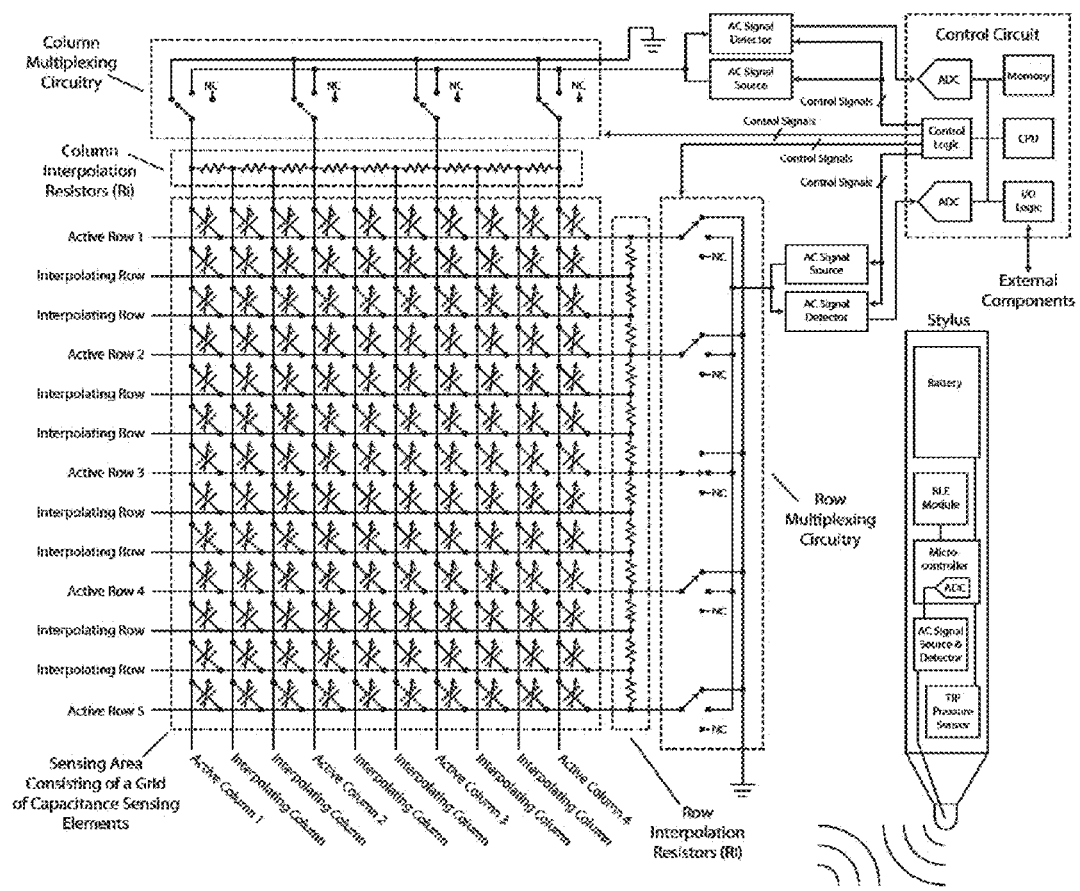
FIG. 98 illustrates an interpolating capacitive touch sensor system that transmits and receives a single frequency from a bi-directional stylus to a single active bidirectional electrode.

The previous two methods can be combined to allow bi-directional communication between the stylus and the sensor as shown in FIG. 98 (9800). To enable this, the interpolating sensor requires a set of AC signal transmitters and detectors on both the columns and rows and the stylus, similarly, requires a set of AC signal transmitters and detectors for the stylus tip. One advantage of this configuration is that bi-directional synchronization can be performed without BLUETOOTH® wireless communications. Furthermore, triangulation can be performed by transmitting a signal from the sensor to the stylus, from the stylus to the sensor, or in both directions. This can be used to increase the accuracy of the triangulation.

Other Types of Objects with Active Tracking

The transceiver circuitry presented here for active tracking of a stylus can be applied to other types of objects. For example, they may be embedded into paint-brushes, rulers, toys, even into thimbles, to allow tracking of those objects of the interpolating capacitive sensor surface.

Combining Force Sensing and Capacitive Sensing

Force/Capacitive Sensing Circuitry (9900)

Figure 99:
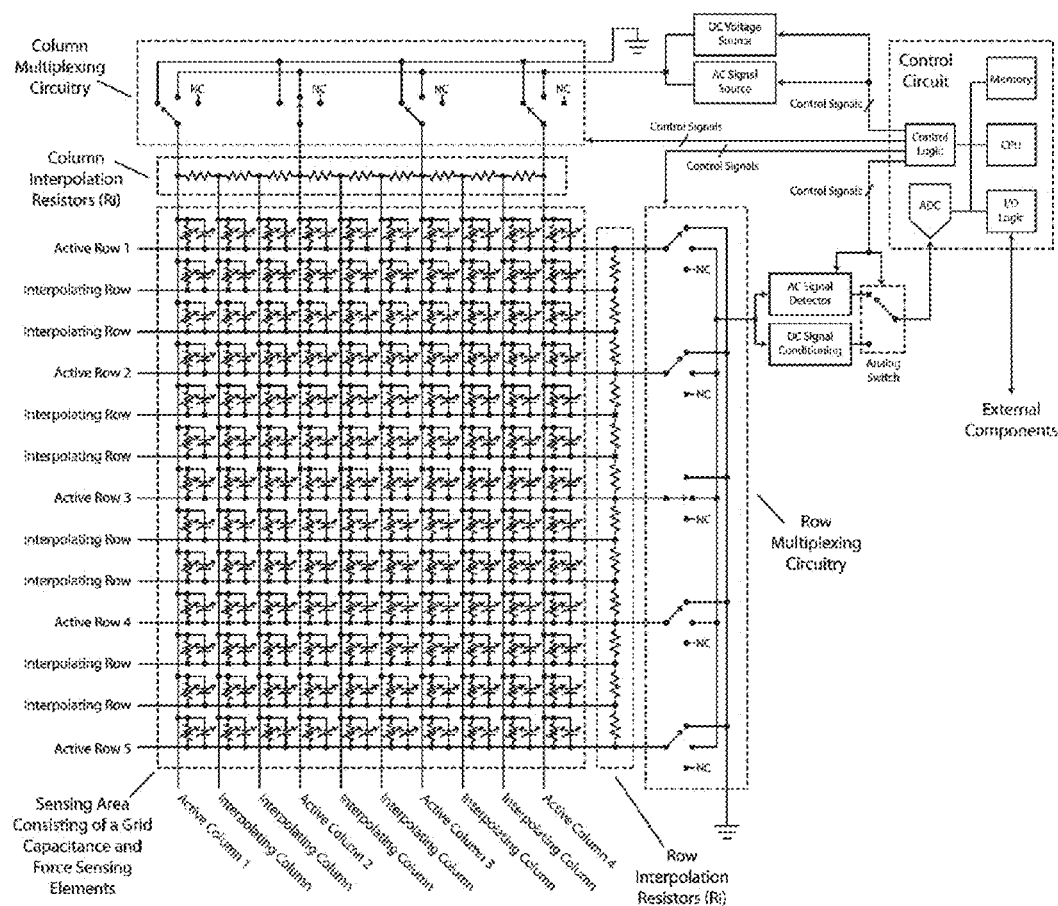
FIG. 99 illustrates a sensor that combines an interpolating capacitive touch sensor system with an interpolating resistive touch sensor system.

All of the force-sensing sensor configurations shown earlier (FIG. 41 (4100) FIG. 64 (6400)) can be scanned both with a DC signal to measure applied force and with an AC signal to measure capacitive coupling. FIG. 99 (9900) shows a circuit diagram which details the electronics necessary to scan a sensor both with AC and with DC signals. It also shows a sensor VIA where each of the sensor elements acts as both a variable resistor and a variable capacitor.

Figure 48:
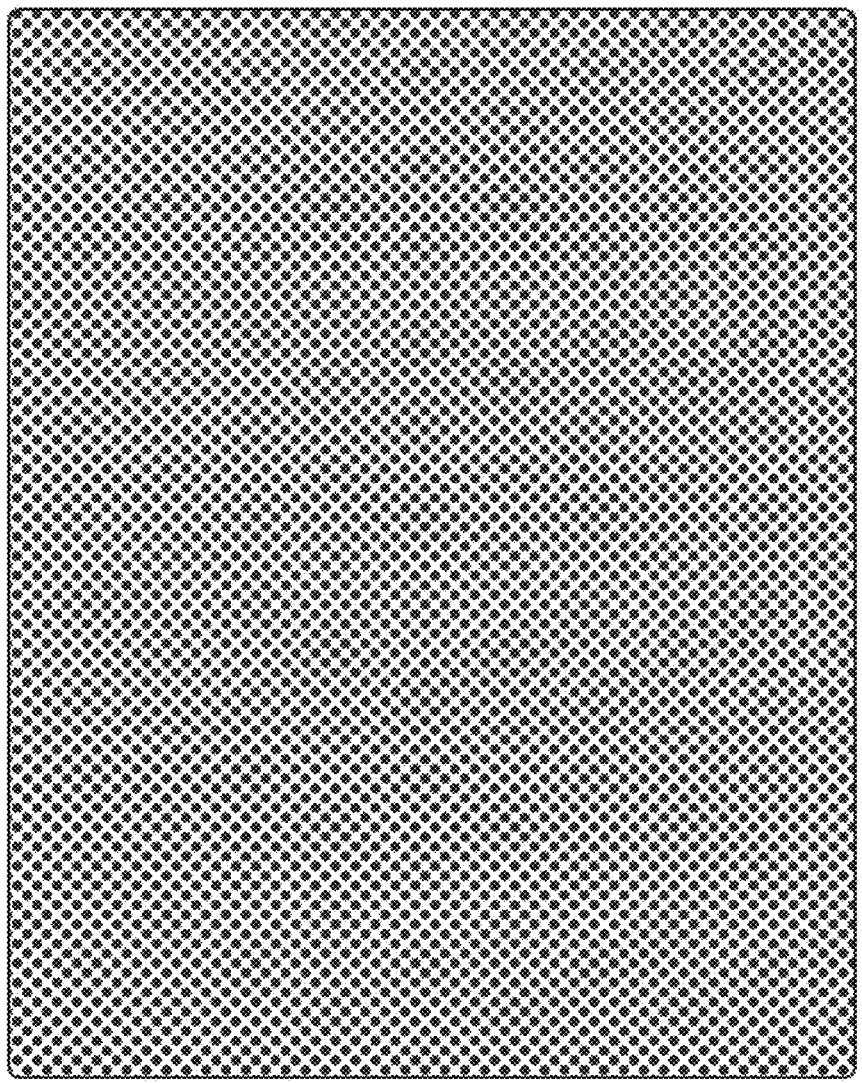
FIG. 48 illustrates detail of a patterned FSM layer wherein the patches of FSM material are shown in black and the substrate holding the FSM material in place is shown in white. Because the pattern is finer than the scale of individual sensor elements, cross-talk between neighboring sensor elements is minimized. This can be used instead of the thin FSM layer shown in FIG. 47 (4700) in a thru-mode sensor configuration. This type of FSM configuration can also be used as the force sensing layer in any shunt-mode sensor configuration.

It has been determined experimentally that in sensors which have a non-continuous force-sensing layer (such as shown in FIG. 41 (4100)-FIG. 42 (4200), FIG. 46 (4600), FIG. 48 (4800), FIG. 49 (4900) and FIG. 50 (5000)-FIG. 60 (6000)) the electric field lines are able to pass through the force sensing layer and can be affected by fingers and conductive objects. Thus, it is possible to operate the sensor both as a capacitive sensor (sensing light contact by conductive objects) and as a resistive sensor (sensing pressure from any object).

Figure 47:
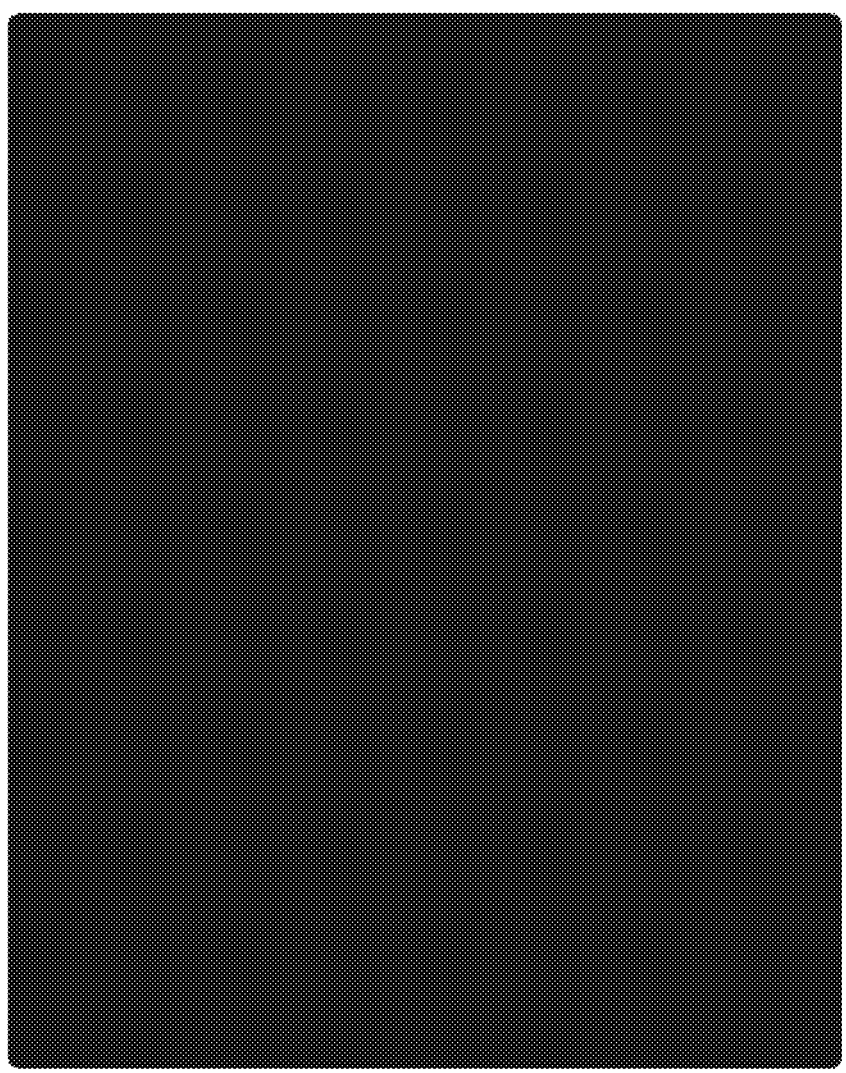
FIG. 47 illustrates detail of a thin FSM layer wherein the FSM material is shown in black, is contiguous, and covers the entire sensor area containing row and column electrodes. Because the material is thin, the in-plane resistance is very high which reduces the possibility of cross-talk between sensor elements. This is the same FSM layer as shown in FIG. 43 (4300) which shows the FSM layer being used in a thru configuration can also be used as the force sensing layer in any shunt-mode sensor configuration.

It has been determined by experimentation that in sensors that have a continuous force-sensing layer (such as shown in FIG. 43 (4300) and FIG. 47 (4700)), it is not possible to detect conductive objects (since the force sensing layer tends to block the electric field lines). However, in some cases, it is possible to detect lighter forces with the AC signal before a change in the DC signal is seen. This is because there can be a minute air-gap between the layers of the sensor, and the capacitive scanning approach is essentially able to measure the distance of the air gap before there is enough contact to cause a change in conductivity between the layers.

The circuit diagram shown in FIG. 99 (9900) can be configured to scan the sensor with a DC signal by enabling the DC Voltage Source and disabling the AC Signal Source, and switching the analog switch (TS12A12511 or equivalent) to receive signal from the DC Signal Conditioning circuit. Alternatively, the circuit can be configured to scan the sensor with an AC signal source by enabling the AC Signal Source, disabling the DC Voltage Source, and switching the analog switch to receive signal from the AC Signal Detector. The circuit can be switched between these two modes either on a per-scan basis or for each sensor element that is scanned.

Force/Capacitance Sensing Methods (12200)-(12300)

Figure 122:
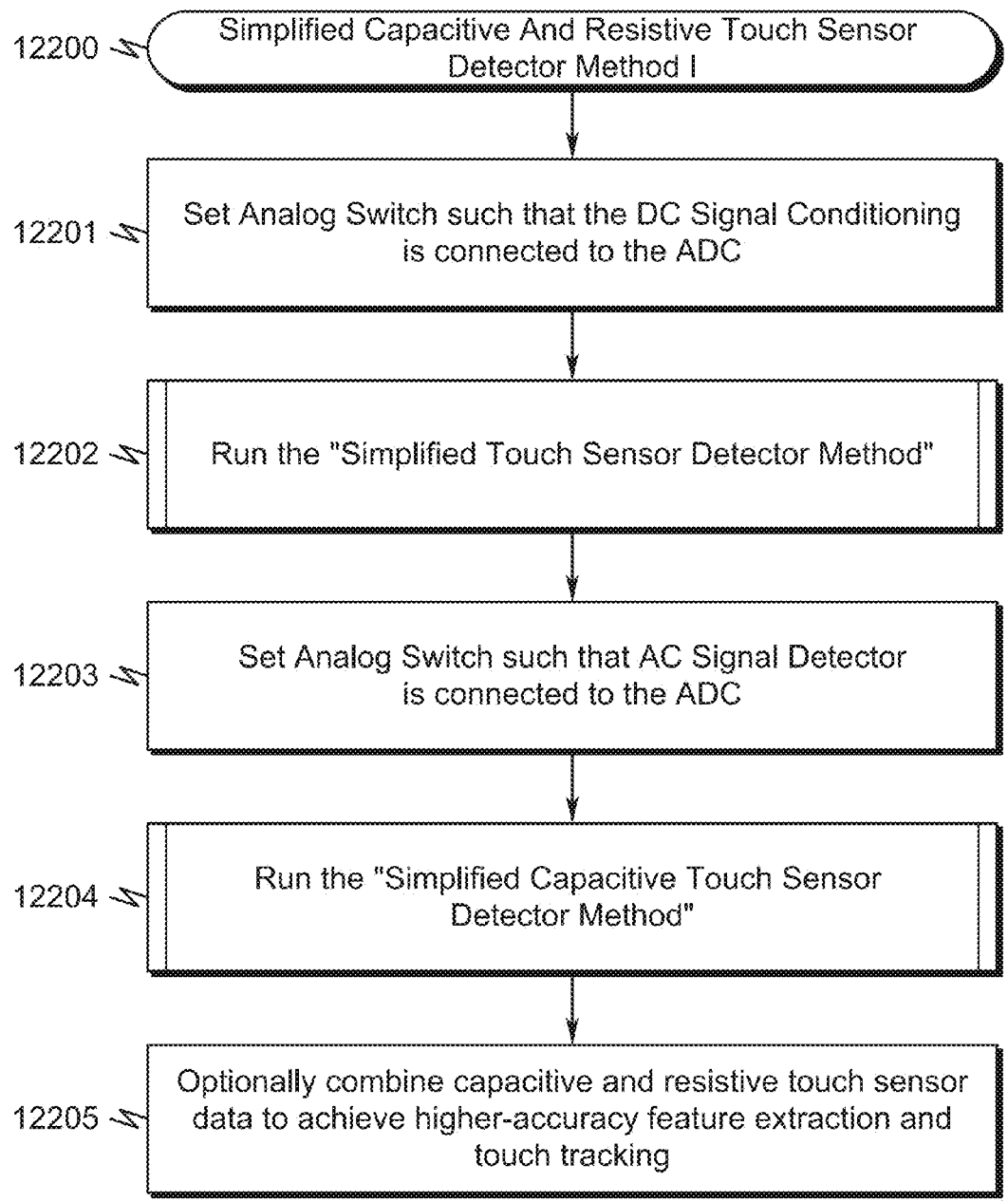
Figure 123:
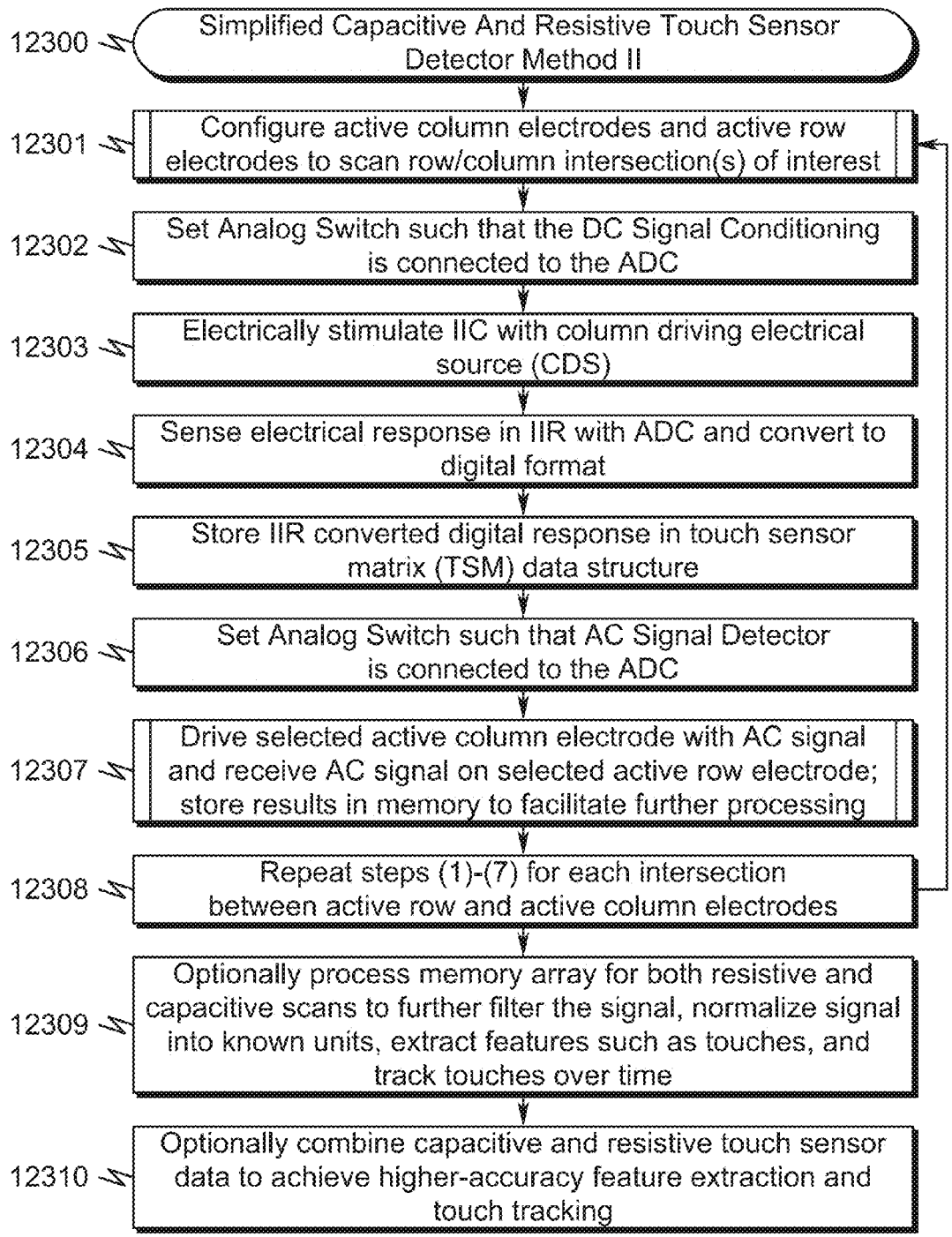

FIG. 122 (12200) shows a method for performing a full resistive scan followed by a full capacitive scan. FIG. 123 (12300) shows the second approach which involves performing both a resistive and capacitive measurement for each sensor element during a scan.

Advantages of Combining Force Sensing and Capacitive Sensing

When a sensor has the ability to sense force and capacitance changes, it becomes possible to use the data from each scan together to improve sensor performance. Combining the two scans together allows for higher-accuracy feature extraction and improves touch tracking. Methods for achieving this will be described in the following paragraphs. Note that although it is possible to combine the raw data from each scan, it is much more practical to run the contact tracking algorithms (described earlier in this document) on the raw data from each scan and combine the contact data sets afterwards. Therefore, the following discussion will focus on the methods for combining force and capacitive sensing contact data.

The force and capacitive scans each generate an array of values (TSM). As discussed earlier in this document, contact data can be extracted from each of these arrays. After this contact extraction, the remainder left is a list of contacts detected by the capacitive sensor, and a list of contacts detected by the force sensor. For each capacitive scan contact, it is possible to calculate the distance of this contact to each of the contacts from the force scan. Using a simple distance threshold, it is possible to decide if these contacts come from the same object interacting with the sensor. This distance calculation/matching process can be done for all the capacitive scan contacts. This essentially generates a list of paired contacts (although some contacts will not have a match). After this matching process is complete, a high-level list of contacts may be generated and produce a indication if a contact was found in the capacitive scan, the force scan, or both scans.

Sensor States (12500)

FIG. 125 (12500) shows how one can use this data to learn more about the objects interacting with the sensor. Since there are two possible states for two sensor types for a given object, there is a total of four possible states for each object:

STATE 1: The object is NOT detected by the resistive force sensor and the object is NOT detected by the capacitive sensor. If an object does not activate either of the sensors, there are likely two possibilities. The first is that there is actually no object interacting with the sensor. The second is that there is a non-conductive object hovering close to the sensor.

STATE 2: The object is NOT detected by the resistive force sensor and the object is detected by the capacitive sensor. In this state, it is known that the object is made of some type of conductive material, since it is detected by the capacitive touch sensor. Also, it is known that the object is either hovering or contacting the sensor with a very light force (since the force sensor is not activated).

STATE 3: The object is detected by the resistive force sensor and the object is detected by the capacitive sensor. In this state, it is known that the object is made of a conductive material and that the object is exerting a force on the sensor (not hovering).

STATE 4: The object is detected by the resistive force sensor and the object is NOT detected by the capacitive sensor. In this state, it is known that the contact is made of a non-conductive material and that the object is exerting a force on the sensor (not hovering).

FIG. 125 (12500) also shows state changes for common types of interactions. Path A shows the state transitions for a conductive object (i.e., fingertip) touching the sensor. If the scan rate is sufficient, a finger touch will always transition from state 1 to 2 to 3. If scanning at a lower frame rate, it may be possible to transition from state 1 to state 3. As the touch lifts off of the sensor, the state will change back to 1 (either directly or via state 2).

Path B shows the state changes for a conductive object (i.e., fingertip) that is hovering above the sensor, but never touches the surface. This occurs if someone is interacting with the sensor exclusively through hover.

Path C shows the state changes for a non-conductive object touching the sensor. It is generally not possible to detect non-conductive objects with the capacitive sensor, so it is not possible to detect a hover state for these objects.

Being able to tell what type of material objects are made of can be very valuable. For example, if a person is using a non-conductive stylus to draw on a sensor, it is possible to clearly distinguish a user's hand from the stylus (since skin is conductive). The contacts for the users hand will be in state 3, while the contact from the stylus will be in state 4. This permits correct identification of the stylus, which is important for drawing applications that require correct identification of a stylus vs. palm. State 2 is also a very important for sensor usability. For many capacitive touch solutions on the market, it is very difficult to distinguish hover from an actual touch. Vendors of existing capacitive touch solutions often use a signal-strength threshold where the hover turns into a touch. However, during actual use, this threshold can often end up being too low, resulting in inadvertent touches (before a user finger even contacts the screen), or the threshold can be too high (resulting in a screen that is unresponsive to touch). By combining a capacitive sensor with a force sensor, it is possible to easily distinguish these two hover vs touch states (state 2 vs. state 3).

Improving Accuracy

When conductive objects interact with the sensor (i.e., fingers), it is actually possible to improve the accuracy of the sensor by combining the capacitive and force data. When the conductive object is in contact with the sensor, the object will create two contacts (one with the force sensor data and one with the capacitive sensor data). It is possible to take these two contacts and average them together to yield a more accurate result. Averaging these two readings will make the final contact less susceptible to instantaneous noise from a reading and in most cases will make the result more accurate.

Furthermore, when touches are extremely light, the capacitive signal may yield a more accurate touch position. In situations where the accuracy of these extremely light touches is important, it may be preferable to use just the touches extracted from the capacitive signal or to use a weighted average to combine the capacitive and force signal, where the capacitive signal is weighted more than the force signal.

Conversely, there may be cases when the force signal may be stronger or cleaner than the capacitive signal. This can happen when the device is exposed to moisture, strong electrical noise, or if a fine-tipped object such as a metal stylus is used. In these cases it may be preferable to use just the touches extracted from the force signal or to use a weighted average to combine the capacitive and force signal, where the force signal is weighted more than the capacitive signal.

The detection of the conditions where one signal (force or capacitive) is weaker or noisier than the other can be performed automatically in software, and the software can then automatically compensate by using just the cleaner signal or by giving more weight to the cleaner signal.

Self-Capacitive Sensing

Many existing capacitive touch sensors use a combination of mutual-capacitive scanning and self-capacitive scanning to detect the positions of touches. While most of the scan algorithms described herein for capacitive sensors fall into the category of mutual-capacitive scanning, the present invention sensors can also be scanned with a self-capacitive approach.

The main difference between a mutual-capacitive scan and a self-capacitive scan is that a mutual-capacitive scan looks for the presence of a touch at each row/column intersection, while self-capacitive scan looks for the presence of a touch either at a given row or at a given column. This is similar to the one-dimensional scan that has been described for interpolating force-sensing sensors in that the position of touches can be determined either along the X or the Y axis. This is also similar to the one-dimensional scan methods used to determine the (X,Y) position of a stylus.

Self-capacitive scanning can be performed in a very similar way for interpolating capacitive sensors as the one-dimensional scan for interpolating force-sensing sensors. For each column/row on which it is desired to measure self-capacitance, ground all the neighboring columns/rows must be grounded and then the capacitance of the desired row/column measured.

One way to measure this capacitance is to use a circuit such as the one shown in FIG. 98 (9800). This figure depicts both an AC Signal Source and an AC Signal Detector on both rows and columns. To measure the capacitance of a row/column using this circuit, it is a simple matter to transmit an AC signal and receive it on the same row/column while the neighboring rows/columns are grounded. As a finger or other conductive object approaches the driven row/column, the capacitance will increase, causing the magnitude of the detected signal to decrease.

Alternately, dedicated capacitance measuring modules, which are available from a variety of different manufacturers, and are incorporated into many available microcontrollers can be used in place of the combination of an AC Signal Source and AC Signal Detectors in FIG. 98 (9800) to measure the capacitance of a given row/column.

Multi-Resolution Capacitive Scan

Just as with interpolating force-sensing sensors, interpolating capacitive sensors support the ability to scan at multiple resolutions. This can be used to improve scan speed, save power, and implement multi-resolution scan. This can also be very useful when scanning objects of different size. For example, a lower resolution scan can be used for scanning for fingers and a higher resolution scan can be used for scanning for styli.

Just as with interpolating force-sensing sensors, lower resolution scans can be achieved by setting a subset of the active electrodes in a VIA to a high impedance state, and scanning just the remaining active electrodes. This is accomplished by setting the switches in the column multiplexing circuitry and the row multiplexing circuitry in FIG. 93 (9300)-FIG. 99 (9900) to the NC (not connected) state. This effectively creates a sensor with lower active line resolution, but still preserves the linearity of the sensor and the accuracy with which a touch can be tracked.

Force Sensing Capacitive (10700)

While the interpolating sensor embodiments shown so far have either used changes in resistance to measure force, or changes in capacitance to detect touch, it is also possible to create a sensor that uses changes in capacitance to measure force. This can be done by taking a capacitive interpolating array with electronics such as shown in FIG. 93 (9300) to FIG. 98 (9800) and structure such as shown in FIG. 81 (8100)-FIG. 84 (8400) and modifying the structure such that each sensor element at each row-column intersection of the VIA changes capacitance in response to force. One possible embodiment of this is shown in FIG. 107 (10700).

FIG. 107 (10700) shows a lower layer, consisting of an interpolating capacitive sensor array, an upper layer which consists of a deformable surface and a squishy (pliable) layer in between. The bottom side of the upper layer is coated with a conductive material. This conductive layer capacitively couples with the capacitive sensor array in the same way that a finger couples with the capacitive sensing arrays in FIG. 81 (8100)-FIG. 84 (8400). However, as pressure is applied, the middle squishy (pliable) layer deforms, allowing the upper layer to come closer to the capacitive sensor array. As this happens, the capacitive coupling between the conductive layer and the transmit lines increases, causing a decrease in the signal on the receive lines. This causes a decrease in the signal received on the receive lines, and this change varies in response to the deformation of the top layer, which changes based on amount of pressure exerted by the user.

In cases where it is desirable to have a transparent sensor, for applications such as integration with a display, the entire sensor structure can be made transparent by using transparent materials in the whole stackup. For example, the top layer can be made of either plastic or thin, flexible glass. A transparent conductive material such as ITO, carbon nanotubes, silver nano-wires, fine-wire mesh, or transparent conductive polymer can be used to form the conductive layer on the underside of the top layer. The middle layer can be formed from a transparent squishy (pliable) material such as silicone, polyurethane, or a transparent gel.

To improve electrical isolation, the conductive layer on the underside of the top layer can be electrically connected to ground.

Integration with Display and Other Sensor Types (10800)

Transparent capacitive sensors can be integrated with displays such as LCD, OLED, or electrophoretic displays by laminating or attaching the sensor to the top of the display. FIG. 108 (10800) shows an example of a capacitive sensor on top of a display. A protective top surface can be attached above the touch sensor to protect both the sensor and the display.

In some cases, it may be desirable to add additional sensors to the combined stackup. FIG. 108 (10800) also shows one alternative embodiment where an electromagnetic sensor is attached below the display. This sensor may be used to sense the presence of a special electromagnetic stylus, RFID tags, or to wirelessly transmit power/data between other devices in contact with the screen.

Interpolation Capacitive Compared with Prior Art (10900)-(11500)

Figure 109:
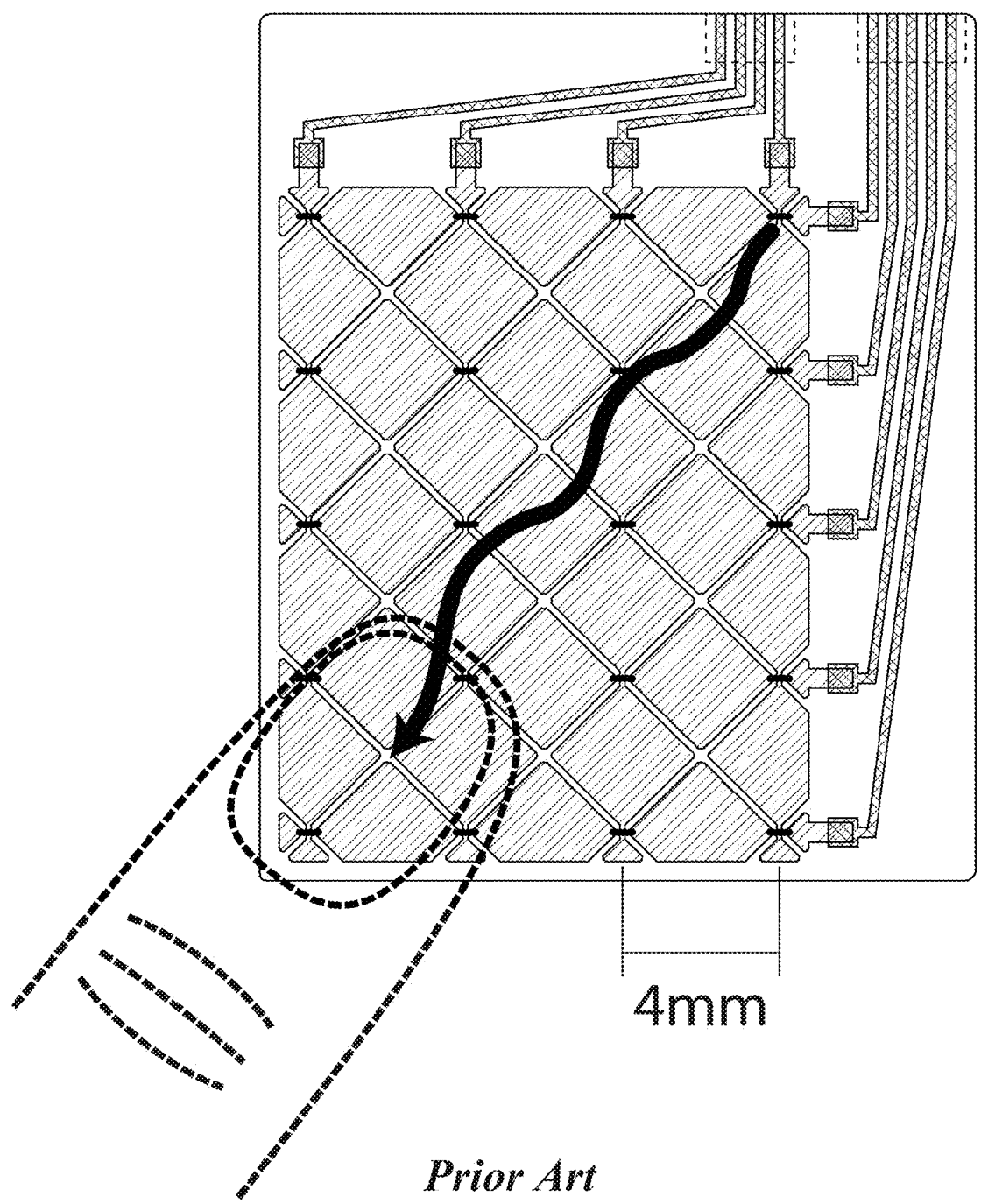
FIG. 109 illustrates the non-linear tracking of a standard capacitive touch sensor configuration with a 4 millimeter electrode and pattern pitch.
Figure 110:
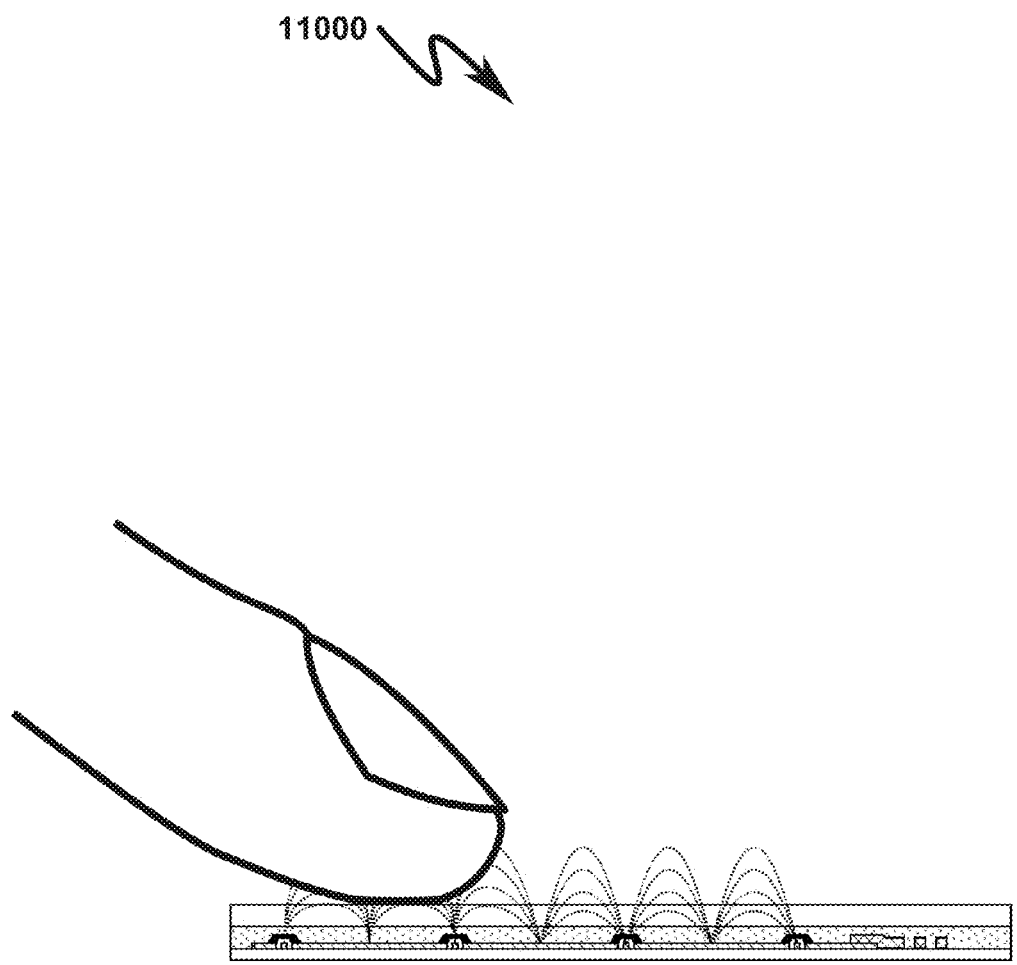
FIG. 110 illustrates a cross section (with visible electric-field lines) of a standard capacitive touch sensor configuration with a 4 millimeter electrode and pattern pitch.

Compared to existing capacitive sensors which do not have interpolation, the present invention sensors can track fingers and styli with very high precision and linearity. In FIG. 109 (10900) and FIG. 110 (11000) a top down view and a cross section of a typical prior art capacitive touch sensor (without interpolation) are depicted. Note that the active electrode pitch is 4 mm, and that the pitch of the sensing pattern is also 4 mm. Looking at the cross section in FIG. 110 (11000), it can be seen that only a small set of electric field lines intersect with the finger, and the pattern of these lines is highly non-linear. As the finger moves in a straight line across the surface of the sensor in FIG. 109 (10900), the path that the sensor thinks the finger has taken is wavy and non-linear as illustrated by the thick curvy line. This is due to the inherent non-linearity of the sensor, and while many capacitive sensor designs attempt to compensate for this non-linearity with lookup tables, it is impossible to compensate well for all sizes and shapes of touch.

Figure 111:
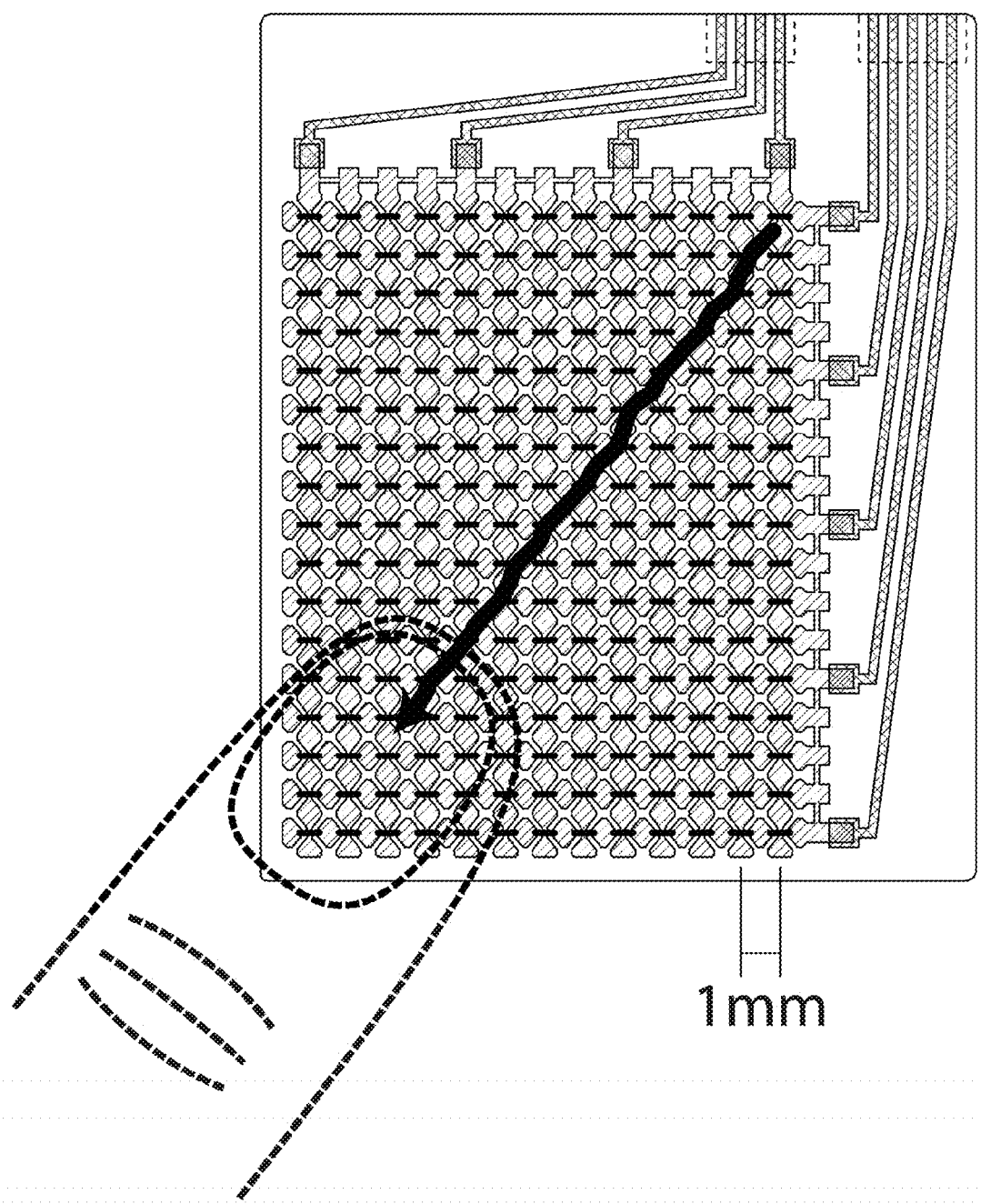
FIG. 111 illustrates the improved sensor linearity of an interpolating capacitive touch sensor configuration with a 4 millimeter active electrode pitch and a 1 millimeter pattern pitch.

In FIG. 111 (11100) and FIG. 112 (11200) a top down view and a cross section of an exemplary present invention interpolated capacitive touch sensors are depicted. Note that although the active electrode pitch is still 4 mm, the addition of interpolation elements allows for a much tighter sensing pattern pitch of 1 mm (with typical present invention row/column pitches range from 0.25 mm to 2.5 mm). Looking at the cross section in FIG. 112 (11200), one can see that many more electric field lines intersect with the finger, causing many more capacitive interactions over the surface of the finger and therefore a much more linear response. As the finger moves in a straight line across the surface of the sensor in FIG. 111 (11100), the path that the sensor thinks the finger has taken is very linear and has very few imperfections as illustrated by the thick curvy line. This more linear response is due to the higher pitch of sensor elements in the interpolated sensor, and this increased linearity benefits all interactions with the sensor, whether the user uses their finger, a stylus, or any other conductive object. Furthermore, any imperfections in the finger position are very small in scale, and can easily be filtered using a time-domain filtering algorithm applied to the calculated finger positions to get a perfectly linear line at the output.

Note that the present invention interpolating approach gives similar performance benefits with other capacitive sensor configurations. For example, an interpolating capacitive sensor with a grid pattern, such as the one shown in FIG. 83 (8300)-FIG. 84 (8400) will also track a stylus/touch with more accuracy than a sensor with a grid pattern that does not support the present invention interpolation method.

Figure 115:
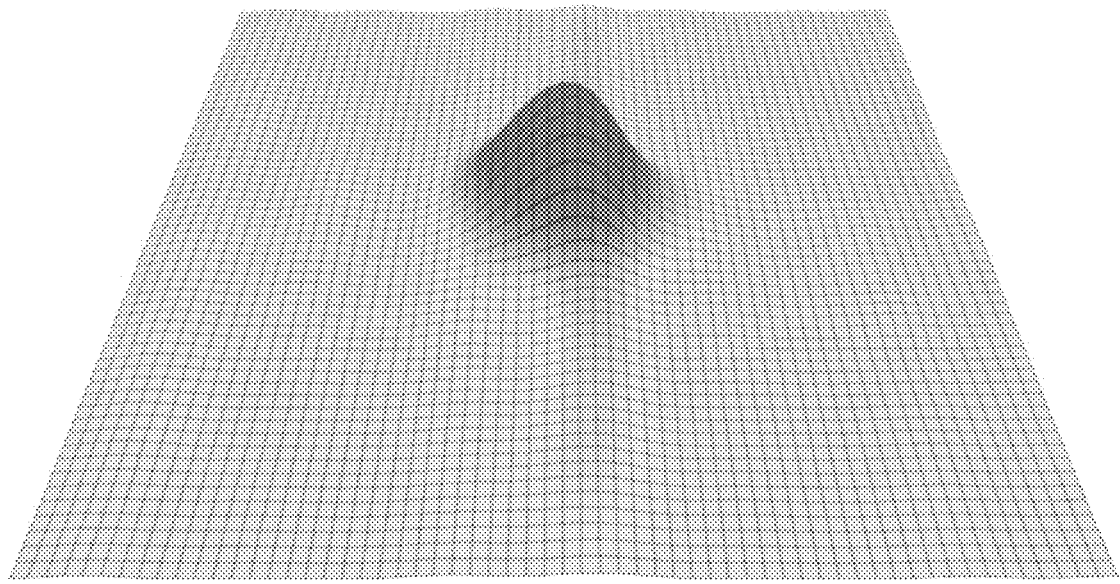
FIG. 115 illustrates the upsampled output of an interpolating capacitive touch sensor solution.

In FIG. 113 (11300)-FIG. 115 (11500), a comparison is depicted between the signal obtained from an existing touch sensor built by a major touch-sensor manufacturer (MICROCHIP® Technology, Inc., 2355 West Chandler BLVD, Chandler, Ariz. 85224-6199 USA) and the signal obtained from a present invention sensor, using a 4 mm active line pitch and a 1 mm sensing pattern pitch. FIG. 113 (11300) shows the signal for a single touch picked up by a MICROCHIP® sensor (which is indicative of other capacitive touch sensors). Here it can be seen that the signal is very non-linear. The central element has a very high peak, and the surrounding elements fall off very quickly. FIG. 114 (11400) shows the signal from the present invention interpolated capacitive touch sensor for a single touch. Here it can be seen that the signal has a much smoother profile, better matching the profile of the finger touching it. Furthermore, in FIG. 115 (11500), depicts an upsampled reconstruction of the signal to estimate the signal picked up by the individual sensor elements. Here, it can be observed that it is possible to reconstruct the actual shape of the finger touch. This type of reconstruction is not possible for the signal produced by the MICROCHIP® sensor because of the inherent non-linearity in its signal.

System Summary

The present invention system anticipates a wide variety of variations in the basic theme of construction, but can be generalized as a touch sensor detector system comprising:
 (a) touch sensor array (TSA);
 (b) array column driver (ACD);
 (c) column switching register (CSR);
 (d) column driving source (CDS);
 (e) array row sensor (ARS);
 (f) row switching register (RSR);
 (g) analog to digital converter (ADC); and
 (h) computing control device (CCD);
 wherein
 the TSA comprises a variable impedance array (VIA) comprising VIA columns and VIA rows;
 the VIA comprises capacitance elements interlinking the VIA columns and the VIA rows;

the VIA is configured to electrically couple a plurality of interlinked impedance columns (IIC) within the TSA with a plurality of interlinked impedance rows (IIR) within the TSA;

the IIC further comprises a plurality of individual column impedance elements (ICIE) electrically connected in series between the VIA columns;

the IIR further comprises a plurality of individual row impedance elements (IRIE) electrically connected in series between the VIA rows;

the ACD is configured to select the IIC within the TSA based on the CSR;

the ACD is configured to electrically drive the selected IIC using the CDS;

the ARS is configured to select the IIR within the TSA based on the RSR;

the ADC is configured to sense the electrical state of the selected IIR and convert the electrical state to a sensed digital value (SDV);

the electrical state is determined by the sum of current contributions of variable impedance elements within the VIA, where the current contribution of each element is determined by a voltage divider formed between the columns of the VIA, a current divider formed between the rows of the via, and the state of the impedance element, to produce a sensed current for a given row-column intersection with the VIA; and the CCD is configured to sample the SDV from the ADC at a plurality of positions within the TSA to form a touch sensor matrix (TSM) data structure.

This general system summary may be augmented by the various elements described herein to produce a wide variety of invention embodiments consistent with this overall design description.

Method Summary

The present invention method anticipates a wide variety of variations in the basic theme of implementation, but can be generalized as a touch sensor detector method wherein the method is performed on a touch sensor detector system comprising:

(a) touch sensor array (TSA);
(b) array column driver (ACD);
(c) column switching register (CSR);
(d) column driving source (CDS);
(e) array row sensor (ARS);
(f) row switching register (RSR);
(g) analog to digital converter (ADC); and
(h) computing control device (CCD);
wherein the TSA comprises a variable impedance array (VIA) comprising VIA columns and VIA rows;

the VIA comprises capacitance elements interlinking the VIA columns and the VIA rows;

the VIA is configured to electrically couple a plurality of interlinked impedance columns (IIC) within the TSA with a plurality of interlinked impedance rows (IIR) within the TSA;

the IIC further comprises a plurality of individual column impedance elements (ICIE) electrically connected in series between the VIA columns;

the IIR further comprises a plurality of individual row impedance elements (IRIE) electrically connected in series between the VIA rows;

the ACD is configured to select the IIC within the TSA based on the CSR;

the ACD is configured to electrically drive the selected IIC using the CDS;

the ARS is configured to select the IIR within the TSA based on the RSR;

the ADC is configured to sense the electrical state of the selected IIR and convert the electrical state to a sensed digital value (SDV);

the electrical state is determined by the sum of current contributions of variable impedance elements within the VIA, where the current contribution of each element is determined by a voltage divider formed between the columns of the VIA, a current divider formed between the rows of the via, and the state of the impedance element, to produce a sensed current for a given row-column intersection with the VIA; and the CCD is configured to sample the SDV from the ADC at a plurality of positions within the TSA to form a touch sensor matrix (TSM) data structure;

wherein the method comprises the steps of:

(1) under control of the CCD, configuring the IIC within the VIA;

(1) under control of the CCD, configuring the IIR within the VIA;

(2) under control of the CCD, electrically stimulating the IIC with the CDS;

(3) under control of the CCD, sensing the electrical state in the IIR with the ADC as a sensed current for a given row-column intersection within the VIA and converting the electrical state to digital data;

(4) under control of the CCD, storing the digital data in the TSM;

(5) under control of the CCD, determining if predetermined variations in the CDR, the IIC, and the IIR have been logged to the TSM, and if so, proceeding to step (8);

(6) under control of the CCD, reconfiguring the CDS, the IIC, and the IIR for a new VIA sensing variant and proceeding to step (3);

(7) under control of the CCD, interpolating the TSM values to determine focal points of activity within the VIA;

(8) under control of the CCD, converting the focal point activity information into a user interface input command sequence; and (9) under control of the CCD, transmitting the user interface input command sequence to a computer system for action and proceeding to step (1).

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the VIA further comprises a force sensing material responsive to pressure applied to the TSA and wherein the CCD is configured to determine pressure applied to the TSA by measurement of resistances in the VIA.

An embodiment wherein the CCD is configured to combine capacitive and force sensing data from the TSA to form an average touch sensing value associated with the TSA.

An embodiment wherein the CCD is configured to combine capacitive sensing data and force sensing data from the TSA using a weighted average to form a combined touch sensing value associated with the TSA.

An embodiment wherein the CCD is configured to combine capacitive sensing data and force sensing data from the TSA using a weighted average to form a combined touch sensing value associated with the TSA where the capacitance associated with the capacitance sensing data is weighted more than the force associated with the force sensing data.

An embodiment wherein the CCD is configured to combine capacitive sensing data and force sensing data from the TSA using a weighted average to form a combined touch sensing value associated with the TSA where the force associated with the force sensing data is weighted more than the capacitive associated with the capacitive sensing data.

An embodiment wherein the CCD is configured to scan the VIA using a mutual-capacitance scan which determines the presence of a touch at each row/column intersection within the VIA.

An embodiment wherein the CCD is configured to scan the VIA using a self-capacitance scan which determines the presence of a touch either at a given row within the VIA or at a given column within the VIA.

An embodiment wherein the CCD is configured to scan the VIA with a subset of active electrodes in the VIA configured in a high impedance state.

An embodiment wherein the VIA comprises sensing elements that change capacitance in response to force applied to the TSA.

An embodiment wherein the CCD is configured to collect both capacitive sensing data (CSD) and force sensing data (FSD) from the TSA and store the CSD and the FSD in the TSM.

An embodiment wherein the CCD is configured to collect capacitive sensing data (CSD) and force sensing data (FSD) associated with an active stylus from the TSA and store the CSD and the FSD in the TSM.

An embodiment wherein the ACD comprises a digital-to-analog converter (DAC) configured to generate a sine wave.

An embodiment wherein the ADC comprises an analog-to-digital converter configured to detect a sine wave.

An embodiment wherein the CCD comprises a state machine configured to determine if the SDV constitutes a touch state derived from a conductive object or a non-conductive object.

An embodiment wherein the ACD comprises a single transmitter configured to scan the VIA one active row-column intersection at a time with the ARS comprising a receiver configured to sense a single row of the VIA at a time.

An embodiment wherein the ACD comprises multiple transmitters configured to drive multiple columns of the VIA.

An embodiment wherein the ARS comprises multiple receivers configured to sense multiple rows of the VIA.

An embodiment wherein the ACD comprises multiple transmitters operating at multiple frequencies configured to drive multiple columns of the VIA.

An embodiment wherein the ACD comprises multiple transmitters operating at multiple frequencies configured to drive multiple columns of the VIA and the ARS comprises multiple receivers configured to sense multiple rows of the VIA at multiple frequencies.

An embodiment wherein the VIA comprises drive electrodes and sense electrodes placed on the same layer and conductive bridges allowing one set of the drive electrodes and the sense electrodes to overlap the other without shorting.

An embodiment wherein the VIA comprises a diamond pattern with drive electrodes and sense electrodes placed on the same layer and conductive bridges allowing one set of the drive electrodes and the sense electrodes to overlap the other without shorting.

An embodiment wherein the VIA comprises a two layer structure incorporating the IIC and the IIR.

An embodiment wherein the VIA comprises sensor elements having a row-column pitch in the range of 0.25 to 2.5 mm.

An embodiment wherein the VIA comprises a resistive sensor element.

An embodiment wherein the VIA comprises sensor elements comprising an inductor.

An embodiment wherein the VIA comprises sensor elements comprising any combination of resistor, capacitor, and inductor.

An embodiment wherein the ICIE comprises a printed narrow resistive strip.

An embodiment wherein the IRIE comprises a printed narrow resistive strip.

An embodiment wherein the ICIE comprises a thin bridge of transparent conductive material.

An embodiment wherein the IRIE comprises a thin bridge of transparent conductive material.

An embodiment wherein the ICIE and the IRIE are comprised of the same material as respective columns and rows of the VIA.

An embodiment wherein the ICIE and the IRIE are comprised of laser trimmed resistors.

An embodiment wherein the VIA is covered with a thin dielectric layer.

An embodiment wherein the TSA further comprises a display separated from the VIA by a transparent conductive layer of shielding material.

An embodiment wherein the VIA further comprises column electrodes and row electrodes formed from a transparent conductive material.

An embodiment wherein the VIA further comprises column electrodes and row electrodes formed from a transparent conductive material selected from a group consisting of: indium tin oxide (ITO); transparent organic conductive particles; graphene; carbon nanotubes; silver nanowires; micro-patterned conductive mesh; transparent conductive polymer; and metal nanoparticles.

An embodiment wherein the VIA is formed on the top of or laminated to a display.

An embodiment wherein the VIA is integrated within the layers of a display.

An embodiment wherein the TSA is configured to transmit a signal to a stylus from each row and column in the VIA and the stylus is configured to determine a signal strength from the transmission and transmit the signal strength to the CCD.

An embodiment wherein the TSA is configured to receive a signal from a stylus from each row and column in the VIA and determine the location of the stylus by analysis of the received signal.

An embodiment wherein the TSA is configured to determine the position of a stylus by bi-directionally communicating with the stylus via rows and columns of the VIA.

An embodiment wherein the TSA is configured to communicate with multiple styli via the rows and columns of the VIA.

An embodiment wherein the TSA is configured to communicate with a stylus having multiple transceivers.

An embodiment wherein the TSA is configured to communicate with a stylus configured to communicate with a host computer via BLUETOOTH® wireless communication.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A capacitive touch sensor system and method incorporating an interpolated sensor array has been disclosed. The system and method utilize a touch sensor array (TSA) configured to detect proximity/contact/pressure (PCP) via a variable impedance array (VIA) electrically coupling interlinked impedance columns (IIC) coupled to an array column driver (ACD), and interlinked impedance rows (IIR) coupled to an array row sensor (ARS). The ACD is configured to select the IIC based on a column switching register (CSR) and electrically drive the IIC using a column driving source (CDS). The VIA conveys current from the driven IIC to the IIC sensed by the ARS. The ARS selects the IIR within the TSA and electrically senses the IIR state based on a row switching register (RSR). Interpolation of ARS sensed current/voltage allows accurate detection of TSA PCP and/or spatial location.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A capacitive touch sensor system comprising:
   (a) touch sensor array (TSA);
   (b) array column driver (ACD);
   (c) column switching register (CSR);
   (d) column driving source (CDS);
   (e) array row sensor (ARS);
   (f) row switching register (RSR);
   (g) analog to digital converter (ADC); and
   (h) computing control device (CCD);
   wherein:
   said TSA comprises a variable impedance array (VIA) comprising VIA columns and VIA rows;
   said VIA comprises capacitance elements interlinking said VIA columns and said VIA rows;
   said VIA is configured to electrically couple a plurality of interlinked impedance columns (IIC) within said TSA with a plurality of interlinked impedance rows (IIR) within said TSA;
   said IIC further comprises a plurality of individual column impedance elements (ICIE) electrically connected in series between said VIA columns;
   said IIR further comprises a plurality of individual row impedance elements (IRIE) electrically connected in series between said VIA rows;
   said ACD is configured to select said IIC within said TSA based on said CSR;
   said ACD is configured to electrically drive said selected IIC using said CDS;
   said ARS is configured to select said IIR within said TSA based on said RSR;
   said ADC is configured to sense the electrical state of said selected IIR and convert said electrical state to a sensed digital value (SDV);
   said electrical state is determined by the sum of current contributions of variable impedance elements within said VIA, where the current contribution of each of said variable impedance elements is determined by a voltage divider formed between the columns of said VIA, a current divider formed between the rows of said VIA, and the state of said each of said variable impedance elements, to produce a sensed current for a given row-column intersection with said VIA; and
   said CCD is configured to sample said SDV from said ADC at a plurality of positions within said TSA to form a touch sensor matrix (TSM) data structure.

2. The capacitive touch sensor system of claim 1, wherein said VIA further comprises a force sensing material responsive to pressure applied to said TSA and wherein said CCD is configured to determine pressure applied to said TSA by measurement of resistances in said VIA.

3. The capacitive touch sensor system of claim 1, wherein said CCD is configured to combine capacitive and force sensing data from said TSA to form an average touch sensing value associated with said TSA.

4. The capacitive touch sensor system of claim 1, wherein said CCD is configured to combine capacitive sensing data and force sensing data from said TSA using a weighted average to form a combined touch sensing value associated with said TSA.

5. The capacitive touch sensor system of claim 1, wherein said CCD is configured to combine capacitive sensing data and force sensing data from said TSA using a weighted average to form a combined touch sensing value associated with said TSA where the capacitance associated with said capacitance sensing data is weighted more than the force associated with said force sensing data.

6. The capacitive touch sensor system of claim 1, wherein said CCD is configured to combine capacitive sensing data and force sensing data from said TSA using a weighted average to form a combined touch sensing value associated with said TSA where the force associated with said force sensing data is weighted more than the capacitive associated with said capacitive sensing data.

7. The capacitive touch sensor system of claim 1, wherein said CCD is configured to scan said VIA using a mutual-capacitance scan which determines the presence of a touch at each row/column intersection within said VIA.

8. The capacitive touch sensor system of claim 1, wherein said CCD is configured to scan said VIA using a self-capacitance scan which determines the presence of a touch either at a given row within said VIA or at a given column within said VIA.

9. The capacitive touch sensor system of claim 1, wherein said CCD is configured to scan said VIA with a subset of active electrodes in said VIA configured in a high impedance state.

10. The capacitive touch sensor system of claim 1, wherein said VIA comprises sensing elements that change capacitance in response to force applied to said TSA.

11. The capacitive touch sensor system of claim 1, wherein said CCD is configured to collect both capacitive sensing data (CSD) and force sensing data (FSD) from said TSA and store said CSD and said FSD in said TSM.

12. The capacitive touch sensor system of claim 1, wherein said CCD is configured to collect capacitive sensing data (CSD) and force sensing data (FSD) associated with an active stylus from said TSA and store said CSD and said FSD in said TSM.

13. The capacitive touch sensor system of claim 1, wherein said ACD comprises a digital-to-analog converter (DAC) configured to generate a sine wave.

14. The capacitive touch sensor system of claim 1, wherein said ADC comprises an analog-to-digital converter configured to detect a sine wave.

15. The capacitive touch sensor system of claim 1, wherein said CCD comprises a state machine configured to determine if said SDV constitutes a touch state derived from a conductive object or a non-conductive object.

16. The capacitive touch sensor system of claim 1, wherein said ACD comprises a single transmitter configured to scan said VIA one active row-column intersection at a time with said ARS comprising a receiver configured to sense a single row of said VIA at a time.

17. The capacitive touch sensor system of claim 1, wherein said ACD comprises multiple transmitters configured to drive multiple columns of said VIA.

18. The capacitive touch sensor system of claim 1, wherein said ARS comprises multiple receivers configured to sense multiple rows of said VIA.

19. The capacitive touch sensor system of claim 1, wherein said ACD comprises multiple transmitters operating at multiple frequencies configured to drive multiple columns of said VIA.

20. The capacitive touch sensor system of claim 1, wherein said ACD comprises multiple transmitters operating at multiple frequencies configured to drive multiple columns of said VIA and said ARS comprises multiple receivers configured to sense multiple rows of said VIA at multiple frequencies.

21. The capacitive touch sensor system of claim 1, wherein said VIA comprises drive electrodes and sense electrodes placed on the same layer and conductive bridges allowing one set of said drive electrodes and said sense electrodes to overlap the other without shorting.

22. The capacitive touch sensor system of claim 1, wherein said VIA comprises a diamond pattern with drive electrodes and sense electrodes placed on the same layer and conductive bridges allowing one set of said drive electrodes and said sense electrodes to overlap the other without shorting.

23. The capacitive touch sensor system of claim 1, wherein said VIA comprises a two layer structure incorporating said IIC and said IIR.

24. The capacitive touch sensor system of claim 1, wherein said VIA comprises sensor elements having a row-column pitch in the range of 0.25 to 2.5 mm.

25. The capacitive touch sensor system of claim 1, wherein said IRIE comprises a resistive sensor element.

26. The capacitive touch sensor system of claim 1, wherein said ICIE comprises a resistive sensor element.

27. The capacitive touch sensor system of claim 1, wherein said ICIE comprises a printed narrow resistive strip.

28. The capacitive touch sensor system of claim 1, wherein said IRIE comprises a printed narrow resistive strip.

29. The capacitive touch sensor system of claim 1, wherein said ICIE comprises a thin bridge of transparent conductive material.

30. The capacitive touch sensor system of claim 1, wherein said IRIE comprises a thin bridge of transparent conductive material.

31. The capacitive touch sensor system of claim 1, wherein said ICIE and said IRIE are comprised of the same material as respective columns and rows of said VIA.

32. The capacitive touch sensor system of claim 1, wherein said ICIE and said IRIE are comprised of laser trimmed resistors.

33. The capacitive touch sensor system of claim 1, wherein said VIA is covered with a thin dielectric layer.

34. The capacitive touch sensor system of claim 1, wherein said VIA is electrically shielded by a transparent conductive layer of shielding material.

35. The capacitive touch sensor system of claim 1, wherein said VIA further comprises column electrodes and row electrodes formed from a transparent conductive material.

36. The capacitive touch sensor system of claim 1, wherein said VIA further comprises column electrodes and row electrodes formed from a transparent conductive material selected from a group consisting of: indium tin oxide (ITO); transparent organic conductive particles; graphene; carbon nanotubes; silver nanowires; micro-patterned conductive mesh; transparent conductive polymer; and metal nanoparticles.

37. The capacitive touch sensor system of claim 1, wherein said VIA is formed on the top of or laminated to a display.

38. The capacitive touch sensor system of claim 1, wherein said VIA is integrated within the layers of a display.

39. The capacitive touch sensor system of claim 1, wherein said TSA is configured to transmit a signal to a stylus from each row and column in said VIA and said stylus is configured to determine a signal strength from said transmission and transmit said signal strength to said CCD.

40. The capacitive touch sensor system of claim 1, wherein said TSA is configured to receive a signal from a stylus from each row and column in said VIA and determine the location of said stylus by analysis of said received signal.

41. The capacitive touch sensor system of claim 1, wherein said TSA is configured to determine the position of a stylus by bi-directionally communicating with said stylus via rows and columns of said VIA.

42. The capacitive touch sensor system of claim 1, wherein said TSA is configured to communicate with multiple styli via the rows and columns of said VIA.

43. The capacitive touch sensor system of claim 1, wherein said TSA is configured to communicate with a stylus having multiple transceivers.

44. The capacitive touch sensor system of claim 1, wherein said TSA is configured to communicate with a stylus configured to communicate with a host computer via BLUETOOTH® wireless communication.

45. A capacitive touch sensor method configured to operate on a capacitive touch sensor system comprising:
(a) touch sensor array (TSA);
(b) array column driver (ACD);
(c) column switching register (CSR);
(d) column driving source (CDS);
(e) array row sensor (ARS);
(f) row switching register (RSR);
(g) analog to digital converter (ADC); and
(h) computing control device (CCD);
wherein:
said TSA comprises a variable impedance array (VIA) comprising VIA columns and VIA rows;
said VIA comprises capacitance elements interlinking said VIA columns and said VIA rows;
said VIA is configured to electrically couple a plurality of interlinked impedance columns (IIC) within said TSA with a plurality of interlinked impedance rows (IIR) within said TSA;
said IIC further comprises a plurality of individual column impedance elements (ICIE) electrically connected in series between said VIA columns;
said IIR further comprises a plurality of individual row impedance elements (IRIE) electrically connected in series between said VIA rows;
said ACD is configured to select said IIC within said TSA based on said CSR;
said ACD is configured to electrically drive said selected IIC using said CDS;
said ARS is configured to select said IIR within said TSA based on said RSR;
said ADC is configured to sense the electrical state of said selected IIR and convert said electrical state to a sensed digital value (SDV);
said electrical state is determined by the sum of current contributions of variable impedance elements within said VIA, where the current contribution of each of said variable impedance elements is determined by a voltage divider formed between the columns of said VIA, a current divider formed between the rows of said VIA, and the state of said each of said variable impedance elements, to produce a sensed current for a given row-column intersection with said VIA; and
said CCD is configured to sample said SDV from said ADC at a plurality of positions within said TSA to form a touch sensor matrix (TSM) data structure;
wherein said method comprises the steps of:
(1) under control of said CCD, configuring said IIC within said VIA;
(2) under control of said CCD, configuring said IIR within said VIA;
(3) under control of said CCD, electrically stimulating said IIC with said CDS;
(4) under control of said CCD, sensing said electrical state in said IIR with said ADC as a sensed current for a given row-column intersection within said VIA and converting said electrical state to digital data;
(5) under control of said CCD, storing said digital data in said TSM;
(6) under control of said CCD, determining if predetermined variations in said CDR, said IIC, and said IIR have been logged to said TSM, and if so, proceeding to step (8);
(7) under control of said CCD, reconfiguring said CDS, said IIC, and said IIR for a new VIA sensing variant and proceeding to step (3);
(8) under control of said CCD, interpolating said TSM values to determine focal points of activity within said VIA;
(9) under control of said CCD, converting said focal point activity information into a user interface input command sequence; and
(10) under control of said CCD, transmitting said user interface input command sequence to a computer system for action and proceeding to step (1).

46. The capacitive touch sensor method of claim 45, wherein said VIA further comprises a force sensing material responsive to pressure applied to said TSA and wherein said CCD is configured to determine pressure applied to said TSA by measurement of resistances in said VIA.

47. The capacitive touch sensor method of claim 45, wherein said CCD is configured to combine capacitive and force sensing data from said TSA to form an average touch sensing value associated with said TSA.

48. The capacitive touch sensor method of claim 45, wherein said CCD is configured to combine capacitive sensing data and force sensing data from said TSA using a weighted average to form a combined touch sensing value associated with said TSA.

49. The capacitive touch sensor method of claim 45, wherein said CCD is configured to combine capacitive sensing data and force sensing data from said TSA using a weighted average to form a combined touch sensing value associated with said TSA where the capacitance associated with said capacitance sensing data is weighted more than the force associated with said force sensing data.

50. The capacitive touch sensor method of claim 45, wherein said CCD is configured to combine capacitive sensing data and force sensing data from said TSA using a weighted average to form a combined touch sensing value associated with said TSA where the force associated with said force sensing data is weighted more than the capacitive associated with said capacitive sensing data.

51. The capacitive touch sensor method of claim 45, wherein said CCD is configured to scan said VIA using a mutual-capacitance scan which determines the presence of a touch at each row/column intersection within said VIA.

52. The capacitive touch sensor method of claim 45, wherein said CCD is configured to scan said VIA using a self-capacitance scan which determines the presence of a touch either at a given row within said VIA or at a given column within said VIA.

53. The capacitive touch sensor method of claim 45, wherein said CCD is configured to scan said VIA with a subset of active electrodes in said VIA configured in a high impedance state.

54. The capacitive touch sensor method of claim 45, wherein said VIA comprises sensing elements that change capacitance in response to force applied to said TSA.

55. The capacitive touch sensor method of claim 45, wherein said CCD is configured to collect both capacitive sensing data (CSD) and force sensing data (FSD) from said TSA and store said CSD and said FSD in said TSM.

56. The capacitive touch sensor method of claim 45, wherein said CCD is configured to collect capacitive sensing data (CSD) and force sensing data (FSD) associated with an active stylus from said TSA and store said CSD and said FSD in said TSM.

57. The capacitive touch sensor method of claim 45, wherein said ACD comprises a digital-to-analog converter (DAC) configured to generate a sine wave.

58. The capacitive touch sensor method of claim 45, wherein said ADC comprises an analog-to-digital converter configured to detect a sine wave.

59. The capacitive touch sensor method of claim 45, wherein said CCD comprises a state machine configured to determine if said SDV constitutes a touch state derived from a conductive object or a non-conductive object.

60. The capacitive touch sensor method of claim 45, wherein said ACD comprises a single transmitter configured to scan said VIA one active row-column intersection at a time with said ARS comprising a receiver configured to sense a single row of said VIA at a time.

61. The capacitive touch sensor method of claim 45, wherein said ACD comprises multiple transmitters configured to drive multiple columns of said VIA.

62. The capacitive touch sensor method of claim 45, wherein said ARS comprises multiple receivers configured to sense multiple rows of said VIA.

63. The capacitive touch sensor method of claim 45, wherein said ACD comprises multiple transmitters operating at multiple frequencies configured to drive multiple columns of said VIA.

64. The capacitive touch sensor method of claim 45, wherein said ACD comprises multiple transmitters operating at multiple frequencies configured to drive multiple columns of said VIA and said ARS comprises multiple receivers configured to sense multiple rows of said VIA at multiple frequencies.

65. The capacitive touch sensor method of claim 45, wherein said VIA comprises drive electrodes and sense electrodes placed on the same layer and conductive bridges allowing one set of said drive electrodes and said sense electrodes to overlap the other without shorting.

66. The capacitive touch sensor method of claim 45, wherein said VIA comprises a diamond pattern with drive electrodes and sense electrodes placed on the same layer and conductive bridges allowing one set of said drive electrodes and said sense electrodes to overlap the other without shorting.

67. The capacitive touch sensor method of claim 45, wherein said VIA comprises a two layer structure incorporating said IIC and said IIR.

68. The capacitive touch sensor method of claim 45, wherein said VIA comprises sensor elements having a row-column pitch in the range of 0.25 to 2.5 mm.

69. The capacitive touch sensor method of claim 45, wherein said IRIE comprises a resistive sensor element.

70. The capacitive touch sensor method of claim 45, wherein said ICIE comprises a resistive sensor element.

71. The capacitive touch sensor method of claim 45, wherein said ICIE comprises a printed narrow resistive strip.

72. The capacitive touch sensor method of claim 45, wherein said IRIE comprises a printed narrow resistive strip.

73. The capacitive touch sensor method of claim 45, wherein said ICIE comprises a thin bridge of transparent conductive material.

74. The capacitive touch sensor method of claim 45, wherein said IRIE comprises a thin bridge of transparent conductive material.

75. The capacitive touch sensor method of claim 45, wherein said ICIE and said IRIE are comprised of the same material as respective columns and rows of said VIA.

76. The capacitive touch sensor method of claim 45, wherein said ICIE and said IRIE are comprised of laser trimmed resistors.

77. The capacitive touch sensor method of claim 45, wherein said VIA is covered with a thin dielectric layer.

78. The capacitive touch sensor method of claim 45, wherein said VIA is electrically shielded by a transparent conductive layer of shielding material.

79. The capacitive touch sensor method of claim 45, wherein said VIA further comprises column electrodes and row electrodes formed from a transparent conductive material.

80. The capacitive touch sensor method of claim 45, wherein said VIA further comprises column electrodes and row electrodes formed from a transparent conductive material selected from a group consisting of: indium tin oxide (ITO); transparent organic conductive particles; graphene; carbon nanotubes; silver nanowires; micro-patterned conductive mesh; transparent conductive polymer; and metal nanoparticles.

81. The capacitive touch sensor method of claim 45, wherein said VIA is formed on the top of or laminated to a display.

82. The capacitive touch sensor method of claim 45, wherein said VIA is integrated within the layers of a display.

83. The capacitive touch sensor method of claim 45, wherein said TSA is configured to transmit a signal to a stylus from each row and column in said VIA and said stylus is configured to determine a signal strength from said transmission and transmit said signal strength to said CCD.

84. The capacitive touch sensor method of claim 45, wherein said TSA is configured to receive a signal from a stylus from each row and column in said VIA and determine the location of said stylus by analysis of said received signal.

85. The capacitive touch sensor method of claim 45, wherein said TSA is configured to determine the position of a stylus by bi-directionally communicating with said stylus via rows and columns of said VIA.

86. The capacitive touch sensor method of claim 45, wherein said TSA is configured to communicate with multiple styli via the rows and columns of said VIA.

87. The capacitive touch sensor method of claim 45, wherein said TSA is configured to communicate with a stylus having multiple transceivers.

88. The capacitive touch sensor method of claim 45, wherein said TSA is configured to communicate with a stylus configured to communicate with a host computer via BLUETOOTH® wireless communication.

89. A tangible non-transitory computer usable medium having computer-readable program code means comprising a capacitive touch sensor method configured to operate on capacitive touch sensor system comprising:
- (a) touch sensor array (TSA);
- (b) array column driver (ACD);
- (c) column switching register (CSR);
- (d) column driving source (CDS);
- (e) array row sensor (ARS);
- (f) row switching register (RSR);
- (g) analog to digital converter (ADC); and
- (h) computing control device (CCD);

wherein:
said TSA comprises a variable impedance array (VIA) comprising VIA columns and VIA rows;
said VIA comprises capacitance elements interlinking said VIA columns and said VIA rows;
said VIA is configured to electrically couple a plurality of interlinked impedance columns (IIC) within said TSA with a plurality of interlinked impedance rows (IIR) within said TSA;
said IIC further comprises a plurality of individual column impedance elements (ICIE) electrically connected in series between said VIA columns;
said IIR further comprises a plurality of individual row impedance elements (IRIE) electrically connected in series between said VIA rows;
said ACD is configured to select said IIC within said TSA based on said CSR;
said ACD is configured to electrically drive said selected IIC using said CDS;
said ARS is configured to select said IIR within said TSA based on said RSR;
said ADC is configured to sense the electrical state of said selected IIR and convert said electrical state to a sensed digital value (SDV);
said electrical state is determined by the sum of current contributions of variable impedance elements within said VIA, where the current contribution of each of said variable impedance elements is determined by a voltage divider formed between the columns of said VIA, a current divider formed between the rows of said VIA, and the state of said each of said variable impedance elements, to produce a sensed current for a given row-column intersection with said VIA; and
said CCD is configured to sample said SDV from said ADC at a plurality of positions within said TSA to form a touch sensor matrix (TSM) data structure;
wherein said method comprises the steps of:
(1) under control of said CCD, configuring said IIC within said VIA;
(2) under control of said CCD, configuring said IIR within said VIA;
(3) under control of said CCD, electrically stimulating said IIC with said CDS;
(4) under control of said CCD, sensing said electrical state in said IIR with said ADC as a sensed current for a given row-column intersection within said VIA and converting said electrical state to digital data;
(5) under control of said CCD, storing said digital data in said TSM;
(6) under control of said CCD, determining if predetermined variations in said CDR, said IIC, and said IIR have been logged to said TSM, and if so, proceeding to step (8);
(7) under control of said CCD, reconfiguring said CDS, said IIC, and said IIR for a new VIA sensing variant and proceeding to step (3);
(8) under control of said CCD, interpolating said TSM values to determine focal points of activity within said VIA;
(9) under control of said CCD, converting said focal point activity information into a user interface input command sequence; and
(10) under control of said CCD, transmitting said user interface input command sequence to a computer system for action and proceeding to step (1).

90. The computer useable medium of claim 89 wherein said VIA further comprises a force sensing material responsive to pressure applied to said TSA and wherein said CCD is configured to determine pressure applied to said TSA by measurement of resistances in said VIA.

91. The computer useable medium of claim 89 wherein said CCD is configured to combine capacitive and force sensing data from said TSA to form an average touch sensing value associated with said TSA.

92. The computer useable medium of claim 89 wherein said CCD is configured to combine capacitive sensing data and force sensing data from said TSA using a weighted average to form a combined touch sensing value associated with said TSA.

93. The computer useable medium of claim 89 wherein said CCD is configured to combine capacitive sensing data and force sensing data from said TSA using a weighted average to form a combined touch sensing value associated with said TSA where the capacitance associated with said capacitance sensing data is weighted more than the force associated with said force sensing data.

94. The computer useable medium of claim 89 wherein said CCD is configured to combine capacitive sensing data and force sensing data from said TSA using a weighted average to form a combined touch sensing value associated with said TSA where the force associated with said force sensing data is weighted more than the capacitance associated with said capacitive sensing data.

95. The computer useable medium of claim 89 wherein said CCD is configured to scan said VIA using a mutual-capacitance scan which determines the presence of a touch at each row/column intersection within said VIA.

96. The computer useable medium of claim 89 wherein said CCD is configured to scan said VIA using a self-capacitance scan which determines the presence of a touch either at a given row within said VIA or at a given column within said VIA.

97. The computer useable medium of claim 89 wherein said CCD is configured to scan said VIA with a subset of active electrodes in said VIA configured in a high impedance state.

98. The computer useable medium of claim 89 wherein said VIA comprises sensing elements that change capacitance in response to force applied to said TSA.

99. The computer useable medium of claim 89 wherein said CCD is configured to collect both capacitive sensing data (CSD) and force sensing data (FSD) from said TSA and store said CSD and said FSD in said TSM.

100. The computer useable medium of claim 89 wherein said CCD is configured to collect capacitive sensing data (CSD) and force sensing data (FSD) associated with an active stylus from said TSA and store said CSD and said FSD in said TSM.

101. The computer useable medium of claim 89 wherein said ACD comprises a digital-to-analog converter (DAC) configured to generate a sine wave.

102. The computer useable medium of claim 89 wherein said ADC comprises an analog-to-digital converter configured to detect a sine wave.

103. The computer useable medium of claim 89 wherein said CCD comprises a state machine configured to determine if said SDV constitutes a touch state derived from a conductive object or a non-conductive object.

104. The computer useable medium of claim 89 wherein said ACD comprises a single transmitter configured to scan said VIA one active row-column intersection at a time with said ARS comprising a receiver configured to sense a single row of said VIA at a time.

105. The computer useable medium of claim 89 wherein said ACD comprises multiple transmitters configured to drive multiple columns of said VIA.

106. The computer useable medium of claim 89 wherein said ARS comprises multiple receivers configured to sense multiple rows of said VIA.

107. The computer useable medium of claim 89 wherein said ACD comprises multiple transmitters operating at multiple frequencies configured to drive multiple columns of said VIA.

108. The computer useable medium of claim 89 wherein said ACD comprises multiple transmitters operating at multiple frequencies configured to drive multiple columns of said VIA and said ARS comprises multiple receivers configured to sense multiple rows of said VIA at multiple frequencies.

109. The computer useable medium of claim 89 wherein said VIA comprises drive electrodes and sense electrodes placed on the same layer and conductive bridges allowing one set of said drive electrodes and said sense electrodes to overlap the other without shorting.

110. The computer useable medium of claim 89 wherein said VIA comprises a diamond pattern with drive electrodes and sense electrodes placed on the same layer and conductive bridges allowing one set of said drive electrodes and said sense electrodes to overlap the other without shorting.

111. The computer useable medium of claim 89 wherein said VIA comprises a two layer structure incorporating said IIC and said IIR.

112. The computer useable medium of claim 89 wherein said VIA comprises sensor elements having a row-column pitch in the range of 0.25 to 2.5 mm.

113. The computer useable medium of claim 89 wherein said IRIE comprises a resistive sensor element.

114. The computer useable medium of claim 89 wherein said ICIE comprises a resistive sensor element.

115. The computer useable medium of claim 89 wherein said ICIE comprises a printed narrow resistive strip.

116. The computer useable medium of claim 89 wherein said IRIE comprises a printed narrow resistive strip.

117. The computer useable medium of claim 89 wherein said ICIE comprises a thin bridge of transparent conductive material.

118. The computer useable medium of claim 89 wherein said IRIE comprises a thin bridge of transparent conductive material.

119. The computer useable medium of claim 89 wherein said ICIE and said IRIE are comprised of the same material as respective columns and rows of said VIA.

120. The computer useable medium of claim 89 wherein said ICIE and said IRIE are comprised of laser trimmed resistors.

121. The computer useable medium of claim 89 wherein said VIA is covered with a thin dielectric layer.

122. The computer useable medium of claim 89 wherein said VIA is electrically shielded by a transparent conductive layer of shielding material.

123. The computer useable medium of claim 89 wherein said VIA further comprises column electrodes and row electrodes formed from a transparent conductive material.

124. The computer useable medium of claim 89 wherein said VIA further comprises column electrodes and row electrodes formed from a transparent conductive material selected from a group consisting of: indium tin oxide (ITO); transparent organic conductive particles; graphene; carbon nanotubes; silver nanowires; micro-patterned conductive mesh; transparent conductive polymer; and metal nanoparticles.

125. The computer useable medium of claim 89 wherein said VIA is formed on the top of or laminated to a display.

126. The computer useable medium of claim 89 wherein said VIA is integrated within the layers of a display.

127. The computer useable medium of claim 89 wherein said TSA is configured to transmit a signal to a stylus from each row and column in said VIA and said stylus is configured to determine a signal strength from said transmission and transmit said signal strength to said CCD.

128. The computer useable medium of claim 89 wherein said TSA is configured to receive a signal from a stylus from each row and column in said VIA and determine the location of said stylus by analysis of said received signal.

129. The computer useable medium of claim 89 wherein said TSA is configured to determine the position of a stylus by bi-directionally communicating with said stylus via rows and columns of said VIA.

130. The computer useable medium of claim 89 wherein said TSA is configured to communicate with multiple styli via the rows and columns of said VIA.

131. The computer useable medium of claim 89 wherein said TSA is configured to communicate with a stylus having multiple transceivers.

132. The computer useable medium of claim 89 wherein said TSA is configured to communicate with a stylus configured to communicate with a host computer via BLUETOOTH® wireless communication.

\* \* \* \* \*